United States Patent
Parker et al.

(10) Patent No.: US 10,167,774 B2
(45) Date of Patent: *Jan. 1, 2019

(54) TURBOMACHINE

(71) Applicant: Cummins Ltd., Huddersfield (GB)

(72) Inventors: John F. Parker, Huddersfield (GB); Robert L. Holroyd, Halifax (GB); Tom J. Roberts, Huddersfield (GB); James Alexander McEwen, West Yorkshire (GB); Tim Denholm, Warwickshire (GB); Simon Moore, Huddersfield (GB); Michael Voong, Huddersfield (GB); Christopher Normington, Huddersfield (GB); Arun Vijayakumar, Huddersfield (GB); Stephen Garrett, Huddersfield (GB)

(73) Assignee: Cummins Ltd., Huddersfield (GB)

( * ) Notice: Subject to any disclaimer, the term of this patent is extended or adjusted under 35 U.S.C. 154(b) by 205 days.

This patent is subject to a terminal disclaimer.

(21) Appl. No.: 14/939,714

(22) Filed: Nov. 12, 2015

(65) Prior Publication Data

US 2016/0061103 A1 Mar. 3, 2016

Related U.S. Application Data

(63) Continuation of application No. 13/692,787, filed on Dec. 3, 2012, now Pat. No. 9,234,456.

(51) Int. Cl.
| | |
|---|---|
| *F01D 17/14* | (2006.01) |
| *F02B 37/22* | (2006.01) |
| *F02B 37/24* | (2006.01) |

(52) U.S. Cl.
CPC ............ *F02B 37/22* (2013.01); *F01D 17/143* (2013.01); *F02B 37/24* (2013.01);
(Continued)

(58) Field of Classification Search
CPC .................................. F01D 7/141; F01D 7/18
(Continued)

(56) References Cited

U.S. PATENT DOCUMENTS

| | | | |
|---|---|---|---|
| 5,267,829 A | 12/1993 | Schmidt et al. | |
| 5,454,225 A * | 10/1995 | Sumser .................. | F01D 9/045 |
| | | | 415/166 |

(Continued)

FOREIGN PATENT DOCUMENTS

| | | |
|---|---|---|
| FR | 2513312 | 3/1983 |
| GB | 2031069 | 5/1982 |

(Continued)

OTHER PUBLICATIONS

European Patent Office, International Search Report and Written Opinion, PCT/GB2010/051672, Cummins Ltd., dated Sep. 9, 2011.
(Continued)

*Primary Examiner* — Woody Lee, Jr.
(74) *Attorney, Agent, or Firm* — Taft Stettinius & Hollier LLP

(57) ABSTRACT

A variable geometry turbine comprising a turbine wheel mounted for rotation about a turbine axis within a housing. The housing defines an annular inlet surrounding the turbine wheel and defined between first and second inlet sidewalls. The turbine further comprises a cylindrical sleeve that is axially movable across the annular inlet to vary the size of a gas flow path through the inlet. The annular inlet is divided into at least two axially offset inlet passages. The inner diameter of the sleeve is greater than the inner diameter of the inlet passages.

17 Claims, 56 Drawing Sheets

(52) U.S. Cl.
CPC .... *F05D 2220/40* (2013.01); *F05D 2250/283* (2013.01); *Y02T 10/144* (2013.01)

(58) Field of Classification Search
USPC .................................. 415/162–165, 194, 195
See application file for complete search history.

(56) References Cited

U.S. PATENT DOCUMENTS

| | | | | |
|---|---|---|---|---|
| 5,855,117 | A * | 1/1999 | Sumser | F01D 17/143 |
| | | | | 415/158 |
| 6,402,465 | B1 * | 6/2002 | Maier | F01D 17/148 |
| | | | | 137/625.15 |
| 7,010,918 | B2 * | 3/2006 | Ruess | F01D 17/105 |
| | | | | 415/157 |
| 7,428,814 | B2 * | 9/2008 | Pedersen | F01D 9/026 |
| | | | | 415/202 |
| 7,458,764 | B2 * | 12/2008 | Lombard | F01D 17/143 |
| | | | | 415/1 |
| 8,186,943 | B2 * | 5/2012 | Fledersbacher | F01D 17/143 |
| | | | | 415/158 |
| 2003/0115875 | A1 | 6/2003 | Sumser et al. | |
| 2007/0177349 | A1 | 8/2007 | Pokharna et al. | |
| 2007/0209361 | A1 | 9/2007 | Pedersen et al. | |
| 2010/0266390 | A1 * | 10/2010 | Henderson | F01D 9/026 |
| | | | | 415/151 |

FOREIGN PATENT DOCUMENTS

| | | |
|---|---|---|
| JP | 05-133238 | 5/1993 |
| JP | 5133238 | 5/1993 |
| JP | 2008-095613 | 4/2008 |
| JP | 2008095613 | 4/2008 |

OTHER PUBLICATIONS

International Search Report and Written Opinion, PCT/GB2010/001866, ISA/EP Cummns Ltd, dated Sep. 2, 2011, 9 pgs.

* cited by examiner

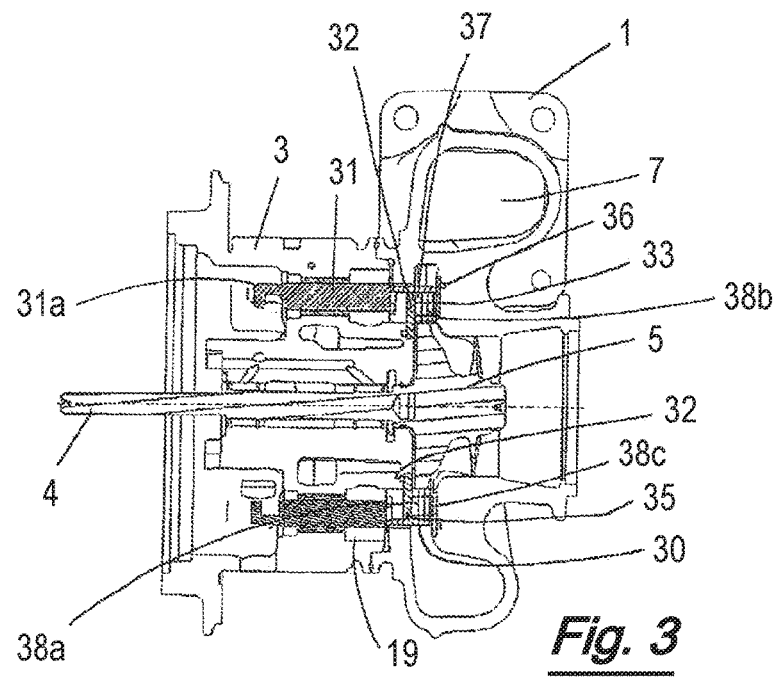
*Fig. 3*
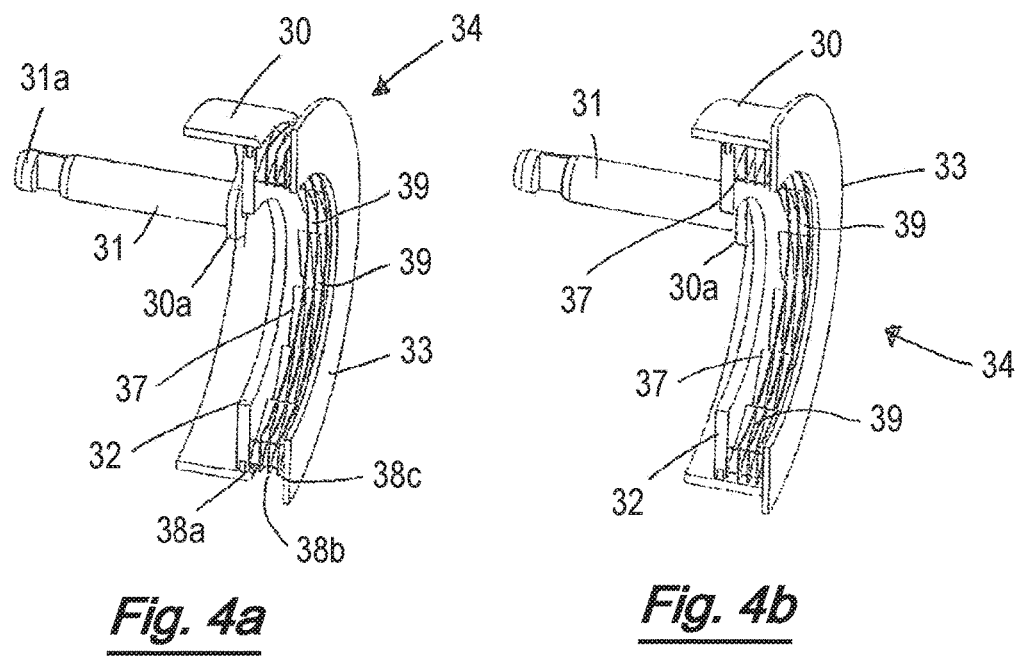
*Fig. 4a*  *Fig. 4b*

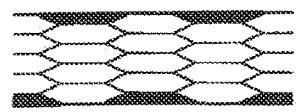
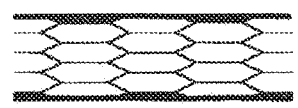
*Fig. 30a*  *Fig. 30b*
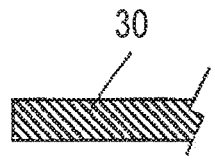
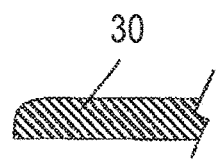
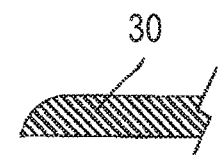
*Fig. 34a*  *Fig. 34b*  *Fig. 34c*
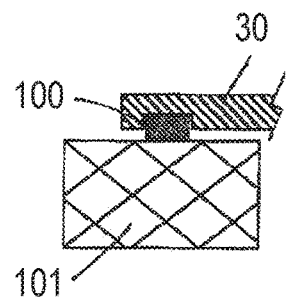
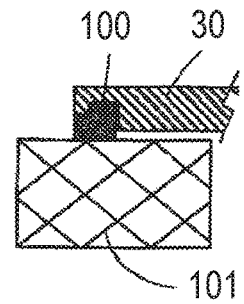
*Fig. 35a*  *Fig. 35b*

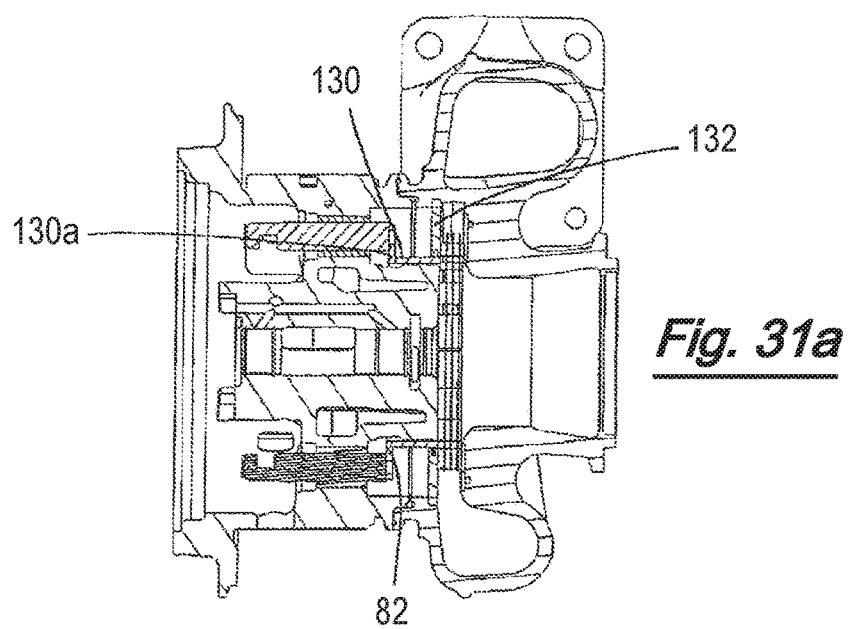
*Fig. 31a*
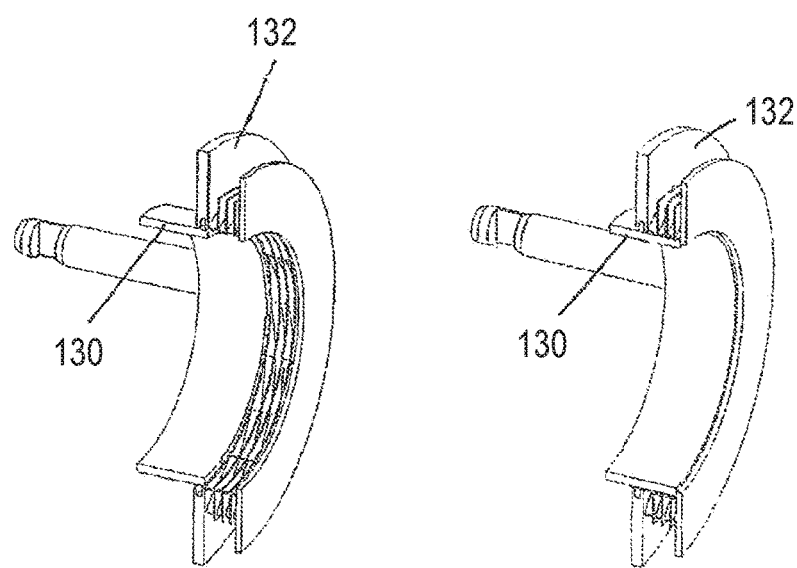
*Fig. 31b*    *Fig. 31c*

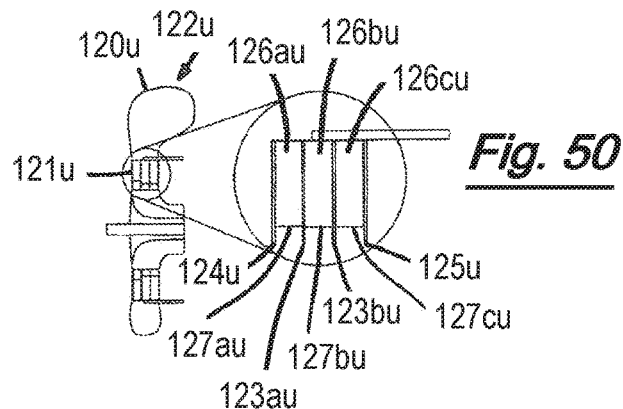
Fig. 50
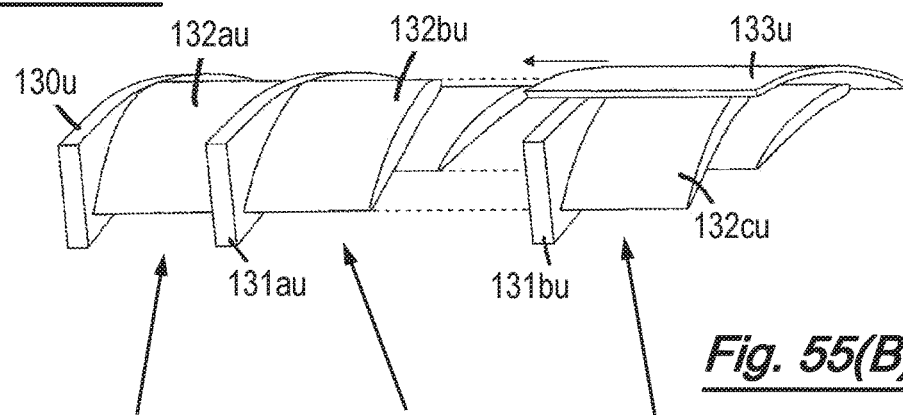
Fig. 55(A)
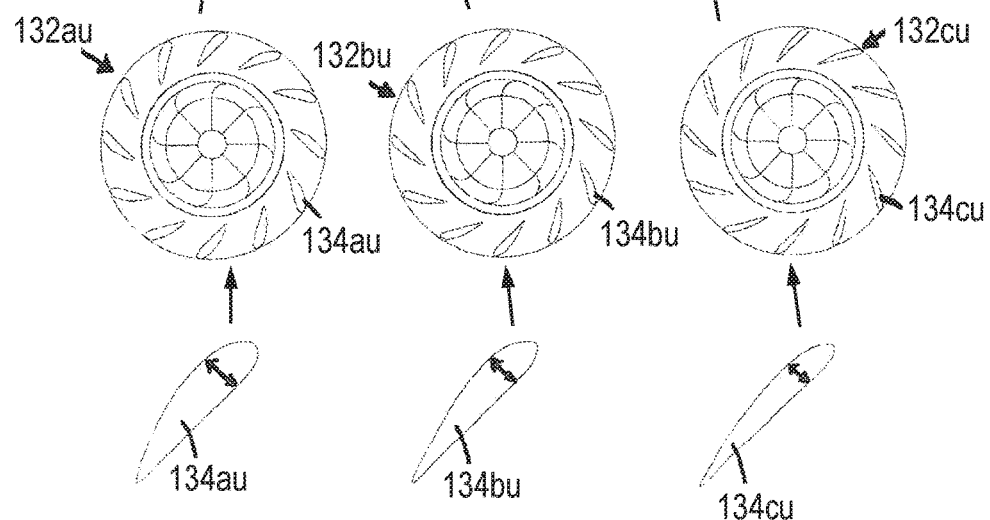
Fig. 55(B)
Fig. 55(C)

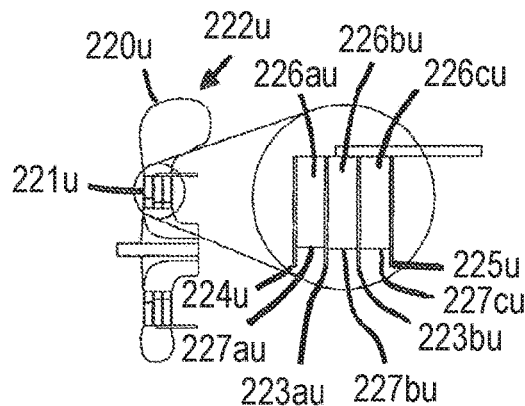
*Fig. 51*
*Fig. 56(A)*
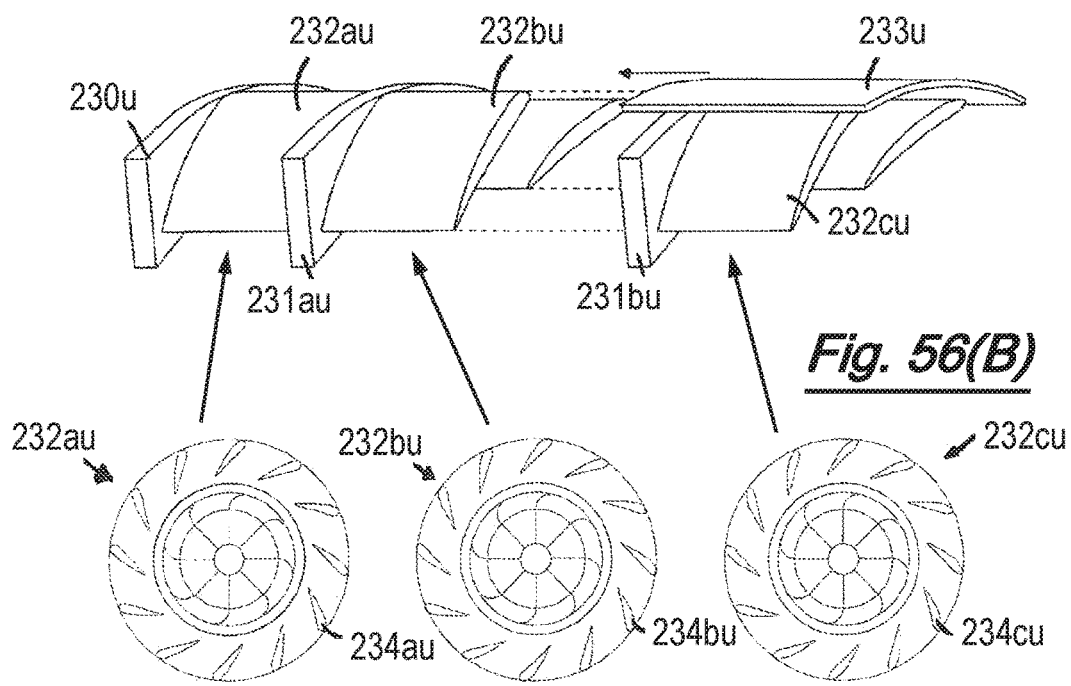
*Fig. 56(B)*
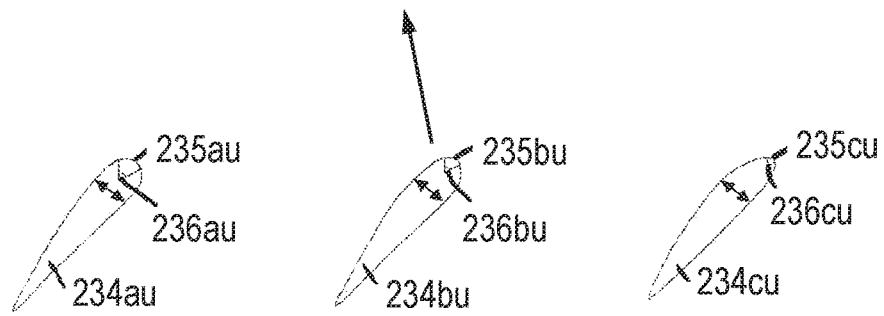
*Fig. 56(C)*

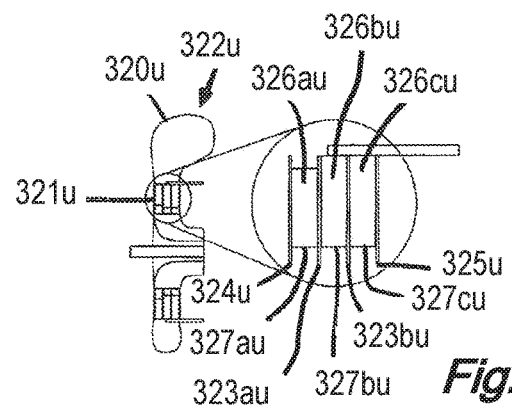
*Fig. 52*
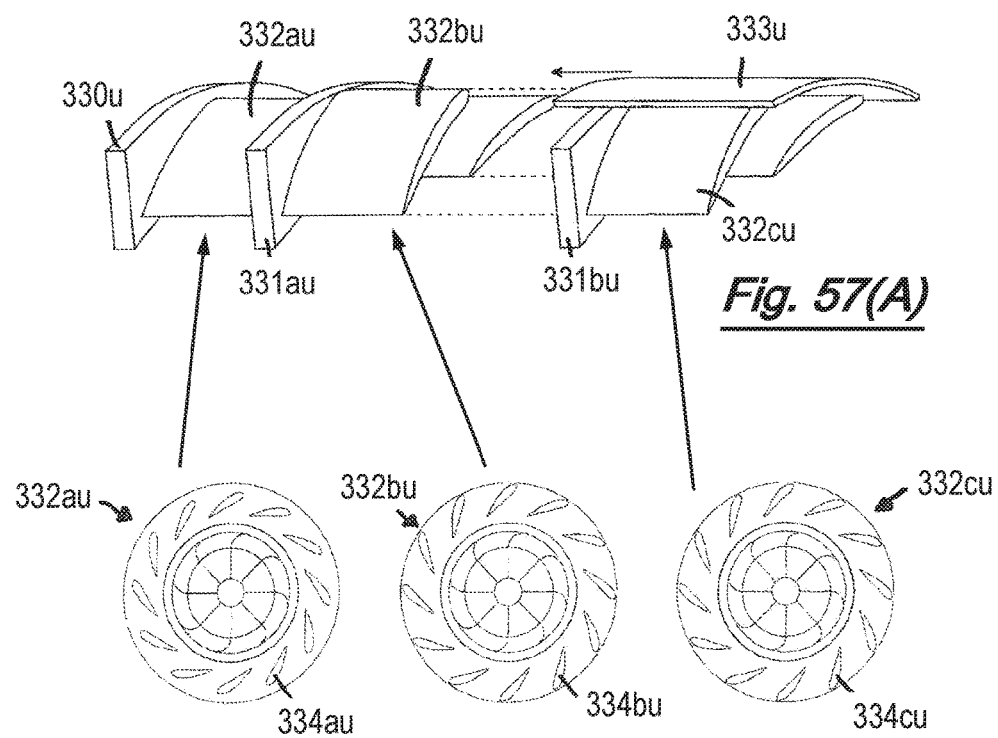
*Fig. 57(A)*
*Fig. 57(B)*

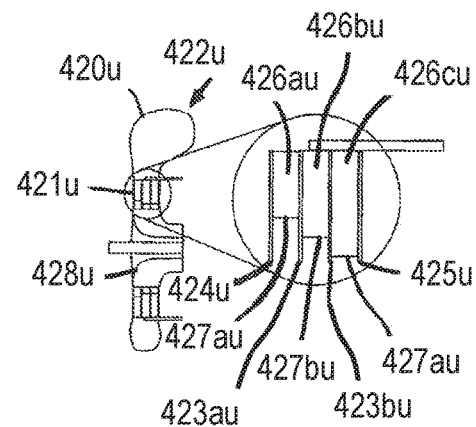
*Fig. 53*
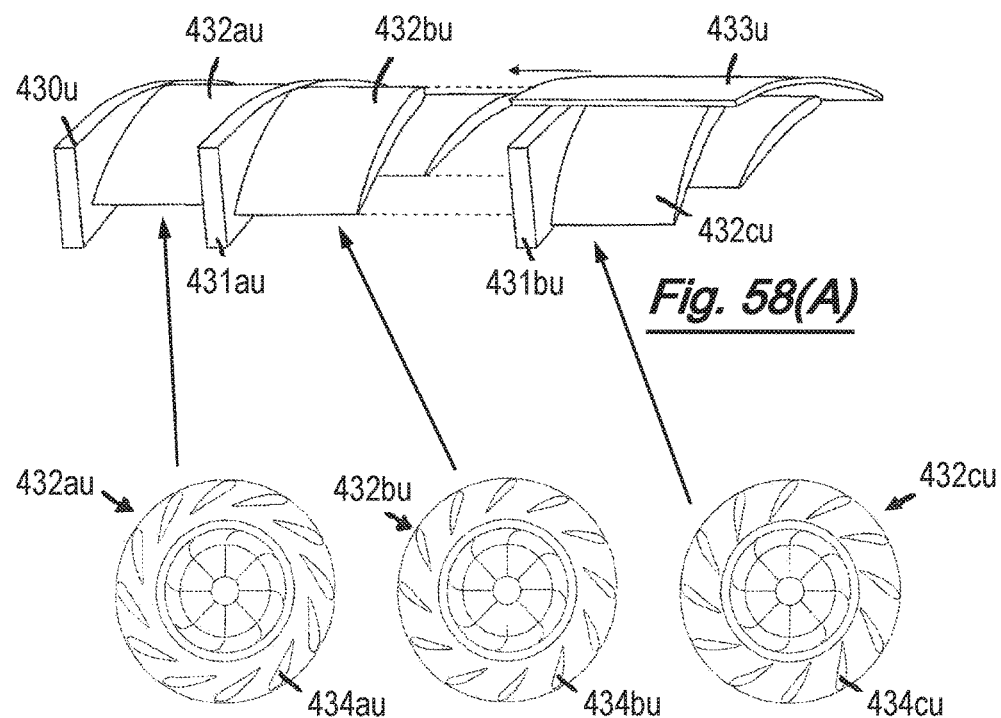
*Fig. 58(A)*
*Fig. 58(B)*

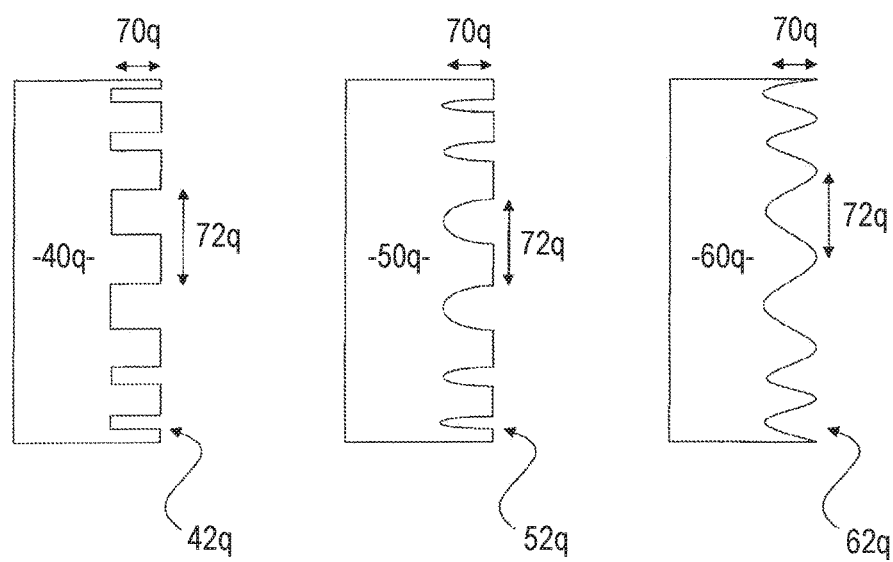

US 10,167,774 B2

TURBOMACHINE

CROSS REFERENCE TO RELATED APPLICATIONS

The present application is a continuation of U.S. patent application Ser. No. 13/692,787 filed on Dec. 3, 2012, which is a continuation of U.S. patent application Ser. No. 13/500,835, filed Apr. 6, 2012, and now abandoned, which is a continuation of PCT/GB2010/051672, filed Oct. 6, 2010, and claims priority from the following British patent applications GB0917513.4, GB1005680.2, GB1012382.6, GB1012389.1, GB1012488.1, GB1012474.1, GB1012536.7, GB1012734.8, GB1012557.3, GB1012767.8, GB1012769.4, GB1012463.4, GB1012471.7, GB1012475.8, GB1012479.0, GB1012492.3, GB1012774.4, GB1012715.5, GB1012538.3, GB1012658.9, GB1012486.5, GB1012768.6, GB1012779.3, GB1012380.0, and GB1012744.7, the entire contents of each of which is hereby incorporated by reference.

The present invention relates to a variable geometry turbine. The variable geometry turbine may, for example, form a part of a turbocharger.

Turbochargers are well known devices for supplying air to an intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine intake manifold. The turbocharger shaft is conventionally supported by journal and thrust bearings, including appropriate lubricating systems, located within a central bearing housing connected between the turbine and compressor wheel housings.

The turbine stage of a typical turbocharger comprises: a turbine chamber within which the turbine wheel is mounted; an annular inlet defined between facing radial walls arranged around the turbine chamber; an inlet volute arranged around the annular inlet; and an outlet passageway extending from the turbine chamber. The passageways and chamber communicate such that pressurised exhaust gas admitted to the inlet volute flows through the inlet to the outlet passageway via the turbine and rotates the turbine wheel. It is also known to improve turbine performance by providing vanes, referred to as nozzle vanes, in the inlet so as to deflect gas flowing through the inlet. That is, gas flowing through the annular inlet flows through inlet passages (defined between adjacent vanes) which induce swirl in the gas flow, turning the flow direction towards the direction of rotation of the turbine wheel.

Turbines may be of a fixed or variable geometry type. Variable geometry turbines differ from fixed geometry turbines in that the size of the inlet can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the inlet using a variable geometry mechanism. Turbochargers provided with a variable geometry turbine are referred to as variable geometry turbochargers.

Nozzle vane arrangements in variable geometry turbochargers can take different forms. In one type, known as a "sliding nozzle ring", the vanes are fixed to an axially movable wall that slides across the inlet passageway. The axially movable wall moves towards a facing shroud plate in order to close down the inlet passageway and in so doing the vanes pass through apertures in the shroud plate. Alternatively, the nozzle ring is fixed to a wall of the turbine and a shroud plate is moved over the vanes to vary the size of the inlet passageway.

The moving component of the variable geometry mechanism, whether it is the nozzle ring or the shroud plate, is supported for axial movement in a cavity in a part of the turbocharger housing (usually either the turbine housing or the turbocharger bearing housing). It may be sealed with respect to the cavity walls to reduce or prevent leakage flow around the back of the nozzle ring.

The moveable wall of the variable geometry mechanism is axially displaced by a suitable actuator assembly comprising an actuator and a linkage. An example of such a known actuator assembly is for instance disclosed in U.S. Pat. No. 5,868,552. The linkage comprises a yoke pivotally supported within the bearing housing and having two arms, each of which extends into engagement with an end of a respective push rod on which the moving component (in this instance the nozzle ring) is mounted. The yoke is mounted on a shaft journaled in the bearing housing and supporting a crank external to the bearing housing which may be connected to the actuator in any appropriate manner. The actuator which moves the yoke can take a variety of forms, including pneumatic, hydraulic and electric forms, and can be linked to the yoke in a variety of ways. The actuator will generally adjust the position of the moving wall under the control of an engine control unit (ECU) in order to modify the airflow through the turbine to meet performance requirements.

In use, axial forces are imported on the moveable wall by the air flow through the inlet, which must be accommodated by the actuator assembly. In addition, a torque is imparted to the nozzle ring as a result of gas flow vane passages being deflected towards the direction of rotation of the turbine wheel. If the nozzle ring is the moving wall of the variable geometry mechanism this torque also has to be reacted or otherwise accommodated by the actuator assembly such as by parts of the linkage.

It is one object of the present invention to obviate or mitigate the aforesaid disadvantages. It is also an object of the present invention to provide an improved or alternative variable geometry mechanism and turbine.

STATEMENTS OF INVENTION

According to an aspect of the present invention there is provided a variable geometry turbine comprising a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into at least two axially offset inlet passages, and wherein the inner diameter of the sleeve is greater than the inner diameter of the inlet passages.

It will be appreciated that axially offset inlet passages include inlet passages with different axial positions and/or inlet passages with different axial extents. Axially offset inlet passages may be spaced apart, adjacent or axially overlapping. Moreover, it will be appreciated that references to the sleeve as being 'cylindrical' are to be interpreted as encompassing any generally cylindrical or annular shape, and does not exclude sleeves having a structure which lacks a perfectly circular axial cross-section. By way of example, cylindrical sleeves in accordance with the present invention may include sections or segments which are not perfectly arcuate so as to define a continuously circular axial cross-section. Such sections or segments could, for example, be substantially straight in axial cross section provided a sufficient number are provided to define a generally cylindrical sleeve.

The inner diameter of the sleeve may be less than or substantially equal to the outer diameter of the inlet passages. Alternatively, the inner diameter of the sleeve is greater than the outer diameter of the inlet passages.

As a further alternative, the turbine may incorporate a plurality of axially movable sleeves, a first sleeve having an inner diameter that is greater than the inner diameter of the inlet passages, and a second sleeve having an inner diameter that is less than or substantially equal to the outer diameter of the inlet passages or an inner diameter that is greater than the outer diameter of the inlet passages. In a still further embodiment, the turbine may incorporate a plurality of axially movable sleeves, a first sleeve having an inner diameter that is less than or substantially equal to the outer diameter of the inlet passages, and a second sleeve having an inner diameter that is greater than the outer diameter of the inlet passages.

The sleeve may be axially movable across the annular inlet in a direction towards the second inlet sidewall so as to reduce the size of the gas flow path through the inlet. At least a portion of an end of the sleeve nearer to the first inlet sidewall than the second inlet sidewall may be configured so as to be exposable to gases flowing through said annular inlet during use. Additionally or alternatively, at least a portion of an end of the sleeve nearer to the first inlet sidewall than the second inlet sidewall may be configured so as to be located in between said first and second inlet sidewall during axial movement of the sleeve across the annular inlet.

The sleeve preferably possesses a small radial thickness or extent, which may, for example, be less than the axial width of the annular inlet. This is intended to reduce aerodynamic load on the sleeve, or actuators thereof. 'Small', may be defined as being less than an axial width of the annular inlet, or less than an axial width of an inlet portion or passage way. The sleeve may be less than 5 mm thick, less than 4 mm thick, less than 3 mm thick, less than 2 mm thick, or less than 1 mm thick, for example approximately 0.5 mm thick.

The annular inlet may be divided into at least two axially offset inlet passages by at least one annular baffle axially spaced from the first and second inlet sidewalls.

Inlet vanes may extend axially across at least one of the axially offset inlet passages.

The minimum distance between a baffle and the turbine wheel may be less than the minimum distance between an adjacent vane and the turbine wheel.

The trailing edges of at least some of the vanes extending across one of the axially offset inlet passages may lie on a different radius to the trailing edges of at least some of the vanes extending across another of the axially offset inlet passages.

The annular inlet may be divided into an annular array of substantially tubular inlet passages extending generally towards the turbine wheel, wherein the annular array of inlet passages comprises at least three axially offset inlet passages.

A variable geometry turbine may comprise an annular inlet surrounding a turbine wheel mounted for rotation about a turbine axis within a turbine chamber defined by a housing, the chamber having an annular inlet defined between inboard and outboard inlet side walls and surrounding the turbine wheel, the annular inlet including:

a first pair of first and second circumferentially spaced inlet passages; and a second pair of third and fourth circumferentially spaced inlet passages;

wherein the second pair of inlet passages is axially displaced from the first pair of inlet passages; and wherein a cylindrical sleeve is supported within the housing for reciprocal motion in an axial direction to vary the size of the annular inlet; and wherein the sleeve is movable between at least a first position in which each of the first pair of inlet passages is at least partially open to gas flow, and the second pair of inlet passages are fully open to gas flow, and a second position in which the first pair of inlet passages are fully blocked to the gas flow and each of the second pair or inlet passages is at least partially blocked to gas flow.

Typically, exhaust gas may flow to the annular inlet via a surrounding volute. In some embodiments of the invention the volute may be axially or circumferentially divided, the annular inlet being defined downstream of the volute or any divided portion of the volute. In such divided volute turbines the adjacent volute portions generally do not communicate with each other, other than at their downstream ends where they terminate at the inlet.

The inboard and outboard inlet sidewalls may for instance be continuations of walls which define the volute.

Typically, the maximum width of the inlet will correspond to the area swept out by rotation of the tips of the turbine wheel blades.

When the sleeve is in the second position each of the second pair of inlet passages may be fully blocked to gas flow.

Some variable geometry turbochargers may include a third pair of fourth and fifth circumferentially spaced inlet passages which are axially displaced from both the first and second pairs of inlet passages. Such embodiments may comprise four or more axially displaced pairs of circumferentially spaced inlet passages. When the sleeve is in the second position, all but one of said axially spaced pairs of circumferentially spaced inlet passages may be fully blocked to gas flow, the remaining pair of circumferentially spaced inlet passages being at least partially blocked to gas flow.

Each of the pairs of inlet passages may be a part of a respective annular array of circumferentially spaced inlet passages surrounding the turbine wheel.

Each pair or annular array of inlet passages may comprise passages which are substantially axially coincident.

At least one inlet passage of at least one pair or annular array of inlet passages may axially overlap at least one of the inlet passages of an adjacent pair or annular array of inlet passages.

The first position of the sleeve may be an open position in which each of said pairs or annular arrays of circumferentially spaced inlet passages are open to gas flow.

The second position of the sleeve may be a closed position in which a free end of the sleeve projects across the annular inlet and abuts either the inboard or outboard side wall.

The sleeve may be controllably positioned between said first and second positions.

In some embodiments the number of inlet passages comprising each annular array of circumferentially spaced inlet passages may be the same.

In other embodiments the number of inlet passages comprising one annular array of circumferentially spaced inlet passages may differ from the number of inlet passages comprising at least one other annular array of circumferentially spaced inlet passages.

A variable geometry turbine may comprise a turbine wheel mounted for rotation about a turbine axis within a housing, the housing defining a annular inlet surrounding the turbine wheel and defined between inboard and outboard inlet side walls, wherein a cylindrical sleeve is mounted within the housing for axial slideable movement across at least a portion of the annular inlet to vary the size of the annular inlet, further comprising:

at least one annular baffle axially spaced from the inboard and outboard side walls of the annular inlet to divide the annular inlet into axially adjacent annular portions, and wherein inlet vanes extend axially across at least two of said annular portions defined by the or each baffle.

Again, gas may flow to the annular inlet via an annular volute or similar chamber surrounding the annular inlet. In some embodiments the volute may be a divided volute, for instance split into separate axial or circumferential portions which may for instance receive gas from different sources (e.g. different banks of cylinders in a multi-cylinder combustion engine). In embodiments of the present invention the inlet and baffle will be downstream of the volute, or any volute portions in a divided volute.

A variable geometry turbine may comprise two or more axially spaced inlet baffles which axially divide the annular inlet into three or more annular regions, wherein inlet vanes extend across at least three of said annular regions.

At least some inlet vanes may extend across the full width of the annular inlet between the inboard and outboard side walls. For instance, an annular array of inlet vanes may extend across the annular inlet between the inboard and outboard side walls and two or more annular inlet baffles may be axially spaced within the annular inlet which together with the vanes define three or more axially spaced annular arrays of inlet passages.

A variable geometry turbine may comprise a turbine wheel mounted for rotation about a turbine axis within a housing, the housing having an annular inlet surrounding the turbine wheel and defined between inboard and outboard inlet side walls, wherein the annular inlet is axially divided into adjacent annular regions by two or more annular inlet baffles, and wherein a cylindrical sleeve is mounted within the housing for axial slideable movement across at least a portion of the annular inlet to vary the size of the annular inlet.

As with other variable geometry turbines, the annular inlet may be defined downstream of a surrounding volute (which may be a divided volute) or similar gas chamber.

Inlet vanes may extend across at least one of the annular regions to divide the annular region into a circumferential spaced array of inlet passages.

Some variable geometry turbines which include inlet vanes as mentioned above, may be such that the trailing edges of at least a majority of vanes extending across an annular portion of the inlet may lie on a radius greater than the internal radius of a baffle defining the annular portion.

In some variable geometry turbines all of the vanes extending across an annular portion of the inlet may have a trailing edge lying at a radius greater than the internal radius of a baffle defining the annular portion. In some embodiments each annular baffle may have an internal radius smaller than the radius of the leading edge of any vane of the annular inlet.

The number of vanes extending across a first annular portion of the inlet may differ from the number of vanes extending across a second annular portion of the inlet.

At least some of the vanes extending across a first annular portion of the inlet may have a configuration different to at least some of the vanes extending across a second annular portion of the inlet. For instance, the vanes extending across a first annular portion of the inlet may have a different swirl angle to the vanes extending across a second annular portion of the inlet.

The trailing edges of at least some of the vanes extending across a first annular portion of the inlet may lie on a different radius to the trailing edges of at least some of the vanes extending across a second annular portion of the inlet. In some embodiments the trailing edges of all of the vanes extending across a first annular portion of the inlet lie on a radius different to that of the trailing edges of all of the vanes extending across a second annular portion of the inlet. In some embodiments the trailing edges of vanes of one annular portion of the inlet lie on a minimum radius which is different to that of vanes extending across any other annular portion of the inlet.

Some variable geometry turbines may comprise at least two of said annular baffles which divide the annular inlet into at least three axially adjacent annular portions.

Movement of the sleeve between positions defining the maximum and minimum width of the inlet is confined to discreet positions corresponding to the axial location of the or each annular baffle.

Accordingly, in some variable geometry turbines the sleeve may be controlled to move in a step-wise fashion between discreet positions which may correspond to open and closed positions as well as intermediate positions, wherein each of the intermediate positions corresponds to the position of an annular baffle. In such intermediate positions the free end of the sleeve may axially align with the leading edge of a baffle.

Some variable geometry turbines may comprise at least two of said annular baffles dividing the annular inlet into at least three axially adjacent annular portions, wherein at least one of said annular portions does not include any inlet vanes.

A variable geometry turbine may comprise a turbine wheel mounted for rotation about a turbine axis within a housing, the housing including an annular inlet surrounding the turbine wheel and defined between inboard and outboard inlet side walls, wherein an annular array of inlet vanes extends between the inboard and outboard inlet side walls defining circumferentially spaced vane passages between adjacent inlet vanes, and wherein substantially circumferentially extending baffle walls extend between at least some adjacent pairs of inlet vanes to divide the respective vanes passages into axially spaced inlet passages.

At least one baffle wall may be annular.

A variable geometry turbine may comprise a turbine wheel mounted for rotation about a turbine axis within a housing, the housing including an annular inlet surrounding the turbine wheel and defined between inboard and outboard inlet side walls, wherein the annular inlet includes a nozzle structure comprising an annular array of substantially tubular inlet passages extending generally towards the turbine wheel, wherein the annular array of inlet passages comprises at least three axially displaced inlet passages.

The nozzle structure may be disposed downstream of an annular volute (which may be axially or circumferentially divided) which surrounds the annular inlet passage to deliver gas flow to the annular inlet passage.

The inlet passages may have a generally diamond, pentagonal, hexagonal or other polygonal cross section along at least a portion of their length.

In some variable geometry turbines the geometry of any given inlet passage may vary along its length. For instance, the cross-sectional area of the inlet passage may decrease to a minimum and then increase again. Similarly, the cross-sectional area may change shape at different positions along its length. For example, the inlet passage may have one cross section at its inlet (upstream) end and another cross section at its outlet (downstream) end. The cross section may change gradually along its length from inlet to outlet. Inlet passages may be substantially straight, or may be curved. In either case they may be swept forwards or backwards relative to the direction of rotation of the turbine wheel.

There may be two or more adjacent annular arrays of inlet passages. Adjacent annular arrays may comprise inlet passages of a different number and/or size and/or geometry or configuration. For instance the passages of one annular array may define a different swirl angle to the passages of another annular array.

The inlet passages may be defined by two or more annular inlet baffles positioned within the annular inlet, wherein adjacent inlet baffles contact one another or are otherwise joined to one another at circumferentially spaced locations to define inlet passages between the areas of contact. The annular inlet baffles may be circumferentially corrugated, so that the areas of contact between adjacent baffles extend across substantially the full radial width of each annular baffle.

The cylindrical sleeve of any aspect of the invention may be mounted within a housing cavity separated from the inlet passage by said inboard side wall, wherein a free end of the cylindrical sleeve extends from said cavity into the annular inlet to define the width of the annular inlet.

Gas flow through the annular inlet may therefore be confined between the free end of the sleeve and the outboard side wall.

In some variable geometry turbines the housing comprises a bearing or centre housing portion, and a turbine housing portion, wherein the turbine wheel rotates in a chamber defined between the bearing/central housing and the turbine housing portions, and wherein the cylindrical sleeve is mounted with a housing cavity defined within the bearing/central housing.

The cylindrical sleeve of any of the aspects of the invention may alternatively be mounted within a housing cavity separated from the inlet passage by said outboard side wall, wherein a free end of the cylindrical sleeve extends from said cavity into the annular inlet to define the width of the annular inlet.

Gas flow through the annular inlet may therefore be confined between the free end of the sleeve and the inboard side wall.

In some variable geometry turbines the housing comprises a bearing or centre housing portion, and a turbine housing portion, wherein the turbine wheel rotates in a chamber defined between the bearing/central housing and the turbine housing portions, and wherein the cylindrical sleeve is mounted with a housing cavity defined within the turbine housing.

The cylindrical sleeve is preferably movable across an outside diameter of the annular inlet to selectively block upstream ends of respective inlet passages or portions relative to gas flow through the turbine.

However in other variable geometry turbines the cylindrical sleeve is movable across an inside diameter of the annular inlet to selectively block downstream ends of respective inlet passages or portions relative to gas flow through the turbine.

Preferentially, the sleeve surrounds the inlet portions, which has been found to give an improved aerodynamic performance. In other words, the inner diameter of the sleeve is greater than an outer diameter (or outer radial extent) of the inlet portion or portions. In another embodiment, the sleeve may be surrounded by the inlet portions. In other words, the outer diameter of the sleeve may be less than inner diameter of the inlet portion or portions. In another embodiment, the sleeve may be moveable through the inlet portion or portions. In other words, the diameter (e.g. inner or outer, or average diameter) of the sleeve may be less than an outer diameter of the inlet portion or portions, and greater than an inner diameter of the inlet portion or portions.

A variable geometry turbine may comprise a turbine wheel mounted for rotation about a turbine axis within a housing, the housing defining an annular inlet surrounding the turbine wheel and defined between inboard and outboard inlet sidewalls, and further comprising at least one annular baffle axially spaced from the inboard and outboard sidewalls of the annular inlet to divide the annular inlet into axially adjacent annular portions, and a cylindrical sleeve axially movable within the annular inlet around the outside diameter of the annular inlet portions and said at least one annular baffle to vary the size of the annular inlet defined between a free end of the sleeve and either the inboard or outboard sidewall.

Once again, the annular inlet may be defined downstream of a surrounding volute (including a divided volute or similar chamber for delivering gas flow to the annular inlet). The effective axial width of the inlet is defined between the free end of the sleeve and either the inboard or outboard sidewalls (depending on which side of the housing the sleeve is mounted).

In some variable geometry turbines the cylindrical sleeve is mounted for movement in a step-wise manner between an open position, a closed position, and one or more positions corresponding to the position of the or each annular baffle.

The sleeve is therefore constrained to move between discreet predetermined positions, some of which correspond to the location of inlet baffles. In some embodiments the sleeve may be prevented from being positioned such that its free end lies between adjacent baffles.

One or more vanes may extend across at least one of the annular inlet portions.

Accordingly, there may be provided a method of controlling or operating a turbine according to the present invention, in which the sleeve is moved in discreet axial steps between positions corresponding to a closed position, an open position and intermediate positions in which the free end of the sleeve is aligned with an annular inlet baffle.

A variable geometry turbine may comprise a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet, at least a portion of the cylindrical sleeve being coated with a catalyst which promotes the decomposition of contaminants which pass through the inlet.

The catalyst may promote the oxidation of soot.

The annular inlet may be divided into at least two axially offset inlet passages.

A variable geometry turbine may comprise a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into a first annular inlet portion and a second annular inlet portion axially offset from the first inlet portion, main inlet vanes and splitter inlet vanes extending axially into at least one of the first and second inlet portions, the main inlet vanes and splitter inlet vanes defining circumferentially adjacent inlet passages.

It will be appreciated that axially offset inlet passages include inlet passages with different axial positions and/or inlet passages with different axial extents. Axially offset inlet passages may be spaced apart, adjacent or axially overlapping.

The main inlet vanes and splitter vanes may extend in into at least one of the first and second inlet portions such that the main inlet vanes and splitter inlet vanes are circumferentially alternating.

The radial distance between the turbine wheel and the trailing edge of a splitter inlet vane may be greater than the radial distance between the turbine wheel and the trailing edge of a main inlet vane.

A variable geometry turbine may comprise a turbine wheel mounted for rotation about a turbine axis within a housing, the housing defining an annular inlet surrounding the turbine wheel and defined between first and second inlet sidewalls, the annular inlet being divided into at least two axially offset inlet portions; and a cylindrical sleeve axially movable across the annular inlet to vary the size of a gas flow path through the inlet; wherein the sleeve is formed from a rolled sheet of material.

Opposing faces of the rolled sheet of material may be attached to one another, such that there is no overlap between ends of the sheet that carry the opposing faces.

Opposing faces or ends of the rolled sheet of material may, instead, overlap one another.

The sleeve, and/or a structure defining the inlet portions, is provided with an axially extending step. The step is a step up or down in the circumferential direction.

A variable geometry turbine may comprise a turbine wheel mounted for rotation about a turbine axis within a housing, the housing defining an annular inlet surrounding the turbine wheel and defined between first and second inlet sidewalls, the annular inlet being divided into at least two axially offset inlet portions; a first cylindrical sleeve section axially movable across the annular inlet to vary the size of a gas flow path through the inlet; and a second cylindrical sleeve section axially movable across the annular inlet to vary the size of a gas flow path through the inlet.

The first cylindrical sleeve section and the second cylindrical sleeve section may be independently moveable with respect to one another.

The first cylindrical sleeve section and the second cylindrical sleeve section may be attached to one another.

The first cylindrical sleeve section and the second cylindrical sleeve section may both have an inner diameter that is greater than an outer diameter of the inlet portions.

The first cylindrical sleeve section and the second cylindrical sleeve section may both have an outer diameter that is less than an inner diameter of the inlet portions.

The first cylindrical sleeve section may have an inner diameter that is greater than an outer diameter of the inlet portions; and/or the second cylindrical sleeve section may have an outer diameter that is less than an inner diameter of the inlet portions.

The variable geometry turbine may further comprise a third cylindrical sleeve section, moveable to open or close a passage between the inlet, or a volume upstream of the inlet, and a turbine outlet.

A variable geometry turbine may comprise: a turbine wheel mounted for rotation about a turbine axis within a housing, the housing defining an annular inlet surrounding the turbine wheel and defined between first and second inlet sidewalls, and a (e.g. substantially annular) baffle structure being axially moveable across the inlet to vary a configuration of a gas flow path through the inlet; the baffle structure comprising at least two axial offset inlet portions, both of which portions may be located fully (i.e. not partially) within the annular inlet.

At least one inlet portion may comprise vanes, dividing an inlet portion into inlet passageways.

At least two inlet portions may comprise vanes, dividing the inlet portions into inlet passageways.

A configuration of vanes in a first inlet portion may be different from a configuration of vanes in a second inlet portion.

A configuration of vanes in a second inlet portion may be the same as a configuration of vanes in a second inlet portion.

The baffle structure may be provided in or on an axially moveable sleeve.

The sleeve may comprise a solid portion (i.e. not an inlet portion) which may be at least partially locatable within the inlet.

The baffle structure may comprise at least three axial offset inlet portions, all three of which portions may be located fully within the annular inlet.

A variable geometry turbine may comprise:

a turbine wheel mounted for rotation about a turbine axis within a housing, the housing defining an annular inlet surrounding the turbine wheel and defined between first and second inlet sidewalls;

a cylindrical sleeve axially movable across the annular inlet to vary the size of a gas flow path through the inlet;

the annular inlet divided into axially adjacent annular portions by at least one annular baffle which is axially spaced from the first and second inlet sidewalls;

inlet vanes extending axially across at least two of said annular portions defined by the or each baffle so as to divide said annular inlet into at least two axially offset inlet passages;

wherein one of said annular baffle(s) has an axial thickness which is less than the maximum axial thickness of at least one of said inlet vanes.

The vanes are orientated to deflect gas flowing through the annular inlet towards the direction of rotation of the turbine wheel. While thicker vanes can have certain benefits they can reduce the "throat area" of the annular inlet, i.e. the maximum swallowing capacity of the turbine. The throat area of the inlet can also be reduced by the presence of any other obstructions or constrictions within the annular inlet. The present invention employs at least one annular baffle provided within the annular inlet so as to divide the inlet into axially adjacent annular portions. To address the potential problem of the baffle(s) reducing the throat area of the inlet, one (or more when a plurality of baffles are present) of said annular baffle(s) has an axial thickness which is less than the maximum axial thickness of at least one of said inlet vanes.

Said one annular baffle preferably has an axial thickness which is less than the maximum axial thickness of all of said inlet vanes. In a preferred embodiment the turbine incorporates a plurality of baffles and all of said baffles have an axial thickness which is less than the maximum axial thickness of all of said inlet vanes.

The total axial thickness of all of the baffles within the annular inlet (i.e. the axial thickness of the baffle when only one is present, or the sum of the axial thicknesses of all of the baffles when two or more are present) may be less than around 50% of the maximum axial thickness of at least one of said inlet vanes. More preferably, the total axial thickness of all of the baffles within the annular inlet is less than around 25% of the maximum axial thickness of at least one of said inlet vanes. Still more preferably the total axial thickness of the baffles is less than around 10% of the maximum axial thickness of at least one of said inlet vanes.

It is preferred that the total axial thickness of all of the baffles within the annular inlet is less than around 25% of the maximum axial width of said annular inlet and may be less than around 10% or 5% of the maximum axial width of said annular inlet.

Another way in which the total thickness of the baffle or baffles can be defined is in relation to the outer diameter of the turbine wheel used in that particular turbine. It is preferred that the total axial thickness of the baffle or baffles within the annular inlet is around 1 to 5% of the diameter of the turbine wheel. More preferably, the total axial thickness may be around 1.5 to 3%, and is yet more preferably around 2 to 2.5%. It is particularly preferred that the total axial thickness is around 2.25% of the diameter of the turbine wheel.

By way of example, in a 40 mm diameter turbine wheel, 3 annular baffles may be employed, each having an axial thickness of around 0.3 mm, which is 0.75% of the diameter of the turbine wheel. Since 3 annular baffles are present the total axial thickness of the baffles within the inlet is 3×0.75%=2.25%.

By way of a further example, in a 90 mm diameter turbine wheel again employing 3 annular baffles, an appropriate axial thickness for each baffle is around 0.7 mm, which is around 0.78% of the diameter of the turbine wheel, making a total axial thickness of the baffles of 3×~0.78%=~2.3%.

In further exemplary embodiments employing a single annular baffle, a 65 mm diameter turbine wheel could incorporate an annular baffle having an axial thickness of 1.5 mm, and a 35 mm diameter turbine wheel could incorporate an annular baffle of 0.8 mm axial thickness.

In still further exemplary embodiments employing two annular baffles, 0.75 mm thick baffles could be used with a 65 mm diameter turbine wheel, and 0.4 mm thick baffles could be used on a 35 mm diameter turbine wheel.

It is preferred that the axial thickness of the or each annular baffle is at least around 0.075 to 0.1 mm, and is more preferably at least around 0.2 mm.

In embodiments of the present invention including two or more annular baffles, the axial thickness of at least two of said baffles may be the same or different. For example, a first annular baffle may define a first axial thickness and a second annular baffle within the same annular inlet may define a different second axial thickness, which may be the same, larger or smaller than the first. Regardless of whether the baffles have the same or different axial thicknesses it is preferred that the total axial thickness of the baffles lies within the preferred range recited above of around 1 to 5% of the diameter of the turbine wheel with which the baffles are being used.

The inlet vanes may have any suitable configuration, and may for example have a similar general aerofoil configuration to that of known inlet vanes, or they may have any alternative configuration selected to define a particular arrangement and configuration of inlet passages. Since the vanes and inlet baffles together define the configuration and orientation of the inlet passages, a wide variety of different inlet passage configurations can be achieved by appropriate design of the individual nozzle vanes in combination with the inlet baffles. Moreover, the designs can be such that there may be differently configured inlet passages in one annular portion as compared to another annular portion within an annular inlet, or there may be differently configured inlet passages within a single annular portion, or both. For instance, the vanes extending across a first annular portion of the inlet may define a different swirl angle to the vanes extending across a second annular portion of the inlet.

The inlet vanes may be provided in annular arrays within each annular portion. The vanes in two or more annular arrays may have different maximum axial thickness, leading edge thickness, maximum circumferential thickness and/or swirl angle. Thus, for example, an array of vanes in a first annular portion may incorporate a plurality of vanes of a first maximum axial thickness and another array of vanes in a second annular portion, which is axially offset from the first annular portion, may incorporate a plurality of vanes of a different second maximum axial thickness, the first maximum axial thickness being larger than the second or vice versa as appropriate. In embodiments incorporating three or more annular portions and therefore three or more annular arrays of vanes, the variation in maximum axial thickness of the vanes may decrease progressively between adjacent pairs of annular arrays, or an intermediate array may possess vanes having a leading edge thickness that is larger or smaller than the arrays of vanes on either side. A similar relationship may exist in respect of the leading edge thickness, maximum circumferential thickness and/or swirl angle between axially offset arrays of vanes.

There is further provided a variable geometry turbine comprising a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into a first annular inlet portion and a second annular inlet portion axially offset from the first inlet portion, inlet vanes extending axially into each of the first and second inlet portions, the inlet vanes defining axially adjacent inlet passages; wherein the configuration of the inlet vanes extending into the first inlet portion differs from the configuration of the inlet vanes extending into the second inlet portion.

The number of vanes in each annular array may differ. For instance, an annular array of fifteen vanes may be included in the same nozzle assembly as an annular array of only eight vanes. Other arrays may have a different number of vanes, greater than fifteen or fewer than eight, or somewhere in between, e.g. twelve. In addition, vanes having different radial extents, and different swirl angles may be used, e.g. some vanes swept forwards to a greater extent than others, and as such defining a greater swirl angle.

For certain engine applications (such as for exhaust gas recirculation, "EGR") it may be desirable to reduce the turbine efficiency in one or more of the arrays of inlet passageways. For example, it may be desirable to reduce efficiency at relatively open inlet widths in some applications. Such reduced efficiency could for instance be achieved by reducing the radial extent of the vanes, increasing the circumferential width and/or leading edge thickness of the vanes, or otherwise configure the vanes to reduce the effective inlet area. A similar effect could also be achieved by providing one or more baffles of increased axial thickness.

In some embodiments relatively small "splitter vanes" may be located between adjacent pairs of "main" vanes. This arrangement may have the effect of increasing the total number of vanes compared with other embodiments, but the vanes may be provided with a reduced radial extent so that there is a greater radial clearance between the vanes and the turbine wheel. The splitter vanes may be advantageous in some embodiments to reduce vibration excited in the turbine blades.

In some embodiments, the vanes may have a "cut-off" configuration in the region of the trailing edge rather than a full airfoil configuration which can be expected to provide reduced efficiency but which may be useful in some applications. In addition, obstructions may be located between adjacent vanes which could further reduce efficiency.

The baffle(s), vane(s) and/or sliding sleeve may be formed from a material that is a ceramic, a metal or a cermet (a ceramic/metal composite). The metal could be any steel, or a nickel based alloy, such as inconel. Any or all of these components may be provided with a coating, for example on the sliding interface of the nozzle and the sleeve there could be a coating of diamond-like-carbon, anodisation, or tribaloy or a substitute wear resistant coating. The aerodynamic surfaces may be provided with a coating to promote smoothness or resist corrosion. Such coatings could include non-deposited coatings such as a plasma-electrolytic-oxide coating or substitute coatings.

It should be appreciated that exhaust gas typically flows to the annular inlet from a surrounding volute or chamber. The annular inlet is therefore defined downstream of the volute, with the downstream end of the volute terminating at the upstream end of the annular inlet. As such, the volute transmits the gas to the annular inlet, while the gas inlet passages of the present invention receive gas from the volute. In some embodiments, the first and second inlet sidewalls which define the annular inlet are continuations of walls which define the volute. The annular inlet may be divided into at least two axially offset inlet passages by one or more baffles located in the annular inlet, and which are therefore positioned downstream of the volute.

The turbine of the present invention has been illustrated in the figures using a single flow volute, however it is applicable to housings that are split axially, whereby gas from one or more of the cylinders of an engine is directed to one of the divided volutes, and gas from one or more of the other cylinders is directed to a different volute. It is also possible to split a turbine housing circumferentially to provide multiple circumferentially divided volutes, or even to split the turbine housing both circumferentially and axially. It should be appreciated, however, that an axially or circumferentially divided volute is distinguished from the multiple gas inlet passages present in the turbine of the present invention. For example, the gas inlet passages relate to a nozzle structure arranged to accelerate exhaust gas received from the volute towards the turbine, and optionally to adjust or control the swirl angle of the gas as it accelerates. The multiple gas inlet passages forming part of the present invention may be further distinguished from a divided volute arrangement in that, while the gas inlet passages receive gas from the volute (or divided volute), and split the gas into an array of paths directed on to the turbine, a divided volute receives gas from the exhaust manifold so as to retain the gas velocity in gas pulses resulting from individual engine cylinder opening events.

It will be appreciated that axially offset inlet passages include inlet passages with different axial positions and/or inlet passages with different axial extents. Axially offset inlet passages may be spaced apart, adjacent or axially overlapping.

A variable geometry turbine may comprise a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into a first annular inlet portion and a second annular inlet portion axially offset from the first inlet portion, equal numbers of inlet vanes extending axially into each of the first and second inlet portions, the inlet vanes defining axially adjacent inlet passages; wherein the configuration of the inlet vanes extending into the first inlet portion differs from the configuration of the inlet vanes extending into the second inlet portion in that the vanes extending into the first inlet portion are circumferentially offset from the vanes extending into the second inlet portion such that the gas flow path for gases exiting the inlet passages in the first inlet portion is circumferentially offset from the gas flow path for gases exiting the inlet passages in the second inlet portion.

It will be appreciated that axially offset inlet passages include inlet passages with different axial positions and/or inlet passages with different axial extents. Axially offset inlet passages may be spaced apart, adjacent or axially overlapping.

The first and second inlet portions may be adjacent one another.

The configuration of the inlet vanes extending into the first inlet portion may differ from the configuration of the inlet vanes extending into the second inlet portion in that the vanes extending into the first inlet portion are circumferentially offset from the vanes extending into the second inlet portion.

The vanes extending into the first inlet portion may be circumferentially offset from the vanes extending into the second inlet portion by a circumferential distance which is generally half that of the circumferential distance separating two adjacent vanes in either the first inlet portion or the second inlet portion.

The vanes in the first and second inlet portions may have substantially the same outer diameter and different inner diameters. Alternatively, the vanes in the first and second inlet portions may have different outer diameters and substantially the same inner diameters. As a further alternative, the respective outer and inner diameters of the vanes in the first and second inlet portions may be different, or may be substantially the same.

A variable geometry turbine may comprise a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into a first annular inlet portion and a second annular inlet portion axially offset from the first inlet portion, inlet vanes extending axially into each of the first and second inlet portions, the inlet vanes defining axially adjacent inlet passages; wherein the configuration of the inlet vanes extending into the first inlet portion differs from the configuration of the inlet vanes extending into the second inlet portion in that the circumferential distribution of the vanes extending into the first inlet portion is different to the circumferential distribution of the vanes extending into the second inlet portion; and wherein the circumferential distribution of the vanes extending into the first inlet portion is non-uniform.

The configuration of the inlet vanes extending into the first inlet portion may differ from the configuration of the inlet vanes extending into the second inlet portion.

The configuration of the inlet vanes extending into the first inlet portion may differ from the configuration of the inlet vanes extending into the second inlet portion in that the circumferential distribution of the vanes extending into the first inlet portion is different to the circumferential distribution of the vanes extending into the second inlet portion.

The first and second inlet portions may be adjacent one another.

Preferably the circumferential distribution of the vanes extending into the second inlet portion is non-uniform.

A variable geometry turbine may comprise a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into a first annular inlet portion and a second annular inlet portion axially offset from the first inlet portion, inlet vanes extending axially into each of the first and second inlet portions, the inlet vanes defining axially adjacent inlet passages; wherein the configuration of the inlet vanes extending into the first inlet portion differs from the configuration of the inlet vanes extending into the second inlet portion in that the vanes extending into the first inlet portion are circumferentially offset from the vanes extending into the second inlet portion; and wherein the number of vanes in the first inlet portion is more than around 50% of the number of vanes in the second inlet portion.

It is preferred that the number of vanes in the first inlet portion is more than around 75% of the number of vanes in the second inlet portion, still more preferably around 85% or more, yet more preferably around 95 to 99% or more of the number of vanes in the second inlet portion. It is particularly preferred that the number of vanes in the first inlet portion is substantially similar but less than the number of vanes in the second inlet portion.

The first and second inlet portions may be adjacent one another.

The vanes in the first and second inlet portions may have substantially the same outer diameter and different inner diameters. Alternatively, the vanes in the first and second inlet portions may have different outer diameters and substantially the same inner diameters. As a further alternative, the respective outer and inner diameters of the vanes in the first and second inlet portions may be different, or may be substantially the same.

The circumferential distribution of the vanes extending into the first and/or second inlet portion may be non-uniform.

A variable geometry turbine may comprise a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet;

wherein the annular inlet is divided into at least three axially offset annular inlet portions by two or more axially spaced annular baffles disposed between the first and second inlet sidewalls; inlet vanes extending axially into at least one of the inlet portions and defining circumferentially adjacent inlet passages; and wherein each of at least two of said baffles extends radially inboard of inlet vanes which extend into at least one of the inlet portions axially adjacent the respective baffle.

The at least two baffles which extend radially inboard of inlet vanes may have different internal diameters.

According to another aspect of the invention there is provided a variable geometry turbine comprising a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into at least three axially offset annular inlet portions by two or more axially spaced annular baffles disposed between the first and second inlet sidewalls; inlet vanes extending axially into at least one of the inlet portions and defining circumferentially adjacent inlet passages; and wherein each of at least two of said baffles extends radially inboard of inlet vanes which extend into at least one of the inlet portions axially adjacent the respective baffle, and wherein a distance between an inner diameter of a first baffle of said at least two of said baffles and a trailing edge of a radially innermost vane in one of said annular inlet portions adjacent the first baffle is greater than a distance between an inner diameter of a second baffle of said at least two of said baffles and a trailing edge of a radially innermost vane in one of said annular inlet portions adjacent the second baffle.

Said one of said annular inlet portions adjacent the first baffle may be axially displaced from the first baffle in a first direction and wherein said one of said annular inlet portions adjacent the second baffle may be axially displaced from the second baffle in the first direction.

At least two baffles which extend radially inboard of inlet vanes in a respective adjacent inlet portions may have different inner diameters.

The axial profile formed by the inner diameters of at least two baffles which extend radially inboard of inlet vanes in a respective adjacent inlet portion may generally correspond to an axial profile of a surface that would be swept by the rotation of the turbine wheel.

The relative inner diameters of at least three baffles which extend radially inboard of inlet vanes in a respective adjacent inlet portion may generally increase in an axial direction.

At least two of the at least two of said baffles may have an inner diameter such that the radial distance relative to the turbine axis between the inner diameter of the baffle and the trailing edge of a radially innermost vane of an inlet portion adjacent the baffle is more than generally 50%, generally 60%, generally 70%, generally 80%, generally 95% or generally 90% of the radial distance between the trailing edge of said radially innermost vane and the outer diameter of the turbine wheel at the axial position of the baffle.

A variable geometry turbine may comprise a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet;

wherein the annular inlet is divided into at least two axially offset annular inlet portions by one or more axially spaced annular baffles disposed between the first and second inlet sidewalls; inlet vanes extending axially into at least one of the inlet portions and defining circumferentially adjacent inlet passages; and wherein at least one of the one or more baffles extends radially inboard of inlet vanes which extend into at least one of the inlet portions axially adjacent the respective baffle, and wherein at least one of said at least one of the one or more baffles has an inner diameter such that the radial distance relative to the turbine axis between the inner diameter of the baffle and the trailing edge of a radially innermost vane of an inlet portion adjacent the baffle is more than generally 50% of the radial distance between the trailing edge of said radially innermost vane and the outer diameter of the turbine wheel at the axial position of the baffle.

The radial distance relative to the turbine axis between the inner diameter of the baffle and the trailing edge of a radially innermost vane of an inlet portion adjacent the baffle may be more than generally 60%, generally 70%, generally 80%, generally 90% or generally 95% of the radial distance between the trailing edge of said radially innermost vane and the outer diameter of the turbine wheel at the axial position of the baffle.

A variable geometry turbine may comprise: a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet;

the annular inlet divided into axially adjacent annular portions by at least one annular baffle which is axially spaced from the first and second inlet sidewalls;

inlet vanes extending axially across at least two of said annular portions defined by the or each baffle so as to divide said annular inlet into at least two axially offset inlet passages;

wherein the configuration of the inlet vanes extending into one of the inlet portions differs from the configuration of the inlet vanes extending into another of the inlet portions and wherein the inner diameter of the sleeve is greater than the outer diameter of the inlet passages.

A variable geometry turbine may comprise:

a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet;

the annular inlet divided into axially adjacent annular portions by at least two annular baffles which are axially spaced from the first and second inlet sidewalls;

inlet vanes extending axially across at least two of said annular portions defined by the or each baffle so as to divide said annular inlet into at least two axially offset inlet passages;

wherein the configuration of the inlet vanes extending into one of the inlet portions differs from the configuration of the inlet vanes extending into another of the inlet portions.

In some embodiments it is preferred that the sleeve is movable towards the second inlet sidewall so as to narrow the gas flow path through the inlet, and the gas flow path through the inlet passage that is closer to the second inlet sidewall has a cross-sectional area perpendicular to the direction of gas flow along said path that is smaller than the corresponding cross-sectional area of the gas flow path through the inlet passage that is further away from the second inlet sidewall.

The vanes may be provided in annular arrays within each annular portion. Preferably an array of vanes in a first annular portion defines a plurality of first inlet passages having a first total cross-sectional area perpendicular to the direction of gas flow and another array of vanes in a second annular portion, which is axially offset from the first annular portion, defines a plurality of second inlet passages having a second larger total cross-sectional area perpendicular to the direction of gas flow.

In a preferred embodiment the turbine incorporates three or more annular portions each annular portion having a respective annular array of vanes disposed therein, and the vanes within each annular array of vanes defining a plurality of inlet passages having a total cross-sectional area perpendicular to the direction of gas flow which decreases progressively between adjacent pairs of annular arrays.

In a further preferred embodiment the turbine incorporates three or more annular portions each annular portion having a respective annular array of vanes disposed therein, and the vanes within an intermediate array defining a plurality of inlet passages having a total cross-sectional area perpendicular to the direction of gas flow that is larger or smaller than the total cross-sectional area perpendicular to the direction of gas flow of inlet passages defined by the arrays of vanes on either side of the intermediate array.

The inlet passages having the smallest total cross-sectional area perpendicular to the direction of gas flow may be provided in the annular portion nearest to the second inlet sidewall where the gas flow path through the inlet is narrowest or substantially closed.

Preferably the sum of the minimum circumferential separations between adjacent vanes within the inlet passage closer to the second inlet sidewall is lower than the sum of the minimum circumferential separations between adjacent vanes within the inlet passage further away from the second inlet sidewall.

In some embodiments it is preferred that at least one vane in one of said annular portions has a greater maximum circumferential thickness than at least one vane in another of the annular portions.

The vanes may be provided in annular arrays within each annular portion.

Preferably an array of vanes in a first annular portion incorporates a plurality of vanes of a maximum circumferential thickness and another array of vanes in a second annular portion, which is axially offset from the first annular portion, incorporates a plurality of vanes of a larger maximum circumferential thickness.

It is preferred that the turbine incorporates three or more annular portions each annular portion having a respective annular array of vanes disposed therein, and the vanes within each annular array of vanes having a maximum circumferential thickness which decreases progressively between adjacent pairs of annular arrays.

Alternatively, it is preferred that the turbine incorporates three or more annular portions each annular portion having a respective annular array of vanes disposed therein, and the vanes within an intermediate array having a maximum circumferential thickness that is larger or smaller than the maximum circumferential thickness of vanes in the arrays of vanes on either side of the intermediate array.

Preferably the vanes having larger maximum circumferential thickness are provided in the annular portion(s) nearer to a closed position of the sleeve where the gas flow path through the inlet is narrowest. It is particularly preferred that vanes having the largest maximum circumferential thickness are provided in the annular portion nearest to the closed position of the sleeve where the gas flow path through the inlet is narrowest or substantially closed.

It is preferred in the first and/or second aspects of the present invention that at least one vane in one of said annular portions has a greater leading edge thickness than at least one vane in another of the annular portions.

Said vanes may be provided in annular arrays within each annular portion. An array of vanes in a first annular portion preferably incorporates a plurality of vanes of a first leading edge thickness and another array of vanes in a second annular portion, which is axially offset from the first annular portion, incorporates a plurality of vanes of a second larger leading edge thickness.

In a preferred embodiment the turbine incorporates three or more annular portions each annular portion having a respective annular array of vanes disposed therein, and the vanes within each annular array of vanes having a leading edge thickness which decreases progressively between adjacent pairs of annular arrays.

In a further embodiment the turbine incorporates three or more annular portions each annular portion having a respective annular array of vanes disposed therein, and the vanes within an intermediate array having a leading edge thickness that is larger or smaller than the leading edge thickness of vanes in the arrays of vanes on either side of the intermediate array.

It is preferred that vanes having a larger leading thickness are provided in the annular portion(s) nearer to a closed position of the sleeve where the gas flow path through the inlet is narrowest. Vanes having the largest leading edge thickness are preferably provided in the annular portion nearest to the closed position of the sleeve where the gas flow path through the inlet is narrowest or substantially closed.

It is preferred in the first and/or second aspects of the present invention that at least one vane in one of said annular portions has a greater maximum outer diameter than at least one vane in another of the annular portions.

The vanes may be provided in annular arrays within each annular portion. Preferably an array of vanes in a first annular portion incorporates a plurality of vanes of a first maximum outer diameter and another array of vanes in a second annular portion, which is axially offset from the first annular portion, incorporates a plurality of vanes of a second larger maximum outer diameter.

One preferred embodiment provides that the turbine incorporates three or more annular portions each annular portion having a respective annular array of vanes disposed therein, and the vanes within each annular array of vanes having a maximum outer diameter which decreases progressively between adjacent pairs of annular arrays.

Another preferred embodiment provides that the turbine incorporates three or more annular portions each annular portion having a respective annular array of vanes disposed therein, and the vanes within an intermediate array having a maximum outer diameter that is larger or smaller than the maximum outer diameter of vanes in the arrays of vanes on either side of the intermediate array.

The vanes having a larger maximum outer diameter may be provided in the annular portion(s) nearer to a closed position of the sleeve where the gas flow path through the inlet is narrowest. Preferably vanes having the largest maximum outer diameter are provided in the annular portion nearest to the closed position of the sleeve where the gas flow path through the inlet is narrowest or substantially closed.

In some embodiments of the present invention it is preferred that at least one vane in one of said annular portions has a greater maximum inner diameter and defines a greater radial clearance between said vane and the turbine wheel than at least one vane in another of the annular portions.

Said vanes may be provided in annular arrays within each annular portion. Preferably an array of vanes in a first annular portion incorporates a plurality of vanes of a first maximum inner diameter which define a first radial clearance between said vanes and the turbine wheel and another array of vanes in a second annular portion, which is axially offset from the first annular portion, incorporates a plurality of vanes of a second larger maximum inner diameter which define a second larger radial clearance between said vanes and the turbine wheel.

In a preferred embodiment the turbine incorporates three or more annular portions each annular portion having a respective annular array of vanes disposed therein, and the vanes within each annular array of vanes having a maximum inner diameter which define a radial clearance between said vanes and the turbine wheel which both decrease progressively between adjacent pairs of annular arrays.

In an alternative preferred embodiment the turbine incorporates three or more annular portions each annular portion having a respective annular array of vanes disposed therein, and the vanes within an intermediate array having a maximum inner diameter which defines a radial clearance between said vanes and the turbine wheel both of which are larger or smaller than the maximum inner diameter of vanes and a radial clearance between said vanes and the turbine wheel in the arrays of vanes on either side of the intermediate array.

Vanes having a larger maximum inner diameter and which define a larger radial clearance between said vanes and the turbine wheel are preferably provided in the annular portion (s) nearer to a closed position of the sleeve where the gas flow path through the inlet is narrowest. It is preferred that said vanes with a larger maximum inner diameter and which define a larger radial clearance between said vanes and the turbine also define a larger swirl angle. Vanes having the largest maximum inner diameter and which define the largest radial clearance between said vanes and the turbine wheel are preferably provided in the annular portion nearest to the closed position of the sleeve where the gas flow path through the inlet is narrowest or substantially closed. It is particularly preferred that vanes with the largest maximum inner diameter and which define the largest larger radial clearance between said vanes and the turbine also define the largest swirl angle.

In some embodiments of the present invention it is preferred that the number of inlet vanes extending into one of the inlet portions differs from the number of inlet vanes extending into another of the inlet portions. Said inlet portions may be adjacent one another.

A variable geometry turbine may comprise:
a turbine wheel mounted for rotation about a turbine axis within a housing, the housing defining an annular inlet surrounding the turbine wheel and defined between first and second inlet sidewalls;
a cylindrical sleeve axially movable across the annular inlet to vary the size of a gas flow path through the inlet;

the annular inlet divided into axially adjacent annular portions by at least one annular baffle which is axially spaced from the first and second inlet sidewalls;

inlet vanes extending axially across at least two of said annular portions defined by the or each baffle so as to divide said annular inlet into at least two axially offset inlet passages;

the sleeve being movable towards the second inlet sidewall so as to narrow the gas flow path through the inlet;

wherein the gas flow path through the inlet passage that is closer to the second inlet sidewall has a cross-sectional area perpendicular to the direction of gas flow along said path that is smaller than the corresponding cross-sectional area of the gas flow path through the inlet passage that is further away from the second inlet sidewall.

The vanes are orientated to deflect gas flowing through the annular inlet towards the direction of rotation of the turbine wheel. Gas is deflected along inlet passages defined between neighbouring vanes and adjacent baffles or sidewalls. The "throat area" of the annular inlet, which may be thought of as the maximum gas "swallowing capacity" of the turbine, is the total cross-sectional area perpendicular to the direction of gas flow of all of the inlet passages defined across the annular inlet. One of the parameters which contributes the definition of the throat area is the minimum circumferential separation between circumferentially adjacent vanes within each annular portion. It is thus preferred that the sum of the minimum circumferential distances between adjacent vanes within the inlet passage closer to the second inlet sidewall is lower than the sum of the minimum circumferential distances between adjacent vanes within the inlet passage further away from the second inlet sidewall.

By using baffles to divide the annular inlet into two or more annular portions the throat area of each annular portion can be independently defined by the arrangement of the vanes within each annular portion and the axial width of each annular portion. In this way, the throat area of the annular inlet can be varied between the first and second inlet sidewalls. Preferably the gas flow path through the annular inlet is more constricted nearer to the second inlet sidewall, where the gas flow path through the inlet is narrowest or substantially closed, than closer to the first inlet sidewall. The variation in the degree of constriction may be progressive across the axial width of the annular inlet or may vary discontinuously with intermediate annular portions being less constricted than neighbouring annular portions provided that the gas flow path through an inlet passage closer to the second inlet sidewall is more constricted than the gas flow path through an inlet passage that is further away from the second inlet sidewall.

Control of the degree of constriction to the gas flow path through the annular inlet by the arrangement of the vanes can be achieved in a number of ways. For example, one or more, or all, of the vanes within one annular portion may have a thickened leading edge, a larger circumferential thickness, or both, as compared to vanes in other annular portions. In a preferred embodiment, vanes with a thicker leading edge are provided in the annular portion(s) nearer to the second inlet sidewall, i.e. the closed position of the sleeve where the gas flow path through the inlet is at its narrowest, since this is where a greater variation in gas incidence angle is to be expected. By way of a further example, a greater number of vanes may be provided in one annular portion than another. For instance, an annular array of fifteen vanes may be included in the same nozzle assembly as an annular array of only eight vanes. Other arrays may have a different number of vanes, greater than fifteen or fewer than eight, or somewhere in between, e.g. twelve. In another example, the swirl angle of vanes in one annular portion may be greater than that in another annular portion. Moreover, the radial extent, outer and/or inner maximum diameter of vanes in one annular portion may be different to that in another annular portion to provide a different degree of constriction in the two annular portions. It will be appreciated that any one or more of the above modifications in vane structure, arrangement or orientation may be employed to achieve the desired variation in throat area across the axial width of the annular inlet.

The vanes are preferably provided in annular arrays within each annular portion. An array of vanes in a first annular portion may define a plurality of first inlet passages having a first total cross-sectional area perpendicular to the direction of gas flow and another array of vanes in a second annular portion, which is axially offset from the first annular portion, may define a plurality of second inlet passages having a second larger total cross-sectional area perpendicular to the direction of gas flow. The first inlet passages are preferably provided closer to the second inlet sidewall than the second inlet passages.

In one embodiment the turbine incorporates three or more annular portions each annular portion having a respective annular array of vanes disposed therein, and the vanes within each annular array of vanes define a plurality of inlet passages having a total cross-sectional area perpendicular to the direction of gas flow which decreases progressively between adjacent pairs of annular arrays. In an alternative embodiment in which the turbine incorporates three or more annular portions each annular portion having a respective annular array of vanes disposed therein, the vanes within an intermediate array define a plurality of inlet passages having a total cross-sectional area perpendicular to the direction of gas flow that is larger or smaller than the total cross-sectional area perpendicular to the direction of gas flow of inlet passages defined by the arrays of vanes on either side of the intermediate array.

In a preferred embodiment the inlet passages within the turbine having the smallest total cross-sectional area perpendicular to the direction of gas flow are provided in the annular portion nearest to the second inlet sidewall where the gas flow path through the inlet is narrowest or substantially closed.

In one preferred embodiment there may be provided at least one annular array of vanes consisting of a relatively small number of vanes configured to define a relatively high swirl angle but which are relatively "thick" and extend to a relatively small internal radius as compared to other arrays of vanes within the same annular inlet so as to provide a relatively small radial clearance around that region of the turbine wheel. With such an arrangement it is easier for an actuator to achieve high resolution control of the cross-sectional flow area because it varies less for a given sleeve movement. The increased swirl may be useful for a vane array positioned to correspond to relatively small inlet widths, which could provide an improvement in efficiency.

There is further provided a variable geometry turbine comprising a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into a first annular inlet portion and a second annular inlet portion axially offset from the first inlet portion, inlet vanes extending axially into each of the first and second inlet portions, the inlet vanes defining axially adjacent inlet passages; wherein the configuration of the inlet vanes extending into the first inlet portion differs from the configuration of the inlet vanes extending into the second inlet portion.

The inlet vanes may have any suitable configuration, and may for example have a similar general aerofoil configuration to that of known inlet vanes, or they may have any alternative configuration selected to define a particular arrangement and configuration of inlet passages. Since the vanes and inlet baffles together define the configuration and orientation of the inlet passages, a wide variety of different inlet passage configurations can be achieved by appropriate design of the individual nozzle vanes in combination with the inlet baffles. Moreover, the designs can be such that there may be differently configured inlet passages in one annular portion as compared to another annular portion within an annular inlet, or there may be differently configured inlet passages within a single annular portion, or both. For instance, the vanes extending across a first annular portion of the inlet may define a different swirl angle to the vanes extending across a second annular portion of the inlet.

For certain engine applications (such as for exhaust gas recirculation, "EGR") it may be desirable to reduce the turbine efficiency in one or more of the arrays of inlet passageways. For example, it may be desirable to reduce efficiency at relatively open inlet widths in some applications. Such reduced efficiency could for instance be achieved by reducing the radial extent of the vanes (as discussed above), increasing the circumferential width of the vanes, or otherwise configure the vanes to reduce the effective inlet area, i.e. the throat area of the annular inlet.

In some embodiments relatively small "splitter vanes" may be located between adjacent pairs of "main" vanes. This arrangement may have the effect of increasing the total number of vanes compared with other embodiments, but the vanes may be provided with a reduced radial extent so that there is a greater radial clearance between the vanes and the turbine wheel. The splitter vanes may be advantageous in some embodiments to reduce vibration excited in the turbine blades.

In some embodiments, the vanes may have a "cut-off" configuration in the region of the trailing edge rather than a full airfoil configuration which can be expected to provide reduced efficiency but which may be useful in some applications. In addition, obstructions may be located between adjacent vanes which could further reduce efficiency.

The trailing edges of at least some of the vanes extending across a first annular portion of the inlet may lie on a different radius to the trailing edges of at least some of the vanes extending across a second annular portion of the inlet. In some embodiments the trailing edges of all of the vanes extending across a first annular portion of the inlet lie on a radius different to that of the trailing edges of all of the vanes extending across a second annular portion of the inlet. In some embodiments the trailing edges of vanes of one annular portion of the inlet lie on a minimum radius which is different to that of vanes extending across any other annular portion of the inlet.

The trailing edges of at least a majority of vanes extending across an annular portion of the inlet may lie on a radius greater than the internal radius of a baffle defining the annular portion. In some embodiments all of the vanes extending across an annular portion may have a trailing edge lying at a radius greater than the internal radius of a baffle defining the annular portion. In some embodiments each annular baffle may have an internal radius smaller than the radius of the leading edge of any vane in the annular inlet.

A variable geometry turbine may comprise:
a turbine wheel mounted for rotation about a turbine axis within a housing, the housing defining an annular inlet surrounding the turbine wheel and defined between first and second inlet sidewalls;
a cylindrical sleeve axially movable across the annular inlet to vary the size of a gas flow path through the inlet;
the annular inlet divided into axially adjacent annular portions by at least one annular baffle which is axially spaced from the first and second inlet sidewalls;
inlet vanes extending axially across at least two of said annular portions defined by the or each baffle so as to divide said annular inlet into at least two axially offset inlet passages;
wherein at least one vane in one of said annular portions has a greater maximum circumferential thickness than at least one vane in another of the annular portions.

The vanes are orientated to deflect gas flowing through the annular inlet towards the direction of rotation of the turbine wheel. A thickened vane can be useful in accommodating greater variation in gas incidence angle without causing flow separation and turbulent flow (efficiency loss). It will be appreciated that thicker vanes reduce the "throat area" of the annular inlet, i.e. the maximum swallowing capacity of the turbine. As a result, the maximum thickness of a vane or vanes in each annular portion of the inlet or "nozzle section" may be optimized to suit its axial location within the annular inlet and a particular application. By way of example, in a preferred embodiment thicker vanes are provided in the annular portion(s) nearer to the closed position of the sleeve, i.e. where the gas flow path through the inlet is at its narrowest, since this is where a greater variation in gas incidence angle is to be expected.

In one preferred embodiment there may be provided at least one annular array of vanes consisting of a relatively small number of vanes configured to define a relatively high swirl angle but which are relatively "thick" and extend to a relatively small internal radius as compared to other arrays of vanes within the same annular inlet so as to provide a relatively small radial clearance around that region of the turbine wheel. With such an arrangement it is easier for an actuator to achieve high resolution control of the cross-sectional flow area because it varies less for a given sleeve movement. The increased swirl may be useful for a vane array positioned to correspond to relatively small inlet widths, which could provide an improvement in efficiency.

There is further provided a variable geometry turbine comprising a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into a first annular inlet portion and a second annular inlet portion axially offset from the first inlet portion, inlet vanes extending axially into each of the first and second inlet portions, the inlet vanes defining axially adjacent inlet passages; wherein the configuration of the inlet vanes extending into the first inlet portion differs from the configuration of the inlet vanes extending into the second inlet portion.

The inlet vanes may have any suitable configuration, and may for example have a similar general aerofoil configuration to that of known inlet vanes, or they may have any alternative configuration selected to define a particular arrangement and configuration of inlet passages. Since the vanes and inlet baffles together define the configuration and orientation of the inlet passages, a wide variety of different inlet passage configurations can be achieved by appropriate design of the individual nozzle vanes in combination with the inlet baffles. Moreover, the designs can be such that there may be differently configured inlet passages in one annular portion as compared to another annular portion within an annular inlet, or there may be differently configured inlet passages within a single annular portion, or both. For instance, the vanes extending across a first annular portion of the inlet may define a different swirl angle to the vanes extending across a second annular portion of the inlet.

The inlet vanes may be provided in annular arrays within each annular portion. The vanes in two or more annular arrays may have different maximum circumferential thicknesses. That is, an array of vanes in a first annular portion may incorporate a plurality of vanes of a first maximum circumferential thickness and another array of vanes in a second annular portion, which is axially offset from the first annular portion, may incorporate a plurality of vanes of a different second circumferential maximum thickness, the first maximum circumferential thickness being larger than the second or vice versa as appropriate. In embodiments incorporating three or more annular portions and therefore three or more annular arrays of vanes, the variation in maximum circumferential thickness of the vanes may decrease progressively between adjacent pairs of annular arrays, or an intermediate array may possess vanes having a maximum circumferential thickness that is larger or smaller than the arrays of vanes on either side.

The vanes within each annular array may have the same radial extent such that the arrays of vanes are essentially continuous across the full width of the annular inlet. Alternatively, the vanes in two or more annular arrays may have different radial extents. For example, the leading edges of all of the vanes across the different arrays may lie on the same outer radius, while the radius of the trailing edges of the different arrays of vanes may differ. In an embodiment including three or more axially spaced annular arrays of vanes the radial position of the trailing edge of each annular array of vanes may decrease from a first annular array to an adjacent second annular array and then further decrease from the second annular array to an adjacent third annular array of vanes.

The number of vanes in each annular array may differ. For instance, an annular array of fifteen vanes may be included in the same nozzle assembly as an annular array of only eight vanes. Other arrays may have a different number of vanes, greater than fifteen or fewer than eight, or somewhere in between, e.g. twelve. In addition, vanes having different radial extents, and different swirl angles may be used, e.g. some vanes swept forwards to a greater extent than others, and as such defining a greater swirl angle.

For certain engine applications (such as for exhaust gas recirculation, "EGR") it may be desirable to reduce the turbine efficiency in one or more of the arrays of inlet passageways. For example, it may be desirable to reduce efficiency at relatively open inlet widths in some applications. Such reduced efficiency could for instance be achieved by reducing the radial extent of the vanes (as discussed above), increasing the circumferential width of the vanes, or otherwise configure the vanes to reduce the effective inlet area.

In some embodiments relatively small "splitter vanes" may be located between adjacent pairs of "main" vanes. This arrangement may have the effect of increasing the total number of vanes compared with other embodiments, but the vanes may be provided with a reduced radial extent so that there is a greater radial clearance between the vanes and the turbine wheel. The splitter vanes may be advantageous in some embodiments to reduce vibration excited in the turbine blades.

In some embodiments, the vanes may have a "cut-off" configuration in the region of the trailing edge rather than a full airfoil configuration which can be expected to provide reduced efficiency but which may be useful in some applications. In addition, obstructions may be located between adjacent vanes which could further reduce efficiency.

The trailing edges of at least some of the vanes extending across a first annular portion of the inlet may lie on a different radius to the trailing edges of at least some of the vanes extending across a second annular portion of the inlet. In some embodiments the trailing edges of all of the vanes extending across a first annular portion of the inlet lie on a radius different to that of the trailing edges of all of the vanes extending across a second annular portion of the inlet. In some embodiments the trailing edges of vanes of one annular portion of the inlet lie on a minimum radius which is different to that of vanes extending across any other annular portion of the inlet.

The trailing edges of at least a majority of vanes extending across an annular portion of the inlet may lie on a radius greater than the internal radius of a baffle defining the annular portion. In some embodiments all of the vanes extending across an annular portion may have a trailing edge lying at a radius greater than the internal radius of a baffle defining the annular portion. In some embodiments each annular baffle may have an internal radius smaller than the radius of the leading edge of any vane in the annular inlet.

A variable geometry turbine may comprise:

a turbine wheel mounted for rotation about a turbine axis within a housing, the housing defining an annular inlet surrounding the turbine wheel and defined between first and second inlet sidewalls;

a cylindrical sleeve axially movable across the annular inlet to vary the size of a gas flow path through the inlet;

the annular inlet divided into axially adjacent annular portions by at least one annular baffle which is axially spaced from the first and second inlet sidewalls;

inlet vanes extending axially across at least two of said annular portions defined by the or each baffle so as to divide said annular inlet into at least two axially offset inlet passages;

wherein at least one vane in one of said annular portions has a greater leading edge thickness than at least one vane in another of the annular portions.

The vanes are orientated to deflect gas flowing through the annular inlet towards the direction of rotation of the turbine wheel. As is well known to the skilled person, a vane has a leading edge and a trailing edge. The leading edge is the portion of the vane which is orientated to face the incident gas flowing through the inlet and therefore is the portion of the vane which the oncoming gas strikes first. The trailing edge is the portion of the vane which the gas flowing through the inlet contacts last before flowing on to the turbine wheel. A vane with a thicker leading edge can be useful in accommodating greater variation in gas incidence angle without causing flow separation and turbulent flow (efficiency loss).

It will be appreciated that vanes having a thicker leading edge can reduce the "throat area" of the annular inlet, i.e. the maximum swallowing capacity of the turbine. As a result, the thickness of the leading edge of a vane or vanes in each annular portion of the inlet or "nozzle section" may be optimized to suit its axial location within the annular inlet and a particular application. By way of example, in a preferred embodiment vanes with thicker leading edges are provided in the annular portion(s) nearer to the closed position of the sleeve, i.e. where the gas flow path through the inlet is at its narrowest, since this is where a greater variation in gas incidence angle is to be expected.

The use of vanes with varying leading edge thickness may be combined with vanes of varying maximum circumferential thickness. For example, vanes with thicker leading edges and may also have larger maximum circumferential thicknesses as compared to other vanes present in the same annular inlet. Alternatively, by appropriate design vanes with thicker leading edges may have smaller maximum circumferential thicknesses as compared to other vanes present in the same annular inlet. The leading edge thickness of the vanes provided within an annular inlet may vary in a generally similar manner to that of the vanes' maximum circumferential thickness, i.e. both may increase progressively from the first inlet sidewall to the second inlet sidewall, or the leading edge thickness of the vanes may vary independently of the variation in maximum circumferential thickness of the vanes across the annular inlet, or the maximum circumferential thickness of all of the vanes provided within the annular inlet may be the same in spite of the vanes having differing leading edge thicknesses.

In one preferred embodiment there may be provided at least one annular array of vanes consisting of a relatively small number of vanes configured to define a relatively high swirl angle but which have relatively "thick" leading edges and extend to a relatively small internal radius as compared to other arrays of vanes within the same annular inlet so as to provide a relatively small radial clearance around that region of the turbine wheel. With such an arrangement it is easier for an actuator to achieve high resolution control of the cross-sectional flow area because it varies less for a given sleeve movement. The increased swirl may be useful for a vane array positioned to correspond to relatively small inlet widths, which could provide an improvement in efficiency.

There is further provided a variable geometry turbine comprising a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into a first annular inlet portion and a second annular inlet portion axially offset from the first inlet portion, inlet vanes extending axially into each of the first and second inlet portions, the inlet vanes defining axially adjacent inlet passages; wherein the configuration of the inlet vanes extending into the first inlet portion differs from the configuration of the inlet vanes extending into the second inlet portion.

The inlet vanes may have any suitable configuration, and may for example have a similar general aerofoil configuration to that of known inlet vanes, or they may have any alternative configuration selected to define a particular arrangement and configuration of inlet passages. Since the vanes and inlet baffles together define the configuration and orientation of the inlet passages, a wide variety of different inlet passage configurations can be achieved by appropriate design of the individual nozzle vanes in combination with the inlet baffles. Moreover, the designs can be such that there may be differently configured inlet passages in one annular portion as compared to another annular portion within an annular inlet, or there may be differently configured inlet passages within a single annular portion, or both. For instance, the vanes extending across a first annular portion of the inlet may define a different swirl angle to the vanes extending across a second annular portion of the inlet.

The inlet vanes may be provided in annular arrays within each annular portion. The vanes in two or more annular arrays may have different leading edge thicknesses. That is, an array of vanes in a first annular portion may incorporate a plurality of vanes of a first leading edge thickness and another array of vanes in a second annular portion, which is axially offset from the first annular portion, may incorporate a plurality of vanes of a different second leading edge thickness, the first leading edge thickness being larger than the second or vice versa as appropriate. In embodiments incorporating three or more annular portions and therefore three or more annular arrays of vanes, the variation in leading edge thickness of the vanes may decrease progressively between adjacent pairs of annular arrays, or an intermediate array may possess vanes having a leading edge thickness that is larger or smaller than the arrays of vanes on either side.

The vanes within each annular array may have the same radial extent such that the arrays of vanes are essentially continuous across the full width of the annular inlet. Alternatively, the vanes in two or more annular arrays may have different radial extents. For example, the leading edges of all of the vanes across the different arrays may lie on the same outer radius, while the radius of the trailing edges of the different arrays of vanes may differ. In an embodiment including three or more axially spaced annular arrays of vanes the radial position of the trailing edge of each annular array of vanes may decrease from a first annular array to an adjacent second annular array and then further decrease from the second annular array to an adjacent third annular array of vanes.

The number of vanes in each annular array may differ. For instance, an annular array of fifteen vanes may be included in the same nozzle assembly as an annular array of only eight vanes. Other arrays may have a different number of vanes, greater than fifteen or fewer than eight, or somewhere in between, e.g. twelve. In addition, vanes having different radial extents, and different swirl angles may be used, e.g. some vanes swept forwards to a greater extent than others, and as such defining a greater swirl angle.

For certain engine applications (such as for exhaust gas recirculation, "EGR") it may be desirable to reduce the turbine efficiency in one or more of the arrays of inlet passageways. For example, it may be desirable to reduce efficiency at relatively open inlet widths in some applications. Such reduced efficiency could for instance be achieved by reducing the radial extent of the vanes (as discussed above), increasing the circumferential width and/or leading edge thickness of the vanes, or otherwise configure the vanes to reduce the effective inlet area.

In some embodiments relatively small "splitter vanes" may be located between adjacent pairs of "main" vanes. This arrangement may have the effect of increasing the total number of vanes compared with other embodiments, but the vanes may be provided with a reduced radial extent so that there is a greater radial clearance between the vanes and the turbine wheel. The splitter vanes may be advantageous in some embodiments to reduce vibration excited in the turbine blades.

In some embodiments, the vanes may have a "cut-off" configuration in the region of the trailing edge rather than a full airfoil configuration which can be expected to provide reduced efficiency but which may be useful in some applications. In addition, obstructions may be located between adjacent vanes which could further reduce efficiency.

The trailing edges of at least some of the vanes extending across a first annular portion of the inlet may lie on a different radius to the trailing edges of at least some of the vanes extending across a second annular portion of the inlet. In some embodiments the trailing edges of all of the vanes extending across a first annular portion of the inlet lie on a radius different to that of the trailing edges of all of the vanes extending across a second annular portion of the inlet. In some embodiments the trailing edges of vanes of one annular portion of the inlet lie on a minimum radius which is different to that of vanes extending across any other annular portion of the inlet.

The trailing edges of at least a majority of vanes extending across an annular portion of the inlet may lie on a radius greater than the internal radius of a baffle defining the annular portion. In some embodiments all of the vanes extending across an annular portion may have a trailing edge lying at a radius greater than the internal radius of a baffle defining the annular portion. In some embodiments each annular baffle may have an internal radius smaller than the radius of the leading edge of any vane in the annular inlet.

A variable geometry turbine may comprise:

a turbine wheel mounted for rotation about a turbine axis within a housing, the housing defining an annular inlet surrounding the turbine wheel and defined between first and second inlet sidewalls;

a cylindrical sleeve axially movable across the annular inlet to vary the size of a gas flow path through the inlet;

the annular inlet divided into axially adjacent annular portions by at least one annular baffle which is axially spaced from the first and second inlet sidewalls;

inlet vanes extending axially across at least two of said annular portions defined by the or each baffle so as to divide said annular inlet into at least two axially offset inlet passages;

wherein at least one vane in one of said annular portions has a greater maximum outer diameter than at least one vane in another of the annular portions.

The vanes are orientated to deflect gas flowing through the annular inlet towards the direction of rotation of the turbine wheel.

The inlet vanes may be provided in annular arrays within each annular portion. The leading edges of at least some of the vanes extending across a first annular portion of the inlet may lie on a different radius to the leading edges of at least some of the vanes extending across a second annular portion of the inlet. In some embodiments the leading edges of all of the vanes extending across a first annular portion of the inlet lie on a radius different to that of the leading edges of all of the vanes extending across a second annular portion of the inlet. In some embodiments the leading edges of vanes of one annular portion of the inlet lie on a maximum radius which is different to that of vanes extending across any other annular portion of the inlet.

The vanes in two or more annular arrays may have different maximum outer diameters. That is, an array of vanes in a first annular portion may incorporate a plurality of vanes of a first maximum outer diameter and another array of vanes in a second annular portion, which is axially offset from the first annular portion, may incorporate a plurality of vanes of a different second maximum outer diameter, the first maximum outer diameter being larger than the second or vice versa as appropriate. In embodiments incorporating three or more annular portions and therefore three or more annular arrays of vanes, the variation in maximum outer diameter of the vanes may decrease progressively between adjacent pairs of annular arrays, or an intermediate array may possess vanes having a maximum outer diameter that is larger or smaller than the arrays of vanes on either side.

The vanes within one or more annular arrays may have different radial extents as compared to that of one or more annular arrays within the same inlet. For example, while at least one vane in one of said annular portions has a greater maximum outer diameter than at least one vane in another of the annular portions, said vanes may have substantially the same maximum inner diameter such that the trailing edges of the vanes are essentially continuous across the full width of the annular inlet. In an embodiment including three or more axially spaced annular arrays of vanes the radial position of the trailing edge of each annular array of vanes may decrease from a first annular array to an adjacent second annular array and then further decrease from the second annular array to an adjacent third annular array of vanes.

There is further provided a variable geometry turbine comprising a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into a first annular inlet portion and a second annular inlet portion axially offset from the first inlet portion, inlet vanes extending axially into each of the first and second inlet portions, the inlet vanes defining axially adjacent inlet passages; wherein the configuration of the inlet vanes extending into the first inlet portion differs from the configuration of the inlet vanes extending into the second inlet portion.

The inlet vanes may have any suitable configuration, and may for example have a similar general aerofoil configuration to that of known inlet vanes, or they may have any alternative configuration selected to define a particular arrangement and configuration of inlet passages. Since the vanes and inlet baffles together define the configuration and orientation of the inlet passages, a wide variety of different inlet passage configurations can be achieved by appropriate design of the individual nozzle vanes in combination with the inlet baffles. Moreover, the designs can be such that there may be differently configured inlet passages in one annular portion as compared to another annular portion within an annular inlet, or there may be differently configured inlet passages within a single annular portion, or both. For instance, the vanes extending across a first annular portion of the inlet may define a different swirl angle to the vanes extending across a second annular portion of the inlet.

The number of vanes in each annular array may differ. For instance, an annular array of fifteen vanes may be included in the same nozzle assembly as an annular array of only eight vanes. Other arrays may have a different number of vanes, greater than fifteen or fewer than eight, or somewhere in between, e.g. twelve. In addition, vanes having different radial extents, and different swirl angles may be used, e.g. some vanes swept forwards to a greater extent than others, and as such defining a greater swirl angle.

For certain engine applications (such as for exhaust gas recirculation, "EGR") it may be desirable to reduce the turbine efficiency in one or more of the arrays of inlet passageways. For example, it may be desirable to reduce efficiency at relatively open inlet widths in some applications. Such reduced efficiency could for instance be achieved by reducing the radial extent of the vanes (as discussed above), increasing the circumferential width of the vanes, or otherwise configure the vanes to reduce the effective inlet area.

In some embodiments relatively small "splitter vanes" may be located between adjacent pairs of "main" vanes. This arrangement may have the effect of increasing the total number of vanes compared with other embodiments, but the vanes may be provided with a reduced radial extent so that there is a greater radial clearance between the vanes and the turbine wheel. The splitter vanes may be advantageous in some embodiments to reduce vibration excited in the turbine blades.

In some embodiments, the vanes may have a "cut-off" configuration in the region of the trailing edge rather than a full airfoil configuration which can be expected to provide reduced efficiency but which may be useful in some applications. In addition, obstructions may be located between adjacent vanes which could further reduce efficiency.

The trailing edges of at least some of the vanes extending across a first annular portion of the inlet may lie on a different radius to the trailing edges of at least some of the vanes extending across a second annular portion of the inlet. In some embodiments the trailing edges of all of the vanes extending across a first annular portion of the inlet lie on a radius different to that of the trailing edges of all of the vanes extending across a second annular portion of the inlet. In some embodiments the trailing edges of vanes of one annular portion of the inlet lie on a minimum radius which is different to that of vanes extending across any other annular portion of the inlet.

The trailing edges of at least a majority of vanes extending across an annular portion of the inlet may lie on a radius greater than the internal radius of a baffle defining the annular portion. In some embodiments all of the vanes extending across an annular portion may have a trailing edge lying at a radius greater than the internal radius of a baffle defining the annular portion. In some embodiments each annular baffle may have an internal radius smaller than the radius of the leading edge of any vane in the annular inlet.

A variable geometry turbine may comprise:

a turbine wheel mounted for rotation about a turbine axis within a housing, the housing defining an annular inlet surrounding the turbine wheel and defined between first and second inlet sidewalls;

a cylindrical sleeve axially movable across the annular inlet to vary the size of a gas flow path through the inlet;

the annular inlet divided into axially adjacent annular portions by at least one annular baffle which is axially spaced from the first and second inlet sidewalls;

inlet vanes extending axially across at least two of said annular portions defined by the or each baffle so as to divide said annular inlet into at least two axially offset inlet passages;

wherein at least one vane in one of said annular portions has a greater maximum inner diameter and defines a greater radial clearance between said vane and the turbine wheel than at least one vane in another of the annular portions.

The vanes are orientated to deflect gas flowing through the annular inlet towards the direction of rotation of the turbine wheel. A radial clearance is defined between each vane and the turbine wheel.

The inlet vanes may be provided in annular arrays within each annular portion. The trailing edges of at least some of the vanes extending across a first annular portion of the inlet may lie on a different radius to the trailing edges of at least some of the vanes extending across a second annular portion of the inlet. In some embodiments the trailing edges of all of the vanes extending across a first annular portion of the inlet lie on a radius different to that of the trailing edges of all of the vanes extending across a second annular portion of the inlet. In some embodiments the trailing edges of vanes of one annular portion of the inlet lie on a maximum radius which is different to that of vanes extending across any other annular portion of the inlet.

The vanes in two or more annular arrays may have different maximum inner diameters and define correspondingly different radial clearances between those vanes and the turbine wheel. That is, an array of vanes in a first annular portion may incorporate a plurality of vanes of a first maximum inner diameter which define a first radial clearance between the vanes and the turbine wheel and another array of vanes in a second annular portion, which is axially offset from the first annular portion, may incorporate a plurality of vanes of a different second maximum inner diameter which define a correspondingly different second radial clearance between the vanes and the turbine wheel, the first maximum inner diameter and radial clearance being larger than the second or vice versa as appropriate. In embodiments incorporating three or more annular portions and therefore three or more annular arrays of vanes, the variation in maximum inner diameter of the vanes and the corresponding radial clearance between the vanes and the turbine wheel may decrease progressively between adjacent pairs of annular arrays, or an intermediate array may possess vanes having a maximum inner diameter and which define a corresponding radial clearance that is larger or smaller than the arrays of vanes on either side.

The vanes within one or more annular arrays may have different radial extents as compared to that of one or more annular arrays within the same inlet. For example, while at least one vane in one of said annular portions has a greater maximum inner diameter than at least one vane in another of the annular portions and defines a greater radial clearance between itself and the turbine wheel than the vane in the other annular portion, said vanes may have substantially the same maximum outer diameter such that the leading edges of the vanes are essentially continuous across the full width of the annular inlet. In an embodiment including three or more axially spaced annular arrays of vanes the radial position of the trailing edge of each annular array of vanes may decrease from a first annular array to an adjacent second annular array and then further decrease from the second annular array to an adjacent third annular array of vanes.

The baffle(s), inlet formations(s) and/or sliding sleeve may be formed from a material that is a ceramic, a metal or a cermet (a ceramic/metal composite). The metal could be any steel, or a nickel based alloy, such as inconel. Any or all of these components may be provided with a coating, for example on the sliding interface of the nozzle and the sleeve there could be a coating of diamond-like-carbon, anodisation, or tribaloy or a substitute wear resistant coating. The aerodynamic surfaces may be provided with a coating to promote smoothness or resist corrosion. Such coatings could include non-deposited coatings such as a plasma-electrolytic-oxide coating or substitute coatings. A catalyst coating to hinder or prevent the build-up of unwanted sooty deposits could be provided on any surface within the turbine housing, for example any surface of the baffle(s), inlet formation(s) and/or sleeve, which comes into contact with exhaust gases during operation.

In certain embodiments it is preferred that the axially movable sleeve can be moved across substantially the fully axial width of the annular inlet so as to substantially close or entirely close gas flow path through the annular inlet.

In some embodiments, in addition to the sleeve with an inner diameter that is greater than the outer diameter of the inlet passages, a second sleeve may be provided on or adjacent to the inner diameter of one or more of the annular baffle(s), on or adjacent to one or more of the outer diameter of the annular baffle(s), or at any intermediate diameter.

In some embodiments the sleeve may be provided on or adjacent to the inner diameter of one or more of the annular baffle(s), on or adjacent to one or more of the outer diameter of the annular baffle(s), or at any intermediate diameter, however, it is preferred that the sleeve has an inner diameter that is greater than the outer diameter of the inlet passages.

Preferably the sleeve is moveable with respect to the baffle(s). Thus it is preferred that the baffle(s) is/are substantially fixed in position during operation of the turbine such that variation in the axial width of the annular inlet of the turbine is achieved by axial displacement of the sleeve rather than any movement in the baffle(s).

It is preferred that the sleeve is moveable with respect to the inlet formations, i.e. the vane(s) and/or any other kind of flow-guiding structure provided in the annular inlet, such as a honeycomb-type flow-guide. Thus, the inlet formations are preferably substantially fixed in position during operation of the turbine such that variation in the axial width of the annular inlet of the turbine is achieved by axial displacement of the sleeve rather than any movement in the inlet formations.

In some embodiments there may be a single baffle so as to divide the annular inlet into two axially offset inlet portions. Alternatively, there may be two axially offset baffles disposed within the annular inlet so as to define three axially offset inlet portions. As a further alternative there may be two or more axially offset baffles disposed within the annular inlet, as in the second aspect of the present invention, so as to define three or more axially offset inlet portions.

There is further provided a variable geometry turbine comprising a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into a first annular inlet portion and a second annular inlet portion axially offset from the first inlet portion, inlet vanes extending axially into each of the first and second inlet portions, the inlet vanes defining axially adjacent inlet passages; wherein the configuration of the inlet vanes extending into the first inlet portion differs from the configuration of the inlet vanes extending into the second inlet portion.

The inlet vanes may have any suitable configuration, and may for example have a similar general aerofoil configuration to that of known inlet vanes, or they may have any alternative configuration selected to define a particular arrangement and configuration of inlet passages. Since the vanes and inlet baffles together define the configuration and orientation of the inlet passages, a wide variety of different inlet passage configurations can be achieved by appropriate design of the individual nozzle vanes in combination with the inlet baffles. Moreover, the designs can be such that there may be differently configured inlet passages in one annular portion as compared to another annular portion within an annular inlet, or there may be differently configured inlet passages within a single annular portion, or both. For instance, the vanes extending across a first annular portion of the inlet may define a different swirl angle to the vanes extending across a second annular portion of the inlet.

The number of vanes in each annular array may differ. For instance, an annular array of fifteen vanes may be included in the same nozzle assembly as an annular array of only eight vanes. Other arrays may have a different number of vanes, greater than fifteen or fewer than eight, or somewhere in between, e.g. twelve. In addition, vanes having different radial extents, and different swirl angles may be used, e.g. some vanes swept forwards to a greater extent than others, and as such defining a greater swirl angle. In a preferred embodiment the swirl angle of a vane or annular array of vanes is larger than the swirl angle of a vane or annular array of vanes that is axially offset.

It is preferred that the relationship between the swirl angle of one array of vanes compared to an axially offset array of vanes is generally similar to the variation in vane maximum inner diameter and clearance between the vanes and the turbine wheel in so far as an increase in one parameter is accompanied by an increase the other two parameters. By way of example, where a first array of vanes defines a first maximum inner diameter, a first radial clearance between the vanes and the turbine wheel and a first swirl angle, a second axially offset array of vanes may define a second maximum inner diameter, a second radial clearance and a second swirl angle in which all of said first parameters are larger than all of the corresponding second parameters. In a preferred embodiment the three parameters progressively increase from one side of the inlet to the opposite side, most preferably from the "open side" of the inlet, i.e. the side nearest to the annular portion furthest from a closed position of the sleeve where the gas flow path through the inlet is narrowest, towards the "closed side" of the inlet, i.e. the annular portion closest to the closed position of the sleeve.

The leading edges of at least some of the vanes extending across a first annular portion of the inlet may lie on a different radius to the leading edges of at least some of the vanes extending across a second annular portion of the inlet. In some embodiments the leading edges of all of the vanes extending across a first annular portion of the inlet lie on a radius different to that of the leading edges of all of the vanes extending across a second annular portion of the inlet. In some embodiments the leading edges of vanes of one annular portion of the inlet lie on a minimum radius which is different to that of vanes extending across any other annular portion of the inlet.

The trailing edges of at least a majority of vanes extending across an annular portion of the inlet may lie on a radius greater than the internal radius of a baffle defining the annular portion. In some embodiments all of the vanes extending across an annular portion may have a trailing edge lying at a radius greater than the internal radius of a baffle defining the annular portion. In some embodiments each annular baffle may have an internal radius smaller than the radius of the leading edge of any vane in the annular inlet.

According to another aspect of the present invention there is provided a variable geometry turbine comprising a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into a first annular inlet portion and a second annular inlet portion axially offset from the first inlet portion, inlet vanes extending axially into each of the first and second inlet portions, the inlet vanes defining axially adjacent inlet passages; wherein the configuration of the inlet vanes extending into the first inlet portion differs from the configuration of the inlet vanes extending into the second inlet portion.

It will be appreciated that axially offset inlet passages include inlet passages with different axial positions and/or inlet passages with different axial extents. Axially offset inlet passages may be spaced apart, adjacent or axially overlapping.

The first and second inlet portions may be adjacent one another.

The configuration of the inlet vanes extending into the first inlet portion may differ from the configuration of the inlet vanes extending into the second inlet portion in that the number of inlet vanes extending into the first inlet portion differs from the number of inlet vanes extending into the second inlet portion.

It will be appreciated that features of any one or more of the above defined embodiments, and optional features thereof, may be combined together in any desirable arrangement in a variable geometry turbine, subject of course to technical constraints that would be evident to the skilled person.

The baffle(s), vane(s) and/or sliding sleeve may be formed from a material that is a ceramic, a metal or a cermet (a ceramic/metal composite). The metal could be any steel, or a nickel based alloy, such as inconel. Any or all of these components may be provided with a coating, for example on the sliding interface of the nozzle and the sleeve there could be a coating of diamond-like-carbon, anodisation, or tribaloy or a substitute wear resistant coating. The aerodynamic surfaces may be provided with a coating to promote smoothness or resist corrosion. Such coatings could include non-deposited coatings such as a plasma-electrolytic-oxide coating or substitute coatings.

It should be appreciated that exhaust gas typically flows to the annular inlet from a surrounding volute or chamber. The annular inlet is therefore defined downstream of the volute, with the downstream end of the volute terminating at the upstream end of the annular inlet. As such, the volute transmits the gas to the annular inlet, while the gas inlet passages of the present invention receive gas from the volute. In some embodiments, the first and second inlet sidewalls which define the annular inlet are continuations of walls which define the volute. The annular inlet may be divided into at least two axially offset inlet passages by one or more baffles located in the annular inlet, and which are therefore positioned downstream of the volute.

The turbine of the present invention has been illustrated in the figures using a single flow volute, however it is applicable to housings that are split axially, whereby gas from one or more of the cylinders of an engine is directed to one of the divided volutes, and gas from one or more of the other cylinders is directed to a different volute. It is also possible to split a turbine housing circumferentially to provide multiple circumferentially divided volutes, or even to split the turbine housing both circumferentially and axially. It should be appreciated, however, that an axially or circumferentially divided volute is distinguished from the multiple gas inlet passages present in the turbine of the present invention. For example, the gas inlet passages relate to a nozzle structure arranged to accelerate exhaust gas received from the volute towards the turbine, and optionally to adjust or control the swirl angle of the gas as it accelerates. The multiple gas inlet passages forming part of the present invention may be further distinguished from a divided volute arrangement in that, while the gas inlet passages receive gas from the volute (or divided volute), and split the gas into an array of paths directed on to the turbine, a divided volute receives gas from the exhaust manifold so as to retain the gas velocity in gas pulses resulting from individual engine cylinder opening events.

It will be appreciated that axially offset inlet passages include inlet passages with different axial positions and/or inlet passages with different axial extents. Axially offset inlet passages may be spaced apart, adjacent or axially overlapping.

A variable geometry turbine may comprise:

a turbine wheel mounted for rotation about a turbine axis within a housing, the housing defining an annular inlet surrounding the turbine wheel and defined between first and second inlet sidewalls;

a cylindrical sleeve axially movable across the annular inlet to vary the size of a gas flow path through the inlet;

the annular inlet divided into axially adjacent annular portions by at least one annular baffle which is axially spaced from the first and second inlet sidewalls;

inlet formations extending axially across at least two of said annular portions defined by the or each baffle so as to divide said annular inlet into at least two axially offset inlet passages;

the baffle(s) and inlet formations forming part of a nozzle assembly located within said annular inlet;

wherein first and second components of the nozzle assembly define complementary features which co-operate to connect together said first and second components.

Within each annular portion the axially extending formations may be vanes, the axially extending part of a porous structure, such as a material having a honeycomb-like internal structure, or both. The formations are orientated to deflect gas flowing through the annular inlet towards the direction of rotation of the turbine wheel. Gas is deflected along inlet passages defined between neighbouring formations and adjacent baffles or sidewalls.

The nozzle assembly incorporates the one or more baffles located in the annular inlet and the axially extending inlet formations. The first and second components carrying the complementary features may both be baffles or parts of baffles, they may both be inlet formations or a subsection of inlet formations, or a combination of the two. By way of example, a baffle may incorporate a depression or recess which is complementary to a projection on an inlet formation, such as a vane. Mating receipt of the projection on the vane with the depression on the baffle enables those two components, i.e. the vane and the baffle, to be connected together. In a further example, the first and second components may be sections of a baffle which need to be assembled together to define the final baffle for location within the annular inlet. The two sections may each incorporate a projection with an inverted section which are mirror images of one another and can therefore be assembled together by co-operation of the two projections. The baffle sections could be part or complete annular members which, when assembled together, are axially adjacent, or they could be segments of the annular baffle which are connected together along a radial or near radial edge.

In preferred embodiments the nozzle assembly incorporates three or four baffles spaced axially across the annular inlet of the turbine. The baffles may be considered as being axially "stacked" on top of one another. Each pair of adjacent baffles is provided with a pair of complementary features which co-operate to correctly align the baffles with respect to one another. In this way the stack of three or four baffles can be properly assembled and aligned before being placed into the annular inlet or they can be aligned as each baffle is mounted separately within the annular inlet.

One of the complementary features may be a depression or recess formed into the structure of the relevant component by stamping or any other appropriate means. A complementary feature, such as a projection may also be formed by stamping, or another suitable method. Where components of the nozzle assembly are to be connected together so as to lie axially adjacent to one another, such as a vane and its respective baffle, then it may be preferable for the complementary features to extend axially. Where the components are intended to lie circumferentially relative to one another, such as segments of an annular baffle, then it may be preferable for the complementary features to extend circumferentially and optionally to extend at least partially in a radial direction and/or axial direction.

The nozzle assembly may comprise a plurality of pairs of said first and second components, and/or the nozzle assembly may comprise a plurality of pairs of complementary features. Said pairs of complementary features may be provided in any arrangement, but a preferred arrangement has the complementary features provided in one or more annular arrays. In this preferred arrangement, the pairs of complementary features provided in said annular array, or provided in at least one of said annular arrays, are preferably equi-angularly spaced.

A nozzle may be provided for location within an annular inlet of a variable geometry turbine, the nozzle comprising at least one baffle and inlet formations; first and second components of the nozzle defining complementary features; wherein said first and second components define complementary features which co-operate to connect together said first and second components.

A method may be provided for assembling a nozzle for location within an annular inlet of a variable geometry turbine, the nozzle comprising at least one baffle and inlet formations; first and second components of the nozzle defining complementary features; wherein the method comprises assembling said first and second components such that said complementary features co-operate to connect together said first and second components.

A method may be provided for assembling a variable geometry turbine, the turbine comprising: a turbine wheel mounted for rotation about a turbine axis within a housing, the housing defining an annular inlet surrounding the turbine wheel and defined between first and second inlet sidewalls; a cylindrical sleeve axially movable across the annular inlet to vary the size of a gas flow path through the inlet; the annular inlet divided into axially adjacent annular portions by at least one annular baffle which is axially spaced from the first and second inlet sidewalls; inlet formations extending axially across at least two of said annular portions defined by the or each baffle so as to divide said annular inlet into at least two axially offset inlet passages; the baffle(s) and inlet formations forming part of a nozzle assembly located within said annular inlet; first and second components of the nozzle assembly defining complementary features; wherein the method comprises assembling said first and second components such that said complementary features co-operate to connect together said first and second components.

Preferably the variable geometry turbine in the second, third and/or fourth aspects defined above is in accordance with the first aspects of the present invention.

It will be appreciated that by appropriate use of co-operating features in the general manner described above the cost and complexity of manufacturing the nozzle assembly, and therefore the turbine, can be reduced as compared to similar assemblies but which do not incorporate the co-operating features.

The co-operating features may be releasably or non-releasably secured together. For example, the features may be locked or screwed together, or they may be brazed together. The features do not have to be used to secure their respective components together, they may be used simply to self-align the two components during assembly to ensure that when the components are secured together they are in the correct relative orientation.

A variable geometry turbine may comprise: a turbine wheel mounted for rotation about a turbine axis within a housing, the housing defining an annular inlet surrounding the turbine wheel and defined between first and second inlet sidewalls; a cylindrical sleeve axially movable across the annular inlet to vary the size of a gas flow path through the inlet; the annular inlet divided into axially adjacent annular portions by at least one annular baffle which is axially spaced from the first and second inlet sidewalls; inlet formations extending axially across at least two of said annular portions defined by the or each baffle so as to divide said annular inlet into at least two axially offset inlet passages; the baffle(s) and inlet formations forming part of a nozzle assembly located within said annular inlet; wherein the nozzle assembly comprises at least two modular components of a first type.

Reference to a "modular component" is intended to refer to a component having a particular design which enables it to be used in a modularised fashion, that is, to be combined with one or more further modular components of the same design to build up an assembly comprised of a plurality of said modular components. In this way, nozzle assemblies of a range of different configurations can be manufactured from relatively few components, thus reducing the cost and complexity of manufacture. It will be appreciated that reference to a "type" of modular component is simply intended to mean that the at least two modular components in the nozzle assembly are substantially (i.e. within manufacturing tolerances) identical in size and shape, and are thus "modular components".

The modular components may be releasably or non-releasably secured together. For example, the components may be locked or screwed together, or they may be brazed together. Moreover, the modular components do not have to connect directly to one another, any number of intermediate components may be provided between the modular components to produce the final nozzle assembly.

A further aspect of the present invention provides a nozzle for location within an annular inlet of a variable geometry turbine, the nozzle comprising at least one baffle and inlet formations; wherein the nozzle comprises at least two modular components of a first type.

Another aspect of the present invention provides a method for assembling a nozzle for location within an annular inlet of a variable geometry turbine, the nozzle comprising at least two modular components of a first type; wherein the method comprises assembling said at least two modular components of a first type.

A still further aspect of the present invention provides a method for assembling a variable geometry turbine according to the fifth aspect of the present invention, wherein the method comprises assembling said at least two modular components of a first type.

It will be appreciated that any one or more of the features of the variable geometry turbine according to the fifth aspect of the present invention may be combined with any one or more of the features of the variable geometry turbine of the first aspect of the present invention.

The baffle(s), inlet formations(s) and/or sliding sleeve may be formed from a material that is a ceramic, a metal or a cermet (a ceramic/metal composite). The metal could be any steel, or a nickel based alloy, such as inconel. Any or all of these components may be provided with a coating, for example on the sliding interface of the nozzle and the sleeve there could be a coating of diamond-like-carbon, anodisation, or tribaloy or a substitute wear resistant coating. The aerodynamic surfaces may be provided with a coating to promote smoothness or resist corrosion. Such coatings could include non-deposited coatings such as a plasma-electrolytic-oxide coating or substitute coatings.

The "throat area" of the annular inlet may be thought of as the maximum gas "swallowing capacity" of the turbine. By using baffles to divide the annular inlet into two or more annular portions the throat area of each annular portion can be independently defined by the arrangement of the inlet formations within each annular portion and the axial width of each annular portion. In this way, the throat area of the annular inlet can be varied between the first and second inlet sidewalls. Preferably the gas flow path through the annular inlet is more constricted nearer to the second inlet sidewall, where the gas flow path through the inlet is narrowest or substantially closed, than closer to the first inlet sidewall. The variation in the degree of constriction may be progressive across the axial width of the annular inlet or may vary discontinuously with intermediate annular portions being less constricted than neighbouring annular portions provided that the gas flow path through an inlet passage closer to the second inlet sidewall is more constricted than the gas flow path through an inlet passage that is further away from the second inlet sidewall. In a preferred embodiment the inlet passages within the turbine having the smallest total cross-sectional area perpendicular to the direction of gas flow are provided in the annular portion nearest to the second inlet sidewall where the gas flow path through the inlet is narrowest or substantially closed.

The axially extending inlet formations are preferably provided in annular arrays within each annular portion. In a preferred embodiment some or all of the formations are vanes. The inlet vanes may have any suitable configuration, and may for example have a similar general aerofoil configuration to that of known inlet vanes, or they may have any alternative configuration selected to define a particular arrangement and configuration of inlet passages. Since the vanes and inlet baffles together define the configuration and orientation of the inlet passages, a wide variety of different inlet passage configurations can be achieved by appropriate design of the individual nozzle vanes in combination with the inlet baffles.

Control of the degree of constriction to the gas flow path through the annular inlet by the arrangement of the formations, e.g. the vanes, can be achieved in a number of ways. For example, one or more, or all, of the vanes within one annular portion may have a thickened leading edge, a larger circumferential thickness, or both, as compared to vanes in other annular portions. In a preferred embodiment, vanes with a thicker leading edge are provided in the annular portion(s) nearer to the second inlet sidewall, i.e. the closed position of the sleeve where the gas flow path through the inlet is at its narrowest, since this is where a greater variation in gas incidence angle is to be expected. By way of a further example, a greater number of vanes may be provided in one annular portion than another. For instance, an annular array of fifteen vanes may be included in the same nozzle assembly as an annular array of only eight vanes. Other arrays may have a different number of vanes, greater than fifteen or fewer than eight, or somewhere in between, e.g. twelve. In another example, the swirl angle of vanes in one annular portion may be greater than that in another annular portion. Moreover, the radial extent, outer and/or inner maximum diameter of vanes in one annular portion may be different to that in another annular portion to provide a different degree of constriction in the two annular portions. It will be appreciated that any one or more of the above modifications in vane structure, arrangement or orientation may be employed to achieve the desired variation in throat area across the axial width of the annular inlet.

For certain engine applications (such as for exhaust gas recirculation, "EGR") it may be desirable to reduce the turbine efficiency in one or more of the arrays of inlet passageways. For example, it may be desirable to reduce efficiency at relatively open inlet widths in some applications. Such reduced efficiency could for instance be achieved by reducing the radial extent of the vanes (as discussed above), increasing the circumferential width of the vanes, or otherwise configure the vanes to reduce the effective inlet area, i.e. the throat area of the annular inlet.

In some embodiments relatively small "splitter vanes" may be located between adjacent pairs of "main" vanes. This arrangement may have the effect of increasing the total number of vanes compared with other embodiments, but the vanes may be provided with a reduced radial extent so that there is a greater radial clearance between the vanes and the turbine wheel. The splitter vanes may be advantageous in some embodiments to reduce vibration excited in the turbine blades.

In some embodiments, the vanes may have a "cut-off" configuration in the region of the trailing edge rather than a full airfoil configuration which can be expected to provide reduced efficiency but which may be useful in some applications. In addition, obstructions may be located between adjacent vanes which could further reduce efficiency.

In certain embodiments it is preferred that the axially movable sleeve can be moved across substantially the fully axial width of the annular inlet so as to substantially close or entirely close gas flow path through the annular inlet.

While the sleeve may be provided on or adjacent to the inner diameter of one or more of the annular baffle(s), on or adjacent to one or more of the outer diameter of the annular baffle(s), or at any intermediate diameter, it is preferred that the sleeve is provided just radially outboard of the outer diameter of the annular baffle(s) such that it contacts or is just clear of the radially outermost surface of the annular baffle(s) during axial movement to vary the width of the annular inlet.

Preferably the sleeve is moveable with respect to the baffle(s). Thus it is preferred that the baffle(s) is/are substantially fixed in position during operation of the turbine such that variation in the axial width of the annular inlet of the turbine is achieved by axial displacement of the sleeve rather than any movement in the baffle(s).

It is preferred that the sleeve is moveable with respect to the inlet formations, i.e. the vane(s) and/or any other kind of flow-guiding structure provided in the annular inlet, such as a honeycomb-type flow-guide. Thus, the inlet formations are preferably substantially fixed in position during operation of the turbine such that variation in the axial width of the annular inlet of the turbine is achieved by axial displacement of the sleeve rather than any movement in the inlet formations.

There may be a single baffle so as to divide the annular inlet into two axially offset inlet portions. Alternatively, there may be two axially offset baffles disposed within the annular inlet so as to define three axially offset inlet portions. As a further alternative there may be two or more axially offset baffles disposed within the annular inlet so as to define three or more axially offset inlet portions.

It should be appreciated that exhaust gas typically flows to the annular inlet from a surrounding volute or chamber. The annular inlet is therefore defined downstream of the volute, with the downstream end of the volute terminating at the upstream end of the annular inlet. As such, the volute transmits the gas to the annular inlet, while the gas inlet passages of the present invention receive gas from the volute. In some embodiments, the first and second inlet sidewalls which define the annular inlet are continuations of walls which define the volute. The annular inlet may be divided into at least two axially offset inlet passages by one or more baffles located in the annular inlet, and which are therefore positioned downstream of the volute.

The turbine of the present invention has been illustrated in the figures using a single flow volute, however it is applicable to housings that are split axially, whereby gas from one or more of the cylinders of an engine is directed to one of the divided volutes, and gas from one or more of the other cylinders is directed to a different volute. It is also possible to split a turbine housing circumferentially to provide multiple circumferentially divided volutes, or even to split the turbine housing both circumferentially and axially. It should be appreciated, however, that an axially or circumferentially divided volute is distinguished from the multiple gas inlet passages present in the turbine of the present invention. For example, the gas inlet passages relate to a nozzle structure arranged to accelerate exhaust gas received from the volute towards the turbine, and optionally to adjust or control the swirl angle of the gas as it accelerates. The multiple gas inlet passages forming part of the present invention may be further distinguished from a divided volute arrangement in that, while the gas inlet passages receive gas from the volute (or divided volute), and split the gas into an array of paths directed on to the turbine, a divided volute receives gas from the exhaust manifold so as to retain the gas velocity in gas pulses resulting from individual engine cylinder opening events.

It will be appreciated that axially offset inlet passages include inlet passages with different axial positions and/or inlet passages with different axial extents. Axially offset inlet passages may be spaced apart, adjacent or axially overlapping.

A variable geometry turbine may comprise: a turbine wheel mounted for rotation about a turbine axis within a housing, the housing defining an annular inlet surrounding the turbine wheel and defined between first and second inlet sidewalls, the annular inlet being divided into at least two axially offset inlet portions; a cylindrical sleeve axially movable across the annular inlet to vary the size of a gas flow path through the inlet; and a guide for guiding the movement of the cylindrical sleeve, the guide being at least partially located within the inlet at a radially extent of the inlet portions, and extending in an axial direction parallel to the turbine axis.

The guide comprises one or more elongate members (e.g. rods or rails).

The one or more elongate members may be located at an outer radially extent of the inlet portions if the sleeve has an inner diameter that is greater than an outer diameter of inlet portions.

The one or more elongate members are located at an inner radially extent of the inlet portions if the sleeve has an outer diameter that is less than an inner diameter of inlet portions The variable geometry turbine may further comprise: one or more vanes located in one or both inlet portions, the one or more vanes dividing an inlet portion into at least two inlet passages, and wherein the guide may comprise: one or more edges of the one or more vanes.

If the sleeve has an inner diameter greater than an outer diameter of the inlet portions, the one or more edges may be a leading edge, or may be leading edges, of the one or more vanes.

If the sleeve has an outer diameter that is less than an inner diameter of the inlet portions, the one or more edges may be a trailing edge, or may be trailing edges, of the one or more vanes.

A variable geometry turbine may comprise: a turbine wheel mounted for rotation about a turbine axis within a housing; the housing defining an annular inlet surrounding the turbine wheel and defined between first and second inlet sidewalls, the annular inlet being divided into at least two axially offset inlet portions by a baffle, an inlet portion being divided into at least two inlet passages by a vane; and a cylindrical sleeve axially movable across the annular inlet to vary the size of a gas flow path through the inlet; wherein one or more of: a portion of an extremity of the baffle, a portion of an extremity of the vane and/or a leading end of the sleeve is provided with an inclined surface for facilitating movement of the sleeve across the baffle and/or vane.

An inner diameter of the sleeve may be greater than an outer diameter of the inlet portion, and wherein: one or more of: a radially outer portion of the baffle, a radially outer portion of the vane and/or a radially inner portion of a leading end of the sleeve may be provided with an inclined surface for facilitating movement of the sleeve across the baffle and/or vane.

The vane may extend to a greater radial extent than the baffle, and at least the vane may be provided with the inclined surface.

The vane may extend to a greater radial extent than the baffle, and a leading end of the sleeve may be provided with one or more discrete (i.e. not extending around the entire circumference of the sleeve) inclined surfaces distributed around a circumference of the sleeve, the location or locations of which coincide with a location of a vane.

The baffle may extend to a greater radial extent than the vane, and at least the baffle may be provided with the inclined surface.

The inclined surface may be one or more of a bevel, a chamfer and/or a rounded edge.

A variable geometry turbine may comprise: a turbine wheel mounted for rotation about a turbine axis within a housing, the housing defining an annular inlet surrounding the turbine wheel and defined between first and second inlet sidewalls, the annular inlet being divided into at least two axially offset inlet portions; a cylindrical sleeve structure axially movable across the annular inlet to vary the size of a gas flow path through the inlet; and wherein the cylindrical sleeve structure extends across the entire width of the inlet, such that a first end of the sleeve structure is supported within or by the first inlet side wall, or a body defining that wall, and a second opposite end of the sleeve structure is supported within or by the second sidewall, or a body defining that wall; and wherein the sleeve structure comprises one or more apertures locatable within the inlet to, upon movement of the sleeve structure, vary the size of a gas flow path through the inlet.

The sleeve structure may comprise a sleeve provided with the one or more apertures.

The sleeve structure may comprise a sleeve section and one or more support struts.

The sleeve structure may comprise a first sleeve section, and a second sleeve section, the first and second sleeve sections being joined and axially separated by one or more support struts.

The one or more support struts may be attached to the sleeve section, and/or the first sleeve section, and/or the second sleeve section.

The one or more support struts may be integral to (e.g. formed integrally with) the sleeve section, and/or the first sleeve section, and/or the second sleeve section.

The one or more support struts may be aligned with leading or trailing edges of vanes provided in one or both inlet portions. The one or more apertures may be alienable with one or more inlet passages defined (e.g. by vanes or other structures) in the one or more inlet portions.

A variable geometry turbine may comprise: a turbine wheel mounted for rotation about a turbine axis within a housing, the housing defining an annular inlet surrounding the turbine wheel and defined between first and second inlet sidewalls, the annular inlet being divided into at least two axially offset inlet portions; a sleeve assembly, comprising a sleeve that is movable in a direction parallel to the turbine axis and across the annular inlet to vary the size of a gas flow path through the inlet, and an actuator for moving the sleeve; wherein a helical interface is present in the sleeve assembly, the helical interface being arranged to induce, in use, helical movement of a part of the sleeve assembly.

The actuator, or a part thereof, may form a part of, or be provided on or in, the sleeve itself.

The sleeve may comprise the helical interface, and the sleeve is arranged to move helically.

The actuator may comprise a rotatable collar that surrounds, or is surrounded by, the sleeve, the rotatable collar being fixed in position in an axial direction, and rotatable to move the sleeve helically.

At least a part of the actuator comprises the helical interface, and the sleeve is arranged to move axially, and/or helically.

The sleeve may comprise a helical groove or slit, and the actuator may comprise: a rotatable collar that surrounds, or is surrounded by, the sleeve, the rotatable collar being fixed in position in an axial direction, and the rotatable collar being provided with a helical groove or slit; and a helically or axially moveable annulus located in-between the sleeve and the rotatable collar, the annulus housing one or more bearings configured to sit in the helical groove or slit of the rotatable collar, and to sit in the helical groove or slit provided in the sleeve, the helical groove or slit of the sleeve, and the helical groove or slit of the rotatable collar, having different handedness.

The sleeve may comprise a helical groove or slit, and the actuator may comprise: a collar that surrounds, or is surrounded by, the sleeve, the collar being fixed in position, and the collar being provided with a helical groove or slit; and a helically moveable annulus located in-between the sleeve and the collar, the annulus housing one or more bearings configured to sit in the helical groove or slit of the rotatable collar, and to sit in the helical groove or slit provided in the sleeve, the helical groove or slit of the sleeve, and the helical groove or slit of the collar, having the same handedness.

One or more of the collar, rotatable collar and/or sleeve may be provided with a plurality of helical grooves or slits, disposed around a circumference of the respective collar, rotatable collar and/or sleeve.

The sleeve assembly may further comprise a guide or driver for guiding or driving movement of the sleeve in an axial and/or helical manner.

According to an aspect of the present invention there is provided variable geometry turbine comprising a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet; wherein the annular inlet is divided into at least three axially offset inlet passages by two or more inlet passage walls disposed between the first and second inlet sidewalls.

It will be appreciated that axially offset inlet passages include inlet passages with different axial positions and/or inlet passages with different axial extents. Axially offset inlet passages may be spaced apart, adjacent or axially overlapping.

The inlet passage walls may be axially spaced annular baffles, the baffles dividing the annular inlet into axially adjacent annular portions.

The number of baffles may be one of 2, 3, 4, 5 or 6.

The variable geometry turbine may further comprise inlet vanes which extend axially across at least two of said axially adjacent annular portions; wherein the cylindrical sleeve is axially movable across the annular inlet to vary the size of a gas flow path through the inlet between a free end of the sleeve and the first inlet sidewall; and wherein the axial width of the inlet vanes extending across a first annular portion of the inlet is less than the axial width of the inlet vanes extending across a second annular portion of the inlet, the first annular portion being closer the first inlet sidewall than the second annular portion is to the first inlet sidewall.

The two or more inlet passage walls may define an annular array of substantially tubular inlet passages extending generally towards the turbine wheel, wherein the annular array of inlet passages comprises at least three axially offset inlet passages.

The sleeve may be axially movable between an open position in which there is a gas flow path through the inlet, between a free end of the sleeve and the first inlet sidewall, through at least one of said at least three axially offset inlet passages, and a closed position in which the size of said gas flow path through the inlet between the free end of the sleeve and the first inlet sidewall is reduced compared to that when the sleeve is in the open position; and wherein the sleeve moves in a direction towards said first inlet sidewall when the sleeve is moved from the open position towards the closed position.

When the sleeve is in the closed position, the axial distance between at least a portion of the free end of the sleeve and the first inlet sidewall may be less than each of the respective axial distances between at least two of the two or more inlet passage walls and the first inlet sidewall.

When the sleeve is in the closed position, the axial distance between all of the free end of the sleeve and the first inlet sidewall may be less than each of the respective axial distances between at least two of the two or more inlet passage walls and the first inlet sidewall.

When the sleeve is in the closed position, the axial distance between at least a portion of the free end of the sleeve and the first inlet sidewall may be less than each of the respective axial distances between each of the two or more inlet passage walls and the first inlet sidewall.

When the sleeve is in the closed position, the axial distance between all of the free end of the sleeve and the first inlet sidewall may be less than each of the respective axial distances between each of the two or more inlet passage walls and the first inlet sidewall.

When the sleeve is in the closed position, the axial distance between at least a portion of the free end of the sleeve and the first inlet sidewall may be less than the axial distance between one of the two or more inlet passage walls and the first inlet sidewall, and wherein said one of the two or more inlet passage walls is located such that the axial distance between said one of the two or more inlet passage walls and the first inlet sidewall is less than or equal to substantially 50% of the axial distance between the first and second inlet sidewalls.

When the sleeve is in the closed position, the axial distance between at least a portion of the free end of the sleeve and the first inlet sidewall may be less than the axial distance between one of the two or more inlet passage walls and the first inlet sidewall, and wherein the sleeve substantially does not contact said one of the two or more inlet passage walls when the sleeve is in the closed position.

When the sleeve is in the closed position, the axial distance between at least a portion of the free end of the sleeve and the first inlet sidewall may be less than the axial distance between one of the two or more inlet passage walls and the first inlet sidewall, and wherein the sleeve is mounted such that gas may pass between said one of the two or more inlet passage walls and the sleeve when the sleeve is in the closed position, the gas then passing through the inlet.

The sleeve may be mounted such that, when the sleeve is in the closed position, the sleeve substantially does not contact any of the two or more inlet passage walls.

An axial dimension of a first of said axially offset inlet passages may be less than an axial dimension of a second of said axially offset inlet passages, and wherein the first of said axially offset inlet passages is located closer the first inlet sidewall than the second of said axially offset inlet passages.

A variable geometry turbine may comprise: a turbine wheel mounted for rotation about a turbine axis within a housing, the housing defining an annular inlet surrounding the turbine wheel and defined between first and second inlet sidewalls, the annular inlet being divided into at least two axially offset inlet portions; a cylindrical sleeve axially movable across the annular inlet to vary the size of a gas flow path through the inlet; wherein an axial extent of a leading end of the sleeve varies in magnitude around a circumference of the sleeve. The variation in the axial extent defines a plurality of recesses and/or protrusions located around the circumference of the leading end of the sleeve. The sleeve, or the axial extent thereof, is free of vanes.

A maximum in the variation in magnitude of the axial extent may be substantially equal to: an axial width of an inlet portion; or an axial width of an inlet portion plus an axial width of a baffle that divides the inlet; or an axial width of an inlet passage through an inlet portion.

The variation in the axial extent is such that an area defined by recesses in, or between protrusions of, the leading end of the sleeve is substantially equal to an area of an opening of an inlet portion, or of openings through inlet passages formed in those inlet portions.

An inlet portion may comprise one or more vanes or other structures dividing the inlet portion into one or more inlet passages, and wherein the variation in magnitude of the axial extent in the circumferential direction is synchronised with a location of the one or more vanes or other structures, or a spacing between the one or more vanes or other structures.

A thickness of the sleeve, in the radial direction, may be less than an axial width of the annular inlet, or less than an axial width of an inlet portion or inlet passages formed in that inlet portion.

An inner diameter of the sleeve may be greater than an outer diameter, or outer radial extent, of the inlet portions.

The axial extent of the leading end of the sleeve may vary in: a castellated manner; and/or a wave-like manner. The variation may be periodic.

According to an aspect of the present invention there is provided a variable geometry turbine comprising a turbine wheel mounted for rotation about a turbine axis within a housing, the housing defining an annular inlet surrounding the turbine wheel and defined between first and second inlet sidewalls; and a cylindrical sleeve axially movable across the annular inlet to vary the size of a gas flow path through the inlet;

wherein the annular inlet is divided into at least two axially offset inlet passages which axially overlap.

It will be appreciated that axially offset inlet passages include inlet passages with different axial positions and/or inlet passages with different axial extents. Axially offset inlet passages may be spaced apart, adjacent or axially overlapping.

The annular inlet may be divided into an annular array of substantially tubular inlet passages extending generally towards the turbine wheel, wherein the annular array of inlet passages comprises at least three axially offset inlet passages which axially overlap.

At least two of said axially offset inlet passages which axially overlap may circumferentially overlap.

The substantially tubular inlet passages may have a generally diamond or generally hexagonal cross-section.

The inlet may be divided into said inlet passages by inlet passage walls defined by a plurality of generally annular non-planar baffles.

The baffles may be generally annular rings which are circumferentially corrugated.

The baffles may have a generally hyperbolic paraboloidal surface.

The annular array of inlet passages may be constructed from a plurality of discrete circumferentially adjacent segments.

Any one or more of the above aspects, embodiments, or features thereof, may be combined with other aspects, embodiments, or features thereof, where appropriate.

BRIEF DESCRIPTION OF THE FIGURES

Specific embodiments of the present invention will now be described, with reference to the accompanying drawings.

FIG. 3 is an axial cross-section through part of a turbocharger including a variable geometry turbine in accordance with an embodiment of the present invention.

FIGS. 4a and 4b illustrate detail of the nozzle assembly of the turbine of FIG. 3.

FIGS. 30a and 30b illustrate a modification of an embodiment of the present invention.

FIGS. 31a to 31c depict a modification of the embodiment of the invention illustrated in FIGS. 3 and 4a-4b.

FIGS. 34a to 34c illustration a detail of a inlet sleeve in accordance with embodiments of the present invention.

FIGS. 35a and 35b schematically illustrate a detail of possible modifications to embodiments of the present invention.

FIG. 50 is an axial cross-section through a turbine volute and annular inlet of a turbine according to a further embodiment of the present invention;

FIG. 51 is an axial cross-section through a turbine volute and annular inlet of a turbine according to another embodiment of the present invention;

FIG. 52 is an axial cross-section through a turbine volute and annular inlet of a turbine according to a still further embodiment of the present invention;

FIG. 53 is an axial cross-section through a turbine volute and annular inlet of a turbine according to a yet further embodiment of the present invention;

FIG. 55 is an illustration of components of a section of a nozzle structure forming part of a turbine according to the embodiment of FIG. 50 composed of an inlet sidewall, baffles, vanes and an axially slidable sleeve—(A) is a perspective view of said section of the nozzle structure, (B) shows radial cross-sectional views of the three arrays of vanes and their respective sidewall or baffle, and (C) shows detail views of a vane in each of said three arrays of vanes;

FIG. 56 is an illustration of components of a section of a nozzle structure forming part of a turbine according to the embodiment of FIG. 51 composed of an inlet sidewall, baffles, vanes and an axially slidable sleeve—(A) is a perspective view of said section of the nozzle structure, (B) shows radial cross-sectional views of the three arrays of vanes and their respective sidewall or baffle, and (C) shows detail views of a vane in each of said three arrays of vanes;

FIG. 57 is an illustration of components of a section of a nozzle structure forming part of a turbine according to the embodiment of FIG. 52 composed of an inlet sidewall, baffles, vanes and an axially slidable sleeve—(A) is a perspective view of said section of the nozzle structure, and (B) shows radial cross-sectional views of the three arrays of vanes and their respective sidewall or baffle;

FIG. 58 is an illustration of components of a section of a nozzle structure forming part of a turbine according to the embodiment of FIG. 53 composed of an inlet sidewall, baffles, vanes and an axially slidable sleeve—(A) is a perspective view of said section of the nozzle structure, and (B) shows radial cross-sectional views of the three arrays of vanes and their respective sidewall or baffle;

FIGS. 71*a* to 71*c* each schematically depict a side-on view of different embodiments of a leading end of an axially moveable sleeve;

DETAILED DESCRIPTION

Figure 1:
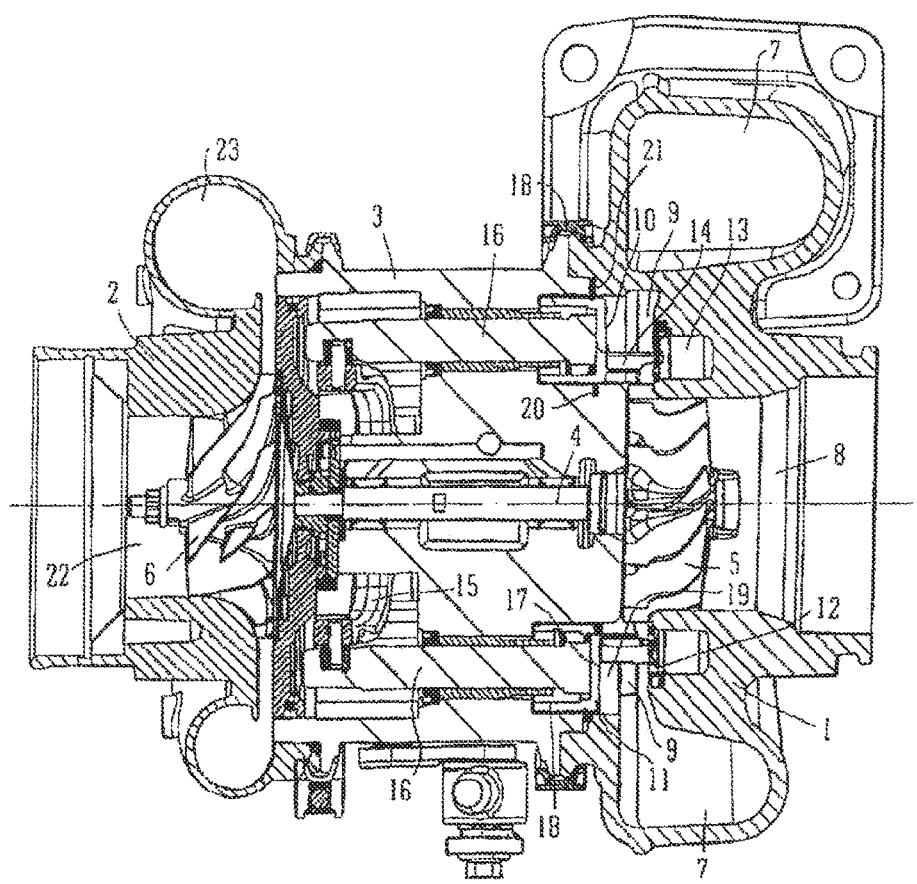
FIG. 1 is an axial cross-section through a known turbocharger including a variable geometry turbine.

Referring to FIG. 1, this illustrates a known turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4*a* on bearing assemblies located in the bearing housing.

The turbine housing 1 defines a volute 7 to which gas from an internal combustion engine (not shown) is delivered. The exhaust gas flows from the volute 7 to an axial outlet passageway 8 via an annular inlet 9 and turbine wheel 5. The inlet 9 is defined between sides walls, one side wall being surface 10 of a radial wall of a movable annular nozzle ring wall member 11 and on the opposite side wall being an annular shroud plate 12. The shroud 12 covers the opening of an annular recess 13 in the turbine housing 1.

The nozzle ring 11 supports an array of circumferentially and equally spaced nozzle vanes 14 each of which extends across the full axial width of the inlet 9. The nozzle vanes 14 are orientated to deflect gas flowing through the inlet 9 towards the direction of rotation of the turbine wheel 5. When the nozzle ring 11 is proximate to the annular shroud 12, the vanes 14 project through suitably configured slots in the shroud 12, into the recess 13.

An actuator (not shown) is operable to control the position of the nozzle ring 11 via an actuator output shaft (not shown), which is linked to a stirrup member 15. The stirrup member 15 in turn engages axially extending guide rods 16 that support the nozzle ring 11. Accordingly, by appropriate control of the actuator (which may for instance be pneumatic or electric or any other suitable type), the axial position of the guide rods 16 and thus of the nozzle ring 11 can be controlled. It will be appreciated that details of the nozzle ring mounting and guide arrangements may differ from those illustrated.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet volute 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown). The speed of the turbine wheel 5 is dependent upon the velocity of the gas passing through the annular inlet 9. For a fixed rate of mass of gas flowing into the inlet 9, the gas velocity is a function of the width of the inlet 9, the width being adjustable by controlling the axial position of the nozzle ring 11. (As the width of the inlet 9 is reduced, the velocity of the gas passing through it increases.) FIG. 1 shows the annular inlet 9 fully open. The inlet passageway 9 may be closed to a minimum by moving the nozzle ring 11 towards the shroud 12.

Figure 2:
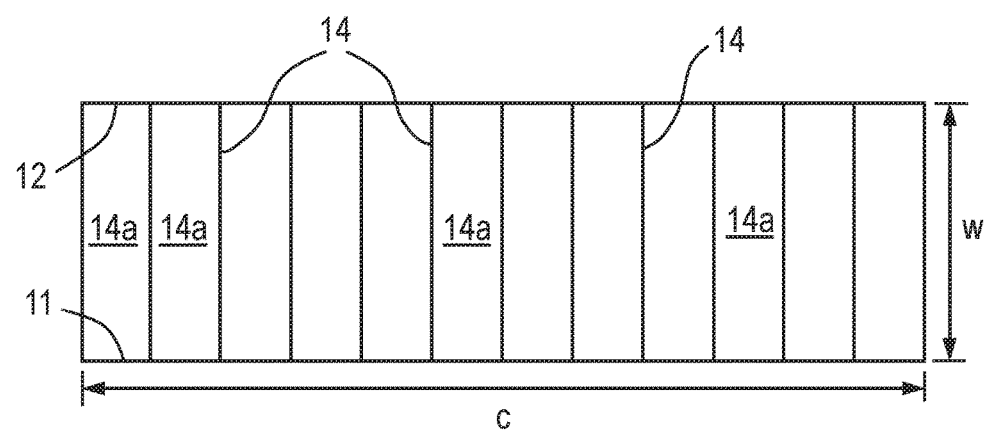
FIG. 2 is a schematic representation of a radial view around a portion of the circumference of the annular inlet of the turbine illustrated in FIG. 1.

Referring to FIG. 2, this is a schematic representation of a radial view around a portion of the circumference of the annular inlet 9 of the turbine of FIG. 1, un-rolled and laid flat in the plane of the paper. In this representation the nozzle ring 11 is in a fully open position such that parallel lines 11 and 12 represent the nozzle ring 11 and shroud plate 12 respectively, and parallel lines 14 represent the leading edges of the nozzle vanes 14 which extend across the inlet 9. The dimension c is a portion of the circumference of the inlet 9, and the dimension w is the maximum width of the annular inlet 9. From FIG. 2 it can be seen that the vanes 14 divide the annular inlet 9 into an annular array of circumferentially adjacent inlet passages 14a. Each inlet passage 14a extends generally radially, but with a forward sweep (with decreasing radius) resulting from the configuration of the vanes 14 which as mentioned above is designed to deflect the gas flow passing through the inlet 9 towards the direction of rotation of the turbine wheel. The geometry of each of the inlet passages 14a, which extend across the full width w of the inlet 9, is defined by the configuration and spacing of the vanes 14, but as shown have a generally rectangular cross-section.

FIG. 3 is a cross-section through part of a turbocharger including a variable geometry turbine in accordance with an embodiment of the present invention. Where appropriate corresponding features of the turbochargers of FIG. 1 and FIG. 3 are identified with the same reference numbers. References to "axial" and "axially" are to be understood as referring to the axis of rotation of the turbine wheel. FIG. 3 shows the bearing housing 3 and turbine housing 4 of the turbocharger, with the compressor (not shown) removed. As with the known turbocharger of FIG. 1, a turbocharger shaft 4 extends through the bearing housing 3 to the turbine housing 1 and a turbine wheel 5 is mounted on one end of the shaft 4 within the turbine housing 1. The turbine housing 1 defines a volute 7 from which exhaust gas flow is delivered to an annular inlet 9 which surrounds the turbine wheel 5.

In accordance with the present invention, the size of the inlet 9 is variable by controlling the position of an axially sliding cylindrical sleeve 30 which is supported on guide rods 31 which are slidably mounted within a cavity 19 defined by the bearing housing 3. The guide rods 31 may have a configuration substantially the same as that of the guide rods 16 illustrated in FIG. 1, and be actuated in the same way via a yoke (not shown) linked to inboard ends 31a of the guide rods 31. Outboard ends 31a of the guide rods 31 are connected to radially extended flanges 30a of the sleeve 30. Respective separate flanges 30a maybe provided for connection to the guide rods 31 as illustrated, or the sleeve 30 may comprise a single annular radially extending flange which is connected to the guide rods 31. The sleeve 30 has a free end which projects into the inlet 9 so that the width of the inlet can be varied in a controlled manner by appropriate movement and positioning of the sleeve 30 via the guide rods 31.

Also in accordance with the present invention the inlet 9 is, at least in part, defined between facing side walls of the turbine housing which in this embodiment comprise nozzle rings 32 and 33 of a nozzle assembly 34. The nozzle assembly 34 is shown in greater detail in FIGS. 4a and 4b (together with a section of the sleeve 31, and a guide rod 31). The first nozzle ring 32 of the nozzle assembly 34 extends radially across the opening of the cavity 19 of the turbine housing to the sleeve 30. Seal ring 35 seals the nozzle ring 32 with respect to the sleeve 30 to prevent gas leakage between the inlet 9 and the cavity 19. Similarly, a seal ring 36 seals the nozzle ring 32 with respect to the turbine housing adjacent a radial inner periphery of the nozzle ring 32. The second nozzle ring 33 of the nozzle ring assembly 34 is fixed to a radial wall of the turbine housing, within a shallow annual recess defined by the turbine housing and is sealed with respect thereto by seal ring 36 to prevent gas leakage between the nozzle ring 33 and the turbine housing.

Figure 5:
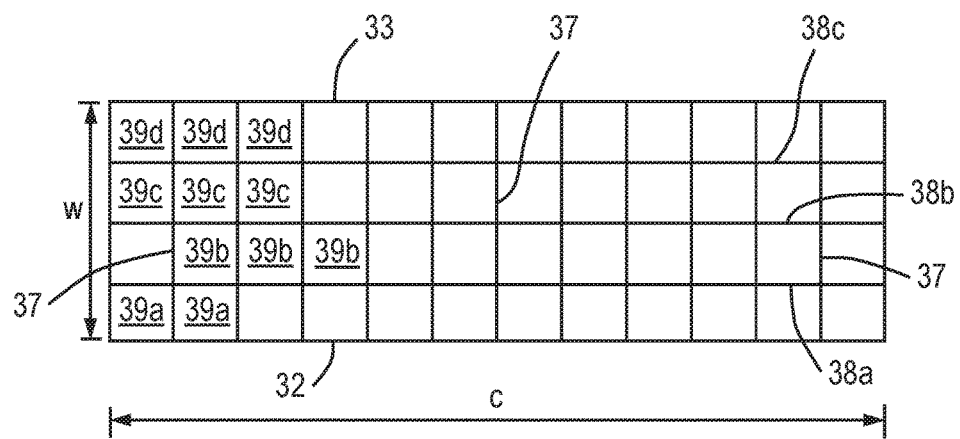
FIG. 5 is a schematic representation of a radial view around a portion of the circumference of the annular inlet of the nozzle assembly of FIGS. 4a and 4b.

An annular array of circumferentially equispaced nozzle vanes 37 extend between the first and second nozzle rings 32 and 33. The nozzle vanes 37 divide the annular inlet into circumferentially spaced inlet portions. Radially extending annular inlet baffles 38a, 38b and 38c are axially equispaced between the nozzle rings 32 and 33 and further divide the annular inlet 9 into axially spaced inlet portions. The baffles 38 are relatively thin rings coaxial with the turbine axis and orientated parallel to the nozzle rings 32 and 33 so that they have radially extending faces. Accordingly, the vanes 37 together with the inlet baffles 38a-38c divide the annular inlet 9 into a plurality of discreet inlet passages 39 (not all of which are individually referenced in the drawings) which is best illustrated in FIG. 5 which is a schematic representation of a radial view of an un-rolled portion of the circumference of the nozzle assembly 34 corresponding to the representation of the known inlet structure shown in FIG. 2. Again the dimension w is the full width of the inlet 9 and the dimension c is a portion of the circumference of the inlet.

Referring to FIG. 5, the vanes 37, and inlet baffles 38a-38c, divide the inlet 9 into four axially spaced annular arrays of circumferentially spaced inlet passages 39a, 39b, 39c and 39d respectively. In contrast, the known arrangement of FIG. 2 has a single annular array of circumferentially spaced inlet passages, each of which extends across the full width of the inlet 9. The exact configuration of the inlet passages 39a to 39d is defined by the configuration of the vanes 37 and baffles 38a to 38c, but as illustrated it can be seen that the passages have a generally rectangular (in this case nearly square) cross section. Each of the inlet passages 39a-39d directs gas flow to the turbine wheel, and due to the sweep of the vanes 37 turns the gas flow in a direction towards to the direction of the rotation of the turbine wheel 5. In this embodiment the inlet passages 39 in each annular array are circumferentially adjacent and each annular array 39a to 39d is axially adjacent to the next.

As described above, the size of the inlet 9 is controlled by adjustment of the axial position of the sleeve 30 which slides over the outside diameter of the vanes and baffles. Depending upon the positioning of the sleeve 30, one or more of the axially spaced annular arrays of inlet passages 39a-39d may therefore be blocked or partially blocked to gas flow through the inlet 9. For instance, FIG. 4a illustrates the sleeve 30 in an almost fully open position in which the first annular array of gas flow passages 39a is partially blocked to gas flow, and the second to fourth annular arrays of inlet passages 39b-39d are fully open to gas flow. FIG. 4b (and FIG. 3), show the sleeve 30 in a fully closed position in which the end of the sleeve 30 bears against the nozzle ring 33 and all four of the axially adjacent annular arrays of inlet passages 39a-39d are closed (subject to the potential for a minimum amount of leakage into the inlet passages 39d between the sleeve 30 and the nozzle ring 33).

Figure 6:
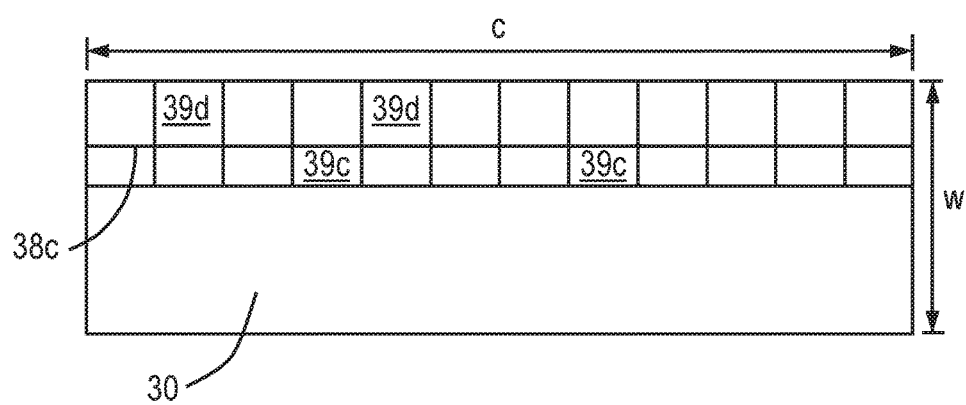
FIG. 6 shows the schematic illustration of FIG. 5 modified to show a sleeve forming part of the nozzle assembly of FIGS. 4a and 4b.

By controlling the position of the sleeve 30 between the open and closed positions, a selected number of the axially adjacent annular arrays of inlet passages 39a-39d may be opened or blocked, or partially opened/blocked. For instance, by positioning the sleeve 30 so that the free end of the sleeve is axially aligned with the first inlet baffle 38a, the first annular array of inlet passages 39a is closed and the second to fourth annular arrays of inlet passages 39b-39d are fully opened to gas flow. Similarly, by positioning the free end of the sleeve 30 part way between inlet baffles 38b and 38c the first and second annular arrays of inlet passages 39a and 39b will be fully closed, the fourth annular array of inlet passage 39d will be fully open and the third annular array of inlet passages 39c will be partially open. This is schematically illustrated in FIG. 6 which superimposes the sleeve 30 on the view shown in FIG. 5.

In the embodiments of the invention described above (and below) the sleeve 30 can fully close the inlet, i.e. block the inlet 9 completely. In other embodiments the sleeve need not necessarily be capable of closing the inlet fully, but might have a "closed" position in which the final array of passages 39 is at least partially open. For instance, the free end of the sleeve could be provided with axially extending lands which provide a hard stop for the closed position of the sleeve, with flow gaps defined between lands around the circumference of the sleeve.

In this embodiment of the invention, the increased acceleration of the gas flow is achieved by reducing the size of the inlet 9 occurs upstream of the inlet passages 39. In the absence of inlet baffles 38, gas accelerating past the end of the sleeve 30 will expand axially across the full width of the inlet 9 before it reaches the turbine wheel 5. This would result in substantial loss of energy in the gas flow as it passes through the inlet which may largely negate the desired effect of constricting the inlet. Accordingly, such a variable geometry turbine could be expect to be very inefficient and thus impractical for many applications, such as for instance for use in a turbocharger turbine. With the present invention, as the sleeve 30 moves beyond the first and subsequent inlet baffles, the volume of the inlet 9 within which the gas can expand is reduced which similarly reduces the potential for loss in energy by expansion of the gas flow within the inlet 9 upstream of the turbine wheel. This in turn significantly improves the efficiency of the inlet. As the free end of the sleeve aligns with a given inlet baffle it is effectively equivalent to a moving radial wall member. Between these locations it is possible there may be a drop off in efficiency but this will not be to the same extent as would be experienced in the absence of any inlet baffles. Surprisingly, simulations suggest that the inlet structure of the present invention has even better efficiency than some known moving wall inlet structures, particularly at smaller inlet widths.

The embodiment of the invention illustrated in FIGS. 3 to 6 has three inlet baffles 38, but more or less than three baffles could be incorporated in alternative embodiments. For instance, provision of only a single inlet baffle, for example midway between the nozzle rings 32 and 33, may improve efficiency above that attainable in the absence of any inlet baffle to a sufficient extent to provide an effective variable geometry turbine structure for use in a turbocharger and other applications.

Efficiency of the turbine inlet can be expected to vary in a somewhat step-wise function of inlet size corresponding to the location of the or each inlet baffle. This effect can however be smoothed by increasing the number of baffles. Although increasing the number of baffles (which have an axial thickness) may increase aerodynamic drag and reduce the maximum cross-sectional flow area available to gas flow for any given inlet width w, this may, if necessary, be compensated by constructing the annular inlet 9 to have a larger maximum axial width and than would be the case in the absence of baffles.

The turbine according to the present invention also has a number of other advantages over the known moving nozzle ring turbine shown in FIG. 1. With the present invention there are considerably reduced pressure and aerodynamic forces on the sleeve compared to those acting on a radial wall. For instance, the axial force imposed on the sleeve 30 by air flow through the inlet is much less than that imposed on a moveable radial wall. This allows the use of a smaller, less robust actuator, and also a less robust linkage between the actuator and the sleeve, as the axial force required to move the sleeve and hold it in position is much less than that required to control the position of a radial wall. The reduction in axial forces on the sleeve compared to those experienced by a radial wall also simplifies accurate control of the size of the inlet.

Employing a cylindrical sleeve as the moving component for varying the inlet size, instead of a moving radial wall, also avoids the need to provide slots to receive the vanes as the inlet width is reduced, which is a requirement of known inlet structures comprising a moving nozzle ring (as illustrated for instance in FIG. 1) and also of alternative known structures in which the vanes are fixed and a slotted shroud is moved axially over the vanes to vary the inlet width. The present invention thus eliminates many of the interface requirements between the moving component and the vane array which in turn increases manufacturing tolerances. Absence of such slots also reduces the possibility of gas leakage around the vane array and simplifies sealing requirements.

Known devices comprising a moveable nozzle ring in which the moving wall member includes the vanes, for instance as shown in FIG. 1, also experience significant torque as the gas flow is deflected by the vanes. With the present invention there is no such torque on the moving component which further reduces the force on the actuator and actuator linkages.

With the embodiment of the invention illustrated in FIGS. 3 and 4, the inlet passages 39 are defined by a nozzle assembly 34 comprising the nozzle rings 32 and 33 which support the inlet vanes 37 and baffles 38. The nozzle rings 32 and 33 thus define the sidewalls of the annular inlet 9 of the turbine. This structure may have advantages such as allowing differently configured nozzle assemblies to be fitted to a common turbine housing so that the inlet structure (i.e. configuration of inlet passages 39) may be varied between turbines which are otherwise substantially identical. This (modular) construction may have manufacturing benefits. However, it will be appreciated that the vanes 37 and baffles 38 which define the passages 39 (or any other structure which may define the inlet passages 39 as described below), need not be formed in a separable modular nozzle assembly, but could be cast or machined integrally with the turbocharger housing (e.g. the bearing housing and/or turbine housing in a typical turbine structure). In such embodiments, sidewalls of the inlet 9 need not be formed by discreet nozzle rings as with the embodiments of FIGS. 3 and 5. Accordingly, although in the description below reference numerals 32 and 33 are conveniently used to identify sidewalls of a turbine inlet 9, these are not to be considered limited to the nozzle rings 32 and 33.

In the embodiment of the invention illustrated in FIGS. 3-6, the turbine nozzle comprises three inlet baffles 38, but as mentioned above there may be more or less inlet baffles in alternative embodiments of the invention. For instance, embodiments with only one or two inlet baffles are effective in significantly increasing the efficiency of a turbine inlet in which the moving component used to vary the inlet size is a cylindrical sleeve surrounding the vane array. Similarly, embodiments with more than three baffles may be advantageous in some embodiments. In some applications, such as for instance turbocharger applications, it is expected that 3 to 6 baffles would be appropriate.

The baffles need not be axially equi-spaced across the width of the inlet 9, and in the case of a single baffle this need not be located mid-way between side walls of the inlet 9. For instance, the axial spacing between any two adjacent baffles, or between a baffle and an adjacent side wall of the inlet may increase or decrease from one axial side of the inlet to the other, or may first increase and then decrease, or vice versa. For instance, where there is more than one inlet baffle, the axial space between the adjacent baffles and between any baffle and a side wall of the inlet may reduce/increase across the inlet 9 so that as the inlet is progressively closed by the cylindrical sleeve, the axial width of any exposed inlet passages 39 reduces/increases.

In the embodiment of the invention illustrated in FIGS. 3-6, each of the inlet baffles comprises a radially extending wall of constant thickness so that opposing surfaces of each baffle lie in a radial plane. In addition, facing surfaces of each baffle are parallel both to one another and to the facing surfaces of the nozzle rings 32 and 33 which defined the side walls of the annular inlet 9. In alternative embodiments of the invention the opposing surfaces of any given baffle need not be parallel to one another and/or need not lie in a radial plane, and/or need not be parallel to the facing surface of an adjacent baffle or inlet side wall.

For example, one or both of the opposing surfaces of a single inlet baffle may lie on a frusto-conical surface of revolution about the turbine axis. Such surfaces may be parallel with one another, or may angle in opposing directions. In embodiments comprising a plurality of frustoconical baffles, adjacent baffles may have facing surfaces which are parallel to one another or which lie at an angle to one another. Similarly, the inlet side walls, (e.g. nozzle rings 32 and 33) may have surfaces which may be parallel or angled to the facing surfaces of adjacent inlet baffles.

An inlet baffle may have a uniform axial thickness, or may have a thickness which varies across its radius. For instance, a baffle may have a narrowing axial thickness with decreasing radius. For instance, an inlet baffle may taper or may have a radial cross section which is has an aerofoil shape similar to that of a conventional inlet vane.

Examples of some of the possible alternatives described above are shown in FIGS. 7a to 7g. These Figures are a simplified radial cross-sections through a turbine inlet 9 comprising sidewalls 11 and 12, and baffles 38. Details of inlet vanes 37 are omitted from some of the figures for simplicity.

Figure 7A:
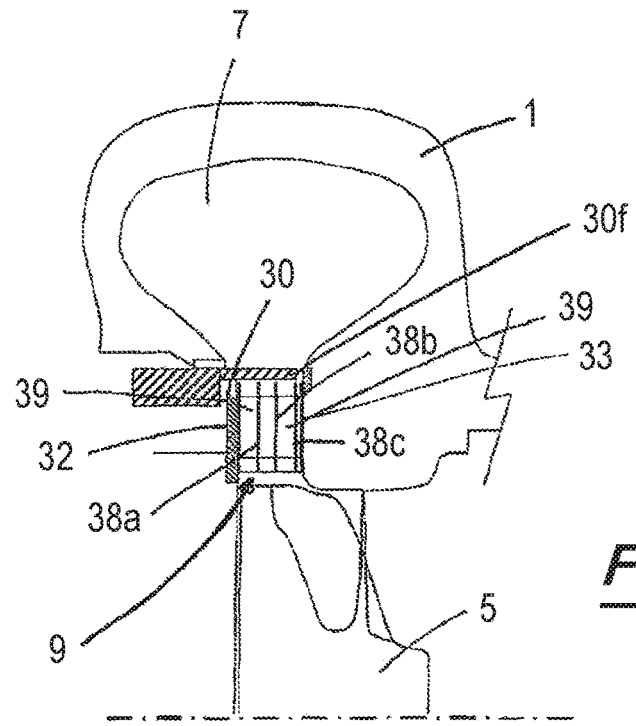
FIGS. 7a to 7g are axial cross-sections through part of a variable geometry turbine in accordance with alternative embodiments of the present invention.

FIG. 7a illustrates an embodiment comprising an annular inlet 9 defined between side walls 32 and 33 and comprising a nozzle having three baffles 38a-38c. In this particular case baffle 38c is much closer to side wall 33 than to the neighbouring baffle 38b. Similarly the spacing of baffles 38a and 38b, and the spacing of side wall 32 and baffle 38a is greater than the spacing between baffle 38c and side wall 33. In this particular embodiment the baffles are radial and parallel to one another as well as to the side walls 32 and 33.

Figure 7B:
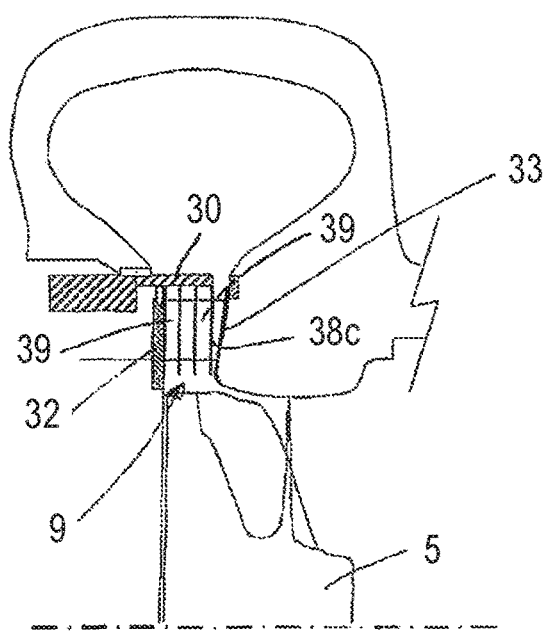

FIG. 7b is a modification of the structure shown in FIG. 7a, in which the side wall 33 of the turbine housing 1 lies of a frusto-conical surface so is angled with respect to the baffle 38c. In alternative embodiments the side wall 32 could be angled in a similar way, and in some embodiments both side walls 32 and 33 may be angled so that both sides of the annular inlet 9 taper inwardly.

Figure 7C:
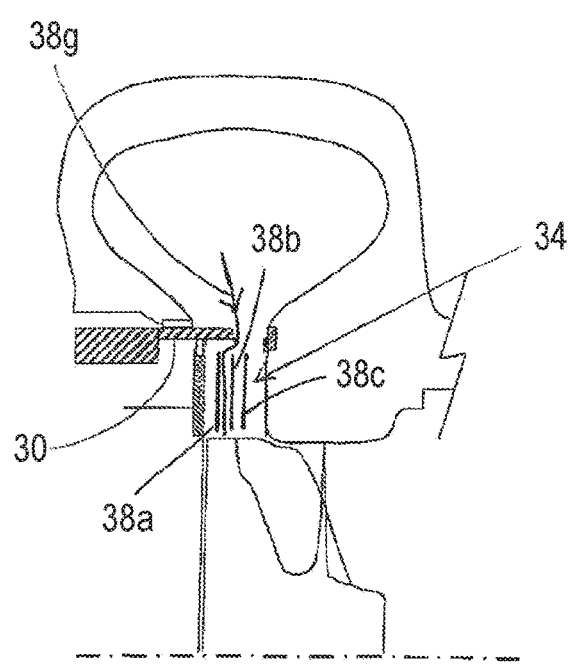

FIG. 7c illustrates an embodiment including three inlet baffles 38a-38c which have progressively increased spacing across the inlet 9, so that as the sleeve 30 is moved to close the inlet the axial width of the inlet passages 39 increases.

Figure 7D:
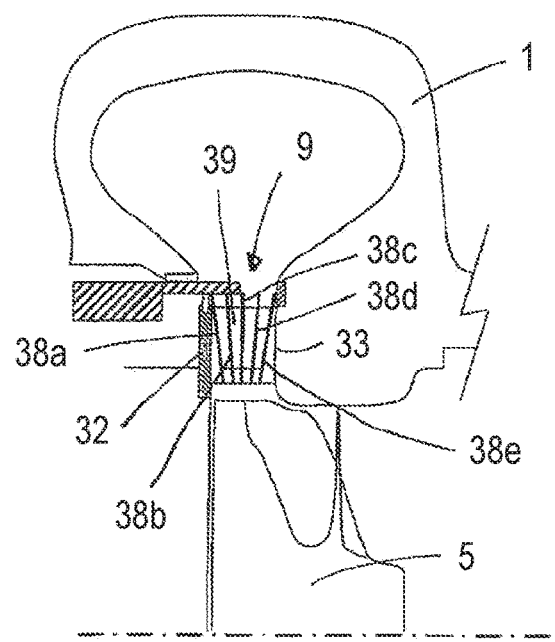

The embodiment of FIG. 7d, the inlet nozzle comprises 5 baffles 38a-38e. As can be seen, in cross-section the baffles have a "fan" arrangement. That is, the central baffle 38c, which is mid way between inlet side walls 32 and 33, lies in a radial plane, but nozzle rings 38a, 38b, and baffles 38d and 38e are inclined so that they each lie on a frusto-conical surface with the effect that the inlet passages 39 tend to converge towards the central inlet baffle 38c. In addition, the effect is to define a tapering nozzle which has a maximum width defined between the nozzle ring 38a and the nozzle ring 38e, and which narrows with decreasing radius. In other words, the nozzle tapers inwardly. A similar effect could be achieved by dispensing with nozzle rings 38a and 38e and inclining the side walls 32 and 33 instead.

Figure 7E:
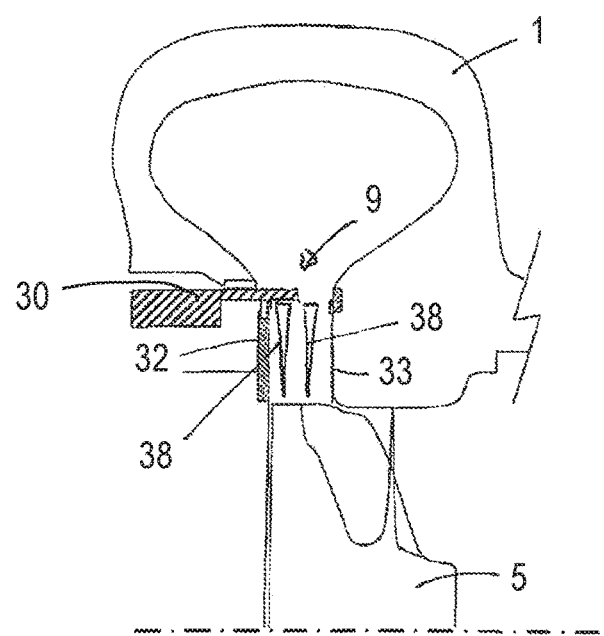

In FIG. 7e, two inlet baffles 38 are shown which taper inwardly. The tapering of the baffles is exaggerated for clarity, and only two baffles are shown to avoid complication, but it would be appreciated that in alternative embodiments there may be only one, or three or more baffles. The vanes are omitted for clarity.

Figure 7F:
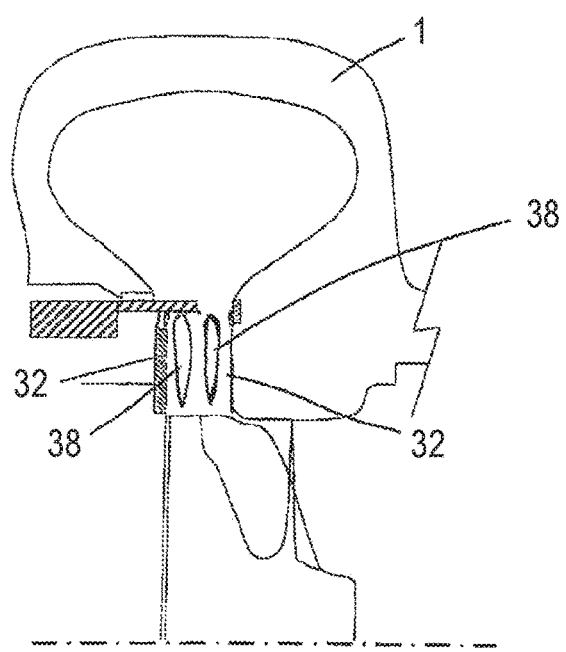
Figure 7G:
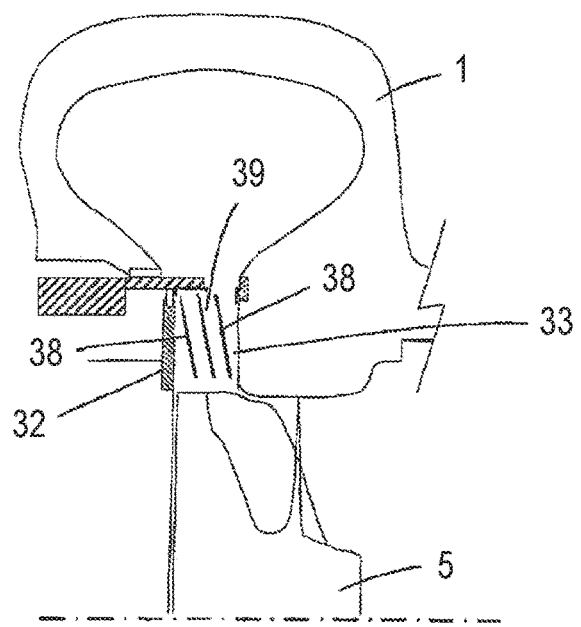

FIG. 7f is a modification of the embodiment shown in FIG. 7e, in which the baffles 38 have an airfoil type cross-section.

In the embodiment of FIG. 7g, the baffles are again simple uniform thickness annular rings, but in this embodiment each of the rings lies on parallel frusto-conical surface so that the baffles 38 are angled with respect to side walls 32 and 33, but are parallel to one another. In the illustration the baffles angle away from the inboard side wall 32 with decreasing radius. In an alternative embodiment the baffles could be angled in the opposite direction to that shown. If baffles at each axial end of the inlet contact the sidewalls 32 and 33 they may effectively constitute nozzle rings defining the maximum width of the inlet 9.

The inlet vanes may have any suitable configuration, and may for instance have substantially the same aerofoil configuration of conventional inlet vanes or any alternative configuration selected to define a particular arrangement and configuration of inlet passages 39. That is, since the vanes and inlet baffles together define the configuration and orientation of the inlet passages 39, a wide variety of different inlet passage configurations can be achieved by appropriate design of the configuration and orientation of the individual nozzle vanes or inlet baffles, and moreover the designs can be such that there may be a variety of differently configured inlet passages within a single nozzle assembly.

As mentioned above, the efficiency of the turbine inlet may vary as the sleeve moves to different positions, and in particular may be greater at positions in which the free end of the sleeve is aligned with one of the baffles than when it is positioned between baffles. Accordingly, in some embodiments of the invention the actuator and/or control system for the sleeve may be configured so that the sleeve only moves in a step-wise manner between fully open and closed (including any "over-open" or "over-closed") positions and positions corresponding to the location of some or all of the baffles, and does not move to locations between adjacent baffles. The effect of this is to provide an inlet with a plurality of discreet sizes between a maximum and minimum. This may provide efficiency advantages, and may allow a lower cost actuator to be used.

Similarly, in some embodiments of the invention it may be desirable to locate baffles at particular axial positions corresponding to sleeve positions (i.e. inlet sizes) which are optimum for certain pre-determined operating conditions of the turbine. For instance, such positions for a turbocharger turbine might correspond to preferred inlet widths for operation at peak engine torque, rated engine speed and freeway cruise point. In some applications, for instance in turbocharged power generators, the power generating engine may be operated at fixed loads and/or speeds with no need to allow for continuous adjustment of the turbine inlet width. In such embodiments baffles can be placed at positions corresponding to the optimum inlet widths for the particular operating conditions required, and the sleeve operated to move only between positions corresponding to the positions of the or each baffle.

In the embodiments of the invention described above, each inlet vane may be viewed as comprising axially adjacent inlet vane portions separated by the inlet baffles. Thus, in the illustrated embodiment each vane 37 may be considered to comprise portions which are axially aligned so that they are equivalent to a single vane extending across the full width of the inlet 9. However, in alternative embodiments it may for instance be desirable to circumferentially stagger inlet vane portions between adjacent pairs of inlet baffles, and in some embodiments it may no longer be possible to identify the equivalent of a single vane extending across the full width of the inlet 9.

Referring once more to FIG. 7a, it can be seen that in this embodiment the sleeve 30 is axially movable between an open position and a closed position. In the open position (not shown, but when the sleeve 30 is retracted in a left direction within the figure) in which there is a gas flow path through the inlet 9, between a free end of the sleeve (the end of the sleeve to the right in the figure) and a first inlet sidewall 33. The gas flow path through the inlet may be through at least one of the axially offset inlet passages. In a closed position (an example of which is shown in the figure) the size of said gas flow path through the inlet 9 between the free end of the sleeve 30 and the inlet sidewall 33 is reduced compared to that when the sleeve is in the open position. The sleeve 30 moves in a direction towards inlet sidewall 33 when the sleeve 30 is moved from the open position towards the closed position.

The sleeve 30 shown in FIG. 7a is in a closed position. The axial distance between any part of the free end of the sleeve (the end to the right as shown in the figure) and the inlet sidewall 33 is less than each of the respective axial distances between at least one of the inlet passage walls (in this case the baffles 38a, 38b and 38c) and the inlet sidewall 33. It will be appreciated that in this embodiment the nozzle assembly has three inlet passage walls (in this case baffles). In other embodiments the nozzle assembly may have any appropriate number of inlet passage walls. Preferably, the number of inlet passage walls (which define axially adjacent inlet passages) is two or more. In the closed position of the sleeve 30 shown in FIG. 7a the axial distance between the free end of the sleeve 30 and the inlet sidewall 33 is less than the axial distance between each of baffles 38a and 38b and the inlet sidewall 33. The axial distance between the free end of the sleeve 30 and the inlet sidewall 33 is substantially the same as the axial distance between the baffle 38c and the inlet sidewall 33. This is because in the closed position of the sleeve 30 shown in FIG. 7a the sleeve is located such that the free end of the sleeve 30 is substantially axially aligned with the position of the baffle 38c. It follows that in the closed position of the sleeve 30 shown in FIG. 7a the sleeve 30 is said to have moved past baffles 38a and 38b and be aligned with baffle 38c. In other embodiments, a closed position of the sleeve may be such that the sleeve is substantially axially aligned with any of the inlet passage walls (e.g. baffles). Alternatively, in some embodiments a closed position of the sleeve may be such that the sleeve is not axially aligned with an inlet passage wall (e.g. baffle) and instead, the free end of the sleeve partially blocks an inlet passage defined by at least one of the inlet passage walls. As previously mentioned, in the closed position of the sleeve 30 shown in FIG. 7a, the sleeve 30 is located past two inlet passage walls (baffles 38a and 38b). This is because the axial distance between the free end of the sleeve 30 and the inlet sidewall 33 is less than the axial distance between each of baffles 38a and 38b and the inlet sidewall 33. In other embodiments, in a closed position of the sleeve, the sleeve may be located past any appropriate number of inlet passage walls. For example, the sleeve may be located past one, two, three or more inlet passage walls. In some embodiments, in a closed position of the sleeve, the sleeve may be located past no inlet passage walls (such that the axial distance between the free end of the sleeve and the inlet sidewall is greater than the respective axial distance between each of the inlet passage walls and the inlet sidewall). In other embodiments, in a closed position of the sleeve, the sleeve may be located past all of the inlet passage walls (such that the axial distance between the free end of the sleeve and the inlet sidewall is less than the respective axial distance between each of the inlet passage walls and the inlet sidewall).

In the embodiment shown in FIG. 7a, the annular sleeve 30 has a free end (that which is to the right in the figure) which has an end face 30f which is generally flat. The end face 30f generally lies on a plane which is perpendicular to the turbine axis. In other words, for a given position of the sleeve 30, the axial distance between any portion of the end face 30f and the inlet sidewall 33 is substantially constant. In other embodiments this need not be the case. For example, the end face 30f may not be generally flat, i.e. for a given position of the sleeve 30, the axial distance between a first portion of the end face 30f and the inlet sidewall 33 is different to the axial distance between a second portion of the end face 30f and the inlet sidewall 33. For example, the end face 30f may have a circumferential profile which is generally wave shaped. In such embodiments where the end face 30f of the sleeve 30 is not flat, when the sleeve is in the closed position, the axial distance between at least a portion of the free end of the sleeve and the first inlet sidewall may be less than each of the respective axial distances between at least one of the inlet passage walls and the first inlet sidewall. In some embodiments, when the sleeve is in the closed position, the axial distance between at least a portion of the free end of the sleeve and the first inlet sidewall may be less than each of the respective axial distances between any number of the inlet passage walls and the first inlet sidewall. For example, when the sleeve is in the closed position, the axial distance between at least a portion of the free end of the sleeve and the first inlet sidewall may be less than each of the respective axial distances between at least two or at least three inlet passage walls and the first inlet sidewall. In an alternative embodiment, when the sleeve is in the closed position, the axial distance between at least a portion of the free end of the sleeve and the first inlet sidewall may be greater than each of the respective axial distances between any of the inlet passage walls and the first inlet sidewall.

In the embodiment shown in FIG. 7a it can be seen that, whilst in the closed position, the sleeve 30 extends past both of inlet passage walls (baffles) 38a and 38b. Baffle 38b is located within the inlet 9 such that the axial distance between the baffle and inlet sidewall 33 is slightly less than substantially 50% of the axial distance between the inlet sidewalls 32 and 33. In other embodiments, in a closed position, the sleeve may extend past at least one inlet passage wall (for example a baffle) which is located such that the axial distance between the inlet passage wall and inlet sidewall 33 is substantially 50% of the axial distance between the inlet sidewalls 32 and 33. In other embodiments, in a closed position, the sleeve may extend past at least one inlet passage wall (for example a baffle) which is located such that the axial distance between the inlet passage wall and inlet sidewall 33 is substantially between 50% and 40%, between 40% and 30%, between 30% and 20%, between 20% and 10%, between 10% and 5% or between 5% and 0% of the axial distance between the inlet sidewalls 32 and 33. Providing a inlet passage wall which is located such that the axial distance between the inlet passage wall and the inlet sidewall is substantially 50% or less of the axial distance between the inlet sidewalls has been found in some embodiments to increase the performance of the turbine and/or improve control of the gas flow through the inlet.

Another way of considering the relative positioning of the sleeve in a closed position and the inlet passage walls (baffles) as shown in FIG. 7a is that at least one inlet passage wall (in this case baffle 38b) is closer to the inlet sidewall 33 than it is to inlet sidewall 32. Inlet sidewall 33 is the sidewall towards which the sleeve moves when it moves from the open position to the closed position (i.e. when the sleeve moves to reduce the size of the inlet 9). Furthermore, when the sleeve 30 is in the closed position, the free end of the sleeve 30 is closer to inlet sidewall 33 than the inlet passage wall (baffle 38b) is to the inlet sidewall 33.

The sleeve 30 and inlet passage walls 38a-38c of the embodiment shown in FIG. 7a are configured such that the sleeve contacts the inlet passage walls. More specifically, a radially inboard surface of the sleeve contacts a radially outboard portion of the inlet passage walls. The sleeve 30 may contact at least one of the inlet passage walls 38a-38c as it moves between open and closed positions, such that the at least on inlet passage wall helps to guide the movement of the sleeve.

In other embodiments, the sleeve may substantially not contact one or more of the inlet passage walls that the sleeve is past when the sleeve is in the closed position. In other words, the sleeve may be mounted such that gas may pass between at least one of inlet passage walls (that the sleeve is past) and the sleeve when the sleeve is in the closed position. In some embodiments the sleeve may not contact any of the inlet passage walls when it is in a closed position.

Figure 8A:
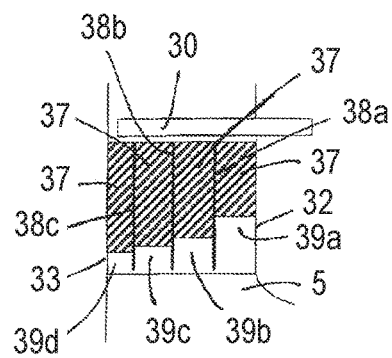
FIGS. 8a-8c are schematic illustrations of further embodiments of the present invention.
Figure 8B:
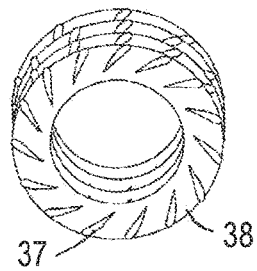
Figure 8C:
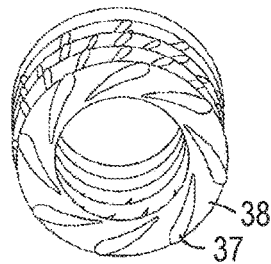

For example, one possible modification of the embodiment of FIGS. 3 to 6 is illustrated in FIGS. 8a-8c, and the same reference numerals are used where appropriate. Referring first to FIG. 8a, it can be seen that vanes 37 are not continuous across the full width of the inlet 9, but rather vanes defining each of the annular arrays of inlet passages 39a-39d have different radial extents. Whilst the leading edges of all of the vanes 37 lie on the same outer radius, the radius of the trailing edges of the vanes differ, in that the radial position of the trailing edge of each annular array of vanes decreases progressively from the first annular array 39a to the fourth annular array 39d. In addition, it can be seen that the inlet baffles 38a-38c have a greater radial extent than at least some of the vanes 37 (in the illustrated embodiment it is greater than that of any of the vanes). That is, whilst they have substantially the same outer radius as the vanes 37, the inner radius of the baffles 38a-38c is significantly less than that of the vanes 37, so that the baffles 38a-38c extend further towards the turbine wheel 5 than the vanes 37. In this particular embodiment each of the baffles 38a-38c has the same radial dimension but this may not be the case in other embodiments. In addition, embodiments in which the baffles extend closer to the turbine wheel than the vanes may include embodiments in which the vanes all have the same radial extent. To offer a significant turbine efficiency improvement, the baffles preferably have a radial extent greater than 110% of that of at least those vanes that do not extend as close to the wheel as the baffle, more preferably greater than 120%. Where at least some of the gas passages have a relatively radial swirl direction (e.g. at an average angle of greater than 40 degrees to the circumferential direction) the baffles preferably have a radial extent greater than 120% of that of at least those vanes that do not extend as close to the wheel as the baffle, more preferably greater than 140%. Where at least some of the gas passages have a very radial swirl direction (e.g. at an average angle of greater than 60 degrees to the circumferential direction) the baffles preferably have a radial extent greater than 140% of that of at least those vanes that do not extend as close to the wheel as the baffle, more preferably greater than 160%.

Also apparent from FIG. 8a, the axial spacing of the inlet baffles 38a-38c is irregular so that whilst the width of the annular arrays of inlet passages 39b and 39c is the same, the axial width of the annular array 39a is greater than that of 38b and 38c, and the axial width of annular array 39d is less than that of axial arrays 38b and 38c.

Although not apparent from FIG. 8a, but illustrated in FIGS. 8b and 8c, the number of vanes in each of the annular arrays 39a to 39d may differ. For instance FIG. 8b shows an annular array of fifteen vanes and FIG. 8c shows an annular array of only eight vanes which may be included in the same nozzle assembly. Other arrays may have a different number of vanes, greater than fifteen or fewer than eight, or somewhere in between (e.g. twelve). In addition, FIGS. 8b and 8c show the vanes having different radial extents, and different swirl angles (that is the vanes visible in 8c are swept forwards to a greater extent than the vanes shown in FIG. 8b, and as such have a greater swirl angle).

The present invention therefore provides a great degree of flexibility in optimising various features of the nozzle to particular requirements and efficiency profiles. For instance, in one embodiment of the invention as illustrated in FIGS. 8a to 8c, there may be eight vanes in the array 39d, twelve vanes in each of the arrays 39b and 39c, and 15 vanes in the array 39a. The swirl angle may be greatest in the array 39d and decrease progressively to the array 39a. This is just one example and it will be appreciated that many other variations are possible. Various factors may influence the particular nozzle design, which may include minimising turbine high-cycle fatigue (i.e. minimising the forcing function on the blades), and optimising or otherwise tailoring the efficiency and swallowing capacity of the turbine (e.g. providing low efficiency at wide inlet openings which is useful in some applications such as e.g. EGR engines as described below).

For instance, in an embodiment in which the sleeve 30 is actuated from the turbine housing side of the inlet, so that its free end moves towards the bearing housing side of the inlet 9 as the inlet is closed (this possibility is discussed in more detail further below) the arrays of inlet channels 39c and 39d are less able to stimulate vibration and fatigue in the turbine blades because the hub end of the turbine leading edge is more rigidly connected to the turbine hub (by virtue of it being closer to the turbine wheel back face). In some applications of the invention it may be desirable to maximise turbine efficiency at smaller inlet openings and thus the vane arrays 39c and 39d may have a reduced clearance with respect of the turbine wheel (as illustrated) to boost efficiency given that this may not result in any significant vibration/fatigue problem as the turbine blades are more rigidly supported in this region. In addition, increasing the swirl angle of the vanes in the array 39d can offer a slight efficiency increase when the sleeve is at nearly closed positions (in which the leading edge of the sleeve 30 extends beyond the location of the inlet baffle 38c). This would have the additional effect of reducing the rate that the cross-sectional flow area changes as a function of sleeve motion, when the sleeve is nearly closed, which allows the actuator to control the cross-sectional flow area more precisely.

For certain engine applications (such as for EGR) it may be desirable to reduce the turbine efficiency in one or more of the arrays of inlet channels 39a-39d. For instance, it may be desirable to reduce efficiency at relatively open inlet widths in some applications. Such reduced efficiency could for instance be achieved by reducing the radial extent of the vanes (as illustrated) and/or by increasing the circumferential width or otherwise configured of the vanes to reduce the effective inlet area. The inlet area could be reduced further by providing other obstacles to flow, for instance posts extending axially into the channel. The axial width of the array can be reduced to increase effective friction losses, and the swirl angle of the vanes could be configured to provide mixed swirl. Other examples (not illustrated) could include a ring of similar and evenly spaced posts, two or more concentric rings of posts, a ring of unevenly and randomly distributed posts, or even a ring of vanes arranged to reverse the swirl angle of the gas (i.e. to rotate gas in the opposite direction to the turbine).

Figure 9A:
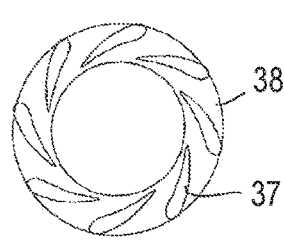
FIGS. 9a to 9c are schematic illustrations of further embodiments of the present invention.
Figure 9B:
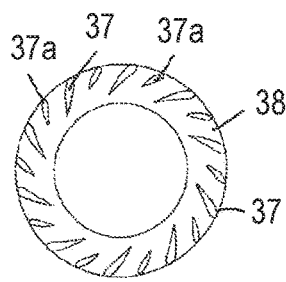
Figure 9C:
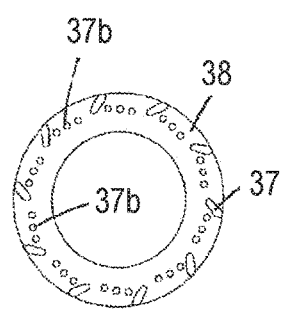
Figure 10A:
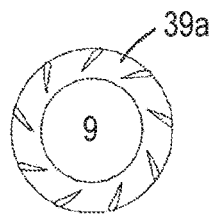
FIGS. 10a to 10e schematically illustrate components of a further embodiment of the present invention.

Other possible examples of vane arrays that might define any given annular array of inlet passages are illustrated in FIGS. 9a-9c which are axial sections showing an inlet baffle 38 supporting vanes 37. In FIG. 9a there is a relatively small number of vanes 37 with a relatively high swirl angle. In addition, the vanes are relatively "thick" and extend to a relatively small internal radius to provide a relatively small radial clearance around the turbine wheel. With such an arrangement it is easier for an actuator to achieve high resolution control of the cross-sectional flow area because it varies less for a given sleeve movement. The increased swirl may be useful for a vane array positioned to correspond to relatively small inlet widths, which could provide a small efficiency improvement.

In the embodiment of FIG. 9b, relatively small "splitter vanes" 37a are located between adjacent pairs of main vanes 37. In this case there are an increased number of vanes compared with the embodiment of FIG. 9a, but the vanes have a reduced radial extent so that there is a greater radial clearance between the vanes and the turbine wheel. Splitter vanes have a chordal length (i.e. a straight-line length between the leading edge and trailing edge of the vane) which is less than that of the main vanes. The splitter vanes may be advantageous in some embodiments to reduce vibration excited in the turbine blades. Splitter blades may be used to lessen reduction in flow through the inlet caused by skin effect friction. This is because the splitter vanes may have a smaller surface area that is exposed to the flow of gas through the inlet than that of the main vanes. Splitter vanes may also direct gas flow towards the turbine wheel in a similar way to conventional (or main) inlet vanes, as previously discussed. Although in FIG. 9b a single splitter vane 37a is located between adjacent pairs of main vanes 37 (i.e. such that the splitter vanes and main vanes are circumferentially alternating), this need not be the case. It will be appreciated that any appropriate layout of main vanes and splitter vanes may be used, for example, there may be more than one splitter vane between an adjacent pair of main vanes or the spacing between adjacent splitter vanes and/or main vanes may vary. Furthermore, there may be more than one type of splitter vane, for example splitter vanes with different characteristics, such as size and shape may be used. In some embodiments, splitter vanes may be located radially inboard or radially outboard of the main vanes. In some embodiments the radial distance between the trailing edges of the splitter vanes and the turbine wheel may be greater than the radial distance between the trailing edges of the main vanes and the turbine wheel.

In the embodiment of FIG. 9c, the vanes have a "cut-off" configuration rather than a full airfoil configuration which can be expected to provide reduced efficiency which may be useful in some applications. In addition, obstructions 37b are located between adjacent vanes 37 which can further reduce efficiency.

Further possible embodiments of a nozzle assembly according to the invention illustrated in FIGS. 10a-10e, 11a-11e, and 12a-12e. In each case, each of the figures a-d is an axial section showing the vanes of a particular annular array of inlet passages 39 which together constitute 5 adjacent annular arrays of inlet passages in the nozzle assembly as a whole. Each figure e is an illustration of the combined locations of all the vanes from figures a-d.

Referring first to FIGS. 10a-10e, it can be seen that each of the annular arrays 39a-39d comprise different numbers of vanes, which for some embodiments may have different configurations such as curvature and/or swirl angle and/or radial extent and/or thickness etc. However, in each of the arrays there is a vane with a leading edge at 0° (the top of the vane array is seen in the Figures) and also at 120° and 240°. This provides support edges across the width of the assembly as a whole (and thus across the width of the inlet 9 as a whole) which can be useful for guiding the sleeve used to vary the inlet width. With a conventional nozzle array, in which vanes extend across the full width of the inlet 9 and are equi-spaced around the circumference of the inlet, the turbine blade produces an even pattern of vane wakes as it sweeps past the trailing edges of the vanes and is thus subjected to one or more main frequencies of vibration. Depending upon the turbine speed these frequencies of vibration may match a resident vibration mode of the blade leading to resonant excitation which contributes to metal fatigue. However, with the illustrated embodiment of the present invention, there are several different patterns of vane wakes, each of which could excite blade vibration at certain speeds, but less strongly than if the blades were aligned circumferentially.

Referring now to the embodiments of FIGS. 12a to 12e, it can be seen that this is very similar to the embodiment of FIGS. 10a to 10e except that the vane at 120° has been moved to 112.5° and the vane at 240° has been moved to 225° (it will be appreciated that these are non-limiting example positions, and other position could be chosen including a reverse arrangement with the angles shifted slightly above 120°/240°).

Accordingly the positions of some of the vanes (between 0° and 240°) are shifted together slightly, while other vanes are shifted apart (from 240° up to 360°/0°). This can alleviate vibration induced by the turbine blade passing each vane and corresponding wake (i.e. $9^{th}$ order excitation for the array in FIG. 12a, $12^{th}$ order for that in FIG. 12b, $15^{th}$ order in FIG. 12d). This is because if the first (squeezed) set of vanes are passed at a rate that begin to induce vibration, these will be followed by a second (stretched) set of vanes that are passed at a different frequency which does not excite the vibration. This is then followed by the first (squeezed) set of vanes again that induces vibration at the resonant frequency but at the wrong phase angle and so forth.

Figure 12A:
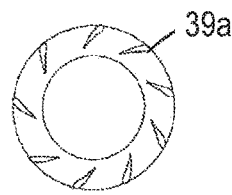
FIGS. 12a to 12e schematically illustrate components of a further embodiment of the present invention.
Figure 11A:
FIGS. 11a to 11e schematically illustrate components of a further embodiment of the present invention.
Figure 10B:
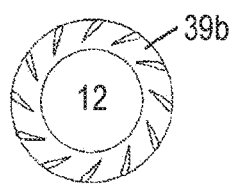
Figure 12B:
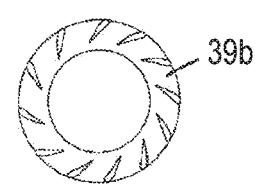
Figure 11B:
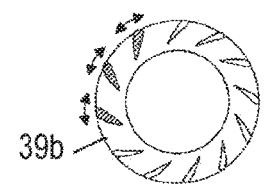
Figure 10C:
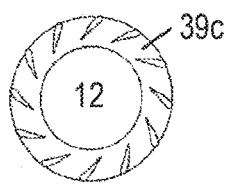
Figure 12C:
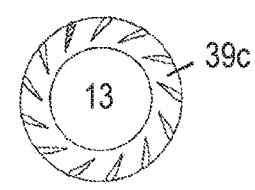
Figure 11C:
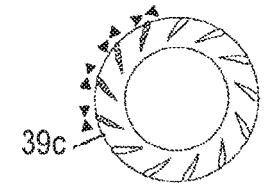
Figure 10D:
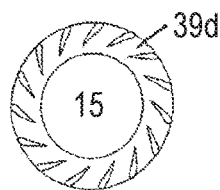
Figure 12D:
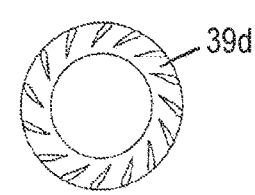
Figure 11D:
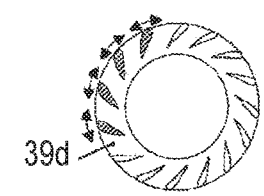
Figure 10E:
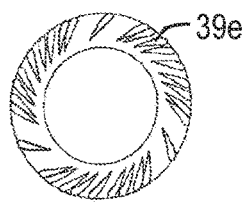
Figure 12E:
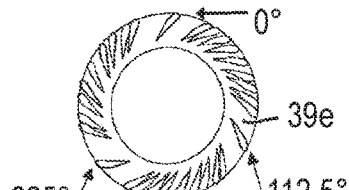
Figure 11E:
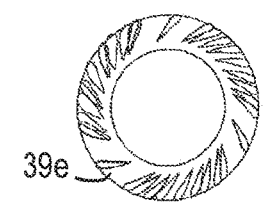

The amount of flow obstruction presented by the vanes is now lower in the top left of each of FIGS. 12a, 12b and 12d. This would ordinarily induce considerable $1^{st}$ order vibration ($1^{st}$ order vibration is caused by variation in the gas flow between one side of the turbine and the other, so vibration would be induced if the turbine is rotating at one of the resonant frequencies of it's blades). If this is problematic, one option is to provide at least one of the vane arrays (in this case the third array shown in FIG. 12c) with an extra vane in the "stretched" region so that in this region the vanes are instead "compressed" together. This will for instance be effective when the sliding sleeve is at one or a small number of positions.

The embodiment of FIGS. 11a to 11e shows a modification which may be provided in addition to or as an alternative to that illustrated in FIGS. 12a to 12e. Here the vanes in the stretched region (240° to 360°) are thickened to compensate for the reduction in the angular density of vanes. Alternatively or in addition the vanes in the compressed region (120° to 240°) may be thinner. Rather than changing the blade thickness, it would be possible to vary other characteristics of the blades, such as for instance the blade length.

Referring to the embodiments discussed above in relation to FIGS. 10 to 12, it will be appreciated that the vanes in each annular array of each embodiment have a circumferential distribution which is uniform in that the vanes are equi-spaced around the annular array. For instance, the circumferential distance between the centre of any vane and the centre of an adjacent vane is the same. In other words, the circumferential distance between the centres of any adjacent vanes is the same. The centre of a vane may be defined as half way along a chord which extends between the trailing and leading edges of the vane. However, the centre of the vane may be considered as a datum point for each vane which may be defined in any other appropriate manner, providing it is defined in the same manner for each vane. In some embodiments the vanes of an annular array may have a circumferential distribution which is non-uniform in that the vanes are not equi-spaced around the annular array. For example, within an annular array, the circumferential distance between the centres of two adjacent vanes (which form a first set of adjacent vanes) may be different to the circumferential distance between the centres of two other adjacent vanes (which form a second set of adjacent vanes). Furthermore, the circumferential distance between the centre of a first vane and the centre of a second vane adjacent the first vane may be different to the circumferential distance between the centre of the first vane and the centre of a third vane adjacent the first vane. In some embodiments the circumferential distribution of the vanes extending into a first annular array may be different to the circumferential distribution of the vanes extending into a second annular array. For instance, in some embodiments the circumferential distribution of vanes extending into a first annular array may be non-uniform, whereas the circumferential distribution of vanes extending into a second annular array may be uniform. Furthermore, in some embodiments the circumferential distribution of vanes extending into both a first annular array and a second annular array may be non-uniform, however the circumferential distribution of vanes extending into the first annular array and the second annular array may be different.

It will be appreciated that these are just some of the many different arrangements made possible by the present invention.

In the embodiments of the invention described above, each inlet baffle is annular and as such extends around the full circumference of the inlet 9. Each inlet baffle may however be considered to comprise an annular array of adjacent baffle portions defined between adjacent inlet vanes (or vane portions). In the illustrated embodiment of FIGS. 3-6, the baffle "portions" of each baffle 38 are aligned to define the respective annular baffle. However, in alternative embodiments it may for instance be desirable to effectively omit some baffle portions, and in some embodiments it may no longer be possible to identify the equivalent of a single inlet baffle extending annularly around the full circumference of in the inlet 9.

Non limiting examples of various alternative embodiments are illustrated in FIGS. 13a to 13f and 14a to 14d. These Figures are schematic radial views of un-rolled portions of the circumference of the respective embodiments corresponding to the views shown in FIGS. 2 and 5 for example.

Figure 13A:
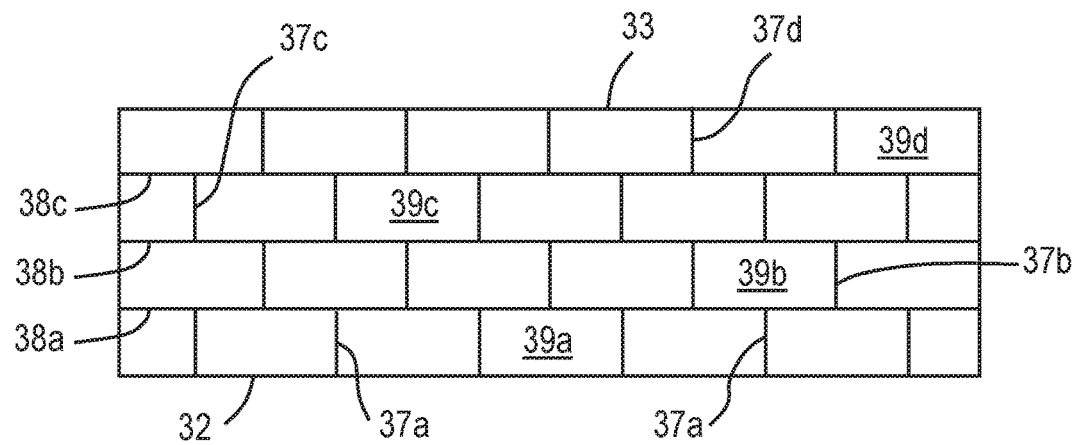
FIGS. 13a to 13f, 14a to 14d, 15, 16a to 16d, and 17 to 22 are each schematic illustrations of a radial view around a portion of the circumference of a respective inlet structure in accordance with various embodiments of the present invention.

FIG. 13a illustrates an embodiment in which inlet vane portions 37a-37d extend between adjacent inlet baffles 38 and between in the baffles 38 and side walls 32 and 33. No single inlet vane 37 is continuous across a baffle 38, with the effect that individual inlet passages 39 are arranged in circumferentially staggered annular arrays 39a-39b (there is circumferential overlap between axially adjacent passages 39).

Figure 13B:
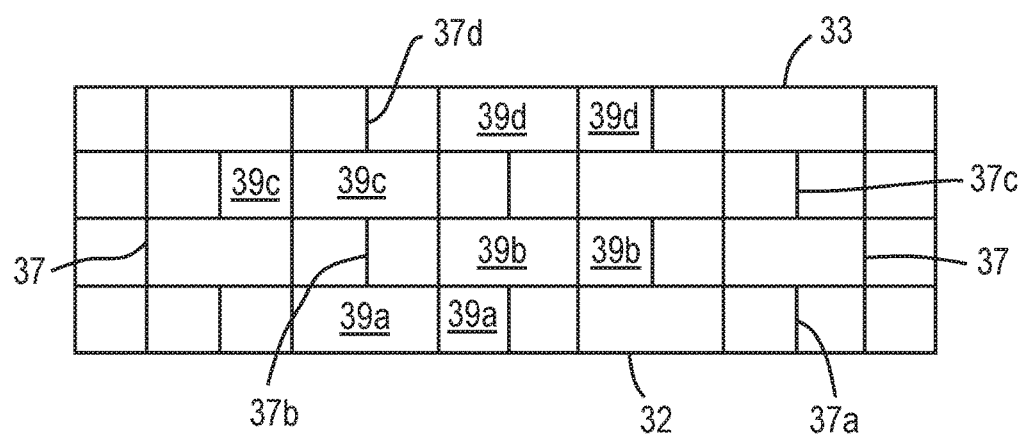

FIG. 13b is a modification of the embodiment shown in FIG. 8a, in which some vanes 37 do extend across the full width of the inlet 9, whereas other vane portions extend only between neighbouring baffles 38 or between a baffle 38 and enabling inlet wall 32/33. There are again four annular arrays of circumferentially adjacent inlet passages 39a-39d, but in this case each annular array includes inlet passages 39 of different sizes, in this case some have a rectangular cross-section whereas others have a square cross-section.

Figure 13C:
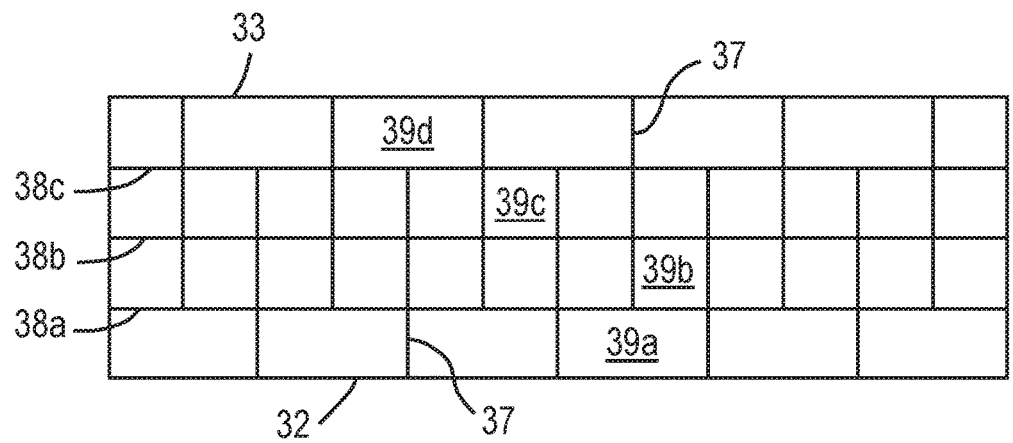

FIG. 13c illustrates an embodiment of the invention in which inlet vanes 37 extend from the side walls 32 and 33 respectively, but in which no single inlet vane 37 extends the full width of the inlet 9. The effect in this case is to create four annular arrays of circumferentially adjacent in the passages 39a-39b, wherein the passages adjacent each side wall 32 and 33 have a rectangular cross-section and the passages 39b and 39c define between the baffles 38 have a generally square cross-section.

Figure 13D:
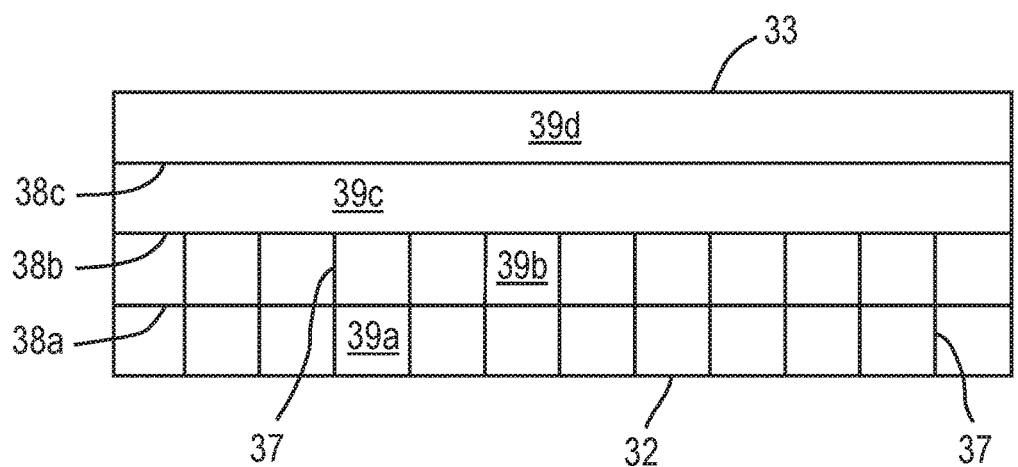

FIG. 13d illustrates an embodiment in which inlet vanes 37 extend only half way across the full width of the inlet 9, in this case extending from side wall 32 to a central inlet baffle 38b. In this case there only two annular arrays of inlet passages 39a and 39b whereas the "arrays" of 39c and 39d are each replaced by a single annular passage way 39c and 39d respectively.

Although a single 'vaneless' space 39d may be provided without any vanes or other structures crossing it, if two vaneless spaces are provided (as shown in FIG. 13d) then the baffle separating them will require support. This could for instance be in the form of at least three small axially extending struts spaced around the turbine inlet between that central baffle and a neighbouring baffle or a side wall.

A single vaneless space 19c between one of the side walls 32 or 33 and the annular arrays of passages (i.e. at one axial end of the turbine inlet) may be very beneficial. By including a vaneless space to be exposed when the sleeve is fully open, the flow range of the variable geometry turbine can be considerably increased. Optionally the radially outboard inlet of the vaneless space may be axially wider than the radially inboard outlet (not illustrated).

Figure 13E:
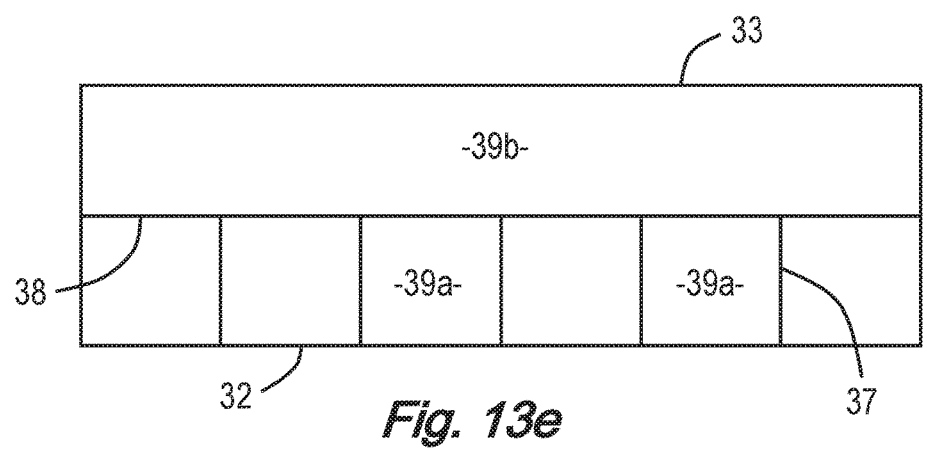
Figure 13F:
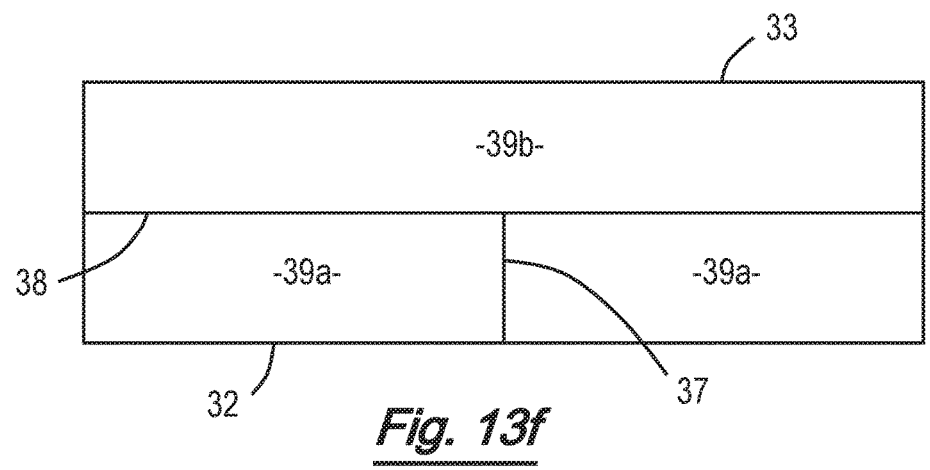

The embodiments of FIGS. 13e and 13f also comprise at least one annular inlet passage absent any vanes. In the embodiment of FIG. 13e, there is a single inlet baffle 38 and vanes 37 extend from side wall 32 to the inlet baffle 38, but do not extend from the inlet baffle 38 to the side wall 33. This creates a first annular array of adjacent inlet passages 39a and a single annular inlet passage 39b. FIG. 13f is an extreme example of the embodiments shown in FIG. 13e, in which there is only a single vane 37 shown which extends from side wall 32 to the single inlet baffle 38. Where the Figure shows only a single vane 37 it is to be understood that there is a diametrically opposed vane 37 so that there are two adjacent semi-circular inlet portions 39a in a first annular array, and a axially adjacent single annular inlet passageway 39b. In practice, there are unlikely to be any applications to the present invention which will require only a single pair of diametrically opposed vanes 37.

In some embodiments there may be at least 6 vanes to help ensure the ends of the vanes are close enough together without being impractically long and inducing excessive gas friction. This may also help the gas to swirl in relatively homogenously (e.g. constant swirl angle around the circumference) which may be difficult to achieve with fewer than 6 vanes. In some embodiments there may be at least 9 vanes, preferably at least 12 and normally at least 14. For instance, such a turbine inlet could have 9-18 vanes, with very small turbocharger turbines suiting perhaps 13-16 vanes and very large automotive ones suiting perhaps 15-18 vanes.

In some embodiments of the invention the skin friction induced by the baffles may be reduced by reducing the radial extent of the baffles and vanes, and hence reducing the vane length. If necessary or desired the number of vanes can be increased to increase the "vane solidity".

With the materials available at present, and the gas pulsations and temperature variations expected, as many as 30 circumferentially distributed gas passages may for instance be appropriate for some applications of the invention, such as for instance heavy duty engine turbocharger applications. In other embodiments as many as 40 circumferentially distributed gas passages perhaps be appropriate, for instance for light duty engine turbocharger applications. For fuel cell turbocharger applications 75 or more circumferentially distributed gas passages may be desirable (due to the lower exhaust temperatures and absence of gas pulsations). For very large turbines operated at low temperatures, low turbine pressure differentials, low gas speeds, and in the absence of gas pulsations and temperature variations, 100 circumferentially distributed gas passages may appropriate.

Therefore the number of circumferentially distributed gas passages (which may all be at least partially axially overlapping) may generally be between 8 and 100. In other embodiments there may be between 12 and 100, or between 18 and 100 (perhaps 23 and 100, possibly 26 and 100 or conceivably 30 to 100). According to one embodiment of the invention, there may be provided two axially divided annular arrays of gas passages, each annular array having between 12 and 100 circumferentially distributed gas passages.

Such structures with large numbers of circumferentially distributed gas passages are not shown for simplicity, but it should be understood that the structures described herein are examples and the principles described may be implemented with large numbers of circumferentially distributed gas passages optionally between 18 and 100.

It will thus be appreciated that the number of vanes can vary from those illustrated in FIGS. 13a-13f.

FIGS. 14a to 14d show embodiments in which vanes 37 extend across the full width of the inlet 9, but at least one or more inlet baffles extend only a part way around the circumference of the inlet.

Figure 14A:
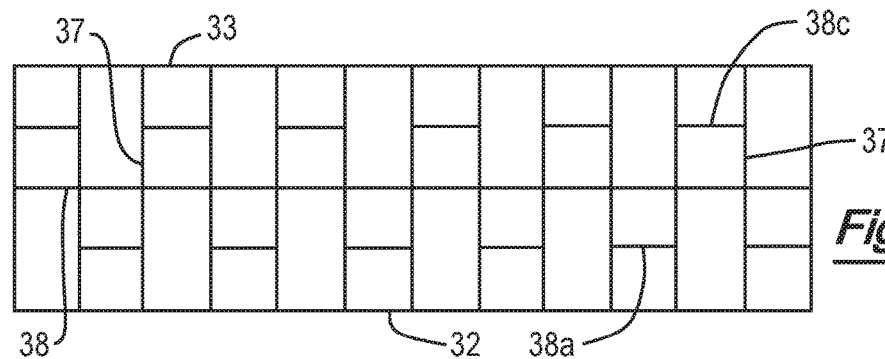

FIG. 14a illustrates an embodiment of the invention comprising a single inlet baffle 38 which extends around the full circumference of the inlet 9 (in this case midway between the side walls 32 and 33), and inlet baffle portions 38a and 38c which extend between other pairs of vanes 37 (which extend across the full width of the inlet 9).

Figure 14B:
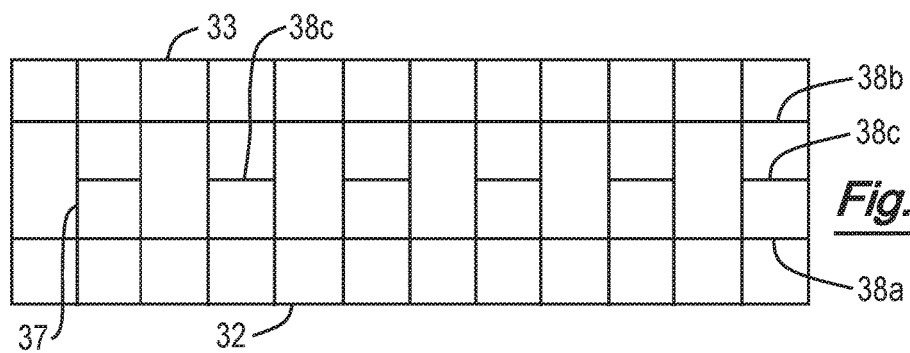

The embodiment of FIG. 14b differs from the embodiment of FIG. 14a in that there are two baffles 38a and 38d which extend around the full circumference of the inlet 9, but where baffle 38c is split into discontinuous baffle portions extending between every other pair of vanes 37.

Figure 14C:
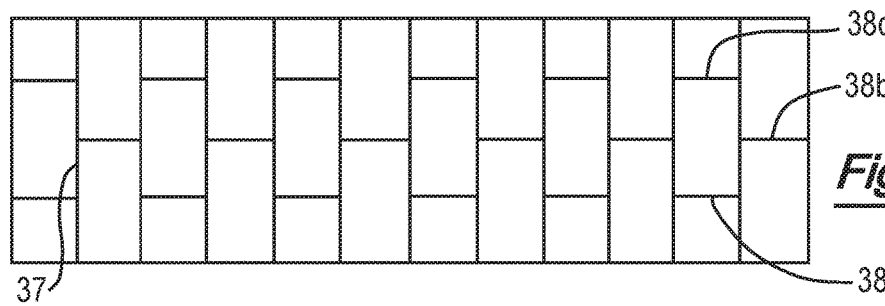

FIG. 14c is an embodiment in which there is no single inlet baffle extending the full circumference of the annular inlet 9, rather inlet baffles 38a-38c comprise baffle portions extending between respective pairs of inlet vanes 37. In the particular embodiment illustrated, the inlet baffle portions 38b are circumferentially staggered relative to the inlet baffle portions 38a and 38c. The individual inlet passages 39 are axially staggered, in that there is axial overlap between circumferentially adjacent passages 39.

Figure 14D:
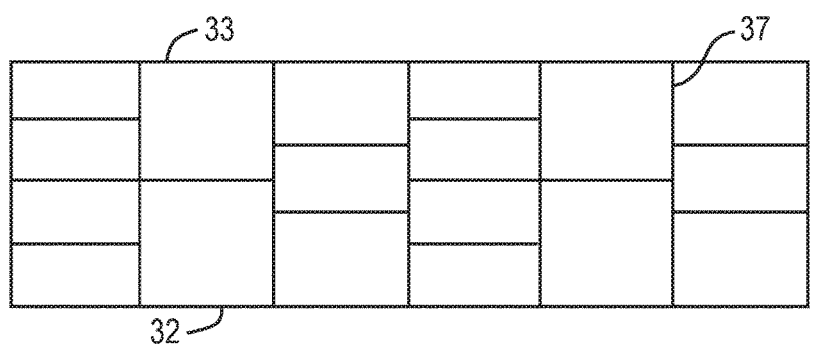

The embodiment of FIG. 14d shows another example of a nozzle which has no single inlet baffle extending the full circumference of the annular inlet 9. Moreover, this embodiment shows how the spacing between inlet baffle portions extending between one pair of vanes may differ to that between the baffle portions extending between an adjacent pair of vanes.

Figure 15:
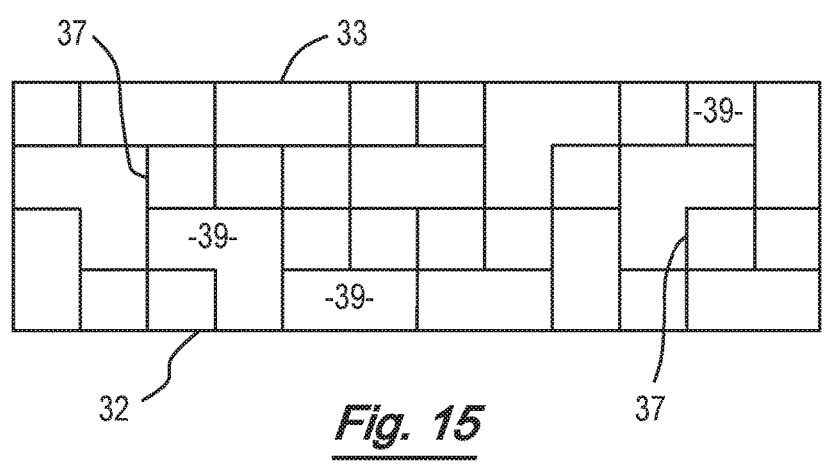

The embodiments of FIGS. 13 and 14 have generally regular arrays of inlet passages 39. However, this need not necessarily be the case. For example, FIG. 15 schematically illustrates an embodiment in which there is no single inlet baffle extending around the full circumference of the inlet, and no single inlet vane extending across the full width of the inlet. In this case the passage array is very irregular. In practice this specific pattern may not be particularly desirable, but it is included to illustrate the extent of variation that can be achieved (subject to manufacturing suitability) with some embodiments of the present invention.

It will be appreciated that the vanes or vane portions of the various embodiments of the invention described above may have any suitable cross-sections or configurations. For instance, the vanes may have a relatively conventional airfoil configuration. In general, it may be advantageous to ensure that the leading edge of each vane has an increased thickness compared with the trailing edge of each vane. Increasing the thickness of the leading edge of the vanes offers higher tolerance to any variations in the incident angle of gas flow impinging on the vanes. That is, depending on the flow/pressure in the turbine volute the direction that gas will impinge on the vanes can vary. If gas hits a simple sheet structure at an angle it may cause the gas flow on the lee-side to separate off from the sheet leaving a vortex/turbulent area which greatly reduces efficiency.

In addition, it will be appreciated that the configuration and/or arrangement of the vanes may vary in order to produce inlet flow passages 39 of a desired configuration. For example, it is generally beneficial for the passages 39 to curve rather than follow a substantially straight path.

In view of the wide variety of possible alternative structures according to the present invention, it may not therefore always be possible to view the inlet nozzle structures as comprising discernable inlet vanes in the conventional sense or even vane portions. Similarly, it may not be possible to identify individual inlet baffles or baffle portions as such. Rather, in more general terms it may be more appropriate to consider the invention as relating to an inlet nozzle structure which defines a plurality of discrete inlet passages which may take a variety of configurations and be arranged in a variety of different ways. Common to all of the embodiments of the invention illustrated in FIGS. 3 to 15, the turbine nozzle comprises at least two axial spaced annular arrays of inlet passages. In some embodiments a single axial "array" may in fact comprise only one circumferential inlet passage. However, in most embodiments it is envisaged that each annular array will comprise many inlet passages circumferentially spaced (e.g. adjacent) around the annular inlet.

In any given embodiment of the invention it may be possible to identify annular arrays of circumferentially spaced inlet passages 39 in different ways. For instance, FIGS. 16a to 16d show the embodiment of FIG. 9d, but with axially spaced annular arrays of circumferentially spaced in the passages 39 identified in different ways. For instance, referring first to FIG. 16a, four annular arrays of inlet passages 39a-39d are identified. In this case, the inlet passages of the first array 39a have differing axial widths, but are adjacent one another. The inlet passages 39b of a second array each have the same axial width but are staggered relative to one another, and are not always adjacent one another. A third annular array of circumferentially spaced inlet passages 39c is identified which have the same axial width and position, but are not adjacent one another. Finally, a fourth annual array of circumferentially spaced inlet passages 39d corresponds to the first array 39a.

Figure 16A:
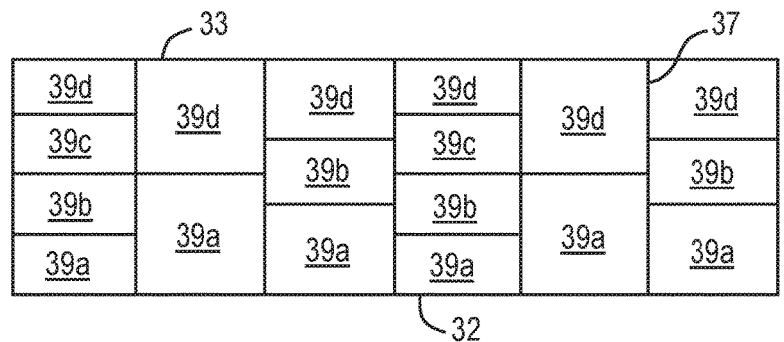
Figure 16B:
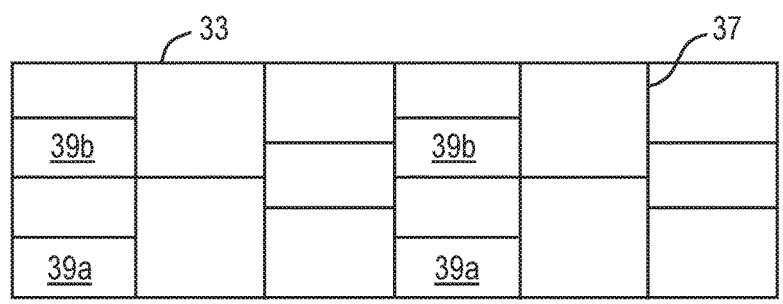
Figure 16C:
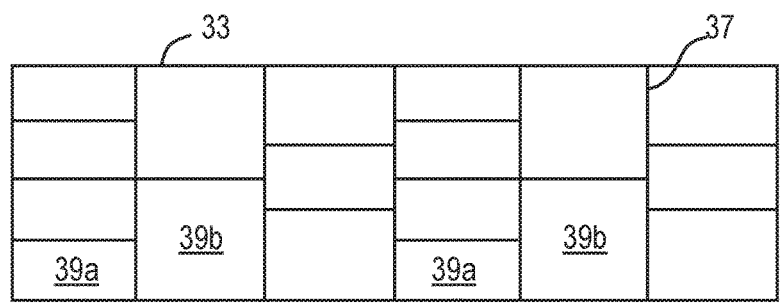
Figure 16D:
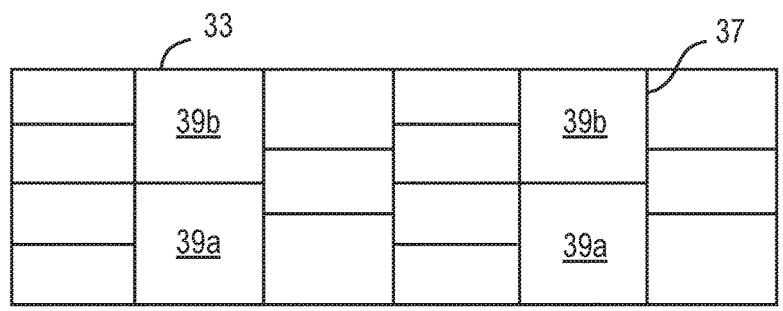

For any particular embodiment of the present invention it may not be necessary to identify more than two distinct axially spaced annular arrays of inlet passages, even when more than two such arrays may exist. For instance, FIG. 16b identifies only two annular arrays of spaced inlet passages 39a and 39b. In this case, the inlet passages in each annular array are neither circumferentially nor axially adjacent one another. In FIG. 16c two different annular arrays of circumferentially spaced inlet passages 39a and 39b are identified. In this case the inlet passages 39a of the first array are actually circumferentially adjacent inlet passages 39b of the second array, the axial spacing being achieved by an overlap in the axial dimension of the passages of each array. That is to say, the inlet passages 39b have a greater axial width than the inlet passages 39a so that at least a portion of each inlet passages 39b is axially spaced from the inlet passages 39a. Finally, FIG. 16d shows another approach to identifying two axially spaced annular arrays of inlet passages 39a and 39b. In this case the passages 39a and 39b are axially adjacent one another, but the passages 39 of each array are not circumferentially adjacent.

It will be understood that further possible distinct annular arrays of inlet passages according to the present invention can be identified with the embodiment of the invention illustrated in FIG. 16a-16d, and that similarly in other embodiments of the invention it will be possible to define distinct axially spaced annular arrays of inlet passages in different ways.

Figure 17:
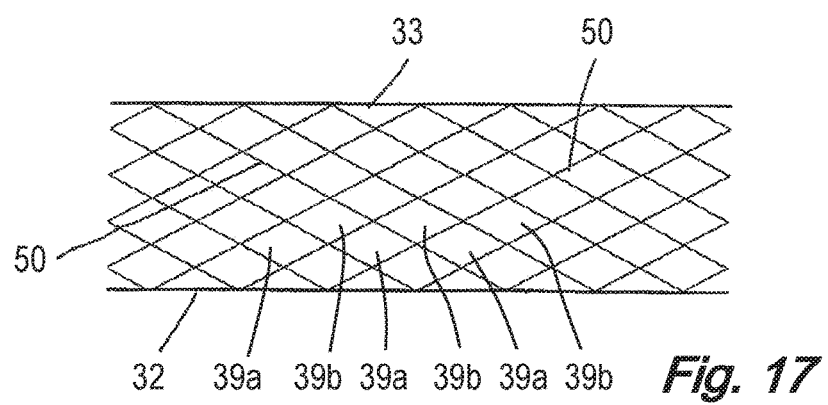
Figure 18:
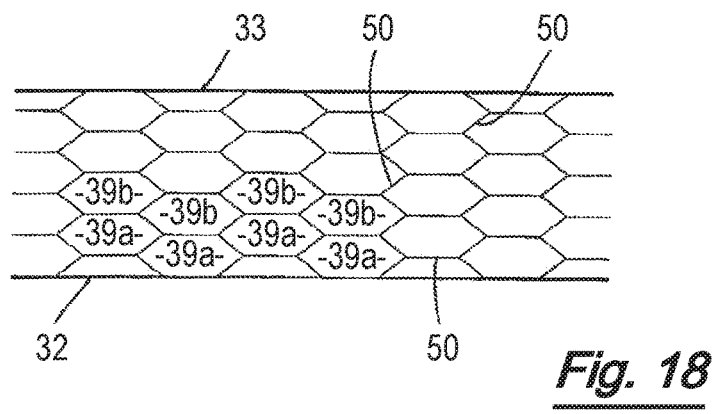

With all embodiments of the invention illustrated in FIGS. 3 to 16, each inlet passage 39 has a generally rectilinear cross section. However, alternative cross sections are possible, such as for instance diamond shaped or hexagonal cross-sections as shown in FIGS. 17 and 18 defined by inlet walls 50. These are examples of embodiments wherein it is not necessarily appropriate to consider any single inlet wall 50 as constituting either a vane in the conventional sense or an inlet baffle distinct from inlet vanes. However, in each case the nozzle structure clearly comprises a plurality of inlet passages 39. In FIG. 17 or 18 one approach to identifying two distinct axially spaced annular arrays of circumferentially spaced passages, 39a and 39b is shown. In each of these embodiments the inlet passages in each annular array identified are circumferentially adjacent one another. Another feature of these embodiments is that adjacent annular arrays which are spaced axially across the inlet overlap one another to a degree. That is, a portion of each individual inlet passage 39b of the second annular array axially overlaps a portion of each inlet passage 39a of the first annular arrays. It is believed that such nozzle structures will further smooth any tendency for the turbine efficiency to have a "stepped" characteristic with varying inlet size.

Figure 19:
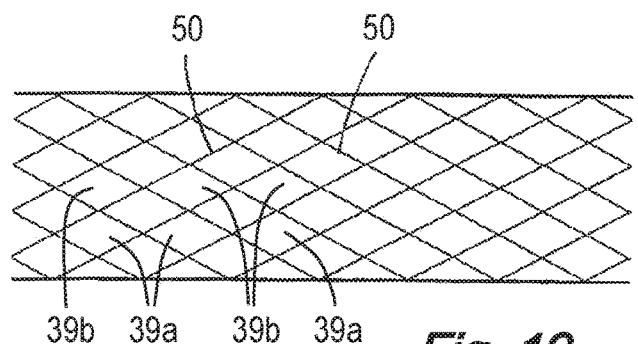
Figure 20:
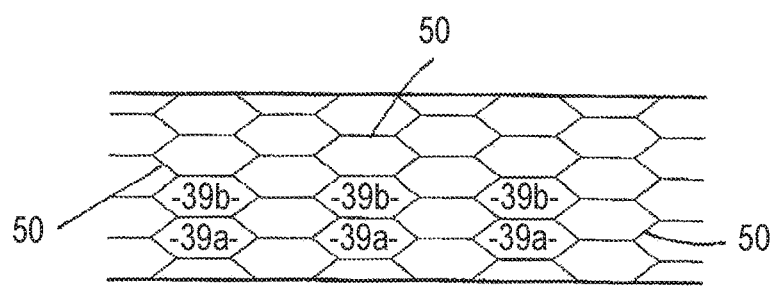

FIGS. 19 and 20 show the same embodiments as FIGS. 17 and 18 but illustrate a different approach to identifying axially spaced annular arrays of inlet passages 39a and 39b. In this case, in each embodiment two annular arrays of inlet passages which are axially spaced but which do not axially overlap are identified.

It will once again be appreciated that the precise configuration of the inlet passages is governed by the configuration of the walls defining them, and that the nozzle structure may be designed such that there are individual inlet passages within the nozzle structure with a different configuration to that of other inlet passages within the same nozzle. A variation of the "honeycomb" embodiment of FIGS. 17 and 18 is for instance illustrated in FIG. 21. With this embodiment inlet walls 50 again define generally hexagonal inlet passages 39 but in this case the array is somewhat irregular. One particular approach to identifying examples of two axially spaced annular arrays of inlet passages 30a and 39b is illustrated. It will be appreciated that alternative spaced annular arrays of inlet passages may be identified by taking a similar approach to that described above in relation to FIGS. 16a to 16d for example.

In all of the embodiments of the invention illustrated in FIGS. 3 to 21, and described above, the inlet nozzle structure comprises a plurality of inlet passages including at least one inlet passage spaced circumferentially and axially respectively from two other inlet passages, or indeed spaced both circumferentially and axially from each of the other two inlet passages. The spacing may be such that at least some of the passages are adjacent one another, and there may be axial and/or circumferential overlap between at least some of the passages. One other way to express this relationship is that in each of the embodiments of the invention illustrated it is possible to identify a first pair of inlet passages that are circumferentially spaced—and possibly adjacent and/or circumferentially overlapping (or staggered), and a second pair of inlet passages which are axially spaced—and possibly adjacent and/or overlapping (or staggered). Depending on how the pairs are identified, in some cases only three passages may be required to define the two pairs, with one inlet passage common to both the first and second pairs.

Figure 22:
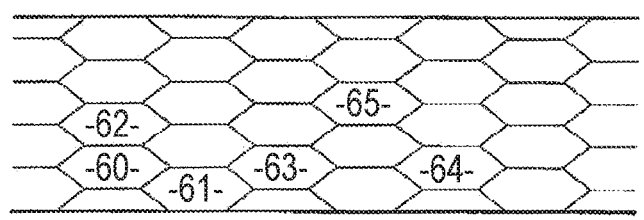

For example, FIG. 22 shows the embodiment of FIGS. 18 and 20 described above. Referring to FIG. 17, a first inlet passage 60 is circumferentially spaced from a second inlet passage 61 and is axially spaced from a third inlet passage 62. In this case the passages are adjacent to one another. Similarly, a single inlet passage 63 is circumferentially spaced from an inlet passage 64 and axially spaced from an inlet passage 65. Here the passages are not adjacent. Inlet passages 60 and 61 can for instance be considered to comprise a first pair of circumferentially spaced inlet passages (as well as axially spaced by virtue of their axial overlap), and inlet passages 60 and 62 can be considered to comprise a second pair of inlet passages that are axially spaced, with the single inlet passage 60 common to both pairs. Likewise, inlet passage 63 and 64 can be considered to comprise a first pair of inlet passages which are circumferentially spaced but not adjacent and inlet passages 63 and 65 can be considered to comprise a second pair of inlet passages which are axially spaced (and in this case also circumferentially spaced), in this case a single inlet passage 63 being common to both pairs. Alternatively, inlet passages 60 and 63 can for instance be considered to comprise a first pair of circumferentially spaced inlet passages, and inlet passages 64 and 65 can be considered to comprise a second pair of axially spaced inlet passages.

Figure 23:
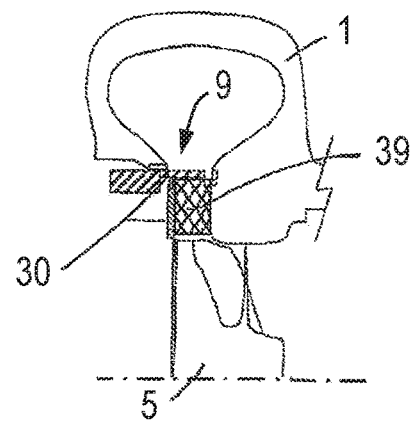
FIGS. 23 to 25 are axial cross-sections schematically illustrating embodiments of the present invention.
Figure 24:
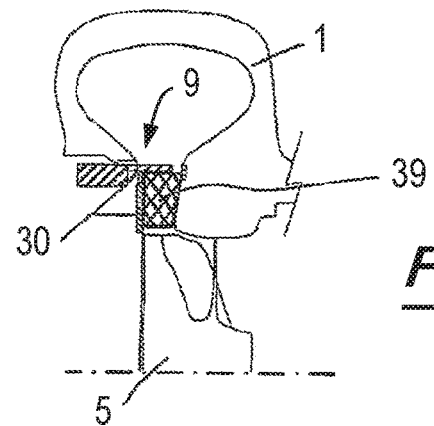
Figure 25:
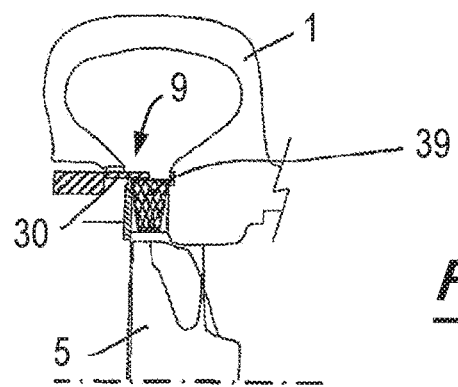

Referring to FIGS. 23 to 25, these illustrate embodiments of the invention in views comprising an array of "diamond shaped" inlet passages 39 in axial-cross section corresponding generally to FIGS. 7a, 7b and 7d respectively. This illustrates that the nozzle may taper inwardly, comprising individual inlet passages 39 which narrow with decreasing radius. It will be appreciated that the same approach could be taken with the hexagonal inlet passage array as illustrated in FIGS. 18 and 20 for example.

More generally it will be appreciated that the configuration of inlet passages 39 may vary considerably between embodiments of the invention. For instance, inlet passages 39 may have a greater or lesser forward sweep relative to the direction of rotation of the turbine blade 5 to induce more or less swirl in the inlet gas flow. The degree of sweep (or swirl angle) may vary along the length of the inlet passages. Different inlet passages may have different swirl angles. For instance, one annular array of inlet passages may all have the same swirl angle but this may differ from the swirl angle of another (e.g. adjacent) annular array of inlet passages.

Also, individual inlet passages 39 may have a cross sectional area which is constant along its length, or which tapers, or which for instance narrows and then widens again between its upstream to downstream ends. For example the cross-sectional area may change from one size and/or shape at the inlet of the passage to another size and/or shape at its outlet. For instance the cross-sectional shape may be diamond shaped or hexagonal at the inlet and change gradually to a more rectangular or square shape at its outlet.

In some embodiments of the invention it may be appropriate to have inlet passages 39 that are restricted to the radial plane, broadly equivalent for instance to known turbocharger nozzle designs comprising straight vanes, i.e. vanes which lie in a plane containing the axis of the turbocharger.

Figure 26:
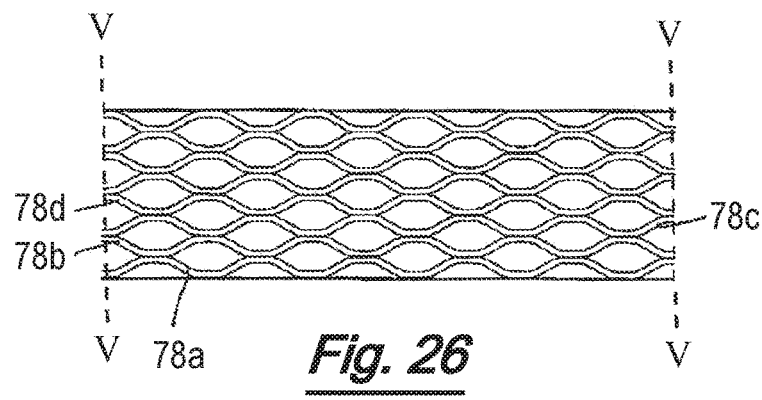
FIG. 26 is a schematic illustration of a radial view around a portion of the circumference of an annular inlet structure in accordance with a embodiment of the present invention.

Although in one sense the "diamond" and "honeycomb" structures shown in FIGS. 17 and 18 for example can not necessarily be considered to comprise vanes in the conventional sense, or clearly discernable baffles, it is in fact possible to construct such nozzle structures from discrete inlet baffles of an appropriate configuration. For example, FIG. 26 shows how the structure shown schematically in FIG. 18 can be constructed by pressing together axially adjacent baffles, four of which 78a-78d are identified in the figure. Each of these baffles is an annular ring but is circumferentially corrugated along the lines of a "wavy washer" and are aligned "out of phase" (circumferentially staggered) so that hexagonal inlet passages 39 are defined between adjacent baffles.

Figure 27A:
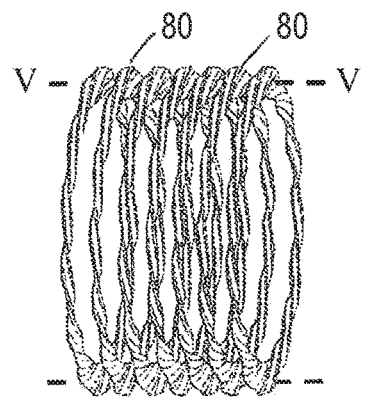
FIGS. 27a to 27d illustrate portions of a turbine and nozzle assembly in accordance with an embodiment of the present invention.
Figure 27B:
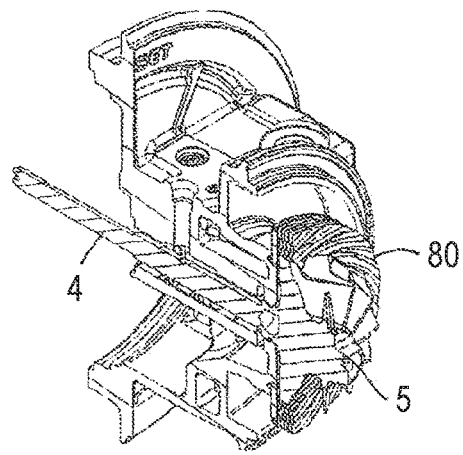
Figure 27C:
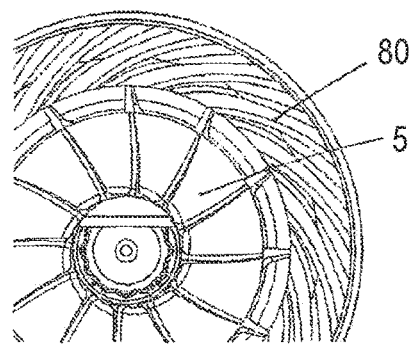
Figure 27D:
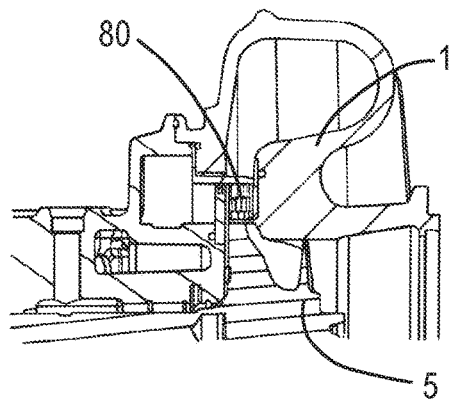

If the corrugations of each baffle extend strictly radially, each of the inlet passages 39 will extend along a radius. However, by sweeping the corrugations forward relative to the circumferential direction of each baffle, inlet passages 39 which similarly sweep forwards can be defined. This is illustrated in FIGS. 27a to 27d. FIG. 27a shows seven baffles in the baffles 80 provided with spiral corrugations prior to assembly into a nozzle structure. To complete the nozzle the baffles 80 are pressed together and joined by any suitable means. FIG. 27b is a cross section through a part of a turbocharger with the resultant nozzle structure in situ. FIG. 27c is an end view of the nozzle structure surrounding the turbine wheel 5, looking along the axis of the turbocharger shaft 4m, and FIG. 27d is an axial cross section corresponding for instance to FIG. 23.

It will be appreciated that various modifications can be made to the embodiment of the invention illustrated in FIGS. 26 and 27a to 27d. For example, the corrugations or waves could take a variety of forms including for instance sinusoidal and diagonal or "V" shapes, or any other shape appropriate to define the required configuration of inlet passages 39. Furthermore, whereas with the illustrated embodiment each of the baffles 80 is corrugated, in other embodiments it may be desirable to place non-corrugated (e.g. strictly radial) baffles between one or more pairs of corrugated baffles to modify the configuration of the inlet passages 39 and certain axial locations across the inlet. Similarly, individual corrugated baffles 80 need not have the same depth of corrugation. Moreover, in some embodiments the baffles 80 can be pressed together in such a way as to have greater or smaller areas of contact between baffles 80 to that illustrated in FIGS. 21 to 22 to again vary the configuration of the inlet passages. Indeed, the contact area may vary across the radius of the nozzle structure to define individual inlet passages 39 which have a corresponding varying cross sectional area.

Various possibilities exist for joining the baffles together. For instance the baffles may be brazed together (for example using silver brazing or other brazing appropriate for the high temperatures encountered in a turbine inlet) or adjacent baffles may be provided with mating formations, such as complimentary projections and indentations. Alternatively, baffles may be spot welded together. Other appropriate manufacturing methods will be apparent to the appropriately skilled person.

Figure 28:
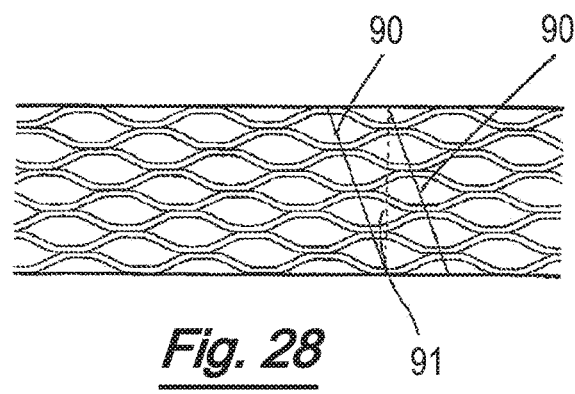
FIGS. 28 and 29 are each schematic illustrations of a radial view around a portion of the circumference of an annular inlet structure in accordance with respective embodiments of the present invention.

With the embodiment of the invention illustrated in FIGS. 26 and 27a to 27d, adjacent baffles are aligned in anti-phase so that every other baffle 70 is directly aligned. This creates a honeycomb like structure in which axially adjacent inlet passages 39 are precisely aligned along the axis of the turbocharger. However, by introducing a slight circumferential offset into each successive baffle as shown in FIG. 28 it is possible to circumferentially stagger axially adjacent inlet passages 39 as illustrated by the lines 90 shown skewed at an angle to the dotted line 91 which is parallel to the turbocharger axis. This could for instance be used to partially alleviate high cycle fatigue in turbine blades when the sleeve is at the open position.

In some embodiments the baffles may be generally annular and have a generally hyperbolic paraboloidal surface (i.e. have a surface which is generally defined in part by the surface of a hyperbolic paraboloid). A hyperbolic paraboloid may be commonly referred to as having a saddle shape. One type of hyperbolic paraboloid may be defined in Cartesian geometry by the equation $$z = \frac{x^2}{a^2} - \frac{y^2}{b^2}.$$

where x, y and z are Cartesian co-ordinates in three dimensions and a and b are constants. In some cases a and b may have substantially the same value. The hyperbolic paraboloidal or 'saddle' shaped baffle may include any number of corners, edges or vertices which are located above or below the major plane of the baffle. While such a baffle may conveniently incorporate four such corners, edges or vertices, it may incorporate any other number as desired, such as six, eight or more.

Figure 29:
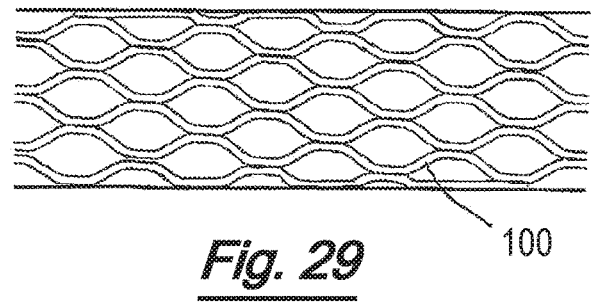

FIG. 29 illustrates an alternative approach to producing a honeycomb structure substantially the same as that shown in 26 but formed from a single helical baffle structure 100 rather than individual annular baffles as illustrated for instance in FIG. 26.

Figure 21:
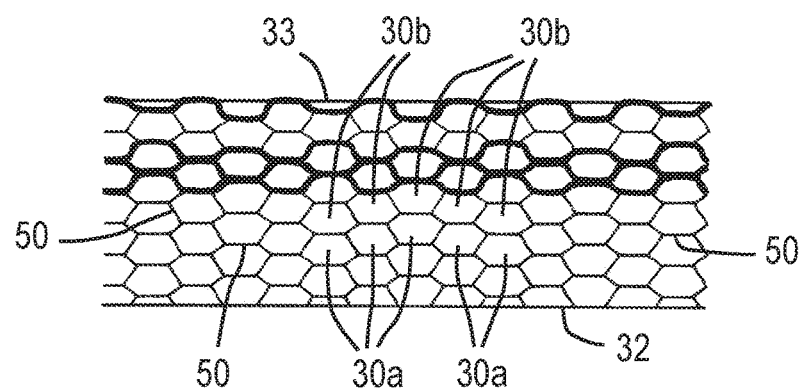

A structure such as that shown for instance in FIG. 21 could also be fabricated from corrugated baffles, but with the corrugations defined in order to produce the more "irregular" honeycomb array illustrated. In this case, and referring back to FIG. 21, the walls 50 could for instance be provided by pressing or otherwise joining together annular baffles of three different configurations (two of which are mirror images of each other) as illustrated in bold line, which shown three baffle plates pressed adjacent one another and a fourth baffle plate adjacent the wall 33 of the inlet 9.

As illustrated in FIGS. 30a and 30b, some of the flow channels may be blocked to tailor efficiency in regions corresponding to certain inlet widths. For instance in FIGS. 30a and 30b part-hexagonal channels at the axial ends of the nozzle are shown blocked out. In the case of FIG. 30b, the axial width of the channels in these regions is reduced which may be beneficial in reducing vibration on the blade when these channels are exposed to the inlet flow.

Whatever the configuration, or method of construction, of the nozzle assembly (e.g. assemblies comprising vanes/baffles or "honeycomb" structures), the surfaces defining the inlet passages and/or the sleeve which varies the size of the gas flow path through the inlet may be at least partially coated with a suitable catalyst for oxidising soot at the high operating temperatures of the turbine in order to help prevent deposition and accumulation of soot on surfaces of the nozzle.

It will be appreciated by the skilled person that there are a variety of different ways in which the nozzle assembly and other details of the inlet structures in accordance with the present invention can be constructed.

Embodiments of the invention illustrated for example in FIGS. 3, 4a-4b, 7a-7g, 23-25 and 27a-27d each show an turbine inlet structure in which the sleeve 30 slides around the outside diameter of the nozzle structure, so that the sleeve acts to block/unblock inlet passages 39 at their upstream ends. However, in alternative embodiments of the invention the cylindrical sleeve may be located on the inside diameter of the nozzle so that it opens and closes inlet passages 39 at their downstream ends adjacent the turbine wheel. For example, FIGS. 31a to 31c show a modification of the embodiment of the invention illustrated in FIGS. 3 and 4a-4b, wherein a modified sleeve 130 slides across the inlet passage 9 downstream of inlet passages 39 so that it slides between the nozzle and turbine wheel. Other details of this embodiment of the invention are substantially the same as those shown and described in relation to FIGS. 3 and 4a-4b and like reference numerals are used where appropriate. The only significant differences are those necessary to accommodate the reduced diameter sleeve 130, namely repositioning of one of the two nozzle rings, identified as nozzle ring 132, and flanges 130a to which support rods 31 are connected. In particular, it will be appreciated that each of the various nozzle structures illustrated and described above, and all variations as described above, can be included in embodiments of the invention in which the sleeve 130 is positioned around the turbine wheel at the internal diameter of the inlet nozzle.

In some embodiments of the invention it may be advantageous to provide two axially slideable sleeves, comprising a first sleeve located around the outside diameter of the inlet passages and a second cylindrical sleeve located at the inside diameter of the inlet passages. In such cases the first and second sleeves may have the same axial extent across the width of the inlet 9, or one of the two sleeves may extend further than the other at least some positions, so that in such positions the overall axial width of the annular inlets differs from its upstream to its downstream openings. The two sleeves could be coupled together (or integral) for actuation as a unit, or may be independently arranged and actuated.

Embodiments of the invention described above show the sleeve 30 and 130 extending across the annular inlet 9 from the bearing housing side of the turbine wheel. In alternative embodiments of the invention the sleeve may extend across the annular inlet 9 from the turbine housing side of the wheel. In other words, the sleeve and actuating mechanism can be housed in the turbine housing rather than in the bearing housing. Examples of such embodiments of the invention are shown in FIGS. 32a and 32b, and 33a and 33b.

Actuating the sleeve from the turbine side can be beneficial for mitigating high cycle fatigue of the turbine blades, because when the sleeve is nearly closed, exposing just one ring of inlet passages. When the sleeve is closed from the turbine side, then ordinarily it closes towards the bearing housing side, and towards the rear of the turbine wheel—which is where the blade is most robustly supported by the turbine back face.

It should also be noted however that it is possible to provide the actuator on one side, arranged to pull the sleeve from the other side via one or more struts (generally at least two and usually three will be necessary). Therefore the actuator could be in the bearing housing, and connected by some "pull-rods" (not shown) to a sleeve in the turbine housing. The "pull-rods" pull the sleeve towards the bearing housing to block the gas inlets. Alternatively the actuator could be in the turbine housing connected by "pull-rods" to a sleeve that is pulled from the bearing housing towards the turbine housing so as to block the gas inlets. These embodiments are not illustrated, partly for brevity and partly because it will typically be preferable to provide the actuator and the sleeve on the same side of the annular turbine inlet.

If pull rods are desired, it may be desirable to align them circumferentially with vanes, for example along the edges (e.g. the radially outer edges) of some of the vanes (e.g. of three sets of axially divided vanes), which may be circumferentially aligned (i.e. non-staggered) vanes.

One possible advantage of the pull rod system (not shown) is that it might assist with aligning the sleeve around the nozzle (due to the extra axial length of the sleeve system) and thus preventing it from tilting and jamming. Another reason to implement a pull rod system would be to gain the benefits of bearing housing actuation while also the mitigation of turbine blade high cycle fatigue that can result from sliding the sleeve from the turbine side.

Figure 32A:
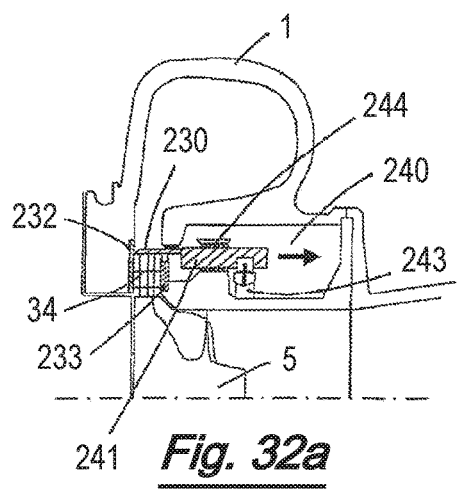
FIGS. 32a to 32b are axial cross-sections through part of a turbine in accordance with another embodiment of the present invention.
Figure 32B:
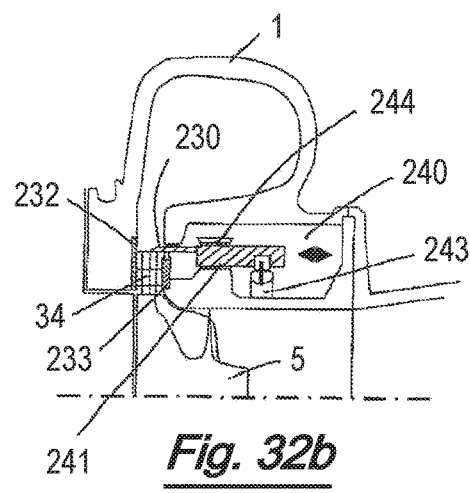

Referring first to FIGS. 32a and 32b, a nozzle assembly is indicated generally by reference 34 and may take any of the variety of forms described above and alternatives thereto. The significant difference between the embodiment of FIGS. 32a and 32b and for instance the embodiment of FIG. 3 for example, is that a cylindrical sleeve 230 is mounted within a cavity 240 defined in a turbine housing 1 rather than in the bearing housing 3. Notwithstanding this different location of the sleeve 230, so that it slides across the inlet 9 from the turbine side to the bearing housing side, the manner of mounting and actuating the sleeve is very similar to that illustrated in FIG. 3. That is, sleeve 230 is mounted on guide rods 241 which are linked to an actuator yoke 243, which may be in turn actuated by a variety of different forms of actuator including pneumatic, hydraulic and electric. In the illustrated example the guide rods 241 are slidably supported within bushes 244. The nozzle assembly 34 comprises a first nozzle ring 232 which defines a first side wall of the inlet 9, and a second nozzle ring 233 which closes the annular recess 240 to the inlet 9, and as such defines a second side wall of the inlet 9. An annular seal ring 107 is provided to seal the sleeve 230 with respect to the nozzle ring 233. It will be appreciated that other aspects of operation in this embodiment of the invention will be substantially the same as those of the embodiments in the invention described above in which the sleeve 30 is actuated from the bearing housing side. In particular, the inlet passages 39 will function in substantially the same way.

Figure 33A:
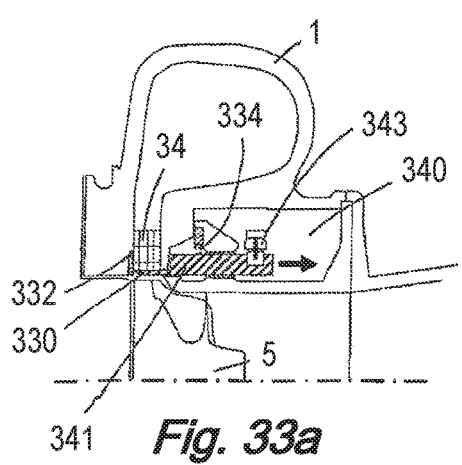
FIGS. 33a to 33b are axial cross-sections through part of a turbine in accordance with another embodiment of the present invention.
Figure 33B:
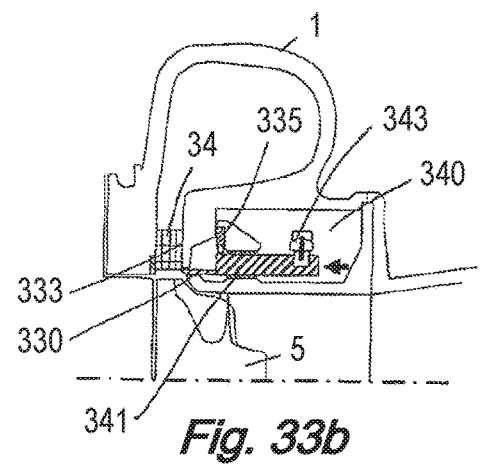

Referring to FIGS. 33a and 33b, these show modification of the embodiment shown in FIGS. 32a and 32b in which the sleeve 330 is positioned on the inside diameter of the nozzle assembly 34 rather than on the outside diameter. In this particular embodiment, the nozzle assembly 34 is located between a side wall 332 of the housing 1, and a facing side wall 332 on the opposite side of annular inlet 9 and which closes annular cavity 240 within which guide rods 241 are slidingly supported. Here again, sleeves 330 may be actuated by any suitable actuator linked to the sleeves by a yoke 243. In this embodiment the cavity 240 is sealed with respect to the inlet 9 by a seal ring 334 supported on the inside diameter of an annular member 335.

As mentioned above, alternative embodiments of the invention may comprise two parallel sleeves, one on the inside diameter and one on the outside diameter, which may be arranged and controlled to move together or independently of one another, and may have different lengths.

Various modifications may be made to the structure of the sleeve. For instance, FIGS. 34a and 34c show three different possibilities for the profiling of the free end of the sleeve 30. Whereas the sleeve 30 of FIG. 34a has a squared-off end, the free end of the sleeve 30 could be curved or otherwise streamlines as shown in FIGS. 34b and 34c. This may improve aerodynamic efficiency as gas flows past the sleeve through the open portion of the inlet 9.

FIGS. 35a and 35b show two possible arrangements for a sleeve 30 including a piston ring seal 100 adjacent the free end of the sleeve 30 to prevent gas flow between the sleeve 30 and a nozzle array in the accordance with the invention, indicated generally by reference 101. It will be appreciated that the nozzle assembly 101 may have any of the possible configurations according to the present invention described above. It will also be appreciated that the free end of the sleeve 30 could be profiled as for instance shown in FIGS. 34b and 34c (and if at the nozzle inner diameter, could be oppositely profiled i.e. on its outer diameter). This, and other shapes, such as a radial ridge (not shown) may be implemented to modify the aerodynamic efficiency of the turbine or to modify the axial or radial aerodynamic forces experienced by the sleeve.

Alternatively, in some embodiments of the invention (which may have any a nozzle assembly with any of the possible configurations described above, e.g. a plurality of baffles) there may be no piston ring seal adjacent the free end of the sleeve. In this manner, the sleeve may be mounted such that gas may pass between the sleeve and the nozzle assembly. For example, in a case where the nozzle assembly comprises a plurality of annular baffles and the sleeve is mounted beyond the outer diameter of the annular baffles, the sleeve may be mounted such that there is a gap between the sleeve and at least one of the annular baffles. In this case the sleeve may have an inner diameter which is greater than the outer diameter of at least one of the annular baffles. An example of a gas flow path 38g between a sleeve 30 and a nozzle assembly 34 can be seen in FIG. 7c. The flow path 38g passes through a radial gap between the sleeve 30 and baffle 38b of the nozzle assembly 34. The flow path 38g is such that once the gas has passed through the gap between the sleeve 30 and baffle 38b, the gas flows through the inlet 9 towards the turbine wheel. In other embodiments, any other appropriate gap between the sleeve and the nozzle assembly (which defines a gas flow path between the nozzle assembly and the sleeve) may be used. Within FIG. 7c the gap between the sleeve and the baffles 38a-38c has been exaggerated for clarity. In the case where the sleeve moves axially towards an inlet sidewall so as to reduce the size of the inlet through which gas may flow, the gap between the sleeve and the nozzle assembly may be such that it permits gas to flow between the nozzle assembly and the sleeve in a direction which is generally opposite to the direction in which the sleeve moves when it moves towards the inlet sidewall so as to reduce the size of the inlet. Furthermore, the gap between the sleeve and the nozzle assembly may be such that it permits gas to flow between the nozzle assembly and the sleeve in a direction which is generally radially inwards, towards the turbine wheel. In some embodiments, the nozzle assembly and sleeve may be configured such that there is a gap between all of the baffles and the sleeve (e.g. the baffles all have an outer diameter which is less than the inner diameter of the sleeve). However, in other embodiments, the nozzle assembly and sleeve may be configured such that there is a gap between only some of the baffles and the sleeve. For example, those baffles for which there is not a gap between the nozzle and the sleeve may be such that they generally contact the sleeve. In this case, such baffles which abut the sleeve may guide the movement of the sleeve as it varies the size of the inlet. It has been found that in some embodiments, provision of a gap (and hence a gas flow path) between the sleeve and the nozzle assembly may improve the performance of the turbine.

It is also possible to profile or chamfer the opposite side of the sleeve (i.e. the edge that contacts the nozzle) to facilitate smooth running and mitigate the possibility of the sleeve jamming for example against a baffle.

Furthermore, it will be appreciated that these possibilities, including those shown in FIGS. 34a-34c, 30a and 30b are applicable to the sleeve regardless of whether it is mounted on the bearing housing or turbine housing side of the nozzle, and regardless of whether it is mounted on the inner or outer diameter of the nozzle or both.

Figure 36:
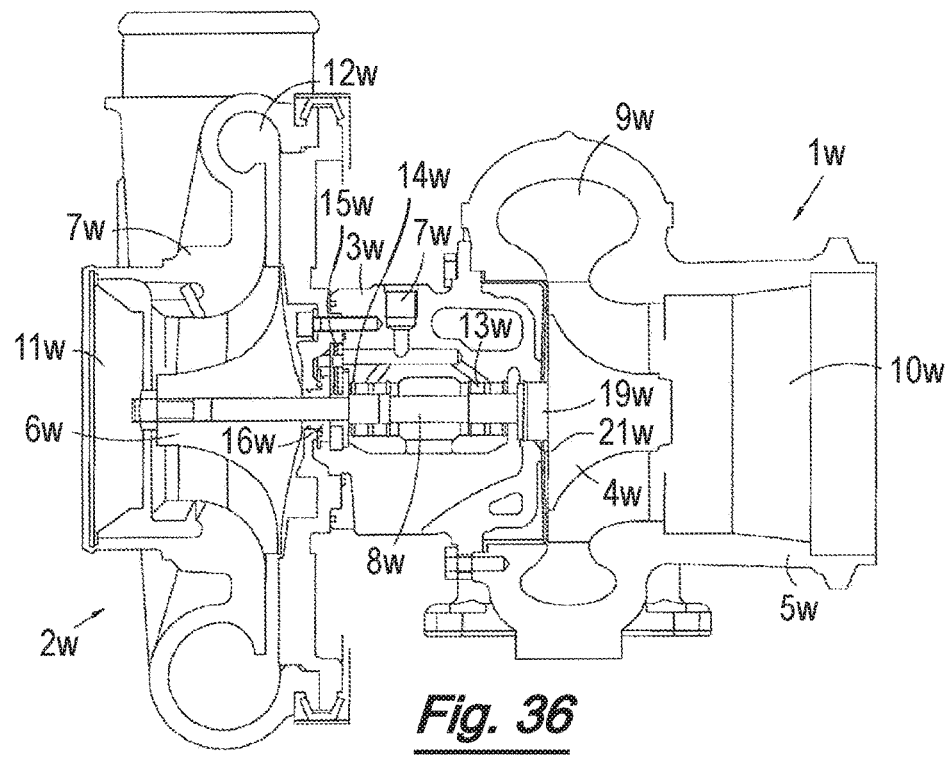
FIG. 36 is an axial cross-section through a conventional turbocharger.

Referring to FIG. 36, the turbocharger comprises a turbine 1w joined to a compressor 2w via a central bearing housing 3w. The turbine 1w comprises a turbine wheel 4w for rotation within a turbine housing 5w. Similarly, the compressor 2w comprises a compressor wheel 6w which can rotate within a compressor housing 7w. The turbine wheel 4w and compressor wheel 6 are mounted on opposite ends of a common turbocharger shaft 8w which extends through the central bearing housing 3w.

The turbine housing 5w has an exhaust gas inlet volute 9w located annularly around the turbine wheel 4w and an axial exhaust gas outlet 10w. The compressor housing 7w has an axial air intake passage 11w and a compressed air outlet volute 12w arranged annularly around the compressor wheel 6w. The turbocharger shaft 8w rotates on journal bearings 13w and 14w housed towards the turbine end and compressor end respectively of the bearing housing 3w. The compressor end bearing 14w further includes a thrust bearing 15w which interacts with an oil seal assembly including an oil slinger 16w. Oil is supplied to the bearing housing from the oil system of the internal combustion engine via oil inlet 17w and is fed to the bearing assemblies by oil passageways 18w.

In use, the turbine wheel 4w is rotated by the passage of exhaust gas from the annular exhaust gas inlet 9w to the exhaust gas outlet 10w, which in turn rotates the compressor wheel 6w which thereby draws intake air through the compressor inlet 11w and delivers boost air to the intake of an internal combustion engine (not shown) via the compressor outlet volute 12w.

Figure 37:
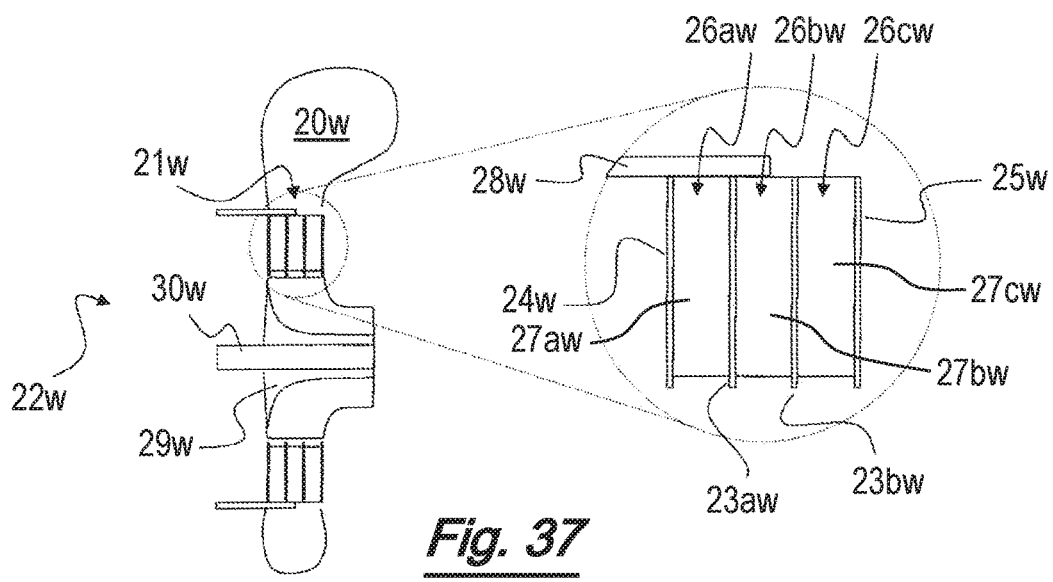
FIG. 37 is an axial cross-section through a turbine volute and annular inlet of a turbine according to an embodiment of the present invention.

In FIG. 37 there is shown a turbine volute 20w and an annular inlet 21w of a turbine 22w according to an embodiment of the present invention. Equiaxially spaced across the inlet 21w are two annular baffles 23aw, 23bw which, together with inner and outer sidewalls 24w, 25w of the inlet, define three axially offset annular inlet portions 26aw 26bw, 26cw of equal axial width. Extending axially across each of the three inlet portions 26aw, 26bw, 26cw are respective annular arrays of vanes 27aw, 27bw, 27cw. The vanes 27aw, 27bw, 27cw are optional, and in other embodiments may not be present in all inlet portions 26aw, 26bw, 26cw. The vanes 27aw, 27bw, 27cw divide each respective inlet portion 26aw, 26bw, 26cw to form inlet passages in each inlet portion 26aw, 26bw, 26cw. A cylindrical sleeve 28w is provided that is axially movable across the annular inlet 21w to vary the size of a gas flow path through the inlet 21w (i.e. to vary the geometry of the turbine). Movement of the cylindrical sleeve 28w may be undertaken, for example, to close or at least partially close, or open, or at least partially open, one or more of the inlet portions 26aw, 26bw, 26cw.

The turbine 22w is also shown as comprising a turbine wheel 29w mounted on a turbine shaft 30w for rotation about a turbine axis.

The sleeve 28w of FIG. 37 may be formed, for example, from casting. However, a more accurate, cheaper or simpler way of making the sleeve 28w is shown in FIGS. 38 and 39.

Figure 38:
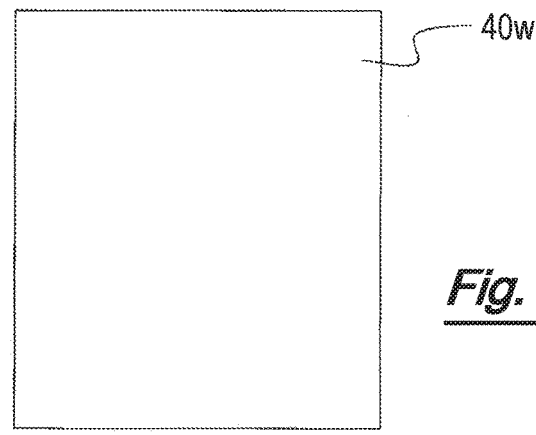
FIGS. 38 and 39 depict a sleeve construction for the sleeve in the turbine of FIG. 37, in accordance with an embodiment of the present invention.

FIG. 38 shows a sheet of material 40w. The sheet 40w may be formed from any material suitable for withstanding the conditions within a turbine. For example, the sheet 40w may be formed from a metal, or an alloy.

Figure 39:
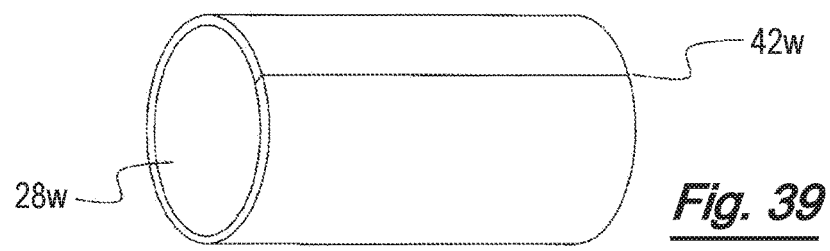

FIG. 39 shows that the sheet has been rolled into a sleeve like shape 28w. Opposing faces of the rolled sheet are welded, brazed or otherwise attached to each other 42w to form the sleeve 28w.

Figure 40:
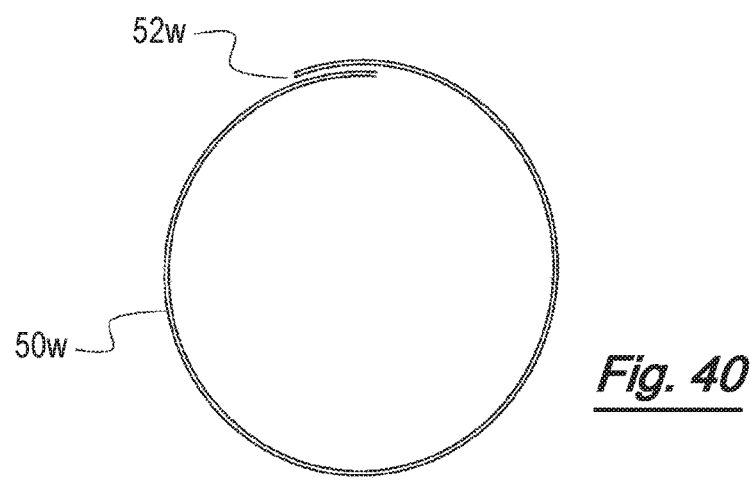
FIG. 40 is an end-on view of a sleeve for use in the turbine of FIG. 37, in accordance with another embodiment of the present invention.
Figure 41A:
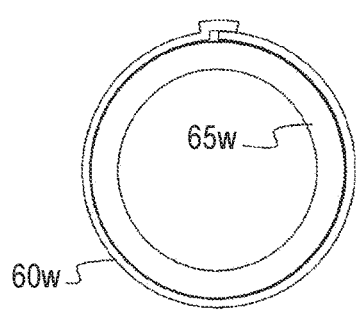
FIGS. 41a-41f are end-on views of sleeves for use in the turbine of FIG. 37, in accordance with other embodiments of the present invention.
Figure 41B:
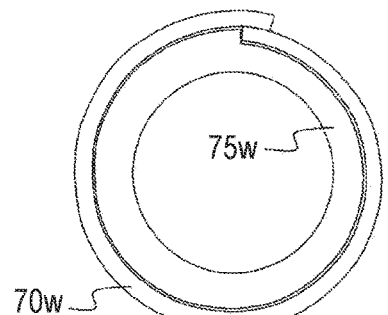
Figure 41C:
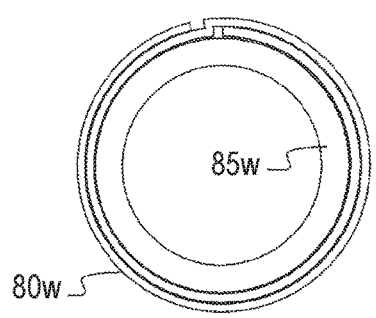
Figure 41D:
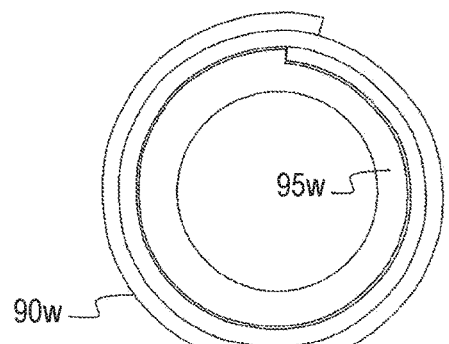
Figure 41E:
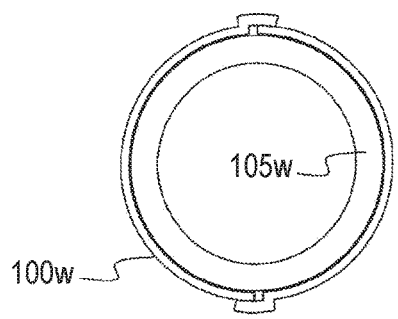
Figure 41F:
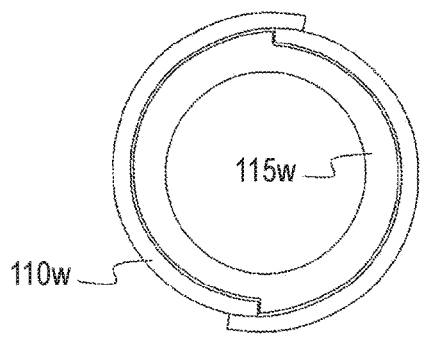

In a different but related embodiment, the opposing faces of the rolled sheet are not attached to each other. Such an embodiment is shown in FIG. 40. In FIG. 40, and end-on view of a sleeve 50w in accordance with another embodiment of the present invention is shown. The sleeve 50w is, again, formed by rolling a sheet of material, which may be formed from any material suitable for withstanding the conditions within a turbine. For example, the sheet may be formed from a metal, or an alloy. In contrast with the sleeve of FIG. 39, in FIG. 40 the opposing faces of the sheet (or ends that carry those faces) are not attached to one another, but instead overlap 52w one another. Such overlap 52w may allow, accommodate or facilitate expansion or contraction of the sleeve during operation of the turbine, for example due to temperature changes that the sleeve is subjected to. Such allowance, accommodation or facilitation may reduce or prevent jamming of the sleeve on vanes or baffles discussed above. For instance, without such allowance, accommodation or facilitation for expansion, the sleeve may abut against baffles or vanes that have expanded, in use, due to heating, which could cause jamming.

The degree of overlap, and/or the material of the sleeve, may be selected such that expansion and/or contraction is undertaken at a rate (e.g. a radial rate) which matches a rate (e.g. a radial rate) of expansion of the baffles or vanes which the sleeve surrounds (or, in other embodiments—not shown—that surround the sleeve).

An axially extending step may be provided in the sleeve, and/or the baffle, vanes or other structure defining the inlet portions. The step is a step up or down in the circumferential direction, and may have a helical component. The step may accommodate the overlap discussed above, and/or may ensure that the overlap does not leave a gap through which gas might otherwise flow, reducing efficiency of the turbine as a while. FIGS. 41a to 41f depict end-on views of different sleeves 60w, 70w, 80w, 90w, 100w, 110w and inlet structures 65w, 75w, 85w, 95w, 105w, 115w, one of both of which is or are provided with such a step. More than one step may be provided in a given sleeve, for example an inner and outer diameter step. The sleeve may overlap to such an extent that the sleeve forms a roll. The sleeve may be formed from two or more portions or section, e.g. half or quarter sleeve sections, that are joined together.

In FIG. 37, a single sleeve section is provided. A single sleeve section may be sufficient. However, greater functionality may be desirable, or in some instances, required. For example, it may be desirable to ensure that gas flows through only a single inlet portion, or through a plurality, but not all, of adjacent inlet portions. This may be desirable to ensure that gas flows through an inlet portion with a certain vane configuration, or through inlet portions with certain vane configurations.

According to a first aspect of the present invention there is provided a variable geometry turbine comprising a turbine wheel mounted for rotation about a turbine axis within a housing. The housing defines an annular inlet surrounding the turbine wheel and defined between first and second inlet sidewalls. The annular inlet is divided into at least two axially offset inlet portions. The preceding features are shown in FIG. 37. In contrast to the arrangement of FIG. 37, and in accordance with the present invention, the turbine further comprises a first cylindrical sleeve section axially movable across the annular inlet to vary the size of a gas flow path through the inlet, and a second cylindrical sleeve section axially movable across the annular inlet to vary the size of a gas flow path through the inlet. By providing two sleeve sections, greater control of the gas flow may be achieved.

Figure 42:
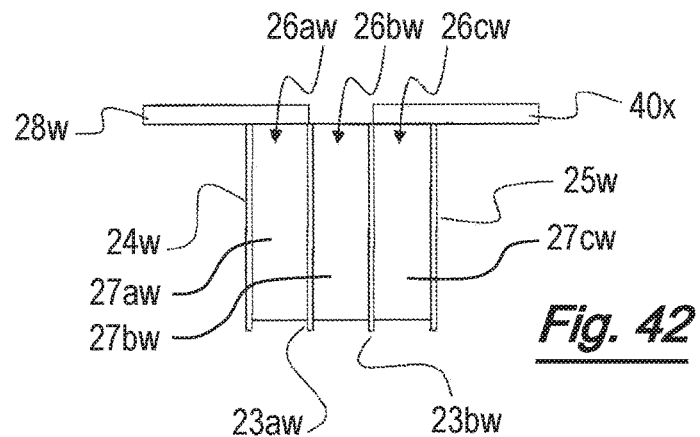
FIG. 42 depicts sleeve sections for use in controlling a gas flow path through an inlet, in accordance with an embodiment of the present invention.

FIG. 42 shows a view of a sub-section of the turbine shown in and described with reference to FIG. 37. In addition to the features shown in FIG. 37, FIG. 42 shows that a second cylindrical sleeve section 40x is provided. The (first) cylindrical sleeve section 28w and the second sleeve section 40x are independently moveable with respect to one another. This allows, for example, improved control of the gas flow through the inlet, so that for example gas may flow through only a single inlet portion 27bw (e.g. with a certain or desired vane configuration, which may include an absence of vanes). Because two independently moveable sleeves sections 28w, 40x are provided, the inlet portion 27bw or portions that is or are exposed does/do not need to be adjacent to a sidewall 24w, 25w, but can be an inlet portion or portions located away from (e.g. separated by one or more other inlet portions 27aw, 27bw) from the sidewalls 24w, 25w.

In FIG. 42, the first cylindrical sleeve section 28w and the second cylindrical sleeve section 40x both have an inner diameter that is greater than an outer diameter of the inlet portions (i.e. the sleeve sections 28w, 40x surround the inlet portions 27aw, 27bw, 27cw). This arrangement may improve turbine operation, for example reducing turbulence or improving properties of gas flow through or past the inlet.

In another embodiment, the first cylindrical sleeve section and the second cylindrical sleeve section may both have an outer diameter that is less than an inner diameter of the inlet portions (i.e. the sleeve sections are surrounded by the inlet portions).

Figure 43:
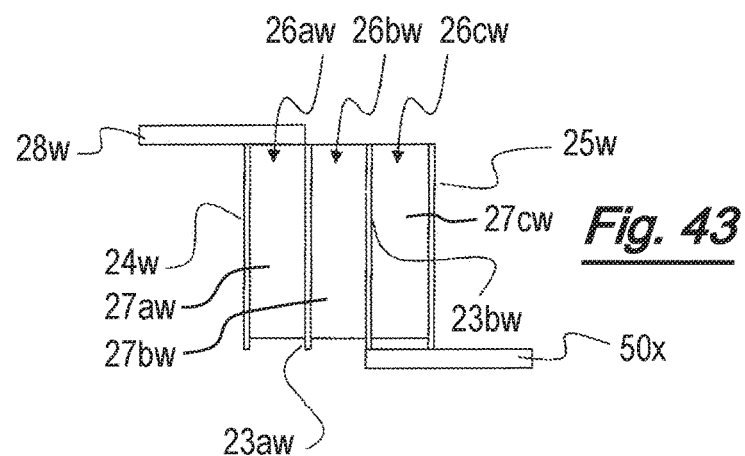
FIG. 43 depicts sleeve sections for use in controlling a gas flow path through an inlet, in accordance with another embodiment of the present invention.

FIG. 43 shows a further embodiment, where the first cylindrical sleeve section 28w has an inner diameter that is greater than an outer diameter of the inlet portions 27aw, 27bw, 27cw (i.e. the first sleeve section 28w surrounds the inlet portions 27aw, 27bw, 27cw). In contrast, a second cylindrical sleeve section 50x has an outer diameter that is less than an inner diameter of the inlet portions 27aw, 27bw, 27cw (i.e. the second sleeve section 50x is surrounded by the inlet portions 27aw, 27bw, 27cw). This arrangement may be advantageous, since now both sleeve sections 28w, 50x can, if required, extend across the inlet, and at the same time.

Figure 44:
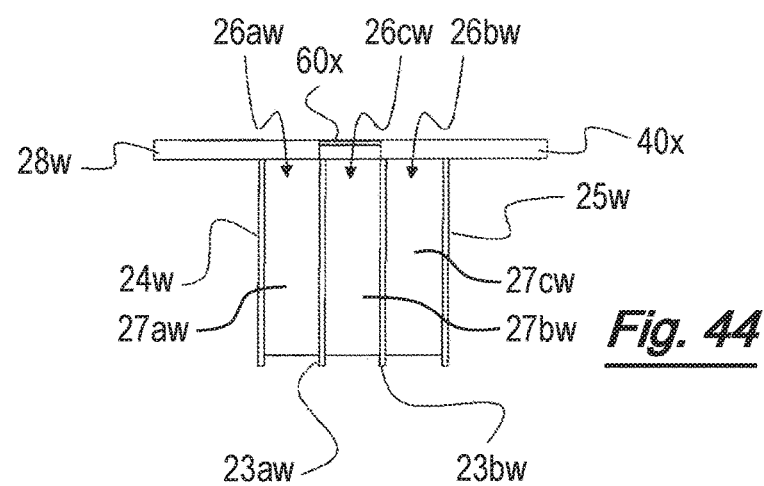
FIG. 44 depicts sleeve sections for use in controlling a gas flow path through an inlet, in accordance with an further of the present invention.

FIG. 44 shows a similar arrangement to that shown in FIG. 42. However, in FIG. 44 (and in contrast to FIG. 42) the sleeve sections 28w, 40x are connected to one another via a bridge connection 60x. The sleeve sections 28w, 40x are thus no longer independently moveable, due their attachment to one another. However, suitable exposure of one or more inlet portions 27aw, 27bw, 27cw (depending on the degree of separation of the sleeve section 28w, 40x and the axial width of the inlet portions 27aw, 27bw, 27cw) may still be achieved via appropriate movement of the sleeve sections 28w, 40x in unison.

The sleeve sections 28w, 40x may be formed from a single sleeve, with an opening (e.g. an annular opening) in the sleeve being provided to form the two sleeve sections. A remaining portion of the sleeve may form the aforementioned bridge connection.

In the embodiments discussed, the sleeves have been shown as being moved from within, or relative to, opposing sidewalls of the inlet. In all embodiments discussed, a variation might include the sleeve sections being moved from, or relative to, the same sidewall. However, such an arrangement might restrict the ability to expose inlet portions located away from the sidewalls of the inlet.

The sleeve sections may be moved by appropriate actuation and interaction with a trailing end of the sleeve sections (e.g. an end not located or locatable within the inlet). Alternatively or additionally, the sleeve sections may be moved by appropriate actuation and interaction with one or more guides (e.g. moveable rods or wires or cables) that extend across the inlet.

Different inlet portions may have different vane configurations (which may include an inlet portion with no vanes). These configurations may be selected, via appropriate inlet portion selection, by movement of the two sleeve sections.

The variable geometry turbine may further comprise a third cylindrical sleeve section, moveable to open or close a passage between the inlet, or a volume upstream of the inlet, and a turbine outlet.

Figure 45:
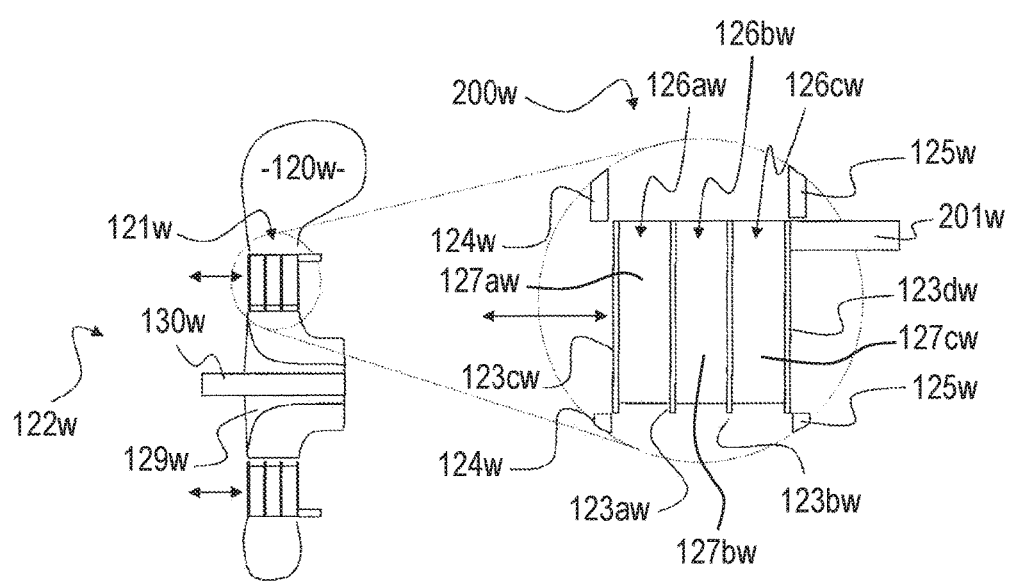
FIG. 45 is an axial cross-section through a turbine volute and annular inlet of a turbine according to an embodiment of the present invention.

A potentially viable alternative to the arrangement shown in FIG. 37 is shown in FIG. 45. In FIG. 45 there is shown a turbine volute 120w and an annular inlet 121w of a turbine 122w according to an embodiment of the present invention. The inlet is at least partially define by sidewalls 124w, 125w. Equiaxially spaced across the inlet 121w are two annular baffles 123aw, 123bw which, together with end-walls 123cw, 123dw, define three axially offset annular inlet portions 126aw, 126bw, 126cw of equal axial width. Extending axially across each of the three inlet portions 126aw, 126bw, 126cw are respective annular arrays of vanes 127aw, 127bw, 127cw. The vanes 127aw, 127bw, 127cw are optional, and in other embodiments may not be present in all inlet portions 126aw, 126bw, 126cw. The vanes 127aw, 127bw, 127cw divide each respective inlet portion 126aw, 126bw, 126cw to form inlet passages in each inlet portion 126aw, 126bw, 126cw.

In contrast to the arrangement shown in FIG. 37, the baffles 123aw, 123bw and vanes 127aw, 127bw, 127cw in FIG. 45 are part of a substantially annular baffle structure 200w that is axially moveable across the inlet 121w to vary a configuration of a gas flow path through the inlet 121w (i.e. to vary the geometry of the turbine). FIG. 45 shows that the baffle structure 200w comprises at least two axial offset inlet portions 126aw, 126bw, 126cw, at least (and perhaps only) two of which may be located fully (i.e. not partially) within the annular inlet 121w. If at least two inlet portions 126aw, 126bw, 126cw were only partially locatable in the inlet 121w, performance may be reduced due to, for example, an increase in turbulence or decrease in gas flow.

The baffle structure 200w may be provided in or on (e.g. at the end of) an axially moveable sleeve. The sleeve may comprise a solid portion 201w (i.e. not an inlet portion)

which may be at least partially locatable within the inlet 121w, for example to at least partially block or close the inlet.

As shown in the Figure, at least one inlet portion 126aw, 126bw, 126cw may comprise vanes 127aw, 127bw, 127cw, dividing an inlet portion 126aw, 126bw, 126cw into inlet passageways. Again as shown in the Figure, at least two inlet portions 126aw, 126bw, 126cw may comprise vanes, dividing the respective inlet portions 126aw, 126bw, 126cw into inlet passageways. A configuration of vanes in a first inlet portion may be different from a configuration of vanes in a second inlet portion (not shown in the Figure). A configuration of vanes in a second inlet portion may be the same as a configuration of vanes in a second inlet portion, as for example schematically depicted in the Figure.

As shown in the Figure the baffle 200w structure may comprise at least three axial offset inlet portions 126aw, 126bw, 126cw, all three of which portions 126aw, 126bw, 126cw may be located fully within the annular inlet.

In other embodiments, it may be preferable to be able to locate (only) a whole number of inlet portions within the inlet (i.e. not a partial inlet, or partial inlets). If one or more inlet portions were only partially locatable in the inlet, performance may be reduced due to, for example, an increase in turbulence or decrease in gas flow.

Referring back to the Figure, for completeness the turbine 122w is also shown as comprising a turbine wheel 129w mounted on a turbine shaft 130w for rotation about a turbine axis.

Figure 46:
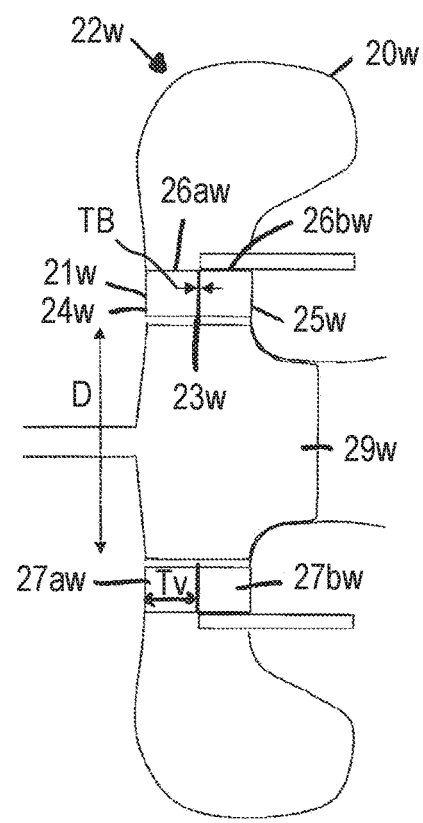
FIG. 46 is an axial cross-section through a turbine volute and annular inlet of a turbine according to a first embodiment of the present invention.

In FIG. 46 there is shown a turbine volute 20w and annular inlet 21w of a turbine 22w according to an embodiment of the present invention. Located within the inlet 21w is an annular baffle 23w which, together with inner and outer sidewalls 24w, 25w of the inlet, define two axially offset annular inlet portions 26aw, 26bw of equal axial width. Extending axially across each of the two inlet portions 26aw-bw are respective annular arrays of vanes 27aw, 27bw of equivalent maximum axial thickness. As can be seen in FIG. 46, the axial thickness 'TB' of the baffle 23w is significantly lower than the maximum axial thickness 'Tv' of each of the vanes 27aw-bw. Moreover, the axial thickness TB of the baffle 23w is also much lower than the diameter 'D' of the turbine wheel 29w. In the specific embodiment shown, TB is around 2.25% of D.

Figure 47:
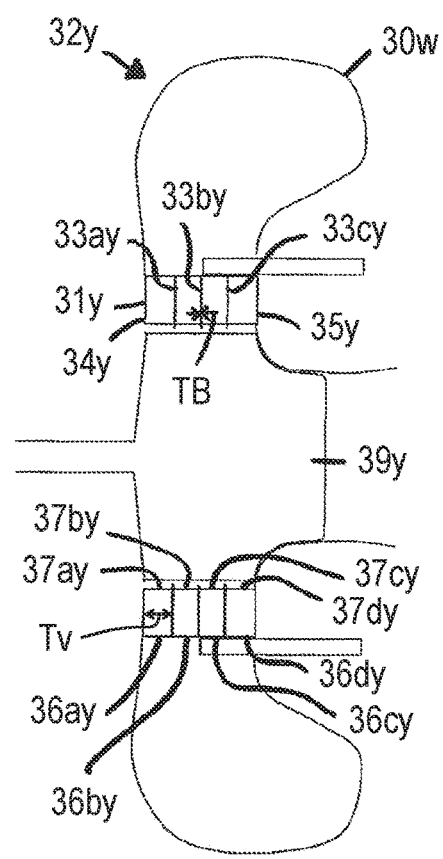
FIG. 47 is an axial cross-section through a turbine volute and annular inlet of a turbine according to a second embodiment of the present invention.

FIG. 47 shows an alternative embodiment of the present invention in which a turbine 32y incorporates a turbine volute 30w and an annular inlet 31y. Equiaxially spaced across the inlet 31y are three annular baffles 33ay, 33by, 33cy which, together with inner and outer sidewalls 34y, 35y of the inlet, define four axially offset annular inlet portions 36ay, 36by, 36cy, 36dy of equal axial width. Extending axially across each of the four inlet portions 36ay-dy are respective annular arrays of vanes 37ay, 37by, 37cy, 37dy of equivalent maximum axial thickness. The axial thickness 'TB' of each of the baffles 33ay-cy is significantly lower than the maximum axial thickness 'Tv' of each of the vanes 37ay-dy and is also much lower than the diameter 'D' of the turbine wheel 39y. In this embodiment shown, TB is around 2.25% of D.

It will be appreciated that in alternative embodiments the number and/or profile of vanes in an array may vary from one array to another, and/or the swirl angle defined by vanes in an array may vary from that defined by vanes in other arrays in the same nozzle structure.

Typically, exhaust gas flows to the annular inlet from a surrounding volute or chamber. The annular inlet is therefore defined downstream of the volute, with the downstream end of the volute terminating at the upstream end of the annular inlet. As such, the volute transmits the gas to the annular inlet, while the gas inlet passages of the present invention receive gas from the volute. In some embodiments, the first and second inlet sidewalls which define the annular inlet are continuations of walls which define the volute. The annular inlet may be divided into at least two axially offset inlet passages by one or more baffles located in the annular inlet, and which are therefore positioned downstream of the volute.

The turbine of the present invention has been illustrated in the figures using a single flow volute, however it is applicable to housings that are split axially, whereby gas from one or more of the cylinders of an engine is directed to one of the divided volutes, and gas from one or more of the other cylinders is directed to a different volute. It is also possible to split a turbine housing circumferentially to provide multiple circumferentially divided volutes, or even to split the turbine housing both circumferentially and axially. It should be appreciated, however, that an axially or circumferentially divided volute is distinguished from the multiple gas inlet passages present in the turbine of the present invention. For example, the gas inlet passages relate to a nozzle structure arranged to accelerate exhaust gas received from the volute towards the turbine, and optionally to adjust or control the swirl angle of the gas as it accelerates. The multiple gas inlet passages forming part of the present invention may be further distinguished from a divided volute arrangement in that, while the gas inlet passages receive gas from the volute (or divided volute), and split the gas into an array of paths directed on to the turbine, a divided volute receives gas from the exhaust manifold so as to retain the gas velocity in gas pulses resulting from individual engine cylinder opening events.

It will be appreciated that axially offset inlet passages include inlet passages with different axial positions and/or inlet passages with different axial extents. Axially offset inlet passages may be spaced apart, adjacent or axially overlapping.

Figure 48:
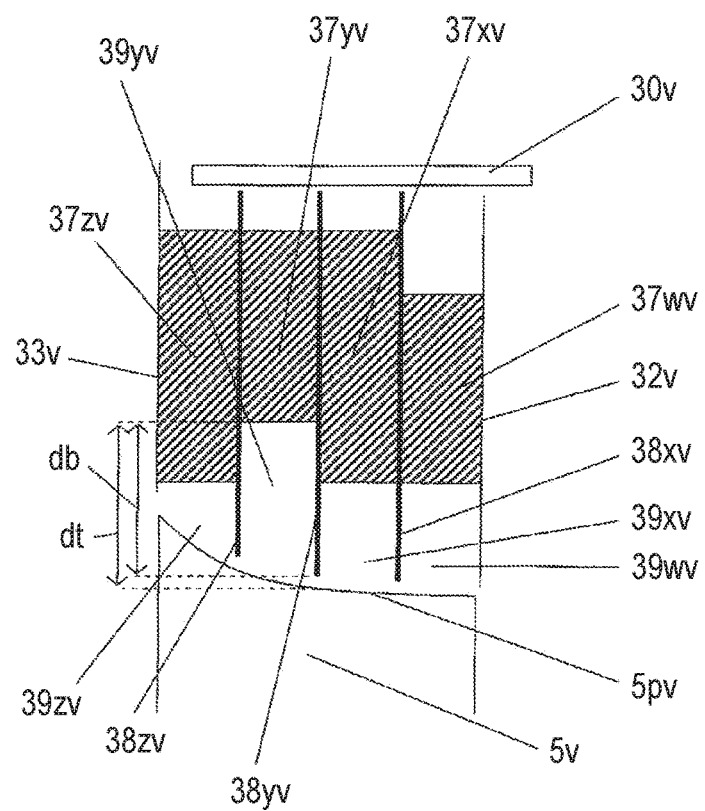
FIG. 48 shows a schematic illustration of a further embodiment of the present invention.

FIG. 48 shows a possible modification of the embodiment illustrated in FIGS. 8a-8c, and the same reference numerals are used where appropriate. As with the embodiment illustrated in FIGS. 8a-8c, it can be seen that vanes 37wv-37zv are not continuous across the full width of the inlet, but rather vanes defining each of the annular arrays of inlet passages 39wv-39zv have various configurations. The various configurations of vanes defining each of the annular arrays of inlet passages may be advantageous because in some embodiments it may be desirable for gas passing through the different annular arrays to have different flow characteristics and/or efficiencies depending on the axial location of the annular array.

The leading edges of vanes 37xv-37zv lie on the same outer radius, whereas the leading edge of vane 37wv lies on a different outer radius. The trailing edges of the vanes 37wv, 37xv and 37zv lie on the same inner radius, whereas the trailing edge of vane 37yv lies on a different inner radius. The radial extent of vanes 37wv and 37yv is the same, but different to that of the vanes 37xv and 37zv. In addition, it can be seen that the inlet baffles 38xv-38zv have a greater radial extent than at least some of the vanes 37v (in the illustrated embodiment it is greater than that of any of the vanes). That is, whilst they have substantially the same outer radius as the vanes 37v, the inner radius of the baffles 38av-38cv is significantly less than that of the vanes 37v, so that the baffles 38xv-38zv extend further towards the turbine wheel 5v than the vanes 37v (i.e. the baffles extend radially inboard of the vanes). In particular, each baffle extends radially inboard of the vanes in the inlet portions axially either side of it. For example, the baffle 38xv extends radially inboard of the vanes 37wv and 37xv. In some embodiments the baffle may extend radially inboard of vanes in only one adjacent inlet portion. The vanes in the other adjacent inlet portion may have a trailing edge which has the same radius (or diameter) as the inner radius (or diameter) of the baffle. It may be advantageous in some embodiments for the baffle to extend radially inboard of vanes in at least one of the adjacent inlet portions, because this limits flow communication and turbulence between axially adjacent inlet portions upstream of the turbine wheel.

In this particular embodiment each of the baffles 38xv-38zv has the same outer radial dimension (or outer diameter). In other embodiments at least one of the baffles may have a different outer radial dimension. In this particular embodiment each of the baffles 38xv-38zv has a different inner radial dimension (or inner diameter). In other embodiments only some of the baffles may have a different inner radial dimension. The inner radial dimensions (or inner diameters) of the baffles 38xv-38zv form a trend whereby the relative inner diameters of the baffles 38xv-38zv increase in an axial direction from inlet sidewall 32v to inlet sidewall 33v. It will be appreciated that in other embodiments, the inner radial dimensions (or inner diameters) of the baffles may form a trend whereby the relative inner diameters of the baffles decrease in an axial direction from inlet sidewall 32v to inlet sidewall 33v. In some embodiments the trend whereby the relative inner radial dimensions (or inner diameters) of the baffles increase/decrease in an axial direction between the inlet sidewalls may only be a general trend. For example, the relative inner radial dimensions (or inner diameters) of the baffles may generally increase in an axial direction between the inlet sidewalls, but at least one of the baffles may have a relative inner radial dimension which falls outside of the trend. A trend whereby the relative inner radial dimensions (or inner diameters) of the baffles increase/decrease in an axial direction between the inlet sidewalls may be advantageous in some embodiments as it may enable the flow characteristics of the gas passing through each inlet portion and being incident on the turbine wheel to vary across the inlet.

In this embodiment, the axial profile formed by the inner radial dimensions (or inner diameters) of the baffles 38xv-38zv generally corresponds to the axial profile of the surface 5pv swept by the rotation of the turbine wheel. In this embodiment, the radial separation between each of the baffles 38xv-38zv and the respective radially adjacent portion of the surface 5pv swept by the rotation of the turbine wheel is generally constant. It will be appreciated that in other embodiments the axial profile of the surface swept by the rotation of the turbine wheel may be different. It will also be appreciated that in some embodiments, only some of the baffles may have inner radial dimensions that form an axial profile which generally corresponds to the axial profile of the surface swept by the rotation of the turbine wheel. Embodiments where the axial profile formed by the inner radial dimensions (or inner diameters) of the baffles generally correspond to the axial profile of the surface swept by the rotation of the turbine wheel may be advantageous in that it enables the characteristics of gas flow through the inlet portions to the turbine wheel which are defined by the separation between the baffle and the turbine wheel to be kept constant across different inlet portions.

In this embodiment it can be seen that each of the baffles 38xv-38zv has an inner radial dimension (inner diameter) such that the radial distance relative to the turbine axis between the inner diameter of each baffle and the trailing edge of a vane of an inlet portion adjacent the baffle (which in the case where the vanes have different radial positions, may be a radially innermost vane) is more than generally 50% of the radial distance between the trailing edge of said vane and the outer diameter of the turbine wheel at the axial position of the baffle. For example, referring to baffle 38yv and adjacent vane 37yv, the baffle 38yv has an inner radial dimension (inner diameter) such that the radial distance db relative to the turbine axis between the inner diameter of the baffle and the trailing edge of the adjacent vane 37yv is more than generally 50% of the radial distance dt between the trailing edge of said vane and the outer diameter of the turbine wheel at the axial position of the baffle. In some embodiments the radial distance relative to the turbine axis between the inner diameter of a baffle and the trailing edge of a vane of an inlet portion adjacent the baffle may be generally 60%, generally 70%, generally 80%, generally 90% or generally 95% of the radial distance between the trailing edge of said vane and the outer diameter of the turbine wheel at the axial position of the baffle. That is to say that the radial distance relative to the turbine axis between the inner diameter of a baffle and the trailing edge of a vane of an inlet portion adjacent the baffle may be generally between 50% and 100%, between 50% and 60%, between 60% and 70%, between 80% and 90%, between 90% and 95% or between 95% and 100% of the radial distance between the trailing edge of said vane and the outer diameter of the turbine wheel at the axial position of the baffle. By ensuring that the radial distance relative to the turbine axis between the inner diameter of a baffle and the trailing edge of a vane of an inlet portion adjacent the baffle is a large proportion of the radial distance between the trailing edge of said vane and the outer diameter of the turbine wheel at the axial position of the baffle, this may help to prevent unwanted expansion of gas passing through the inlet portions before thy pass the turbine wheel. This feature may also help to prevent flow communication and turbulence between adjacent inlet portions upstream of the turbine wheel. Furthermore it may be advantageous in helping to prevent gas flowing from the inlet portions around the turbine wheel, without exerting significant force on the turbine wheel. A practical limit as to how close the baffles can extend towards the outer surface of the turbine wheel may be provided by when the skin effect (due to skin friction caused by the proximity of the turbine wheel to the baffles) negatively affects performance of the turbine wheel.

Figure 49:
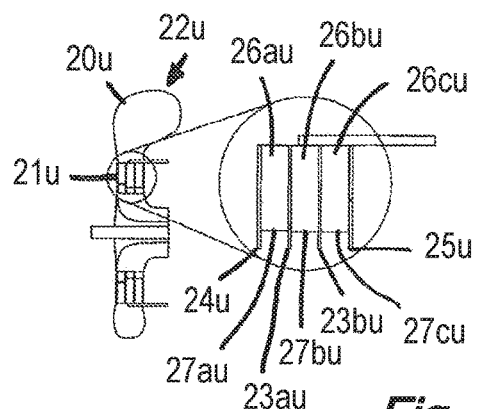
FIG. 49 is an axial cross-section through a turbine volute and annular inlet of a turbine according to an embodiment of the present invention.

In FIG. 49 there is shown a turbine volute 20u and annular inlet 21u of a turbine 22u according to an embodiment of the present invention. Equiaxially spaced across the inlet 21u are two annular baffles 23au, 23bu which, together with inner and outer sidewalls 24u, 25u of the inlet, define three axially offset annular inlet portions 26au, 26bu, 26cu of equal axial width. Extending axially across each of the three inlet portions 26au-cu are respective annular arrays of vanes 27au, 27bu, 27cu having differing arrangements so as to constrict the area accessible to gas flowing through the annular arrays 27au-cu to differing extents.

Figure 54:
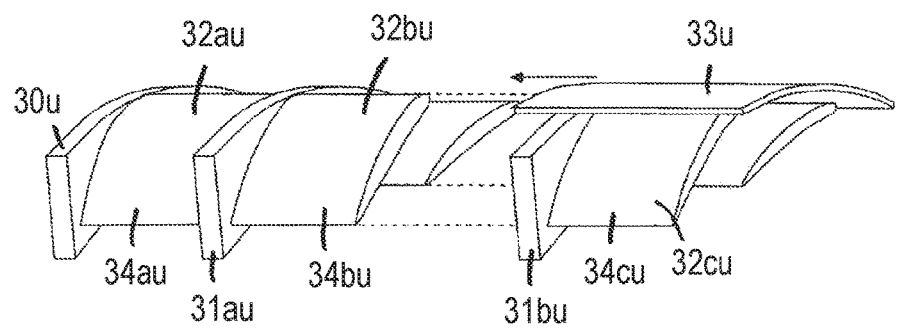
FIG. 54 is a perspective illustration of components of a section of a nozzle structure forming part of a turbine according to the embodiment of FIG. 49 composed of an inlet sidewall, baffles, vanes and an axially slidable sleeve.

FIG. 54 is an illustration of components of a section of a nozzle structure forming part of a turbine according to the embodiment of FIG. 49. A perspective view of the nozzle structure is shown which comprises of an inlet sidewall 30u, first and second axially spaced baffles 31au, 31bu, three annular arrays of axially extending vanes 32au, 32bu, 32cu and an axially slidable sleeve 33u. Each array of vanes 32au-cu is comprised of a plurality of vanes 34au, 34bu,

34*cu*. Of the three arrays 32*au-cu*, the array 32*cu* furthest from the "closed position" of the sleeve 33*u*, i.e. when the sleeve 33*u* covers the entire turbine inlet and overlies the sidewall 30*u*, includes the smallest number of vanes 34*cu*. The middle array 32*bu* contains more vanes 32*bu*, while the array 32*au* closest to the "closed position" of the sleeve 33*u*, i.e. the array 32*au* which lies in the annular inlet portion which is bordered on one side by the inlet sidewall 30*u*, contains the largest number of vanes 34*au*. In this way, the array 32*au* closest to the "closed position" of the sleeve 33*u* presents the greatest constriction to gas flowing through the annular inlet, while the array 32*cu* lying furthest away from the "closed position" of the sleeve 33*u* presents the least constriction to gas flow through the annular inlet.

In FIG. 50 there is shown a turbine volute 120*u* and annular inlet 121*u* of a turbine 122*u* according to an embodiment of the present invention. Equiaxially spaced across the inlet 121*u* are two annular baffles 123*au*, 123*bu* which, together with inner and outer sidewalls 124*u*, 125*u* of the inlet, define three axially offset annular inlet portions 126*au*, 126*bu*, 126*cu* of equal axial width. Extending axially across each of the three inlet portions 126*au-cu* are respective annular arrays of vanes 127*au*, 127*bu*, 127*cu* of differing maximum circumferential thickness, i.e. width in radial cross-section, for instance as viewed in FIG. 55B or 55C.

FIG. 55 is an illustration of components of a section of a nozzle structure forming part of a turbine according to the embodiment of FIG. 50. A perspective view of the nozzle structure is shown in FIG. 55(A) and comprises of an inlet sidewall 130*u*, first and second axially spaced baffles 131*au*, 131*bu*, three annular arrays of axially extending vanes 132*au*, 132*bu*, 132*cu* and an axially slidable sleeve 133*u*. FIG. 55(B) shows radial cross-sectional views of the three annular arrays of vanes 132*au-cu* comprised in the nozzle structure shown in FIG. 55(A). FIG. 55(C) shows a detailed radial cross-sectional view of a respective vane 134*au*, 134*bu*, 134*cu* in each of the three arrays of vanes 132*au-cu*. The circumferential thickness of each vane 134*au-cu* in each array 132*au-cu* is indicated by a double headed arrow within each vane 134*au-cu* in FIG. 55(C).

As can be observed from FIGS. 55(B) and 55(C) the vanes 134*cu* in the array 132*cu* furthest from the "closed position" of the sleeve 133*u*, i.e. when the sleeve 133*u* covers the entire turbine inlet and overlies the sidewall 130*u*, are circumferentially thinner and thereby define a smaller radial cross-sectional area than the vanes 134*bu* in the middle array 132*bu*, which are in turn, circumferentially thinner than the vanes 134*au* in the array 132*au* closest to the "closed position" of the sleeve 133*u*, i.e. the vanes 134*au* which lie in the annular inlet portion which is bordered on one side by the inlet sidewall 130*u*. In the embodiment illustrated in FIG. 55 the three arrays of vanes 132*au-cu* each contain the same total number of vanes 134*au-cu* and each define a similar swirl angle. It will be appreciated however that in alternative embodiments the number of vanes in an array may vary from one array to another, and/or the swirl angle defined by vanes in an array may vary from that defined by vanes in other arrays in the same nozzle structure.

In FIG. 51 there is shown a turbine volute 220*u* and annular inlet 221*u* of a turbine 222*u* according to an embodiment of the present invention. Equiaxially spaced across the inlet 221*u* are two annular baffles 223*au*, 223*bu* which, together with inner and outer sidewalls 224*u*, 225*u* of the inlet, define three axially offset annular inlet portions 226*au*, 226*bu*, 226*cu* of equal axial width. Extending axially across each of the three inlet portions 226*au-cu* are respective annular arrays of vanes 227*au*, 227*bu*, 227*cu* of differing maximum circumferential thickness, i.e. width in radial cross-section, for instance as viewed in FIG. 56B or 56C.

FIG. 56 is an illustration of components of a section of a nozzle structure forming part of a turbine according to the embodiment of FIG. 51. A perspective view of the nozzle structure is shown in FIG. 56(A) and comprises of an inlet sidewall 230*u*, first and second axially spaced baffles 231*au*, 231*bu*, three annular arrays of axially extending vanes 232*au*, 232*bu*, 232*cu* and an axially slidable sleeve 233*u*. FIG. 56(B) shows radial cross-sectional views of the three annular arrays of vanes 232*au-cu* comprised in the nozzle structure shown in FIG. 56(A). FIG. 56(C) shows a detailed radial cross-sectional view of a respective vane 234*au*, 234*bu*, 234*cu* in each of the three arrays of vanes 232*au-cu*. The thickness of each respective leading edge 235*au*, 235*bu*, 235*cu* of each vane 234*au-cu* in each array 232*au-cu* is directly related to a respective angle 236*au*, 236*cu*, 236*cu* defined as shown in FIG. 56(C). The maximum circumferential thickness of each vane 234*au-cu* in each array 232*au-cu* is indicated by a double headed arrow within each vane 234*au-cu* in FIG. 56(C).

As can be observed from FIGS. 56(B) and 56(C) the vanes 234*cu* in the array 232*cu* furthest from the "closed position" of the sleeve 233*u*, i.e. when the sleeve 233*u* covers the entire turbine inlet and overlies the sidewall 230*u*, have thinner leading edges 235*cu*, which in turn have thinner leading edges 235*bu* than the vanes 234*au* in the array 232*au* closest to the "closed position" of the sleeve 233*u*, i.e. the vanes 234*au* which lie in the annular inlet portion which is bordered on one side by the inlet sidewall 230*u*. In spite of the difference in leading edge thickness, the vanes 234*au-cu* in the three arrays of vanes 232*au-cu* all possess substantially the same circumferential thickness (indicated by a double headed arrow within each vane in FIG. 56(C)). In an alternative embodiment, the vanes 234*au-cu* in the three arrays 232*au-cu* may have different maximum circumferential thicknesses, for instance, the array of vanes 232*au* with the thickest leading edges 235*au* may also possess the largest maximum circumferential thickness as compared to the other two arrays 232*bu-cu*. In the embodiment illustrated in FIG. 56 the three arrays of vanes 232*au-cu* each contain the same total number of vanes 234*au-cu* and each define a similar swirl angle. It will be appreciated however that in alternative embodiments the number of vanes in an array may vary from one array to another, and/or the swirl angle defined by vanes in an array may vary from that defined by vanes in other arrays in the same nozzle structure.

In FIG. 52 there is shown a turbine volute 320*u* and annular inlet 321*u* of a turbine 322*u* according to an embodiment of the present invention. Equiaxially spaced across the inlet 321*u* are two annular baffles 323*au*, 323*bu* which, together with inner and outer sidewalls 324*u*, 325*u* of the inlet, define three axially offset annular inlet portions 326*au*, 326*bu*, 326*uc* of equal axial width. Extending axially across each of the three inlet portions 326*au-cu* are respective annular arrays of vanes 327*au*, 327*bu*, 327*cu* of differing maximum outer diameter, i.e. width in radial cross-section. As can be seen in FIG. 52, the vane 327*au* has a smaller radial extent and thus defines a smaller maximum outer diameter than the two other vanes 327*bu-cu*. This is further described below in relation to FIG. 57.

FIG. 57 is an illustration of components of a section of a nozzle structure forming part of a turbine according to the embodiment of FIG. 52. A perspective view of the nozzle structure is shown in FIG. 57(A) and comprises of an inlet sidewall 330*u*, first and second axially spaced baffles 331*au*, 331*bu*, three annular arrays of axially extending vanes 332*au*, 332*bu*, 332*cu* and an axially slidable sleeve 333*u*. FIG. 57(B) shows radial cross-sectional views of the three annular arrays of vanes 332*au-cu* comprised in the nozzle structure shown in FIG. 57(A). Each array of vanes 332*au-cu* is comprised of a plurality of equiangularly spaced vanes 334*au*, 334*bu*, 334*cu* of similar radial cross-sectional profile in that the leading edge of each vane 334*au-cu* is the same thickness, the maximum circumferential thickness of each vane 334*au-cu* is the same, and the radial cross-sectional area of each vane 334*au-cu* is the same.

As can be observed from FIG. 57(B) the vanes 334*bu-cu* in the arrays 332*bu-cu* furthest from the "closed position" of the sleeve 333*u*, i.e. when the sleeve 333*u* covers the entire turbine inlet and overlies the sidewall 330*u*, extend radially outwards to a greater extent and thereby define a greater maximum outer diameter than the vanes 334*au* in the array 332*au* closest to the "closed position" of the sleeve 333*u*, i.e. the vanes 334*au* which lie in the annular inlet portion which is bordered on one side by the inlet sidewall 330*u*. In the embodiment shown in FIG. 57 the vanes 334*au-cu* in the three arrays 332*au-cu* all possess trailing edges lying on the same inner radius, i.e. defining the same maximum inner diameter. This does not have to be the case, however. One or more arrays 332*au-cu* may define a greater maximum inner diameter than one or more other arrays 332*au-cu*. Moreover, in a further alternative embodiment the arrays of vanes 332*au-cu* may each define a different maximum outer diameter.

In the embodiment illustrated in FIG. 57 the three arrays of vanes 332*au-cu* each contain the same total number of vanes 334*au-cu* and each define a similar swirl angle. It will be appreciated however that in alternative embodiments the number of vanes in an array may vary from one array to another, and/or the swirl angle defined by vanes in an array may vary from that defined by vanes in other arrays in the same nozzle structure.

In FIG. 53 there is shown a turbine volute 420*u* and annular inlet 421*u* of a turbine 422*u* according to an embodiment of the present invention. Equiaxially spaced across the inlet 421*u* are two annular baffles 423*au*, 423*bu* which, together with inner and outer sidewalls 424*u*, 425*u* of the inlet, define three axially offset annular inlet portions 426*au*, 426*bu*, 426*cu* of equal axial width. Extending axially across each of the three inlet portions 426*au-cu* are respective annular arrays of vanes 427*au*, 427*bu*, 427*cu* of differing maximum inner diameter, i.e. width in radial cross-section. As can be seen in FIG. 53, the array of vanes 427*au* has a smaller radial extent and defines a greater maximum inner diameter and a greater radial clearance between the vanes 427*au* and the turbine wheel 428*u* than the middle vanes 427*bu*. In a similar way, the middle array of vanes 427*bu* has a smaller radial extent and defines a greater maximum inner diameter and a greater radial clearance between the vanes 427*bu* and the turbine wheel 428*u* than the vanes 427*cu*. This is further described below in relation to FIG. 58.

FIG. 58 is an illustration of components of a section of a nozzle structure forming part of a turbine according to the embodiment of FIG. 53. A perspective view of the nozzle structure is shown in FIG. 58(A) and comprises of an inlet sidewall 430*u*, first and second axially spaced baffles 431*au*, 431*bu*, three annular arrays of axially extending vanes 432*au*, 432*bu*, 432*cu* and an axially slidable sleeve 433*u*. FIG. 58(B) shows radial cross-sectional views of the three annular arrays of vanes 432*au-cu* comprised in the nozzle structure shown in FIG. 58(A). Each array of vanes 432*au-cu* is comprised of a plurality of equiangularly spaced vanes 434*au*, 434*bu*, 434*cu* of similar radial cross-sectional profile in that the leading edge of each vane 434*au-cu* is the same thickness, the maximum circumferential thickness of each vane 434*au-cu* is the same, and the radial cross-sectional area of each vane 434*au-cu* is the same.

As can be observed from FIG. 58(B) the vanes 434*cu* in the array 432*cu* furthest from the "closed position" of the sleeve 433*u*, i.e. when the sleeve 433*u* covers the entire turbine inlet and overlies the sidewall 430*u*, extend radially inwards to a greater extent and thereby define a smaller maximum inner diameter than the vanes 434*bu* in the middle array 432*bu*, which, in turn, define a smaller maximum inner diameter than the vanes 434*au* in the array 432*au* closest to the "closed position" of the sleeve 433*u*, i.e. the vanes 434*au* which lie in the annular inlet portion which is bordered on one side by the inlet sidewall 430*u*. Moreover, the radial clearance defined between the trailing edges of the vanes 434*au-cu* and the turbine wheel (not shown in FIG. 58) increases progressively from the array 434*cu* furthest from the closed position of the sleeve to the array 434*au* closest to the closed position of the sleeve. By virtue of the different orientation of the vanes 432*au-cu* within each array 434*au-cu* the swirl angle generated by the arrays of vanes 434*au-uc* also increases progressively from the array 434*cu* furthest from the closed position to the array 434*au* closest to the closed position.

In the embodiment shown in FIG. 58 the vanes 434*au-cu* in the three arrays 432*au-cu* all possess leading edges lying on the same outer radius, i.e. defining the same maximum outer diameter. This does not have to be the case, however. One or more arrays 432*au-cu* may define a greater maximum outer diameter than one or more other arrays 432*au-cu*. Moreover, in a further alternative embodiment two of the arrays of vanes 432*au-cu* may define a first maximum inner diameter which is different to that of the other of the arrays 432*au-cu*.

In the embodiment illustrated in FIG. 58 the three arrays of vanes 432*au-cu* each contain the same total number of vanes 434*au-cu*. It will be appreciated however that in alternative embodiments the number of vanes in an array may vary from one array to another in the same nozzle structure.

Figure 59:
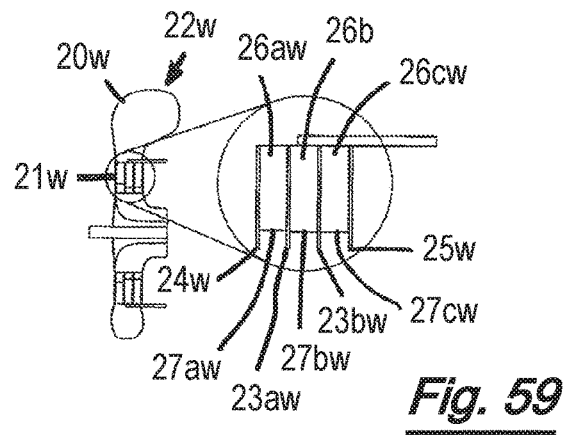
FIG. 59 is an axial cross-section through a turbine volute and annular inlet of a turbine according to an embodiment of the present invention.

In FIG. 59 there is shown a turbine volute 20*w* and annular inlet 21*w* of a turbine 22*w* according to an embodiment of the present invention. Equiaxially spaced across the inlet 21*w* are two annular baffles 23*aw*, 23*bw* which, together with inner and outer sidewalls 24*w*, 25*w* of the inlet, define three axially offset annular inlet portions 26*aw*, 26*bw*, 26*cw* of equal axial width. Extending axially across each of the three inlet portions 26*aw-cw* are respective annular arrays of vanes 27*aw*, 27*bw*, 27*cw*. The baffles 23*aw-bw* and vanes 27*aw-cw* together represent a nozzle assembly located within the annular inlet 21*w* which directs exhaust gases flowing from the turbine volute 20 on to the blades of turbine 22*w* in the most appropriate manner to suit the operating requirements of the turbine 22*w*. While not visible in FIG. 59, each vane in the outer arrays vanes 27*aw*, 27*cw* incorporates a finger which extends axially inwards from the inner edge of the vane towards the adjacent inner baffle 23*aw*, 23*bw* respectively, while each vane in the middle array of vanes 27*bw* incorporates a pair of fingers one extending axially outwards from each of the opposite edges of the vane which are received in complementary depressions defined by each of the baffles 23*aw-bw*. In an alternative embodiment, the baffle 23*aw* supports the vanes 27*aw* and the baffle 23*bw* supports the vanes 27*bw*. The vanes 27*cw* are supported by the inlet sidewall 25*w*. The two baffles 23*aw-bw* and their respective arrays of vanes 27*aw-bw* are substantially identical in size and shape and as such represent modular components that have been assembled, together with the vanes 27*cw* to provide the nozzle assembly shown within the turbine inlet 21*w*.

Figure 60:
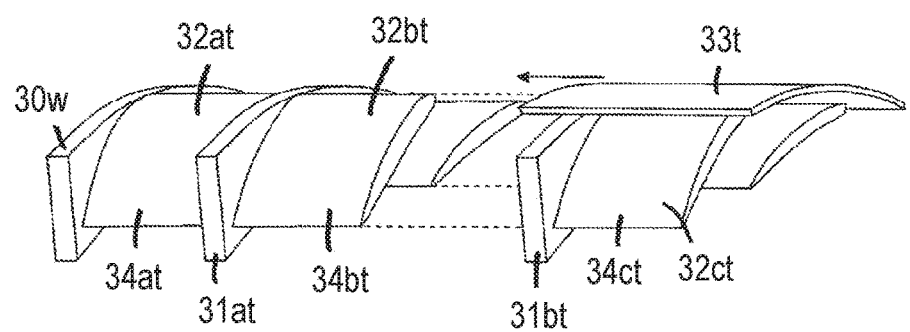
FIG. 60 is a perspective illustration of components of a section of a nozzle structure forming part of a turbine according to an embodiment of the present invention composed of an inlet sidewall, baffles, vanes and an axially slidable sleeve.

FIG. 60 is an illustration of components of a section of a nozzle assembly forming part of a turbine according to an embodiment of the present invention. A perspective view of the nozzle assembly is shown in combination with an inlet sidewall 30*w* of a turbine inlet passageway. The nozzle assembly comprises first and second axially spaced baffles 31*at*, 31*bt* and three annular arrays of axially extending vanes 32*at*, 32*bt*, 32*ct*. An axially slidable sleeve 33*t* is disposed around the outer diameter of the vane arrays 32*at-bt* and is actuated to vary the axial width of the turbine inlet passageway and in doing so, the "throat" of the turbine. Each array of vanes 32*at-ct* is comprised of a plurality of vanes 34*at*, 34*bt*, 34*ct*. While not visible in FIG. 60, each vane 34*at*, 34*ct* in the outer arrays vanes 32*at*, 32*ct* incorporates an axially inwardly extending projection which is received in a set of complementary depression formed in the axially adjacent baffle 31*at*, 31*bt* respectively, and each vane 34*bt* in the middle array of vanes 32*bt* incorporates a pair of projections extending axially from the opposite edges of the vane 34*bt* which are received in complementary depressions defined by each of the baffles 31*at-bt*. In an alternative embodiment, the baffle 31*at* supports the vane array 32*bt* and the baffle 31*b* tsupports the vane array 32*ct*. The vane array 32*at* is supported by the inlet sidewall 30*w*. The two baffles 31*at-tb* and their respective arrays of vanes 32*bt-ct* are of modular design and have been produced from the same casting. As such, the nozzle assembly can be manufactured in a more cost-effective manner than if the two baffles 31*at-bt* and three arrays of vanes 32*at-ct* had been produced separately.

While both of the embodiments shown in FIGS. 59 and 60 employ vanes it will be appreciated that one or more of said vanes or arrays of vanes could be replaced with an alternative form of axially extending formation, such as material having a honeycomb-like internal structure. Moreover, in alternative embodiments the co-operating features may both be defined on the baffles or both on vanes or other axially extending formations.

Figure 61:
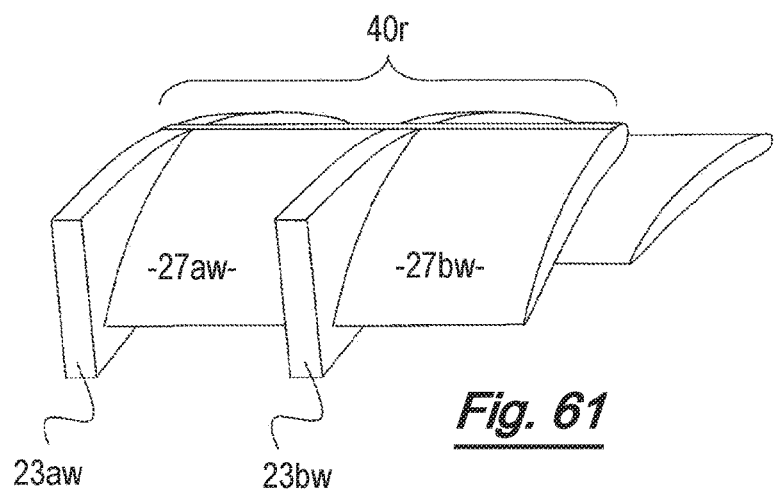
FIG. 61 is a perspective view of baffles, vanes and a guide for guiding movement of a sleeve, in accordance with an embodiment of the present invention.

Referring once again to FIG. 37, movement of the sleeve 28*w* in the axial direction may result in the sleeve 28*w* impacting one or more of the baffles 23*aw*, 23*bw* or vanes 27*aw*, 27*bw*, 27*cw*. Such impact may result in jamming or sticking of the sleeve 28*w*, which is undesirable. According to an embodiment of the present invention, this problem may be at least partially overcome by providing a guide (which may be referred to as a running guide) for guiding the axial movement of the cylindrical sleeve 28. The guide is at least partially located within the annular inlet at a radially extent of the inlet portions 26*aw*, 26*bw*, 26*cw*, and extends in a substantially axial direction, parallel to the turbine axis. The guide may be located at a radially outer or inner extent of the inlet portions 26*aw*, 26*bw*, 26*cw*, depending on the configuration of the sleeve 28*w*. The arrangement shown in FIG. 37 comprises such a guide, although this guide is not visible in the Figure. FIG. 61 is used to describe the guide.

FIG. 61 is a perspective view of baffles 23*aw*, 23*bw* and vanes 27*bw*, 27*cw*. A guide 40*r* is shown as comprising leading edges of the vanes 27*bw*, 27*cw*, the edges being at an outer radial extent of inlet portions defined by the baffles 23*aw*, 23*bw*. The leading edges of the vanes 27*bw*, 27*cw* extend in a linear, substantially continuous manner, parallel to the turbine axis. The continuity is only broken by the presence of the baffles 23*aw*, 23*bw*, the radially outer extent of which is preferably flush with the edges of the vanes 27*bw*, 27*cw* that form the guide 40*r*. In use, the sleeve may be moved along the guide 40*r*.

In this embodiment, the sleeve has an inner diameter greater than an outer diameter of the inlet portion—i.e. the sleeve surrounds the inlet portions. If, in for example another embodiment, the sleeve has an outer diameter that is less than an inner diameter of the inlet portions—i.e. the inlet portions surround the sleeve—the one or more vane edges may be trailing edges, for example defining a guide at an inner radial extent of the vanes and/or inlet portions.

Figure 62:
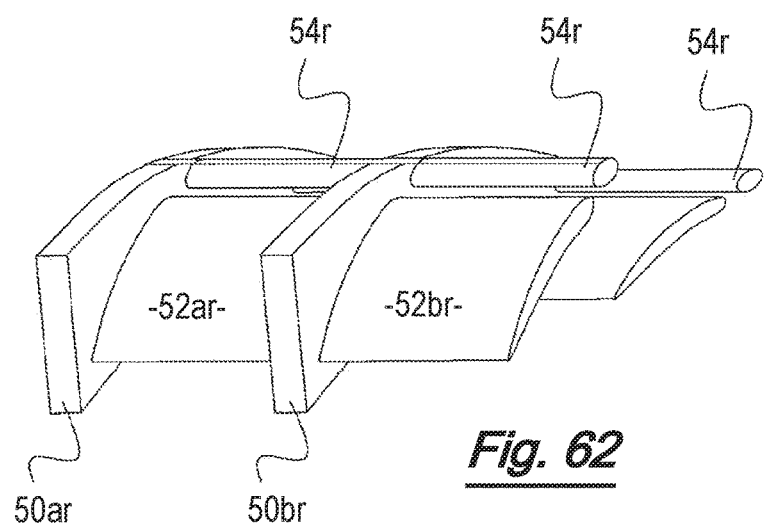
FIG. 62 is a perspective view of baffles, vanes and a guide for guiding movement of a sleeve, in accordance with another embodiment of the present invention.

FIG. 62 schematically depicts another embodiment of the present invention. FIG. 62 is a perspective view of baffles 50*ar*, 50*br* and vanes 52*ar*, 52*br*. A guide is shown as comprising elongate members 54*r*. The elongate members 54*r* are located at an outer radially extent of the inlet portions defined by the baffles 50*ar*, 50*br*. A plurality of elongate members 54*r* are provided which are aligned in a linear, substantially continuous manner in between baffles 50*ar*, 50*br*, extending parallel to the turbine axis. The continuity is only broken by the presence of the baffles 50*ar*, 50*br*, the radially outer extent of which is preferably flush with an outer radial extent of the elongate members 54*r* that form the guide. In use, the sleeve may be moved along the guide.

The guide or guides in the form of elongate members (which are, in generally axially extending) may undesirably affect the flow of gas through the inlet. To minimise this undesirable effect, the guide or guides may be aligned with leading or trailing edges of vanes or other structures (preferably axially extending) provided in one or both inlet portions or passages in those portions.

In another, related embodiment, an elongate member, or a plurality of elongate members may not extend between baffles. Instead, the members may extend across one or more baffles, so that the radially outer extent of the baffles does not need to be flush with an outer radial extent of the elongate members that form the guide.

In the embodiment shown in FIG. 62, the sleeve has an inner diameter greater than an outer diameter of the inlet portions—i.e. the sleeve surrounds the inlet portions. If, in for example another embodiment, the sleeve has an outer diameter that is less than an inner diameter of the inlet portions—i.e. the inlet portions surround the sleeve—the one or more elongate members may be located at an inner radially extent of the inlet portions.

Locating the guide of the present invention at least partially within the inlet ensures that the sleeve is properly guided within the inlet itself, where forces due to gas flow are greatest and where impact of the sleeve with vanes or baffles might otherwise occur. The sleeve might also be guided by a channel or the like in a housing of the turbine, for example. However, a guide in the housing might, alone, be insufficient to prevent impact of the sleeve with vanes or baffles in the inlet.

In any embodiment, a single guide extending in an axial direction may be provided. More than one guide may be provided, for example diametrically opposed guides, or guides located at certain locations around the inlet (e.g. three, four, five or more equally space locations, or at the location of a leading edge of a vane, at the location of each vane, or at the location of a group of vanes). A single guide may, instead, be understood as comprising sub-guides or guide parts or the like, which for example may be diametrically opposed sub-guides or guide parts, or sub-guides or guide parts that are located at certain locations around the inlet (e.g. three, four, five or more equally space locations, or at the location of a leading edge of a vane, at the location of each vane, or at the location of a group of vanes).

Although not visible in FIG. 37, one, more or all of a portion of an extremity of the baffles 23aw, 23bw, a portion of an extremity of the vanes 27aw, 27bw, 27cw and/or a leading end of the sleeve 28w may be provided with an inclined surface for facilitating movement of the sleeve 28w across the baffle 23aw, 23bw and/or vane 27aw, 27bw, 27cw. The inclined surface is provided on a surface which might contact with the sleeve 28w, vane 27aw, 27bw, 27cw and/or baffle 23aw, 23bw.

Without such an inclined surface, the sleeve 28w might be more likely to come up against a more readily opposable surface (e.g. two flat faces or edges coming together), which might cause the sleeve 28w to jam, or which might at least cause sticking of the sleeve 28w, or excessive wear of the sleeve 28w, baffles 23aw, 23bw, or vanes 27aw, 27bw, 27cw.

Figure 63:
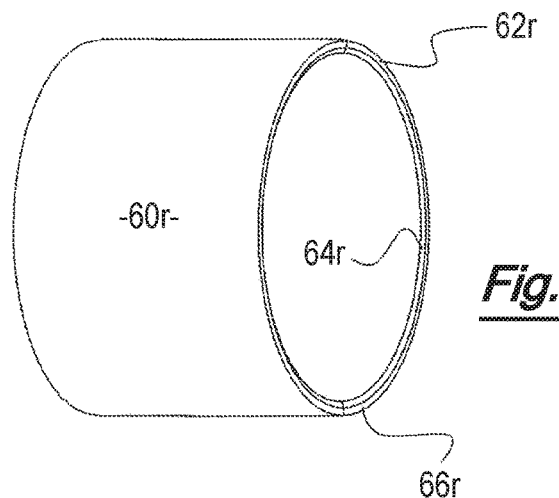
FIG. 63 is a perspective view of a sleeve in accordance with an embodiment of the present invention.

FIG. 63 shows an embodiment of a sleeve 60r. In this embodiment, an inner diameter of the sleeve 60r is greater than an outer diameter of the inlet portions discussed above—i.e. the sleeve 60r surrounds the inlet portions. A radially inner portion of a leading end 62r of the sleeve 60r is provided with an inclined surface 64r in the form of a chamfer for facilitating movement of the sleeve 60r across the baffles and/or vanes that form the inlet portions or passages. An outer radially portion 66r of the leading end 62r of the sleeve need not comprise an inclined surface, since the outer radially extent is remote from, and will thus not come into contact with, the vanes or baffles.

Figure 64A:
FIGS. 64*a* to 64*e* depict different examples of inclined surfaces that may be used in accordance with embodiments of the present invention.
Figure 64B:
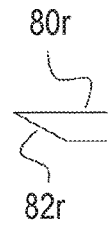
Figure 64C:

FIGS. 64a, 64b and 64c depict different examples of inclined surfaces that may be used in accordance with embodiments of the present invention. FIG. 64a depicts a portion of an object 70r (e.g. a portion of a sleeve, baffle or vane) provided with a chamfer 72r. FIG. 64b depicts a portion of an object 80r (e.g. a portion of a sleeve, baffle or vane) provided with a bevel 82r. FIG. 64c depicts a portion of an object 90r (e.g. a portion of a sleeve, baffle or vane) provided with a rounded edge 92r.

Figure 64D:
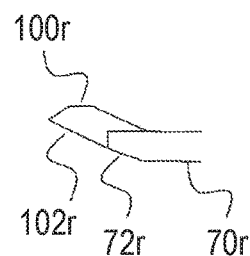

FIG. 64d shows that the inclined surface of FIG. 64a, for example, could be extended by the provision of a further structure 100r (e.g. a lip, a cap or the like) having or providing a further inclined surface 102r.

Figure 64E:
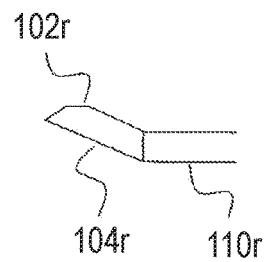

FIG. 64e shows an object 110r with no inclined surface. The object 110r can be provided with an inclined surface by the provision of a further structure 112r (e.g. a lip, a cap or the like) having or providing a further inclined surface 114r.

Figure 65:
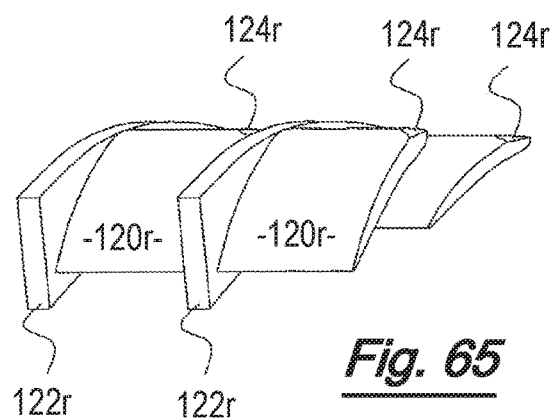
FIG. 65 is a perspective view of vanes provided with inclined surfaces, in accordance with an embodiment of the present invention.
Figure 66:
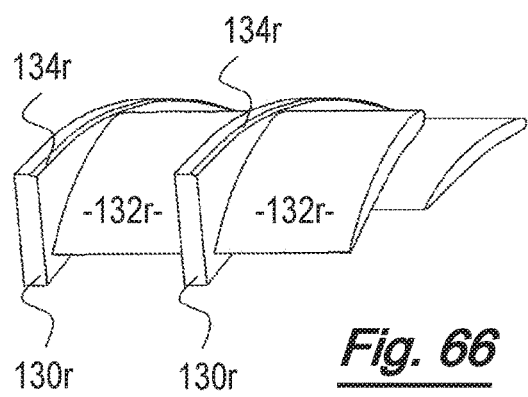
FIG. 66 is a perspective view of baffles provided with inclined surfaces, in accordance with an embodiment of the present invention

Due to manufacturing tolerances, or by deliberate design (e.g. for performance reasons), the baffles and vanes may not have an identical outer radial extent. FIGS. 65 and 66 depict examples where the baffles and vanes do not have the same outer radial extent.

FIG. 65 shows vanes 120r extending, in a radially direction, slightly beyond a radially extent of baffles 122r. Because the vanes 120r extend slightly beyond a radially extent of baffles 122r, the vanes 120r are more likely to be impacted by, and potentially cause jamming of, a sleeve moving across those vanes 120r. For this reason, an extremity of the vanes 120r (at least) is provided with an inclined surface 124r for facilitating movement of the sleeve across vanes 120r.

In another embodiment (not shown), and alternatively or additionally, the problem identified in the preceding paragraph may be obviated or mitigated by providing a leading end of the sleeve with one or more discrete (i.e. not extending around the entire circumference of the sleeve) inclined surfaces distributed around a circumference of the sleeve, the location or locations of which coincide with a location of a vane. For example, a plurality or an array of such discrete inclined surfaces may be distributed around a circumference of the leading end of the sleeve to coincide with a plurality or an array of vanes circumferentially distributed around the inlet (e.g. within the inlet portions).

FIG. 66 shows baffles 130r extending, in a radially direction, slightly beyond a radially extent of vanes 132r. Because the baffles 130 extend slightly beyond a radially extent of baffles 130r, the baffles 130r are more likely to be impacted by, and potentially cause jamming of, a sleeve moving across those baffles 130r. For this reason, an extremity of the baffles 130r (at least) is provided with an inclined surface 134r for facilitating movement of the sleeve across baffles 130r.

In a different but related embodiment, or sets of embodiments, an outer diameter of the sleeve is less than an inner diameter of the inlet portions discussed above—i.e. the sleeve is surrounded by the inlet portions. A radially outer portion of a leading end of the sleeve may be provided with an inclined surface in the form of a chamfer or the like (e.g. any inclined surface) for facilitating movement of the sleeve across the baffles and/or vanes that form the inlet portions or passages. In this embodiment, or set of embodiments, a portion of the radially inner (as opposed to outer) extremities of the baffles or vanes that are provided with the inclined surfaces, since in these embodiments the sleeve will move over these portions.

The inclined surface may not extend around an entire circumference of the sleeve, or along an entire circumference of an annular baffle, or be provided on each and every vane. Instead, the inclined surface or surfaces may be discrete, and located at appropriate parts or sections of the sleeve and/or baffle, or only on certain vanes. For example, the inclined surface may only need to be provided where there is likely to be (or would otherwise likely to be) opposed (e.g. potentially jamming) contact between the sleeve and baffles and/or vanes.

The inclined surface or surfaces of the vanes or baffles will, in general, be located and/or oriented to face toward a leading end of the sleeve, such that the sleeve is able to ride along and over the inclined surface.

The sleeve 28w in FIG. 37 may form part of a sleeve assembly. The sleeve assembly comprises the sleeve 28w and an actuator for affecting movement of the sleeve 28w. The actuator may affect the movement by moving the sleeve 28w in a certain way, or constraining or controlling movement in a certain way. The actuator, or a part thereof, may form a part of, or be provided in or on, the sleeve 28w. In accordance with an embodiment of the present invention, a helical interface is present in the sleeve assembly. The helical interface is arranged to induce, in use, helical movement of a part of the sleeve assembly. The helical movement of a part of the assembly (which may be a part of or all of the actuator, or of the sleeve) ensures, or at least promotes, a more uniform distribution of forces on the sleeve during movement of the sleeve, which may assist in ensuring or promoting coaxial movement of the sleeve. Such coaxial movement may reduce the chances of the sleeve abutting against one or more baffles or vanes, which could otherwise result in sticking or jamming of the sleeve. Such sticking or jamming is undesirable.

Figure 67:
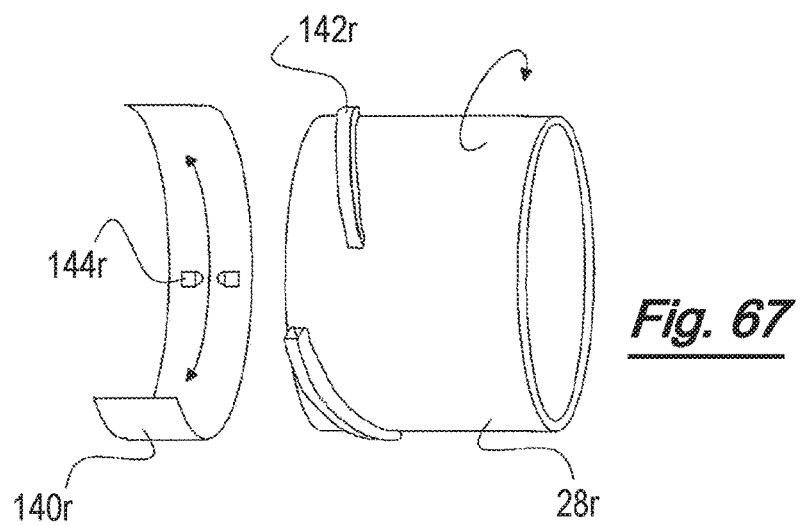
FIG. 67 is a perspective view of a sleeve assembly in accordance with an embodiment of the present invention.

The sleeve assembly used in FIG. 37 is shown in more detail in FIG. 67. FIG. 67 shows an expanded view of the sleeve assembly. The sleeve assembly comprises the sleeve 28r and an actuator part in the form of a rotatable collar 140r. In practice, the rotatable collar 140r completely surrounds the sleeve 28r. However, this is not shown in the Figure, for reasons of clarity.

The sleeve 28r is provided with one or more helical ribs 142r. An inner surface of the rotatable collar is provided with one or more bearings 144 for engaging with opposing sides of the one or more helical ribs 142r. The rotatable collar 140r is fixed in position axially.

In use, the rotatable collar 140r is rotated, for example by another part of the actuator (not shown). Rotation of the rotatable collar 140r causes the one or more helical ribs 144r to move between bearings 144r. Because the rotatable collar 140r is fixed in position axially, and because the one or more ribs 142r are helical, rotation of the rotatable collar 140r causes helical movement of the sleeve 28r.

Figure 68:
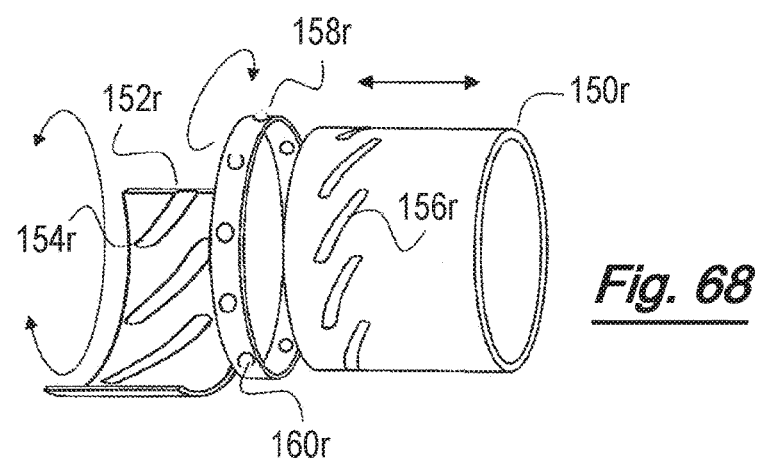
FIG. 68 is a perspective view of a sleeve assembly in accordance with another embodiment of the present invention.

FIG. 68 depicts an expanded view of another embodiment of a sleeve assembly. The sleeve assembly comprises a sleeve 150r and a first actuator part in the form of a rotatable collar 152r that is fixed in position axially. The rotatable collar 152r is provided with one or more helical grooves or slits 154r. The sleeve 150r is also provided with one or more helical grooves or slits 156r. The helical grooves or slits 154r of the rotatable collar 152r have the same handedness as those helical grooves or slits 156r of the sleeve 150r.

Disposed in-between the rotatable collar 152r and the sleeve 150r is a second part of the actuator in the form of an annulus 158r. The annulus 158r houses one or more bearings 160r configured to sit in the one or more helical grooves or slits 154r of the rotatable collar 152r, and to also sit in the helical grooves or slits 156r provided in the sleeve 150r.

In use, the rotatable collar 152r is rotated, for example by another part of the actuator (not shown). Rotation of the rotatable collar 152r causes the annulus 158r to move in a helical and/or axial direction, due to the bearings 160r moving in the helical grooves or slits 154r of the collar 152r. Such movement of the annulus 158r, in turn, causes movement of the sleeve 150r, due to the bearings 160r moving in the helical grooves or slits 156r of the sleeve 150r and the same handedness of the helical grooves or slits 154r, 156r. If movement of the sleeve 150r is not guided in some way, the sleeve 150r may simply rotate with the annulus 158r. Thus, the sleeve assembly may further comprise a guide for guiding (which includes restraining) movement of the sleeve 150r in an axial and/or helical manner.

In practice, the rotatable collar 152r completely surrounds the annulus 158r, which completely surrounds the sleeve 50r. However, this is not shown in the Figure, for reasons of clarity.

Figure 69:
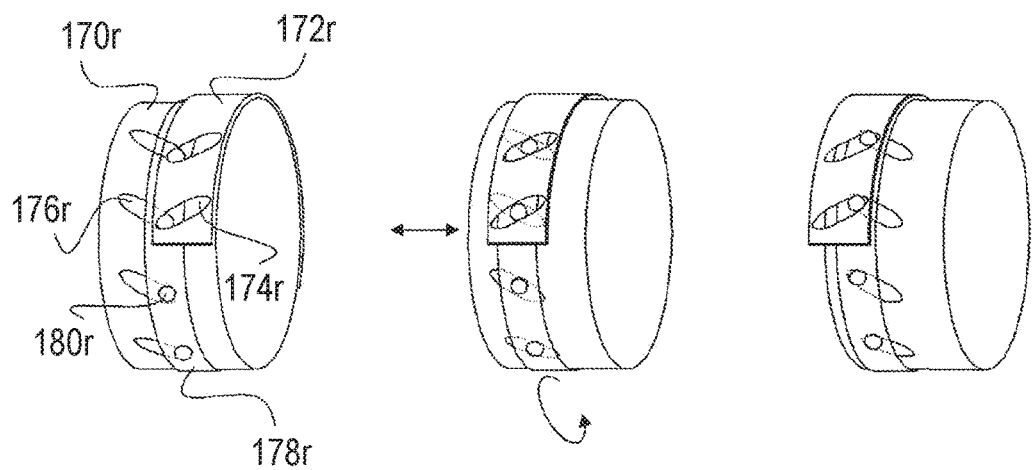
FIG. 69 is a perspective view of a sleeve assembly, in different operating positions, in accordance with a further embodiment of the present invention.

FIG. 69 depicts expanded views of another embodiment of a sleeve assembly, in three stages of operation. The sleeve assembly comprises a sleeve 170r and a first actuator part in the form of a collar 172r that is fixed in position. The collar 172r is provided with one or more helical grooves or slits 174r. The sleeve 170r is also provided with one or more helical grooves or slits 176r. The helical grooves or slits 174r of the collar 172r have a different handedness to those helical grooves or slits 176r of the sleeve 170r.

Disposed in-between the collar 172r and the sleeve 170r is a second part of the actuator in the form of an annulus 178r. The annulus 178r houses one or more bearings 180r configured to sit in the one or more helical grooves or slits 174r of the collar 172r, and to also sit in the helical grooves or slits 176r provided in the sleeve 170r.

In use, the sleeve 170r is driven axially, for example by another part of the actuator, e.g. push rods or the like (not shown). Movement of the sleeve 170r causes the annulus 178r to move in a helical and/or axial direction, due to the bearings 180r moving in the helical grooves or slits 174r of the collar 172r and the helical grooves or slits 176r of the sleeve 170r itself. Movement of the bearings with the annulus, together with the different handedness of the helical grooves or slits 174r of the collar 172r and the helical grooves or slits 176r of the sleeve 170r, causes a driving force applied to the sleeve 170r to be uniformly distributed around the sleeve 170r.

In practice, the collar 172r completely surrounds the annulus 178r, which completely surrounds the sleeve 170r. However, this is not shown in the Figure, for reasons of clarity.

In any of the embodiment, one or more of the collar, rotatable collar and/or sleeve may be provided with a plurality of helical grooves or slits, disposed (e.g. equally) around a circumference of the respective collar, rotatable collar and/or sleeve. This may improve, or further improve, the equalisation of the distribution of driving or movement related forces around the sleeve.

Figure 70:
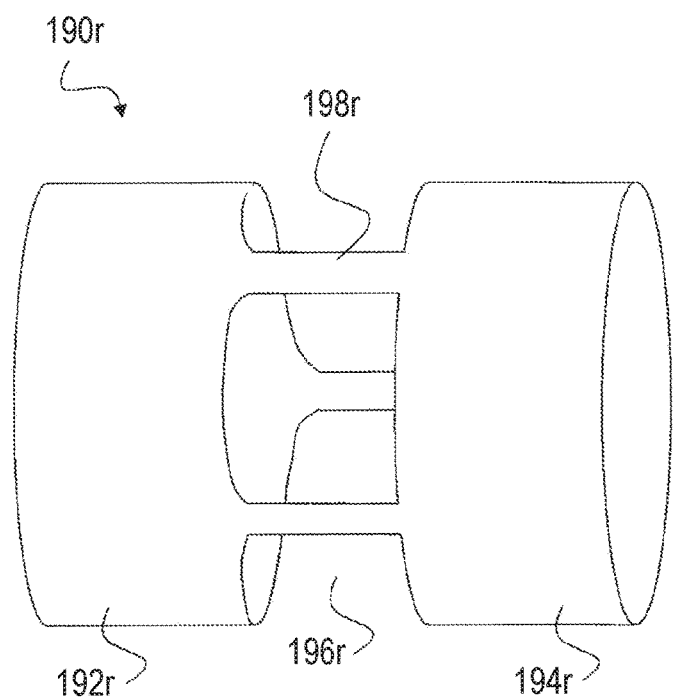
FIG. 70 schematically depicts a sleeve structure in accordance with another embodiment of the present invention.

Various apparatus, and components thereof, have been described for reducing or eliminating contact between structures defining axially offset inlet portions (e.g. baffles, vanes, or other structures). FIG. 70 shows an alternative or additional way in which this result may be achieved.

FIG. 70 schematically depicts a cylindrical sleeve structure 190r in accordance with an embodiment of the present invention. The cylindrical sleeve structure 190r is axially movable across the annular inlet discussed above to vary the size of a gas flow path through the inlet. The cylindrical sleeve structure 190r extends across the entire width of the inlet, such that a first end of the sleeve structure 192r is supported within or by the first inlet side wall, or a body defining that wall, and a second opposite end of the sleeve structure 194r is supported within or by the second sidewall, or a body defining that wall. Supporting the sleeve structure 190r at both sides of the inlet limits or reduced the chances of the sleeve structure coming into contact with a structure in the inlet.

The sleeve structure 190r comprises one or more apertures 196r (e.g. apertures with an axial extent) locatable within the inlet to, upon movement of the sleeve structure 190r, vary the size of a gas flow path through the inlet. This may include moving the sleeve structure 190r to align the apertures 196r with inlet portions or passageways defined in the inlet.

The sleeve structure 190r may be alternatively or additionally described as comprising a sleeve structure that has been provided with, of formed with the one, or more apertures.

The sleeve structure 190r may be alternatively or additionally described as comprising a first sleeve section 192r, and a second sleeve section 194r, the first and second sleeve sections being joined and axially separated by one or more (e.g. axially extending) support struts 198r. The one or more support struts 198r may be attached to the sleeve sections 192r, 194r. However, if the one or more support struts 198r are integral to (e.g. formed integrally with) the sleeve sections 192r, 194r, the overall sleeve structure may be more rigid and mechanically robust.

Figure 70A:
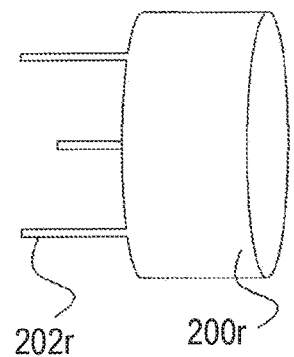
FIG. 70*a* schematically depicts a sleeve structure in accordance with further embodiment of the present invention.
Figure 70B:
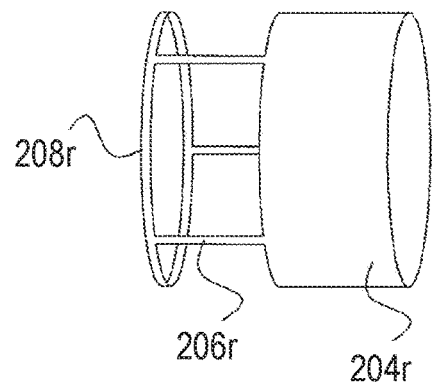
FIG. 70*b* schematically depicts a sleeve structure in accordance with a yet further embodiment of the present invention.
Figure 70C:
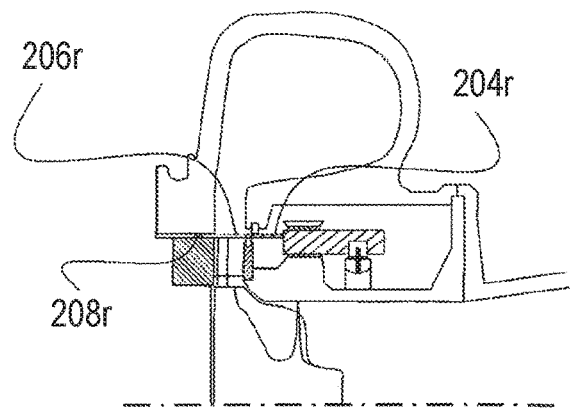
FIG. 70*c* schematically depicts a section of a turbine incorporating the sleeve structure shown in FIG. 70*b*.

In alternative embodiments (see FIGS. 70a to 70c) a single sleeve section 200r, 204r may be provided with one or more support struts 202r, 206r. The sleeve section 200r, 204r may be supported within or by the first inlet side wall, or a body defining that wall, and the struts 202r, 206r, whose ends directed towards the second sidewall may be free (as in FIG. 70a) or may be linked via a ring 208r (see FIGS. 70b and 70c), may be supported within or by the second sidewall, or a body defining that wall. Two axially separated sleeve sections may, however, be preferable, so that the size of the inlet can be controlled by bringing either of the sleeve sections into the inlet to control the size thereof. This may facilitate the control of the size of the inlet from either side thereof, which may provide additional functionality. Alternatively or additionally, the use of two sleeve sections, with an appropriate spacing defined therebetween, may allow for a particular inlet portion or passage thereof to be opened or closed in a selective manner by movement of the sleeve structure as a whole.

It will be appreciated that if struts are employed, apertures may be defined between the struts, or within and/or through the struts.

Struts, or any structure surrounding or defining the aforementioned apertures, may undesirably affect the flow of gas through the inlet. To minimise this undesirable effect, the struts or structures may be aligned with (or more generally, alignable with) leading or trailing edges of vanes or other structures (preferably axially extending) provided in one or both inlet portions or passages in those portions.

A vane may be any structure that divides an inlet portion into one or more inlet passages. The vane may preferably be defined as any structure that can direct gas flow in a particular direction, for example in accordance with a desired swirl angle or angle of attack or the like.

Preferentially, the sleeve surrounds the inlet portions, which has been found to give an improved aerodynamic performance. In other words, the inner diameter of the sleeve is greater than an outer diameter (or outer radial extent) of the inlet portion or portions. In another embodiment, the sleeve may be surrounded by the inlet portions. In other words, the outer diameter of the sleeve may be less than inner diameter of the inlet portion or portions. In another embodiment, the sleeve may be moveable through the inlet portion or portions. In other words, the diameter (e.g. inner or outer, or average diameter) of the sleeve may be less than an outer diameter of the inlet portion or portions, and greater than an inner diameter of the inlet portion or portions.

Although not visible in FIG. 37 an axial extent of a leading end (which includes a leading edge or face) of the sleeve $28w$ varies in magnitude around a circumference of the sleeve $28w$. FIGS. $71a$ to $71c$ depict different examples of such variation.

FIG. $71a$ shows an embodiment of a sleeve $40q$. The axial extent of a leading end $42q$ of the sleeve $40q$ varies in magnitude around a circumference of the sleeve $40q$. The variation has a castellated configuration. The castellation might alternatively or additionally be described as axial variation in a square-wave like manner.

FIG. $71b$ shows another embodiment of a sleeve $50q$. The axial extent of a leading end $52q$ of the sleeve $50q$ varies in magnitude around a circumference of the sleeve $50q$. The variation has a castellated-like configuration. In this embodiment, the castellation is not strictly angular, but involves a degree of curvature of side and base edges of the castellation. The castellation might alternatively or additionally be described as axial variation in a wave like manner.

FIG. $71c$ shows another embodiment of a sleeve $60q$. The axial extent of a leading end $62q$ of the sleeve $60q$ varies in magnitude around a circumference of the sleeve $60q$. The variation has a wave-like property, for example varying in a sinusoidal manner. Because the axial extent of a leading end of the sleeve varies in magnitude around a circumference of the sleeve, the opening or closing of the inlet portions is not undertaken in a harsh step-wise manner, as might be the case if the axial extent exhibited no variation. This might result in associated or related step-wise characteristic in the performance of the turbine as a whole. Instead, the axial variation ensures that the opening or closing of the inlet portions is undertaken more gradually, which obviates or mitigates such a step-wise characteristic.

Referring to FIGS. $71a$ to $71c$, a maximum $70q$ in the variation in magnitude of the axial extent may be substantially equal to: an axial width of an inlet portion; or an axial width of an inlet portion plus an axial width of a baffle that divides the inlet; or an axial width of an inlet passage through an inlet portion. This may facilitate a smooth change or transition in gas flow through the inlet portion as the sleeve is axially moved.

An inlet portion may comprise one or more vanes or other structures dividing the inlet portion into one or more inlet passages. The variation in magnitude of the axial extent in the circumferential direction (e.g. a pitch or wavelength $72q$) may be synchronised in some way with a location of the one or more vanes or other structures, or a spacing between the one or more vanes or other structures. The synchronisation may extend or continue around the circumference of the sleeve. For example, the synchronisation may be such that the variation in magnitude is in phase with the location of the vanes or other structures. Alternatively or additionally, an area defined between a maximum and minimum axial extent may be equal to an area defined between vanes or other structures in the vicinity of the variation. In other words, an area defined by recesses (or in other words between protrusions) of the leading end of the sleeve may be equal to an area of the opening or opening of inlet portions or inlet passages through those inlet portions. This may ensure that when a leading edge of the leading end of the sleeve is aligned with a baffle that divides the inlet, gas flow through an inlet portion which the sleeve has partially closed is optimised. The synchronisation may be used in combination with the concept described above relating to the maximum in the variation in magnitude of the axial extent.

Figure 72:
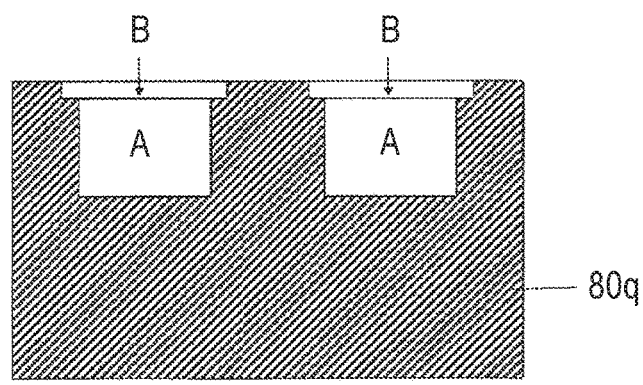
FIG. 72 is a schematic side-on view of the leading end of an axially moveable sleeve according to another embodiment of the present invention.

Referring to FIG. 72, there is shown another embodiment of a sleeve $80q$ incorporating cut out areas A and B, only two of which are visible in FIG. 72. The total area of the cut out sections A and B has been designed to be substantially equal to the area of the throat defined by the vanes located radially inboard of the sleeve (not shown in FIG. 72). In this way, the axial location of the sleeve primarily controls the flow of gas through the turbine inlet rather than the vane throat. The axial depth of each area A is substantially equal to the distance between adjacent baffles within the turbine inlet. The purpose of each area B is to filter out or reduce the undesirable effect the baffle as far as possible by allowing more circumferential area to be exposed to the gas flow at the point at which area A starts to be concealed by a baffle, for this reason the axial depth of area B is equal to the axial thickness of each baffle.

Alignment of a single vane throat area with a radially overlying cut-away section of the sleeve may only be important if the number of cutaways is effectively equal to the number of vanes. It will be appreciated that this does not necessarily need to be the case in all embodiments. In alternative embodiments, more cutaways may be desired for example. In this case, the same basic theory can be applied, i.e. the total flow area defined by the sleeve cut-aways should be substantially similar or equal to the total flow area defined by the combination of all of the vane throats. The shape of the profile of the end of the sleeve defined by one or more cut-away sections can be tailored to meet a specific requirement. For example, a sleeve may be provided with a saw tooth, sinusoidal or semicircular profile.

Figure 73:
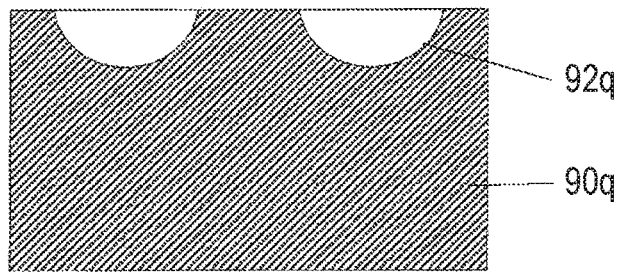
FIG. 73 is a schematic side-on view of the leading end of an axially moveable sleeve according to a still further embodiment of the present invention.

Referring to FIG. 73, a sleeve 90q with semicircular cut-aways 92q may be particularly desirable because semicircular cut-aways offer a good compromise between flow characteristic and design for manufacture. A semicircle profile can be machined relatively easily in comparison to some more complex profiles, but still offers a circumferential increase in flow area with respect to axial position, to filter out the baffle.

It is advantageous in certain embodiments for the axial depth of the cut-away sections of the sleeve to be substantially equal to the spacing between adjacent baffles within the turbine inlet (including the width of one baffle). In such embodiments, it may also be advantageous that at least one or more, more preferably most, or all, of the baffles should have substantially equal axial spacing.

In some embodiments the cut-away sections at the end of the sleeve need not all be the same shape, size or have equal spacing, however it is generally preferred that their combined cross-sectional area relative to gas flow through the turbine inlet should be substantially equal to the cross-sectional area of the throat area of at least one annular array of inlet gas passages defined by the vanes.

The invention may be alternatively or additionally described or defined in many as will now be discussed.

An axial extent of a leading end of the sleeve varies in magnitude around a circumference of the sleeve. This results in a plurality of recesses and/or protrusions being defined around the circumference of the leading end of the sleeve. The recesses (which may be defined as spaces between protrusions) extend through the entire thickness or the sleeve. The recesses and/or protrusions are present to, upon movement of the sleeve, selectively block or expose (e.g. close or open) inlet portions, or inlet passages provided in those portions by other structures.

It will be apparent that the sleeve is free of vanes. It is known in the prior art to provide a sleeve with vanes, for example to affect the angle of attack of gas flowing past the vanes. However, it is important to note that such a prior art sleeve is cylindrical, and this cylinder is then provided with vanes. In other words, an axial extent of a leading end of the prior art sleeve does not vary in magnitude around a circumference of the sleeve. In this prior art sleeve, a plurality of recesses and/or protrusions are not defined around the circumference of the leading end of the sleeve. Instead, vanes protrude from a circular face of that sleeve.

In another prior art sleeve, a leading portion (i.e. not end) of the sleeve extends further in an axial direction that another, adjacent portion (e.g. an outer diameter portion) to accommodate a vane structure upon appropriate movement of the sleeve. However, and again, an axial extent of a leading end of the prior art sleeve does not vary in magnitude around a circumference of the sleeve. Instead, the axial extent defines a circular structure. In this prior art sleeve, a plurality of recesses and/or protrusions are not defined around the circumference of the leading end of the sleeve.

Preferentially, the sleeve surrounds the inlet portions, which has been found to give an improved aerodynamic performance. In other words, the inner diameter of the sleeve is greater than an outer diameter (or outer radial extent) of the inlet portion or portions. In another embodiment, the sleeve may be surrounded by the inlet portions. In other words, the outer diameter of the sleeve may be less than inner diameter of the inlet portion or portions. In another embodiment, the sleeve may be moveable through the inlet portion or portions. In other words, the diameter (e.g. inner or outer, or average diameter) of the sleeve may be less than an outer diameter of the inlet portion or portions, and greater than an inner diameter of the inlet portion or portions.

The extent of the sleeve in the radial direction (which may be described as a thickness of the sleeve) may be small, to reduce aerodynamic load on the sleeve, or actuators thereof. 'Small', may be defined as being less than an axial width of the annular inlet, or less than an axial width of an inlet portion or passage way. The sleeve may be less than 5 mm thick, less than 4 mm thick, less than 3 mm thick, less than 2 mm thick, or less than 1 mm thick, for example approximately 0.5 mm thick.

Figure 74:
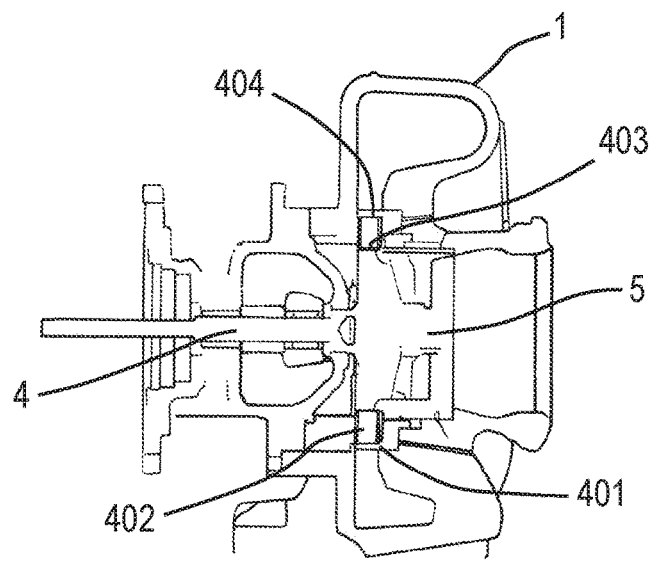
FIG. 74 schematically illustrates a turbine incorporating an axially sliding sleeve and a baffle/vane arrangement in accordance with a preferred embodiment of the present invention.

Referring now to FIG. 74, there is shown a cross-sectional view of a turbine incorporating an axially sliding sleeve 401 and a baffle/vane arrangement in accordance with a preferred embodiment of the present invention in which the vanes 402 are configured so that their radially inner edges 403, i.e. the vane surfaces defining the gas outlets of the baffle/vane structure, have less (or minimal) axial overlap than their radially outer edges 404, i.e. the vane surfaces defining the inlets to the baffle/vane structure.

Figure 75A:
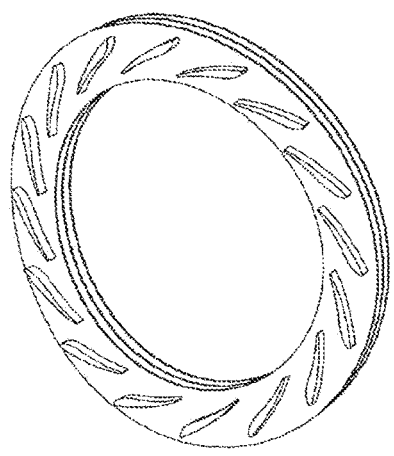
FIGS. 75*a* and 75*b* are perspective and side-on schematic illustrations of a further alternative embodiment of a baffle/vanes structure according to the present invention.
Figure 75B:

FIGS. 75a and 75b are perspective and side-on views of a further alternative embodiment of a baffle/vanes structure according to the present invention which, when mounted within the annular inlet to the turbine, divides the inlet into at least two axially offset inlet passages which axially overlap.

Figure 76:
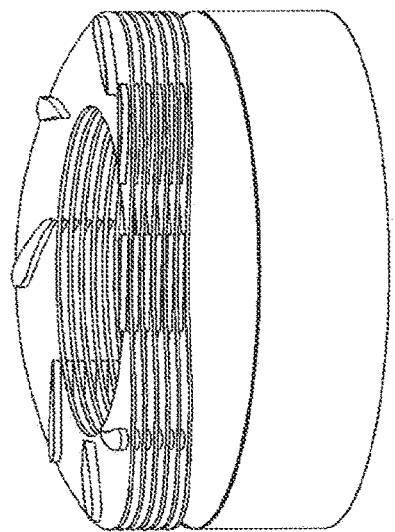
FIG. 76 is a perspective schematic illustration of still another embodiment of a baffle/vane structure according to the present invention.
Figure 77:
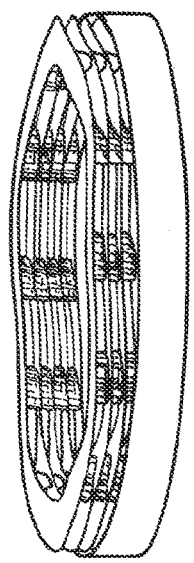
FIG. 77 is a perspective schematic illustration of still another embodiment of a baffle/vane structure according to the present invention.

FIGS. 76 and 77 are perspective views of still further embodiments of baffle/vane structures according to the present invention which, when mounted within the annular inlet to the turbine, divides the inlet into at least two axially offset inlet passages which axially overlap.

Figure 78:
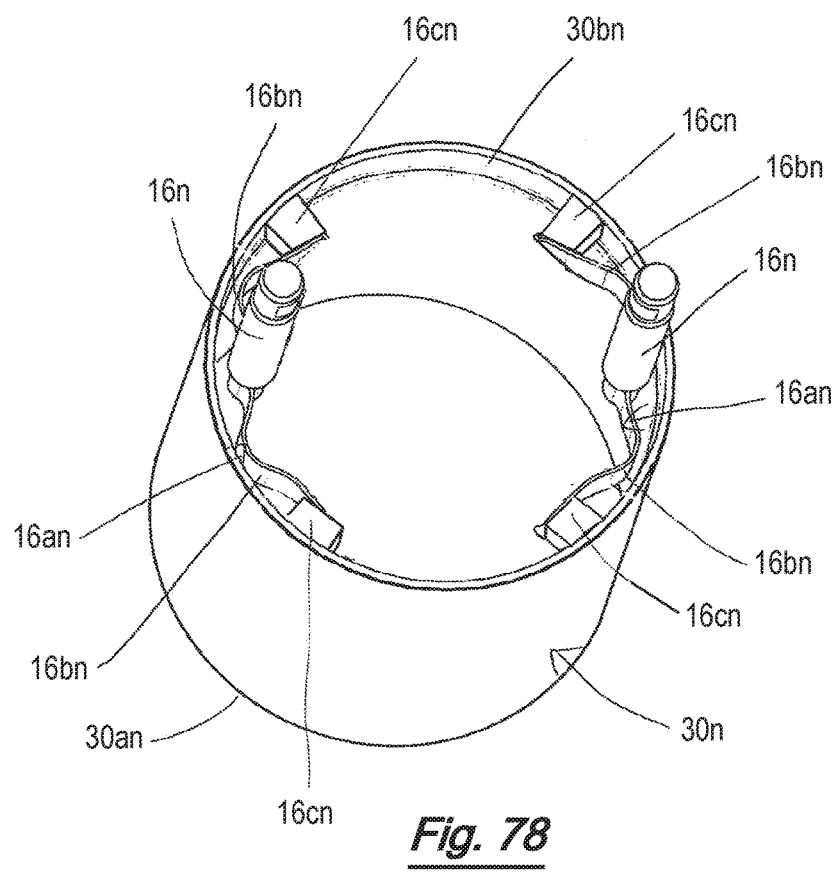
FIG. 78 is a perspective view of a sleeve which forms part of a turbine in accordance with an embodiment of the invention.

FIG. 78 is a perspective view of a sleeve 30n which forms part of a turbine in accordance with an embodiment of the invention. The sleeve 30n is generally cylindrical and has a first, free end 30an which may be used to define the size of an inlet when the sleeve 30n is installed in a turbine according to an embodiment of the present invention. A second end 30bn of the sleeve 30n is linked to a pair of guide rods 16n by respective thermal expansion tolerant structures 16an. When the sleeve 30n is installed in the turbine, the guide rods 16n extend axially and support the sleeve 30n. The guide rods 16n are also linked to an actuator. Accordingly, by appropriate control of the actuator (which may for instance be pneumatic or electric or any other suitable type), the axial position of the guide rods 16n and thus of the sleeve 30n can be controlled.

The thermal expansion tolerant structures 16an shown in FIG. 78 each have a pair of spring arms 16bn which mounted at one end to the sleeve 30n via a mounting portion 16cn. The spring arms 16bn are made of a material (such as sheet metal) which is flexible and can therefore tolerate relative movement which may occur between the sleeve 30n and the guide rods 16n due to thermal expansion of the sleeve 30n, guide rods 16n and/or any other part of the turbine (not shown) including the turbine housing. The spring arms 16bn and/or mounting portions 16cn may be constructed from a material which has a coefficient of thermal expansion which is different to that of the material from which the sleeve 30n and/or guide rods 16n is constructed. It will be appreciated that any other appropriate thermal expansion tolerant structure may be used. For example, any of the thermal expansion tolerant structures disclosed in British patent GB2468871 may be appropriately adapted for use within embodiments of the present invention. The entire contents of British patent application GB2468871 is hereby incorporated by reference.

Figure 79:
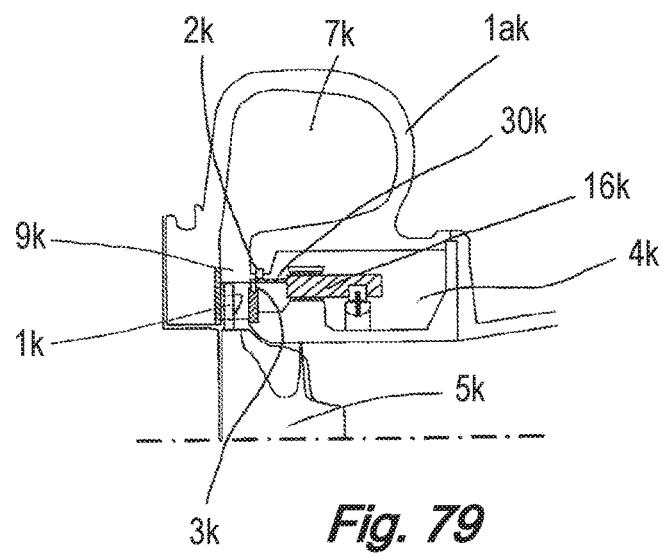
FIGS. 79 to 82 show axial cross sections through parts of turbines in accordance with further embodiments of the invention

FIG. 79 shows a schematic axial cross-section of part of a turbine in accordance with the present invention. The turbine has a turbine wheel 5k mounted for rotation about an axis within a turbine housing 1ak. A nozzle assembly 1k is mounted within an annular inlet 9k which is upstream of the turbine wheel 5k and downstream of an inlet volute 7k. A sleeve 30k is mounted to guide rods 16k (only one of which is shown in the figure) within a turbine housing 1ak, such that the guide rods 16k (and hence the sleeve 30k) can move axially control the size of the inlet 9. The guide rods 16k are located within a chamber 4k. Annular seals 2k and 3k are located between the turbine housing 1ak and sleeve 30k at locations which are radially outboard of the sleeve 30k and radially inboard of the sleeve 30k respectively. The annular seals 2k and 3k define, at least in part, the chamber 4k by separating the chamber 4k from the inlet 9k and hence the inlet volute 7k. A first portion of the sleeve 30k extends into the inlet 9k (and is hence exposed to gas in the inlet which is at an inlet pressure), whereas a second portion of the sleeve 30k is received within the chamber 4k. Axial movement of the sleeve 30k causes the relative size of the first and second portions of the sleeve 30k to change. The annular seals 2k and 3k substantially seal between the sleeve 30k and the turbine housing 1ak both radially outboard and radially inboard of the sleeve 30k. It follows that the flow of gas from the inlet 9k (and hence the inlet volute 7k) into the chamber 4k is substantially prevented. In this manner, the guide rods 16k and the portion of the sleeve 30k which are within the chamber 4k are isolated from, and hence not exposed to the gas in the inlet 9k. Gas in the inlet 9k may be at a relatively high pressure compared to the pressure of gas within the chamber 4k.

It will be appreciated that in some embodiments the seals 2k and 3k may totally prevent gas from flowing from the inlet 9k into the chamber 4k. In other embodiments, some degree of gas flow may be permitted by at least one of the seals 2k and 3k from the inlet 9k into the chamber 4k.

Figure 80:
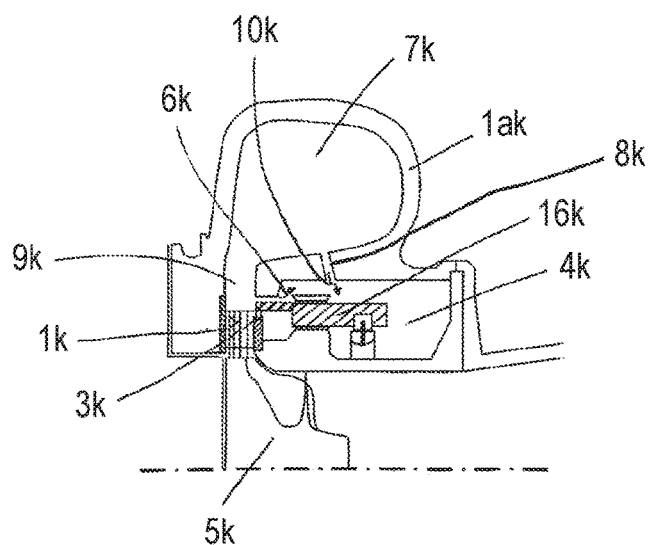

FIG. 80 shows an alternative embodiment of the present invention which is similar to that show in FIG. 79. The embodiment shown in FIG. 80 differs from that shown in FIG. 79 in that the seal (2k within FIG. 79) which is radially outboard of the sleeve 30k has been omitted. The omission of the seal means that there is a gas flow path 6k between the inlet 9k (and hence the inlet volute 7k) and the chamber 4k. It follows that the pressure of the gas in the chamber 4k is substantially equal to the pressure of the gas in the inlet 9k (and hence the inlet volute 7k). It follows that substantially the entire sleeve 30k (and also the guide rods 16k) is exposed to gas which is at substantially the same pressure (in this case the pressure of the inlet 9k and hence the inlet volute 7k). Exposing substantially the entire sleeve to gas which is at substantially the same pressure may in some embodiments of the invention minimise the aerodynamic force which exerted by the gas on the sleeve. It follows that a reduction in the aerodynamic force which exerted by the gas on the sleeve may lead to a reduction in the aerodynamic force transmitted to the actuator and any actuator linkage from sleeve and the guide rods. A reduction in the aerodynamic force transmitted to the actuator and any actuator linkage may mean that a less powerful actuator and/or a less resilient actuator may be used. This may lead to a reduction in the cost, weight and or size of the turbine, which may be desirable in certain applications of the turbine.

The embodiment shown in FIG. 80 further differs from that shown in FIG. 79 in that there is a gas flow passage 8k between the inlet volute 7k and the chamber 4k. The gas flow passage 8k creates a further gas flow path 10k between the inlet volute 7k (and hence the inlet 9k) and the chamber 4k. The effect of the gas flow path 10k is substantially identical to that of gas flow path 6k in that the pressure of the gas in the inlet volute 7k (and hence that of the inlet 9k) is substantially equalised. Thus, substantially the entire sleeve 30k (and also the guide rods 16k) is exposed to gas which is at substantially the same pressure (in this case the pressure of the inlet 9k and hence the inlet volute 7k).

It will be appreciated that although the embodiment shown in FIG. 80 has both gas flow path 6k and gas flow path 10k to substantially equalise the pressure of the gas in the chamber 4k and in the inlet 9k (and hence the inlet volute 7k). In other embodiments, only one of the gas flow paths 6k or 10k may be provided.

Figure 81:
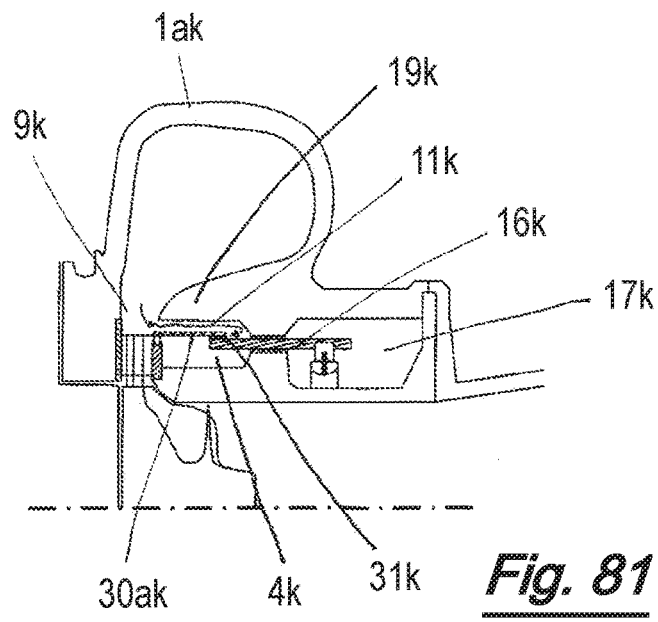

FIG. 81 shows an alternative embodiment in which there is a gas flow path 11k which enables substantially the entire of a relatively thin sleeve 30ak (for example, one with a small radial extent) to be exposed to gas which is at substantially the same pressure as that within the inlet 9k. Furthermore, a rear face 31k of the sleeve is exposed to gas which is at substantially the same pressure as that within the inlet 9k. The force which is exerted on the rear face 31k of the sleeve 30ak by the gas it is exposed to will urge the sleeve 30k in an opposite direction to that which is a result of a force exerted on a portion of the sleeve 30k which is in the inlet 9k. Only a portion of the guide rods 16k is received within the chamber 4k and hence exposed to gas which is at substantially the same pressure as that within the inlet 9k. Chamber 17k which contains a separate portion of the guide roads may be isolated (i.e. such that gas cannot flow between the two) from chamber 4k.

Figure 82:
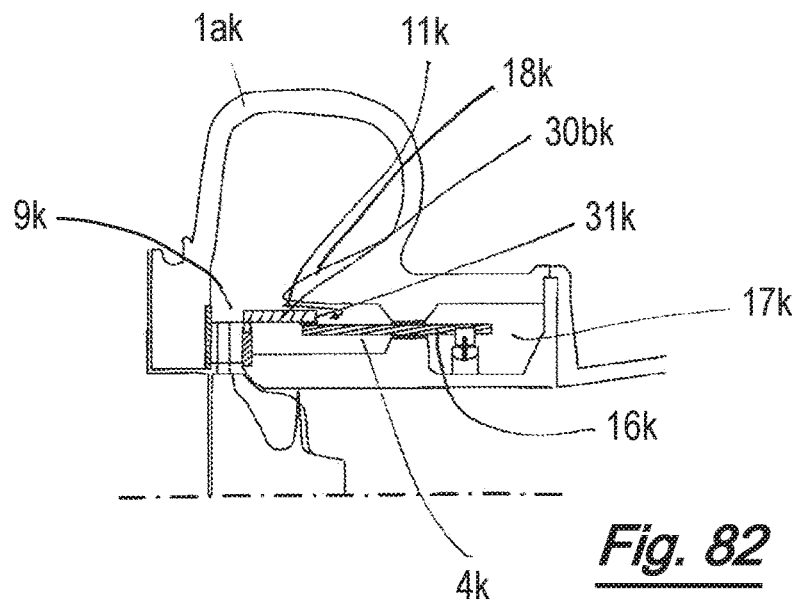

FIG. 82 shows a further embodiment in which a relatively thick sleeve 30bk is received in chamber 4k. Gas flow path 11k ensures that the chamber 4k contains gas which is at substantially the same pressure as that within the inlet 9k. Because the sleeve 30bk is thicker (i.e. has a greater radial extent) than sleeve 30ak the area of back face 31k will be greater than that of sleeve 30ak. As a result, the force exerted by the gas on the back face 31k of the sleeve 30bk will be greater than that exerted on the back face 31k of the sleeve 30ak.

The embodiment shown in FIG. 82 differs from that in FIG. 81 in that a protrusion 18k in the turbine housing 1ak shown in FIG. 82 extends axially less towards the inlet 9k compared to a protrusion 19k in the turbine housing 1ak shown in FIG. 81. This has the effect that, when the sleeve 30bk is in a closed position (as shown in FIG. 82) the sleeve is more exposed to a generally radial force exerted by gas flowing through the inlet 9k than sleeve 30ak in a closed position (as shown in FIG. 81). Minimising the generally radial force exerted on the sleeve 30ak may reduce wear on the sleeve 30ak in some embodiments of the invention.

Figure 83:
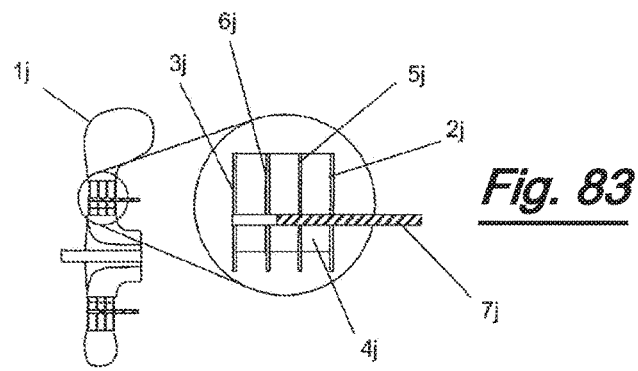
FIG. 83 is an axial cross-section through a turbine volute and annular inlet of a turbine according to a yet further embodiment of the present invention.
Figure 84:
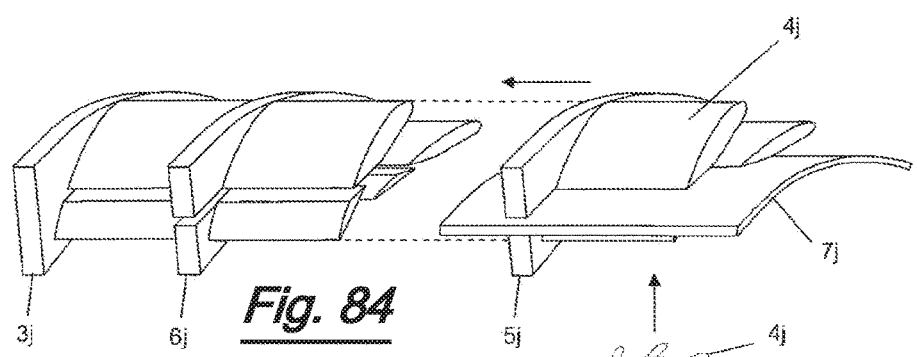
FIG. 84 is a perspective illustration of components of a section of a nozzle structure forming part of a turbine according to the embodiment of FIG. 83 composed of an inlet sidewall, baffles, vanes and an axially slidable sleeve.
Figure 85:
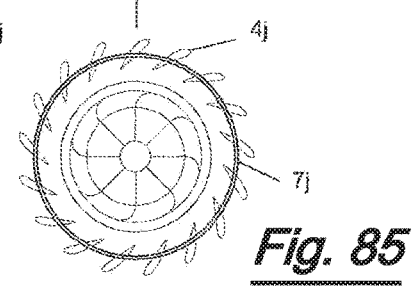
FIG. 85 is a radial cross-sectional illustration of the array of vanes, baffles and cylindrical sleeve according to the embodiment of FIGS. 83 and 84.

Referring to FIGS. 83 to 85 there is shown a turbine volute 1j incorporating an annular inlet defined between first and second inlet sidewalls 2j, 3j. Within the inlet is mounted a nozzle structure comprised of three axially offset annular arrays of axially extending vanes 4j interposed by first and second annular baffles 5j, 6j so as to define inlet passages through which exhaust gases flow towards the turbine wheel (not shown) during operation. There is also provided an axially slidable sleeve 7j which can be moved between the first and second sidewalls 2j, 3j so as to vary the axial width of the inlet.

As can be observed in FIGS. 83 to 85, the sleeve 7j is located on a radius which is intermediate the inner and outer diameters of the baffles 5j, 6j. As a result, to facilitate axial movement of the sleeve 7j, the vanes 4j and baffles 5j, 6j define radially extending slits centred on the same radius and having a similar or greater radial thickness to that of the sleeve 7j. Locating the sleeve 7j within the 'throat' area of the vanes 4j reduces or may substantially remove any step response in mass flow of the exhaust gases as the sleeve 7j is displaced axially across the inlet.

Figure 86:
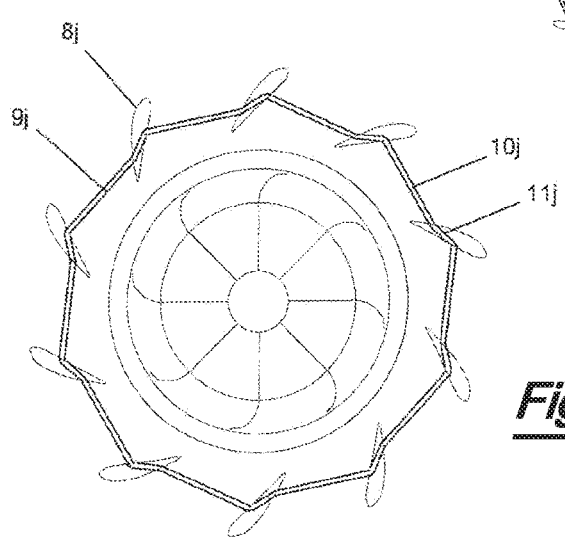
FIG. 86 is a radial cross-sectional illustration of a generally cylindrical axially slidable sleeve and array of vanes according to an alternative embodiment of the present invention.

FIG. 86 is a radial cross-sectional illustration of an axially slidable sleeve 9j and array of vanes 8j according to an alternative embodiment of the present invention.

The arrangement depicted in FIG. 86 is similar to that shown in FIG. 85 except for the fact that the sleeve 9j, while still clearly generally cylindrical, is composed of a plurality of sections or segments 10j, 11j which are substantially straight in axial cross-section. Such an embodiment may be advantageous, for example, to better align the sleeve 9j with the position of minimum cross-sectional area, i.e. the throat defined by the vanes 8j.

Nozzle structures in accordance with the present invention may be configured to provide varying efficiency for different inlet widths (i.e. corresponding to different positions of the sleeve or sleeves). For instance, it is mentioned above in relation to the embodiment of FIGS. 3 to 6 that baffles may be unequally spaced across the axial width of the inlet. Where the sleeve is capable of moving to positions between the location of baffles, there may be greater inefficiency at such an intermediate position between two relatively widely spaced baffles than between two relatively closely spaced baffles. The ability to tailor the efficiency of the nozzle in this way may have a number of applications.

For instance, turbocharged engines may have an exhaust flow path for returning exhaust gas into the engine inlet. Such systems are generally referred to as "exhaust gas re-circulation" systems, or EGR systems. EGR systems are designed to reduce particulate emissions from the engine by re-circulating a portion of exhaust gas for re-combustion which may often be necessary to meet increasingly stringent emissions legislation. Introduction of re-circulating exhaust gas into the boosted inlet air flow can require a raised exhaust manifold pressure in "short route" EGR systems in which the re-circulating exhaust gas passes from the exhaust to the engine inlet without reaching the turbocharger turbine.

Variable geometry turbochargers can be used to assist in raising the exhaust gas to the required pressure for re-circulation to increase the "back pressure" in the exhaust gas flow upstream of the turbine. When using a variable geometry turbocharger in such a way it has been found that it can be advantageous to reduce the operating efficiency of the turbine at certain inlet widths. In accordance with the present invention this can be achieved by constructing the nozzle e.g. spacing of the inlet baffles, so that the inlet passages 39 are particularly wide (axially) in the region of the mid-stroke position of the sleeve. For instance, between two suitably widely positioned baffles, there will be a range of relatively inefficient positions for the sleeve, typically corresponding to the pair of baffles being a third to a two-thirds open, and the baffle positions may be chosen to provide inefficient operation when the whole inlet is more than half open. Such deliberately produced inefficiency may not have any significant effect on the efficiency of the nozzle when the sleeve is fully open, or indeed fully or nearly fully closed.

It would be possible to achieve a similar effect from "honeycomb" type nozzle structures in accordance with the invention, by ensuring that the inlet passages 39 have a greater maximum axial width around the mid-point of the nozzle assembly or any other axial location of the nozzle corresponding to inlet widths at which reduced efficiency is desired0.

In some embodiments of the invention it might be advantageous to decrease the baffle spacing (or otherwise increase the axial size of the inlet passages 39) in regions of the inlet corresponding to closed or relatively closed positions of the sleeve.

That is, using a given number of baffles there may be advantages in arranging the baffles closer together near to the fully closed position. For any given number of baffles, this may increase efficiency in relatively closed positions of the sleeve.

Various other modifications may be made to certain embodiments of the invention. For instance, the sleeve could be provided with one or more bypass apertures which are only exposed to gas flow through the inlet when the sleeve is in a closed or "over-closed" position. An "over-closed" position may be regarded as a position in which the sleeve moves axially beyond a position necessary to fully block the inlet. A bypass aperture could for instance allow exhaust gas to bleed through the sleeve towards the turbine inlet, towards the turbine downstream of it's inlet (e.g. via the turbine shroud) or even downstream of the turbine to bypass it entirely in order to increase the temperature of exhaust gas downstream of the turbine which might be useful in order to oxidise soot collected in a downstream particulate filter, in order to re-generate the filter. In other applications there may be other advantageous aerodynamic effects to be achieved by allowing the sleeve to move into an "over-closed" position, and thereby open an alternative gas flow path.

Similarly, in some embodiments of the invention it may be advantageous for the sleeve to be movable to an "over-open" position to expose a bypass gas passage which is not normally open as the sleeve moves through its normal operating range to control the size of the inlet. Such a bypass passage could for instance provide wastegate functionality which may extend the effective flow range of the turbine. The bypass passage could for instance comprise one or more bypass apertures formed in a cylindrical surface extending inboard of the sliding sleeve (e.g. as an extension to the sleeve). This arrangement may be particularly suitable for a turbine-side mounted sleeve. In an alternative arrangement movement of the sleeve into an "over-open" position may expose apertures provided in the turbine housing thereby opening a bypass flow path. This arrangement may be particularly suitable for a sleeve mounted on the bearing housing side of the inlet. Bypass arrangements such as that disclosed in U.S. Pat. No. 7,207,176 could for instance be adapted for application to embodiments of the present invention.

It will be understood that whereas embodiments of the present invention have been described in relation to the turbine of a turbocharger, the invention is not limited in application to turbochargers but could be incorporated in turbines of other apparatus. Non-limiting examples of such alternatives include power turbines, steam turbines and gas turbines. In embodiments in which the turbine is part of a turbocharger, the turbocharger might be part of a turbocharged combustion engine, such as a compression ignition (diesel) engine, or a gasoline direction injection (GDi) engine for example. Such applications could include more than one turbocharger including a turbine according to the present invention. Other possible applications include fuel cell turbochargers or turbines.

Turbines in accordance with the present invention may include a wastegate, which may be a controllable independently of the sleeve (or sleeves). Wastegates of conventional design might be used.

The present invention may be used in one or more turbines of a multi-stage turbine arrangement. For instance, a radial inflow turbine according to the present invention may be combined with a second turbine stage which could be radial or axial.

The multi-stage turbines may be mounted to a common turbine shaft. Turbines according to the present invention may similarly be included in turbochargers of a multi-turbocharger system. For instance, turbochargers in a series or parallel arrangement may include turbines according to the present invention.

Turbines according to the present invention may also be used for generating electrical energy (for instance in an automotive system) or in waste heat recovery systems (again particularly for automotive applications, e.g. where a secondary fluid such as water or a refrigerant fluid is boiled by low grade engine/exhaust heat, and expands to drive the turbine). The secondary fluid could even be compressed air as described by the Brayton cycle.

The turbine inlet volute may be a divided volute. For instance, it is known to provide a turbocharger turbine with a volute divided into more than one chamber, each volute chamber being connected to a different set of engine cylinders. In this case, the division is usually an annular wall within the volute separating the volute into axially adjacent portions. It may also be possible to divide the volute circumferentially so that different arcuate portions of the volute deliver gas to different arcuate portions of the turbine inlet.

The turbine of the present invention has been illustrated in the figures using a single flow volute, however it is applicable to housings that are split axially, whereby gas from one or more of the cylinders of an engine are directed to one of the divided volutes, and gas from one or more of the other cylinders is directed to a different volute of the turbine housing. It is also possible to split a turbine housing circumferentially to provide multiple circumferentially divided volutes, or even to split the turbine housing both circumferentially and axially.

However an axially or circumferentially split volute can for instance be distinguished from the axially and circumferentially spaced gas inlet passages of the present invention. For example, the latter relate to a nozzle structure arranged to accelerate exhaust gas from the volute towards the turbine, and also possibly to adjust or control the swirl angle of the gas as it accelerates. Although straight inlet gas passages are in principle possible, generally they are curved so as to control the gas swirl angle efficiently. The gas inlet passages may also distinguished from divided volutes in that the former receive gas from the volute (or divided volute), and split the gas into an array of paths. By contrast divided volutes receive gas from the exhaust manifold, and generally from differing cylinders of an engine so as to retain the gas velocity in gas pulses resulting from individual engine cylinder opening events. As such, a divided volute transmits the gas to the annular inlet, while the gas inlet passages of the present invention accept gas from the volute.

It would be possible to provide the present invention in conjunction with an axially divided volute. In such embodiments the baffle(s) axially dividing the gas inlet passages would generally be distinct from the wall(s) axially dividing the volutes.

It would also be possible to provide the present invention in conjunction with a circumferentially divided volute. A wall dividing two circumferentially spaced volutes could extend radially inwards to further serve as one of the vanes (again provided that the sliding sleeve operates at the inner diameter of the gas inlet passages). Alternatively such a volute dividing wall could extend radially inward and adjacent to the sliding sleeve, so the sleeve is radially inboard of the volute dividing wall, but outboard of the gas inlet passages. Such an arrangement could beneficially mitigate the loss of gas velocity in gas pulses experienced in a single volute turbine, and might also assist in guiding the sliding sleeve to mitigate the possibility of it becoming misaligned and consequently jamming.

The present invention has been described generally in relation to radial inflow turbines. However it is not necessary for the flow to be fully restricted to the radial plane, and a moderately conical inlet may be implemented instead. Furthermore the invention may be applied to "mixed-flow" turbines, whereby the conical inlet has a cone angle in the region of up to 45 degrees or where the turbine housing is axially split into more than one volute, each having a different degree of mixed flow direction. For example one volute might have an inlet substantially in the radial plane while a second volute might have an inlet extending backward in the region of 45 degrees. The present invention could be applied to either one or both of the volutes in such an embodiment.

The invention described in the present could be applied in the case of an axially divided turbine housing, where one volute directs gas axially to the turbine, and another volute directs gas radially or at an intermediate angle to the turbine.

The invention is also applicable to dual (or multi) stage turbines. Therefore it might be applied to the first stage of a multi-stage turbine where the first stage is a radial-inflow turbine stage (or mixed flow turbine stage) and there are one or more additional stages such as axial turbines stage and/or a radial-outlet turbine stage.

As indicated above, the present invention may be implemented to vary the geometry of only one or some of the volutes of an axially divided volute turbine. Indeed it would be possible to provide two variable geometry mechanisms as described herein, utilising two sliding sleeves so as to vary the flow of two axially divided volutes independently.

The present invention could be implemented in conjunction with a sliding variable geometry turbine mechanism of the prior art such as described in U.S. Pat. No. 4,557,665, U.S. Pat. No. 5,868,552, or U.S. Pat. No. 6,931,849. For example the cylindrical sliding wall may additionally be provided with a radial sliding wall. The cylindrical sliding wall acts to vary the number of gas inlet passages exposed, while the sliding radial wall acts to vary the width of a second set of gas inlet passages which are at a different radial extent to the others. Another way to combine the present invention with a sliding variable geometry turbine mechanism of the prior art would be to implement the two types of variable geometry mechanism in two different volutes of an axially divided volute turbine. A third way to implement these mechanisms in conjunction would be to provide them on different turbines of a multiple turbine system, such as a two stage turbocharger.

The present invention could be implemented in conjunction with a swing vane variable geometry mechanism such as described in U.S. Pat. No. 6,779,971 or US2008118349. One possible way to achieve this would be to provide an array of swing vanes each having local baffles (e.g. circular), which are arranged flush with annular baffles. The annular baffles have enough clearance to allow the vanes to rotate between predefined angles. The sliding sleeve as described herein could be permitted to slide inboard or outboard of the annular baffles. This design presents some technical challenges so it might be preferred to implement an array of swing vanes radially inboard or radially outboard of the axially divided array of gas inlet passages as described herein, however the advantage of doing so may be small compared to the cost of doing so. A third, and perhaps better way to combine the present invention with a swing vane system would be to provide a twin inlet (axially divided volute) turbine with an array of swing vanes in one volute, and the sliding sleeve and axially divided baffles described herein in the second volute. A fourth and more yet better way to combine the present invention with a swing vane system would be to provide two turbines (or two turbochargers) in one system (for example in a twin turbo engine system), one of them being a swing vane turbine, and the other being a turbine according to the present invention.

The axially divided gas passages and sliding sleeve described herein might also be implemented in conjunction with a "variable flow turbine" design as described in JP10008977 In these designs a "variable flow turbine" has an inner main volute and an outer (or in rare cases an axially adjacent) "flow extension" volute the entry of which is controlled by a valve similar in shape to conventional flap valves or wastegate valves, the present invention might be implemented to vary the cross sectional area of the flow path back from the outer volute to the inner volute. This might alleviate the need for the outer volute to have such a gat at its inlet. Alternatively/additionally the present invention might be implemented to vary the flow cross sectional area of the inner volute to the turbine. Additionally/alternatively the present invention might be implemented in a multi-turbine (or multi turbocharger) system, one exhibiting the present invention, and the other exhibiting a "variable flow turbine" such as described in JP10008977.

Whereas examples of mechanisms for actuating the inlet sleeves are discussed above, it will be appreciated that other mechanisms may be employed as appropriate to different embodiments and applications of the invention.

A turbine nozzle according to the present invention could be implemented in conjunction with the circumferentially sliding volute tongue extender described in DE102007058246.

A turbine nozzle according to the present invention could be implemented with a multiple volute turbine housing being an asymmetric housing, where one volute is larger than another. The dividing wall between the volutes may or may not extend in to the annular nozzle.

A turbine nozzle according to the present invention could be enabled to also actuate a second device, for example a variable geometry mechanism of a different turbine, a boost relief valve, or a variable geometry compressor mechanism.

A turbine nozzle according to the present invention may be implemented in conjunction with a shaft operating on fluid film bearings (i.e. oil fed) and could be implemented with a shaft operating on rolling element bearings (i.e. ball bearings), however other bearings such as aerostatic, aerodynamic and magnetic are possible.

A turbine nozzle according to the present invention may be implemented to drive an electric machine. For example it could drive a shaft supporting the turbine, a compressor and a generator. The generator might be between the compressor and the turbine, or it might be axially outboard, in particular beyond the compressor.

A turbine nozzle according to the present invention may be implemented in conjunction with a dual walled or otherwise thermally insulating turbine housing. Alternatively or additionally the turbine housing could be cooled for example with water cooling. Alternatively or additionally the turbine housing could be provided with a non metallic layer, for example ceramic for insulation or aramid fibre or substitute fibres for burst containment.

Furthermore the material of a turbine nozzle according to the invention (or indeed the sliding sleeve) could be ceramic, cermet, instead of metal. Of if of metal could be any steel, or a nickel based alloy such as inconel. It could be provided with a coating, for example on the sliding interface of the nozzle and the sleeve there could be a coating of diamond-like-carbon, anodisation, or tribaloy or a substitute wear resistant coating. On the aerodynamic surfaces there could be a coating to promote smoothness or resist corrosion. Such coatings on the turbine components could include non-deposited coatings such as plasma-electrolytic-oxide coating or substitute coatings. Optionally the nozzle or the sleeve could be provided with a sensor that could be an integrated sensor (such as a pressure, temperature, vibration or speed sensor). Such sensors would need to be insulated electrically from other metallic components.

A turbine nozzle according to the present invention could be implemented in conjunction with noise reduction means such as absorption or reflection silencers, including quarter wave or Helmholtz resonators. These could in principle be provided in any of the aerodynamic surfaces.

A turbine nozzle according to the present invention could be implemented in conjunction with oil sealing means on the shaft of the turbine, which could include blown double seals such as piston rings. A range of oil slingers and other oil seals as known in the prior art could be provided.

A turbine nozzle according to the present invention could be implemented in conjunction with a low-restriction pipe bend, for example at the turbine outlet, the bend having a widened portion at the bend.

The turbine inlet could have a valve arranged to control the ratio of inlet flow between two or more volutes, or control the ratio of flow (or back pressure) between various gas sources such as engine cylinders.

The turbine inlet may be formed as a contiguous element with an exhaust manifold.

A wide range of control strategies may be implemented to control the sliding sleeve described herein. The range of possible control strategies includes all those already described in the literature with respect to controlling conventional variable geometry mechanisms, especially sliding vane mechanisms used on automotive turbochargers.

Among the various possible actuation methods possible, is the axially arranged tripod which permits on-axis actuation for example using a pneumatic actuator can. The sliding sleeve may be actuated from a chamber situated axially away from the turbine, which may contain a soot collection or oxidation element, such as the wire mesh or catalyst coated wire mesh as described in WO2010012992.

A turbine nozzle according to the invention may be used in conjunction with a splitted turbine wheel, having some blades that extend the full axial width of the turbine inlet, and some vanes which extend only part way from the turbine back face axially across the inlet. For example the shorter vanes may extend up to but not beyond a particular axial nozzle division, such as a baffle. The short and long vanes may alternate, or alternatively there could be several short vanes between each long vane.

Another option is to have more than two types of vane. There might also or alternatively be variation in the number of blades along the turbine. For example some blades may extend all the way from the turbine inlet to the turbine outlet while other vanes (e.g. alternating) might extend only from the inlet partway to the outlet, or from the outlet only partway to the inlet.

The turbine might be provided with an integral rotating wall which may be adjacent to the turbine shroud formed by the turbine housing. This forms a front face for the passages between the turbine blades. Alternatively or additionally the turbine might be provided with one or more rotating walls partway between the hub/backface of the turbine and the frontface of the turbine. Such one or more rotating walls might be aligned axially with one or more respective axial dividers of the axially divided nozzle described herein. This would prevent the gas expanding away from the turbine hub and backface when the sliding sleeve is only partly open, and would contribute to turbine efficiency.

Any one or more of the above embodiments, or features thereof, may be combined with other embodiments, or features thereof, where appropriate.

Other possible modifications and alternatives to the embodiments illustrated and describe above will be readily apparent to the appropriately skilled person.

The invention claimed is:

1. A variable geometry turbine comprising
   a turbine wheel mounted for rotation about a turbine axis within a housing, the housing defining an annular inlet surrounding the turbine wheel and defined between first and second inlet sidewalls; and
   a cylindrical sleeve axially movable across the annular inlet to vary the size of a gas flow path through the inlet;
   wherein the annular inlet is divided into at least three axially offset inlet passages by two or more inlet passage walls disposed between the first and second inlet sidewalls.

2. A variable geometry turbine according to claim 1, wherein the inlet passage walls are axially spaced annular baffles, the baffles dividing the annular inlet into axially adjacent annular portions.

3. A variable geometry turbine according to claim 2, wherein the number of baffles is one of 2, 3, 4, 5 or 6.

4. A variable geometry turbine according to claim 2, further comprising inlet vanes which extend axially across at least two of said axially adjacent annular portions; wherein the cylindrical sleeve is axially movable across the annular inlet to vary the size of a gas flow path through the inlet between a free end of the sleeve and the first inlet sidewall; and wherein the axial width of the inlet vanes extending across a first annular portion of the inlet is less than the axial width of the inlet vanes extending across a second annular portion of the inlet, the first annular portion being closer to the first inlet sidewall than the second annular portion is to the first inlet sidewall.

5. A variable geometry turbine according to claim 1, wherein the two or more inlet passage walls define an annular array of substantially tubular inlet passages extending generally towards the turbine wheel, wherein the annular array of inlet passages comprises at least three axially offset inlet passages.

6. A variable geometry turbine according to claim 5, wherein the sleeve is axially movable between an open position in which there is a gas flow path through the inlet, between a free end of the sleeve and the first inlet sidewall, through at least one of said at least three axially offset inlet passages, and a closed position in which the size of said gas flow path through the inlet between the free end of the sleeve and the first inlet sidewall is reduced compared to that when the sleeve is in the open position; and wherein the sleeve moves in a direction towards said first inlet sidewall when the sleeve is moved from the open position towards the closed position.

7. A variable geometry turbine according to claim 6, wherein, when the sleeve is in the closed position, the axial distance between at least a portion of the free end of the sleeve and the first inlet sidewall is less than each of the respective axial distances between at least two of the two or more inlet passage walls and the first inlet sidewall.

8. A variable geometry turbine according to claim 6, wherein, when the sleeve is in the closed position, the axial distance between all of the free end of the sleeve and the first inlet sidewall is less than each of the respective axial distances between at least two of the two or more inlet passage walls and the first inlet sidewall.

9. A variable geometry turbine according to claim 6, wherein, when the sleeve is in the closed position, the axial distance between at least a portion of the free end of the sleeve and the first inlet sidewall is less than each of the respective axial distances between each of the two or more inlet passage walls and the first inlet sidewall.

10. A variable geometry turbine according to claim 6, wherein, when the sleeve is in the closed position, the axial distance between all of the free end of the sleeve and the first inlet sidewall is less than each of the respective axial distances between each of the two or more inlet passage walls and the first inlet sidewall.

11. A variable geometry turbine according to claim 6, wherein, when the sleeve is in the closed position, the axial distance between at least a portion of the free end of the sleeve and the first inlet sidewall is less than the axial distance between one of the two or more inlet passage walls and the first inlet sidewall, and wherein said one of the two or more inlet passage walls is located such that the axial distance between said one of the two or more inlet passage walls and the first inlet sidewall is less than or equal to substantially 50% of the axial distance between the first and second inlet sidewalls.

12. A variable geometry turbine according to claim 6, wherein, when the sleeve is in the closed position, the axial distance between at least a portion of the free end of the sleeve and the first inlet sidewall is less than the axial distance between one of the two or more inlet passage walls and the first inlet sidewall, and wherein the sleeve substantially does not contact said one of the two or more inlet passage walls when the sleeve is in the closed position.

13. A variable geometry turbine according to claim 6, wherein, when the sleeve is in the closed position, the axial distance between at least a portion of the free end of the sleeve and the first inlet sidewall is less than the axial distance between one of the two or more inlet passage walls and the first inlet sidewall, and wherein the sleeve is mounted such that gas may pass between said one of the two or more inlet passage walls and the sleeve when the sleeve is in the closed position, the gas then passing through the inlet.

14. A variable geometry turbine according to claim 6, wherein the sleeve is mounted such that, when the sleeve is in the closed position, the sleeve substantially does not contact any of the two or more inlet passage walls.

15. A variable geometry turbine according to claim 6, wherein an axial dimension of a first of said axially offset inlet passages is less than an axial dimension of a second of said axially offset inlet passages, and wherein the first of said axially offset inlet passages is located closer the first inlet sidewall than the second of said axially offset inlet passages.

16. A variable geometry turbine according to claim 1, wherein the annular inlet is in communication with a volute through which, during operation, gas flows to the annular inlet, such that the annular inlet is downstream of the volute.

17. A variable geometry turbine according to claim 16, wherein the first and second inlet sidewalls of the annular inlet are continuations of walls which define the volute.

\* \* \* \* \*